United States Patent [19]
Withgott et al.

[11] Patent Number: 5,390,259
[45] Date of Patent: Feb. 14, 1995

[54] METHODS AND APPARATUS FOR SELECTING SEMANTICALLY SIGNIFICANT IMAGES IN A DOCUMENT IMAGE WITHOUT DECODING IMAGE CONTENT

[75] Inventors: M. Margaret Withgott, Los Altos; Steven C. Bagley; Dan S. Bloomberg, both of Palo Alto, all of Calif.; Daniel P. Huttenlocher, Ithaca, N.Y.; Ronald M. Kaplan, Palo Alto, Calif.; Todd A. Cass, Cambridge, Mass.; Per-Kristian Halvorsen, Los Altos, Calif.; Ramana B. Rao, San Francisco, Calif.; Douglass R. Cutting, Menlo Park, Calif.

[73] Assignee: Xerox Corporation, Rochester, N.Y.

[21] Appl. No.: 794,191

[22] Filed: Nov. 19, 1991

[51] Int. Cl.⁶ .............................................. G06K 9/00
[52] U.S. Cl. ............................................ 382/9; 382/18; 382/40
[58] Field of Search ................... 382/9, 18, 25, 27, 54, 382/55, 40

[56] References Cited

U.S. PATENT DOCUMENTS

| | | |
|---|---|---|
| 2,905,927 | 9/1959 | Reed . |
| 4,010,445 | 3/1977 | Hoshino . |
| 4,155,072 | 5/1979 | Kawa . |
| 4,377,803 | 3/1983 | Lotspiech et al. . |
| 4,408,342 | 10/1983 | Grabowski et al. . |
| 4,610,025 | 9/1986 | Blum et al. . |
| 4,731,857 | 3/1988 | Tappert . |
| 4,750,209 | 6/1988 | Shimura et al. ............ 382/9 |
| 4,773,098 | 3/1988 | Scott . |
| 4,809,344 | 2/1989 | Peppers et al. . |
| 4,847,912 | 7/1989 | Tanaka et al. ............ 382/18 |
| 4,965,763 | 10/1990 | Zamora . |
| 4,972,349 | 11/1990 | Kleinberger . |
| 4,977,603 | 12/1990 | Irie et al. . |
| 4,979,227 | 12/1990 | Mittelbach et al. . |
| 4,985,863 | 1/1991 | Fujisawa et al. . |
| 4,991,094 | 2/1991 | Fagan et al. . |
| 4,994,987 | 2/1991 | Baldwin . |
| 4,996,707 | 2/1991 | O'Malley et al. . |
| 5,077,668 | 12/1991 | Doi . |

FOREIGN PATENT DOCUMENTS

0364179 4/1990 European Pat. Off. .
0364180 4/1990 European Pat. Off. .

OTHER PUBLICATIONS

D. S. Bloomberg, "Multiresolution morphological approach to document image analysis", First International Conference on Document Analysis and Recognition ICDAR 91, 30 Sep.–20 Oct. 1991, St. Malo France, pp. 963–971.

D. S. Bloomberg, "Image analysis using threshold reduction", SPIE Proc. Conference On Image Algebar and Morphological Image Processing II, vol. 1568, 23–24 Jul. 1991, San Diego, pp. 38–52.

(List continued on next page.)

*Primary Examiner*—Leo H. Boudreau
*Attorney, Agent, or Firm*—Oliff & Berridge

[57] ABSTRACT

A method and apparatus for processing a document image, using a programmed general or special purpose computer, includes forming the image into image units, and at least one image unit classifier of at least one of the image units is determined, without decoding the content of the at least one of the image units. The classifier of the at least one of the image units is then compared with a classifier of another image unit. The classifier may be image unit length, width, location in the document, font, typeface, cross-section, the number of ascenders, the number of descenders, the average pixel density, the length of the top line contour, the length of the base contour, the location of image units with respect to neighboring image units, vertical position, horizontal inter-image unit spacing, and so forth. The classifier comparison can be a comparison with classifiers of image units of words in a reference table, or with classifiers of other image units in the document. Equivalent classes of image units can be generated, from which word frequency and significance can be determined. The image units can be determined by creating bounding boxes about identifiable segments or extractable units of the image, and can contain a word, a phrase, a letter, a number, a character, a glyph or the like.

9 Claims, 38 Drawing Sheets

OTHER PUBLICATIONS

G. A. Story et al., "The RightPages Image-Based Electronic Library for Alerting and Browsing", Computer, vol. 25, No. 9, Sep. 1992, pp. 17-25.

"Document Analysis System" Wong et al. IBM Journal of Research and Development, vol. 26, No. 6, pp. 647-656 (Nov. 1982).

"Unsupervised Construction of Decision Networks For Pattern Classification" Casey et al. IMB Research Report RJ 4264 (46852) Jun. 21, 1984.

"Introduction To Modern Information Retrieval" Salton et al. Chapter 2, McGraw-Hill, Inc. pp. 24-51, 1983.

"Schochastic Modeling for Automatic Speech Understanding" by Baker, Morgan-Kaufmann Publishers, Inc., Palo Alto, Calif. (1990).

"Understanding Multi-Articled Documents" by Tsujimoto et al., Proc. 10th International Conference of Patent Recognition, Atlantic City, N.J., Jun. 1990.

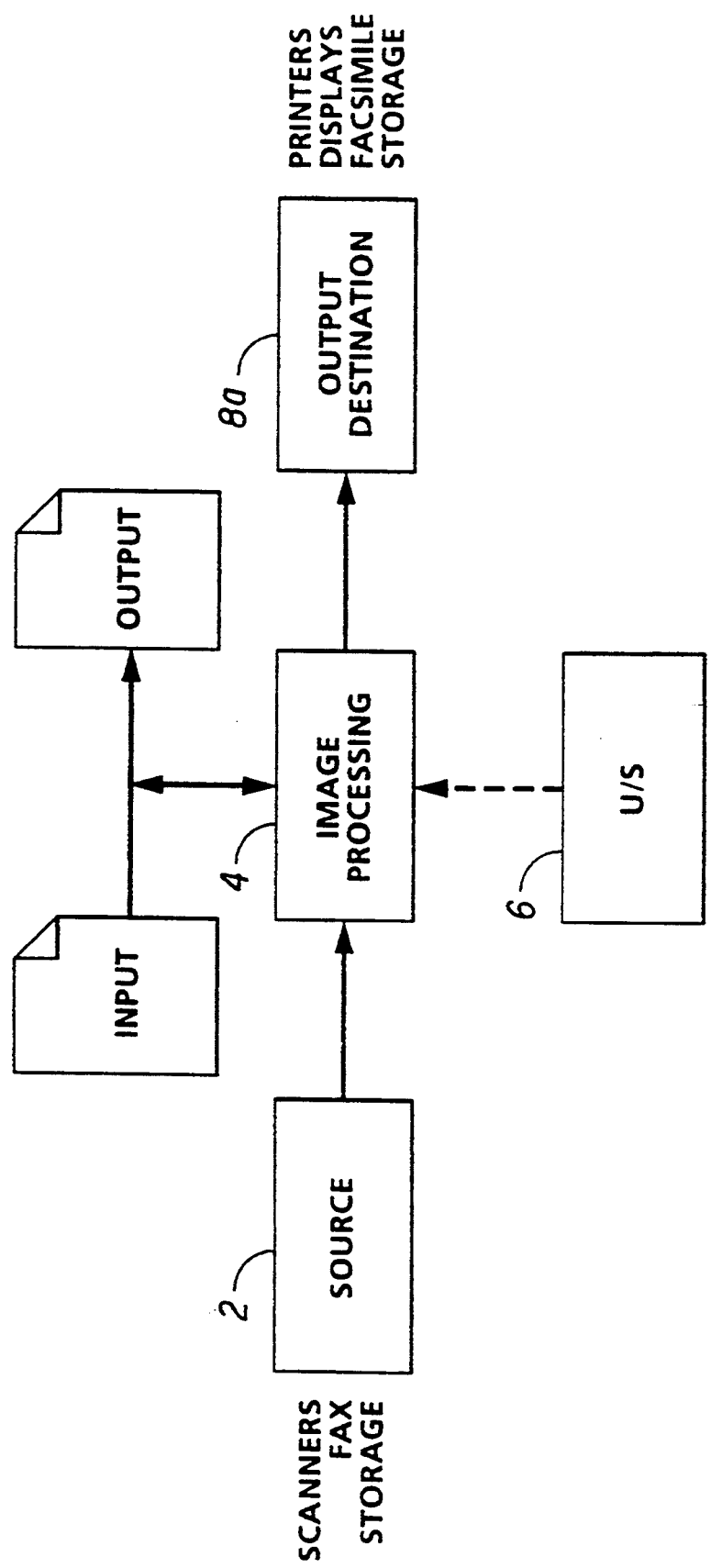

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 4

(A practitioner) may not solicit professional employment from a prospective client with whom the practitioner has no family or prior professional relationship, by mail, in-person or otherwise, when a significant motive for the (practitioner's) doing so is the practitioner's pecuniary gain under circumstances evidencing undue influence, in-

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

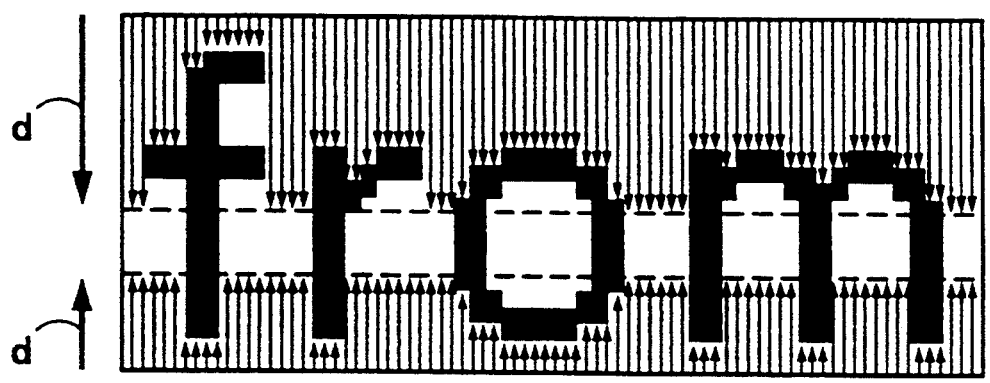
FIG. 20A
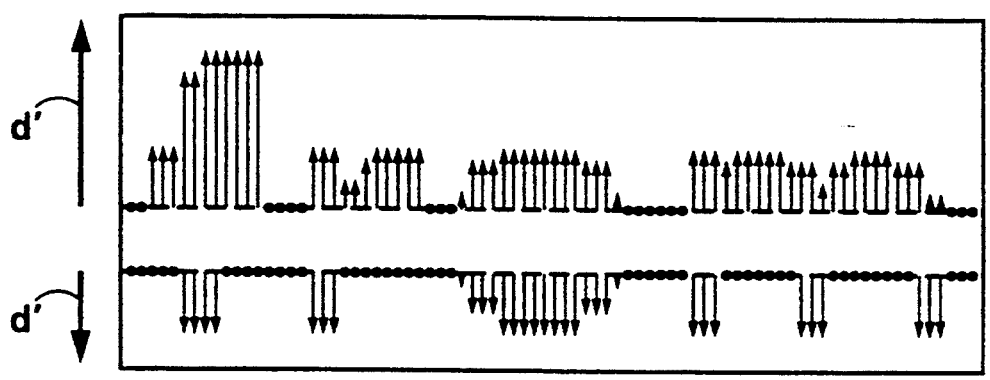
FIG. 20B
FIG. 20C
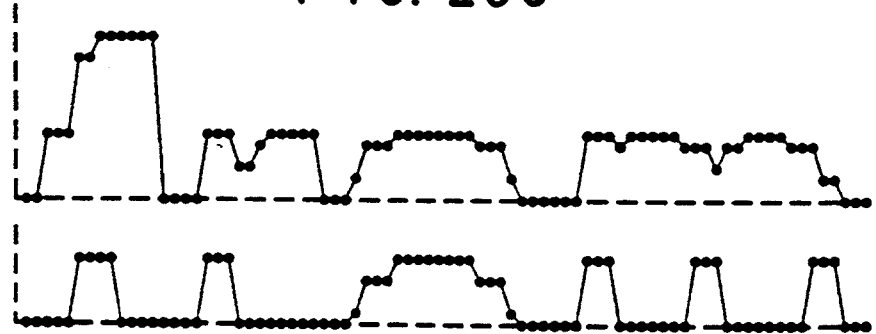
FIG. 20D

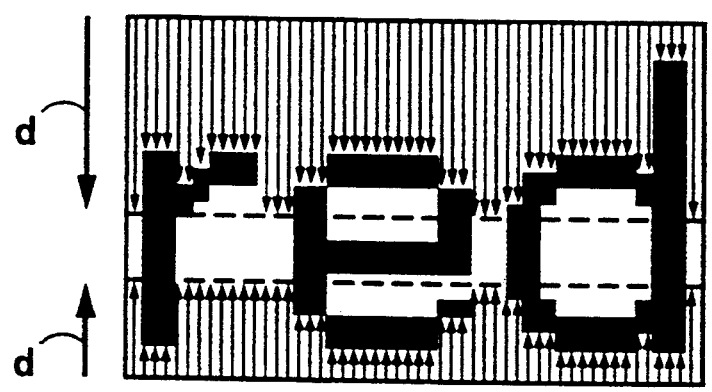
FIG. 21A
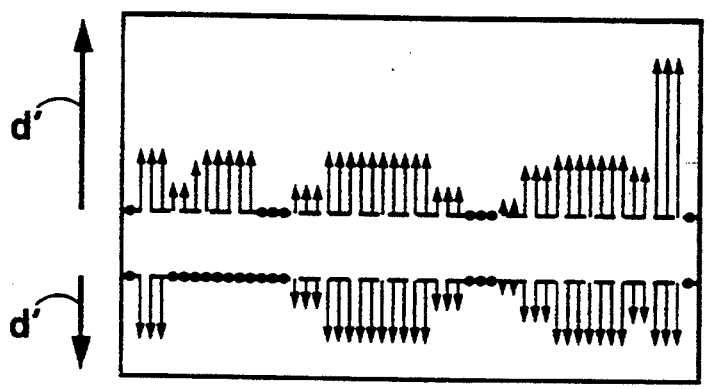
FIG. 21B
FIG. 21C
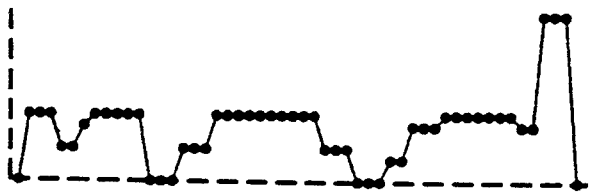
FIG. 21D

METHODS AND APPARATUS FOR SELECTING SEMANTICALLY SIGNIFICANT IMAGES IN A DOCUMENT IMAGE WITHOUT DECODING IMAGE CONTENT

A portion of the disclosure of this patent document contains material that is subject to copyright protection. The copyright owner has no objection to the facsimile reproduction by anyone of the patent document or the patent disclosure, as it appears in the U.S. Patent and Trademark Office records, but otherwise reserves all copyright rights whatsoever.

CROSS-REFERENCES TO RELATED CASES

The following concurrently filed and related U.S. applications having a common assignee are hereby cross referenced and incorporated by reference in their entirety.

"Detecting Function Words Without Converting a Document to Character Codes" to Bloomberg et al., U.S. patent application Ser. No. 07/794,190, filed Nov. 19, 1991, and now pending.

"A Method of Deriving Wordshapes for Subsequent Comparison" to Huttenlocher et al., pending U.S. patent application Ser. No. 07/794,391, filed Nov. 19, 1991, published European Application No. 543594, published May 26, 1993.

"Method and Apparatus for Determining the Frequency of Words in a Document Without Document Image Decoding" to Cass et al., U.S. patent application Ser. No. 07/795,173, filed Nov. 19, 1991, and now pending.

"Optical Word Recognition by Examination of Word Shape" to Huttenlocher et al., U.S. patent application Ser. No. 07/796,119, filed Nov. 19, 1991, and now pending.

"Method for Comparing Word Shapes" to Huttenlocher et al., U.S. patent application Ser. No. 07/795,169, filed Nov. 19, 1991, and now pending.

"Method and Apparatus for Determining the Frequency of Phrases in a Document Without Document Image Decoding" to Withgott et al., U.S. patent application Ser. No. 07/794,55, filed Nov. 19, 1991, and now pending.

"A Method and Apparatus for Image Hand Markup Detection" to Bloomberg, U.S. patent application No. 07/794,275, filed Nov. 19, 1991, and now U.S. Pat. No. 5,201,011.

"A Method and Apparatus for Automatic Modification of Selected Semantically Significant Image Segments Within a Document Without Document Image Decoding" to Huttenlocher et al., U.S. patent application No. 07/795,174, filed Nov. 19, 1991, and now pending.

"Method and Apparatus for Summarizing a Document Without Document Image Decoding" to Withgott et al., U.S. patent application Ser. No. 07/794,543, filed Nov. 19, 1991, and now pending.

"Method and Apparatus for Supplementing Significant Segments of a Document With Retrieved Information Without Document Image Decoding" to Withgott et al., U.S. patent application Ser. No. 07/795,419, filed Nov. 19, 1991 and now pending.

BACKGROUND OF THE INVENTION

1. Field of the Invention

The invention relates to improvements in methods and apparatuses for automatic document processing, and more particularly to improvements for automatically selecting information containing segments indicative of the subject matter content of undecoded document images without first decoding the document or otherwise understanding the information content thereof.

2. References and Background

It has long been the goal in computer based electronic document processing to be able, easily and reliably, to identify, access and extract information contained in electronically encoded data representing documents; and to summarize and characterize the information contained in a document or corpus of documents which has been electronically stored. For example, to facilitate review and evaluation of the significance of a document or corpus of documents to determine the relevance of same for a particular user's needs, it is desirable to be able to identify the semantically most significant portions of a document, in terms of the information they contain; and to be able to present those portions in a manner which facilitates the user's recognition and appreciation of the document contents. However, the problem of identifying the significant portions within a document is particularly difficult when dealing with images of the documents (bitmap image data), rather than with code representations thereof (e.g., coded representations of text such as ASCII). As opposed to ASCII text files, which permit users to perform operations such as Boolean algebraic key word searches in order to locate text of interest, electronic documents which have been produced by scanning an original without decoding to produce document images are difficult to evaluate without exhaustive viewing of each document image, or without hand-crafting a summary of the document for search purposes. Of course, document viewing or creation of a document summary require extensive human effort.

On the other hand, current image recognition methods, particularly involving textual material, generally involve dividing an image segment to be analyzed into individual characters which are then deciphered or decoded and matched to characters in a character library. One general class of such methods includes optical character recognition (OCR) techniques. Typically, OCR techniques enable a word to be recognized only after each of the individual characters of the word have been decoded, and a corresponding word image retrieved from a library.

Moreover, optical character recognition decoding operations generally require extensive computational effort, generally have a non-trivial degree of recognition error, and often require significant amounts of time for image processing, especially with regard to word recognition. Each bitmap of a character must be distinguished from its neighbors, its appearance analyzed, and identified in a decision making process as a distinct character in a predetermined set of characters. Further the image quality of the original document and noise inherent in the generation of a scanned image contribute to uncertainty regarding the actual appearance of the bitmap for a character. Most character identifying processes assume that a character is an independent set of connected pixels. When this assumption fails due to the quality of the scanned image, identification also fails.

REFERENCES

U.S. Pat. No. 4,010,445 to Hoshino describes a word recognition apparatus that uses character decoding for retrieving key characters. The decoded characters are placed in one or more given positions of a word to form an input character string for use as a retrieving-key into a stored word dictionary.

U.S. Pat. No. 4,977,603 to Irie et al. describes a method and apparatus for pattern recognition utilizing the multiple similarity method in which structural features of a pattern to be recognized are taken into account by deriving a vector quantity indicating distribution of black picture elements constituting the pattern. Information derived from the vector quantity is then used to identify the pattern with a pattern of a standard library.

U.S. Pat. No. 2,905,927 to Reed describes a method and apparatus for recognizing a word employing three scans to determine the characteristics or pattern of the word. An upper scan is used to determine the number and position of full-height symbols, and a lower scan is used to determine the number and position of the symbols extending below a baseline. A center scan is used to acquire information relative to the symbol spacing and the number of symbols in the word.

U.S. Pat. No. 4,773,098 to Scott describes a method for recognizing and providing an output corresponding to a character in which the character is received by an imager, digitized and transmitted to a memory. Data in the memory is read in a sequence which circumnavigates the test character. Only data representative of the periphery of the character are read. During the circumnavigation, character parameters, such as height, width, perimeter, area and waveform are determined. The character parameters are compared with reference character parameters and the ASCII code for the reference character which matches the character is provided as an output. Also described are other contour "data signatures" for objects consisting of a sailboat, circle, rectangle, , "7" and star, which may be stored as firmware in the RAM of a microprocessor. When the imager of a didactic device is exposed to a flash card or similar implement on which indicia of some form appears, the image signal data collected in the RAM is compared with the data signatures comprising the firmware in the RAM of the microprocessor.

U.S. Pat. No. 4,377,803 to Lotspiech et al. describes an apparatus and method for segmenting characters generated by an optical scanner. The boundaries of characters in a type-written data field are determined by scanning a document and inputting a raster scan into a video buffer. As the scan is placed into the buffer, it is separated into a plurality of sectors. A horizontal histogram establishes the number of ON pixels associated with each sector. A baseline is determined and a vertical histogram and pitch data are used to find the "word"location of the line to be segmented. The word location data and the vertical histogram data are utilized by a find character unit to locate each character.

U.S. Pat. No. 4,155,072 to Kawa describes a method in which a character is scanned in a plurality of parallel scan lines, and the starting and ending positions of the character in the respective scan lines are detected. The portions of the character between the starting and ending positions of the respective scan lines are quantized and classified into a code. The starting and ending positions and the classification codes are compared with those of standard character patterns, and the character with the closest correlation is recognized as the standard character. This operation corresponds to tracing the right and left outlines of the character, and classifying the interior of the character. Means are provided for normalizing the horizontal size, position and slant of the character prior to correlation. A quadratic correlation function is described which selectively utilizes root mean square values of positive and negative projection components of a characteristic vector of a covariance matrix of a standard character pattern.

U.S. Pat. No. 4,979,227 to Mittelbach et al. describes a method for automatic character recognition in which character strings marked by word start and word end are formed from the discrete characters calculated with the assistance of a character classifier. The character strings are compared with stored comparison strings of a context lexicon to determine identity or similarity. The context lexicon is continuously updated by continuous read-in of strings containing no rejection characters, and the repeated read-in of identical strings is counted. The string with optimum similarity and frequency is selected for further evaluation. A correction provided with reference to the context comparison is only executed when the substitution transposition is probable, based on the classifier characteristic for the characters under consideration.

U.S. Pat. No. 4,731,857 to Tappert describes a recognition system for run-on handwritten characters wherein a word is preprocessed by segmenting an image and recognizing the segments. A method is disclosed which has the following steps: 1) determining potential segmentation points; 2) sending all segments which could be characters to a character recognizer which calculates a probability that the character is part of a word; and 3) using the probability as a basis for determining the best possible word choices.

U.S. Pat. No. 4,809,344 to Peppers et al. describes an apparatus for preprocessing of character recognition wherein a page is segmented by extracting a plurality of features based on character and line separations. After preprocessing, the features are sent to a character recognizer. If the character recognizer cannot recognize the character, the image is returned to the preprocessor for more segmentation. A number of masks are used to detect vertical and horizontal features and to determine coordinates for the features.

"Understanding Multi-Articled Documents" by Tsujimoto and Asada, a paper presented at the 10th International Conference on Pattern Recognition, Atlantic City, N.J. (June 1990), describes a method to understand document layouts without the assistance of the character recognition results, i.e., the organization of the contents of the documents. It is related that documents have an obvious hierarchical structure in their geometry which is represented by a tree. A small number of rules are introduced to transform the hierarchical structure into a logical structure which represents the semantics carried by the documents. A virtual field separator technique is employed to utilize the information carried by special constituents of the documents, such as field separators and frames, keeping the number of transformation rules small.

"Document Analysis System," by Wong, K. Y., Casey, R. G., and Wahl, F. M., *IBM Journal of Research and Development*, Vol. 26, No. 6, November 1982, pp. 647–656, describes a system that assists a user in encoding printed documents for computer processing. An image manipulation editor reads and stores images on a disk and provides image-editing functions such as copy, move, erase, etc. A digitized printed document is segmented and classified into regions of text and images. Blocks containing text can be analyzed with a pattern-matching program that groups similar symbols from the document and creates a prototype pattern to represent each group. During pattern matching, the position and matching prototype index for each text pattern is recorded. The prototype patterns are identified interactively or by automatic recognition logic.

*Introduction to Modern Information Retrieval* by Salton and McGill, McGraw-Hill, Inc., 1983, describes techniques for computing key word matches, locating the most frequent noun phrases in the text, and composing stop-lists of words which are not likely to be of interest to a user of an information retrieval system. Such techniques assume noise-free (perfectly recognizable) text. Perfectly recognized scanned texts are viewed as interchangeable with electronically stored character code files.

U.S. Pat. No. 4,985,863 to Fujisawa et al. describes a document storage and retrieval system and a method of document retrieval that stores a portion of characters for outputting and also stores the document in the form of an image for retrieving. A retrieval request for a text is made using a proper number of the text or a special symbol. The document image can then be retrieved and stored or decoded to character codes for outputting. Note that character recognition must be performed to recognize a retrieval key of a document before retrieval, although the actual retrieval or transfer of the document does not require complete character recognition.

U.S. Pat. No. 4,908,716 to Sakano describes an image processing apparatus in which an area of a document is designated by a marking entered in the document and a portion encircled by the marking is treated as a marked area which is the subject of a trimming or a masking process. A color felt pen or the like is used to encircle a designated area of a document. Then, a mark detection circuit can detect the marking by detecting the tone of the image. The disparate reflectivity or tone of the marker pen allows marked area detection. Thereupon, the marked area can be erased or maintained as desired.

SUMMARY OF THE INVENTION

In light of the above, therefore, it is an object of the invention to provide a method and apparatus for selecting semantically significant image segments or units in a scanned document image according to their relative information content without decoding all or part of the document image and without otherwise understanding the information content thereof.

It is another object of the invention to provide a method and apparatus of the type described that enables a reduction in the degree of error in performing image segment selection operations.

It is another object of the invention to provide a method and apparatus of the type described that requires relatively little data processing, in view of prior techniques, and therefore can be performed more rapidly than prior document image segment selection techniques.

It is another object of the invention to provide a means for reducing the effort necessary to automatically or interactively locate segments within a particular region of a document without first converting the document to character codes.

It is still another object of the invention to provide a method and apparatus for recognizing a portion of a document image segment without first converting the image segment to character codes.

The present invention addresses the problems of the prior art by providing a method and apparatus for the selection of information containing image units in a document which reflects the relative information content of the image units without first decoding the image units, such as by converting the image to character codes or deriving mathematical vectors of the character contents or a portion thereof. Eliminating the need for character decoding for character and word selection minimizes error in the recognition process and decreases the time necessary for image processing, particularly in regard to word recognition. The invention provides an important step in streamlining word recognition processes, enabling and enhancing a variety of applications in the field of image processing.

The present invention additionally provides a method and apparatus for image identification and selection from a specified portion of a scanned document, using region criteria and significant image unit characteristics. This can be done either automatically or interactively, and, in any event, without first converting the scanned document to character codes. The information thus developed enables criteria to be developed for use in evaluating the significance of the document or its contents for many purposes. For example, it has long been recognized that the location of a word in a text may be significant for its role in document classification. In the past, however, typically the primary characterization of locations that has been successfully employed has been proximity information. The invention, on the other hand, enables the image units to be weighted, and additional weight to be assigned based on the location of the image unit in a selected region or regions within the document image, as well as the presence of other significant morphological image unit characteristics, such as frequency, emphasis, and proximity information. The region criteria therefore can be used to augment or replace certain traditional information extraction techniques, as well as simple phrase or word spotting in relevance searches.

Thus, in accordance with one aspect of the invention, a method and apparatus is presented for electronical processing at least one document stored as an electronic document image containing undecoded information to identify a selected portion thereof. The method may be performed using a programmed general or special purpose computer. In accordance with the method, the document image is first segmented into image units, each of which has an undecoded information content. The relative information content of at least some of the image units is then classified, without decoding the image units being classified or reference to decoded image data, based on an evaluation of predetermined morphological (structural) image characteristics of the image units. Then, image units are selected for further processing according to the classification of the image units obtained in the classifying step.

The predetermined morphological image characteristics advantageously include at least one of an image unit length, width, or other dimension; location within the document image; font; typeface; cross-sectional characteristics; the number of ascenders; the number of descenders; the average pixel density; the length of the top line contour; the length of the base contour; or other such morphological characteristic.

The classification also advantageously can be based on a determination of the relative frequencies with which image units having similar predetermined image characteristics are present among the image units being classified.

Further, the method of the invention advantageously includes, prior to the classifying step, image-analysis based discrimination, without decoding the image units or reference to decoded image data, of the image units which do not contain sufficient information to be useful for evaluation of the subject matter content of the document; and classification of only the image units not discriminated in the discrimination step.

These and other objects, features and advantages of the invention are disclosed in or apparent to those skilled in the art from the following detailed description, when read in conjunction with the accompanying drawing and the appended claims.

BRIEF DESCRIPTION OF THE DRAWING

A preferred embodiment of the invention is illustrated in the accompanying drawing, in which:

FIG. 3A shows a generalized system diagram of an image processing system in which the present invention would find use;

FIG. 4 shows an image sample of example text over which the inventive process will be demonstrated;

FIG. 5 is a copy of a scanned image of the example text;

FIGS. 6A, 6B and 6C graphically illustrate the process used to determine the angle at which the example text is oriented in the image sample prior for further processing, while

FIG. 16 shows the sample text with bounding boxes placed around each word group in a manner which uniquely identifies a subset of image pixels containing each character string;

FIGS. 20A, 20B, 20C and 20D illustrate derivation of a single independent value signal, using the example word "from⇌";

FIGS. 21A, 21B, 21C and 21D illustrate derivation of a single independent value signal, using the example word "red⇌", which does not appear in the sample image of example text;

FIGS. 29A-1–29C-2 show three sets of character ascender structuring elements where: FIGS. 29A-1 and 29A-2 show a set of character ascender structuring elements of height 3 and length 5 where FIG. 29A-1 shows a structuring element with ON pixels along the bottom row and along the rightmost column and one or more OFF pixels in a remaining location preferably separated from the ON pixels, and FIG. 29A-2 shows a structuring element with ON pixels along the bottom row and along the leftmost column and one or more OFF pixels in a remaining location preferably separated from the ON pixels; FIGS. 29B-1 and 29B-2 show a set of character ascender structuring elements of height 4 and length 5 where FIG. 29B-1 shows a structuring element with ON pixels along the bottom row and along the rightmost column and one or more OFF pixels in a remaining location preferably separated from the ON pixels, and FIG. 29B-2 shows a structuring element with ON pixels along the bottom row and along the leftmost column and one or more OFF pixels in a remaining location preferably separated from the ON pixels; FIGS. 29C-1 and 29C-2 show a set of character ascender structuring elements of height 5 and length 5 where FIG. 29C-1 shows a structuring element with ON pixels along the bottom row and along the rightmost column and one or more OFF pixels in a remaining location preferably separated from the ON pixels, and FIG. 29C-2 shows a structuring element with ON pixels along the bottom row and along the leftmost column and one or more OFF pixels in a remaining location preferably separated from the ON pixels.

FIGS. 30A-1–30C-2 show three sets of character descender structuring elements where: FIGS. 30A-1 and 30A-2 show a set of character descender structuring elements of height 3 and length 5 where FIG. 30A-1 shows a structuring element with ON pixels along the top row and along the rightmost column and one or more OFF pixels in a remaining location preferably separated from the ON pixels, and FIG. 30A-2 shows a structuring element with ON pixels along the top row and along the leftmost column and one or more OFF pixels in a remaining location preferably separated from the ON pixels; FIGS. 30B-1 and 30B-2 show a set of character descender structuring elements of height 4 and length 5 where FIG. 30B-1 shows a structuring element with ON pixels along the top row and along the rightmost column and one or more OFF pixels in a remaining location preferably separated from the ON pixels, and FIG. 30B-2 shows a structuring element with ON pixels along the top row and along the leftmost column and one or more OFF pixels in a remaining location preferably separated from the ON pixels; and FIGS. 30C-1 and 30C-2 show a set of character descender structuring elements of height 5 and length 5 where FIG. 30C-1 shows a structuring element with ON pixels along the top row and along the rightmost column and one or more OFF pixels in a remaining location preferably separated from the ON pixels, and FIG. 30C-2 shows a structuring element with ON pixels along the top row and along the leftmost column and one or more OFF pixels in a remaining location preferably separated from the ON pixels.

The Appendix contains source code listings for a series of image manipulation and signal processing routines which have been implemented to demonstrate the functionality of the present invention. Included in the Appendix are four sections which are organized as follows:

Section A, beginning at page 1, comprises the declarative or "include⇌ files which are commonly shared among the functional code modules;

Section B, beginning at page 26, includes the listings for a series of library type functions used for management of the images, error reporting, argument parsing, etc.;

Section C, beginning at page 42, comprises numerous variations of the word shape comparison code, and further includes code illustrating alternative comparison techniques than those specifically cited in the following description;

Section D, beginning at page 145, comprises various functions for the word shape extraction operations that are further described in the following description.

DETAILED DESCRIPTION OF THE PREFERRED EMBODIMENT

Figure 1:
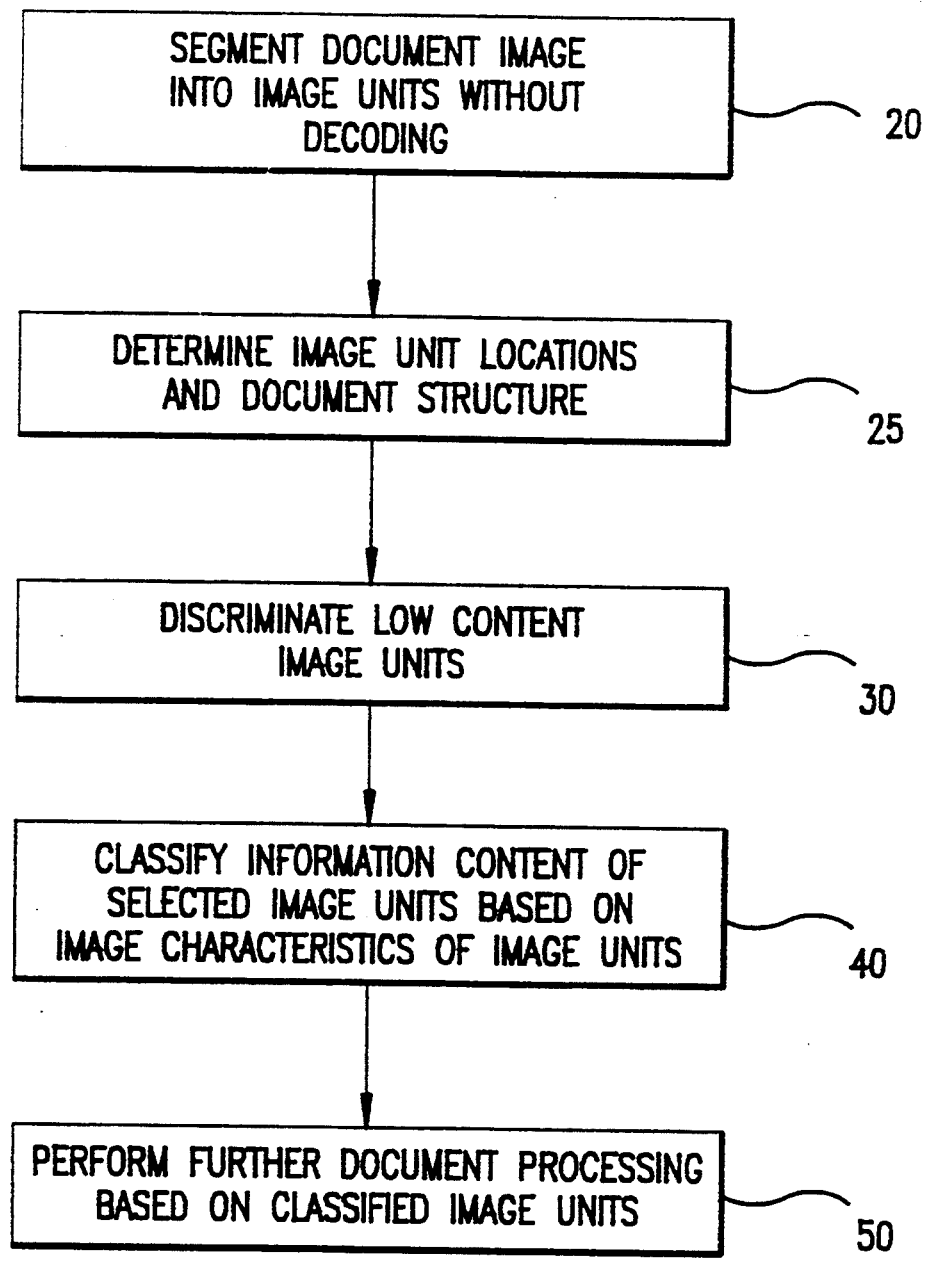
FIG. 1 is a flow chart diagram of a preferred embodiment of a method according to the invention.
Figure 2:
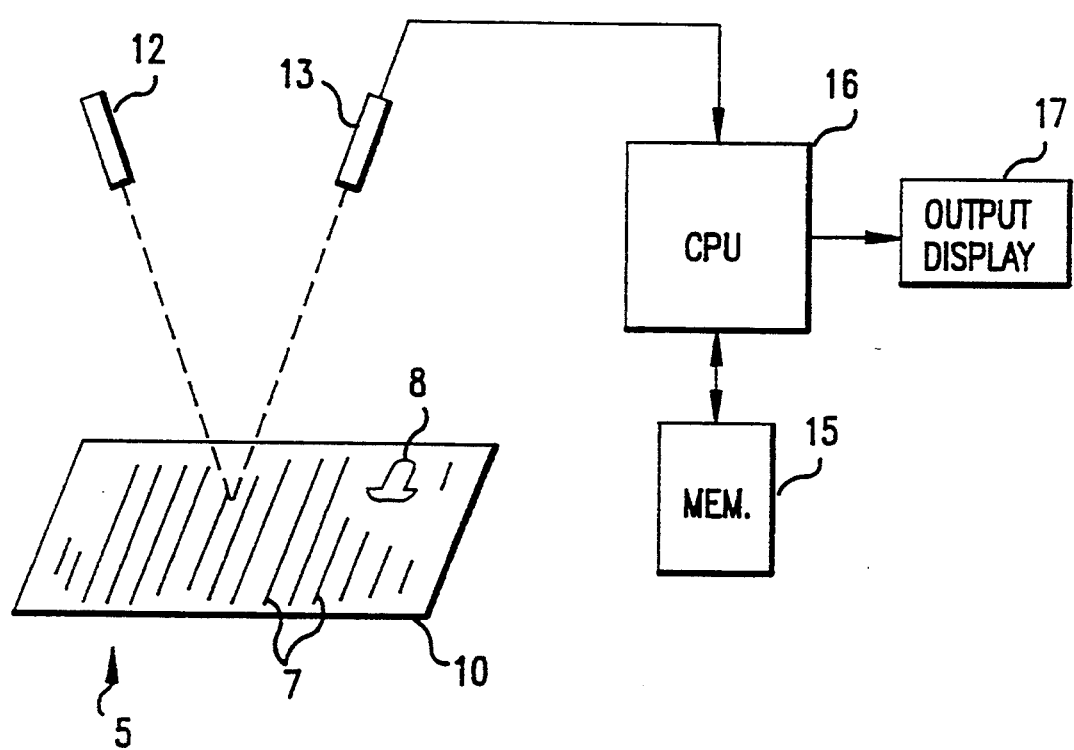
FIG. 2 is a block diagram of a preferred embodiment of apparatus for carrying out the method of the invention.

A preferred embodiment of the method of the invention is illustrated in the flow chart of FIG. 1, and apparatus for performing the method of FIG. 1 is shown in FIG. 2. For the sake of clarity, the invention will be described with reference to the processing of a single document. However, it will be appreciated that the invention is applicable to the processing of a corpus of documents containing a plurality of documents.

The invention is not limited to systems utilizing document scanning. Rather, other systems such as a bitmap workstation (i.e., a workstation with a bitmap display) or a system using both bitmapping and scanning would work equally well for the implementation of the methods and apparatus described herein.

Figure 8A:
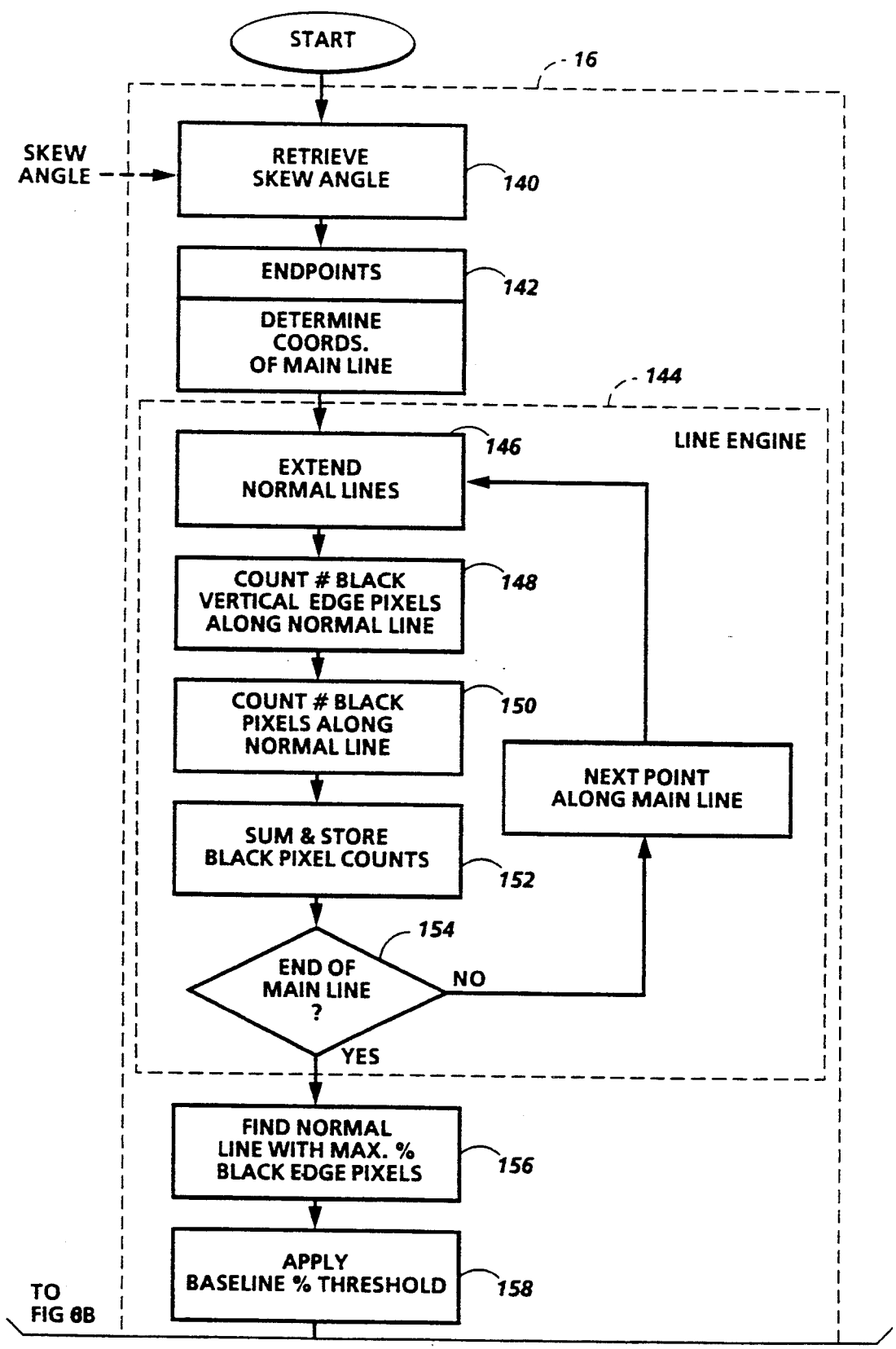
FIGS. 8A and 8B are flowcharts illustrating the procedures executed to determine the baselines shown in FIG. 7A.
Figure 8B:
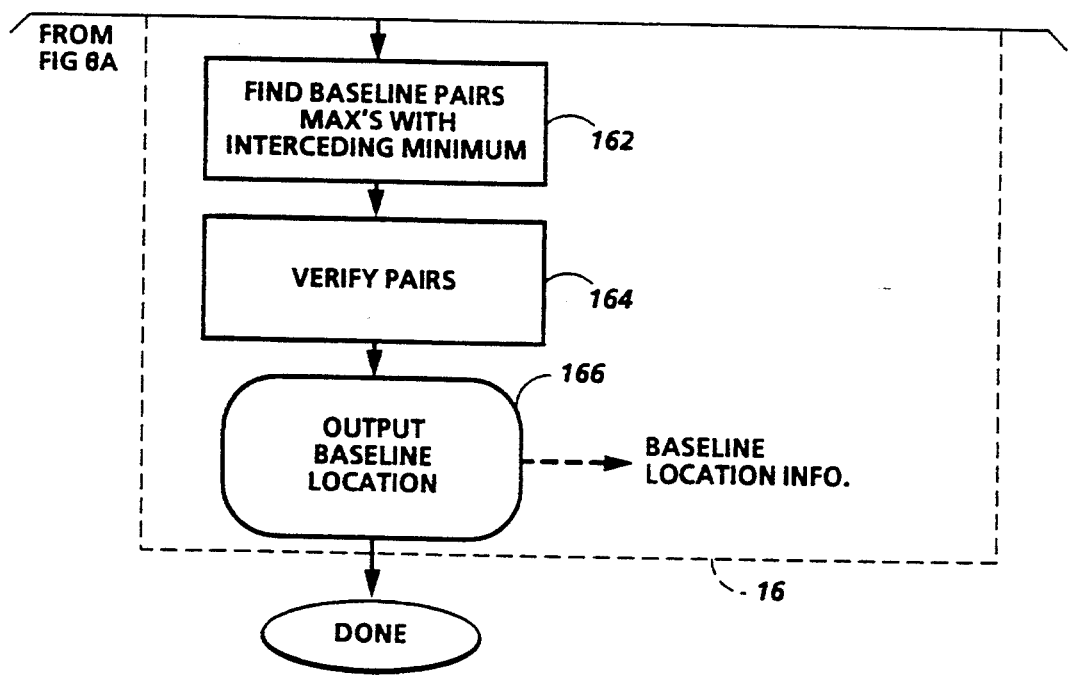

With reference first to FIG. 2, the method is performed on an electronic image of an original document 5, which may include lines of text 7, titles, drawings, FIGS. 8, or the like, contained in one or more sheets or pages of paper 10 or other tangible form. The electronic document image to be processed is created in any conventional manner, for example, by a means such as an optical scanner 12 and sensor 13 as shown, a document copier machine scanner, a Braille reading machine scanner, a bitmap workstation, an electronic beam scanner or the like. Such means are well known in the art, and thus are not described in detail herein. An output derived from the scanner sensor 13 is digitized to produce an undecoded bitmap image data representing the document image for each page of the document, which data is stored, for example, in a memory 15 of a special or general purpose digital computer 16. The output from the computer 16 is delivered to an output device, such as, for example, a memory or other form of storage unit, or an output display 17 as illustrated, which may be, for instance, a photocopier, CRT display, printer, facsimile machine, or the like.

With reference now to FIG. 1, the first phase of the image processing technique of the invention involves a low level document image analysis in which the document image for each page is segmented into undecoded information containing image units (step 20) using conventional image analysis techniques; or, in the case of text documents, preferably using the bounding box method described in copending U.S. patent application Ser. No. 07/794,392 filed concurrently herewith by Huttenlocher and Hopcroft, and entitled "Method and Apparatus for Determining Boundaries of Words in Text,⇌ which application is incorporated herein by reference. The locations of and spatial relationships between the image units on a page are then determined (step 25). For example, an English language document image can be segmented into word image units based on the relative difference in spacing between characters within a word and the spacing between words. Sentence and paragraph boundaries can be similarly ascertained. Additional region segmentation image analysis can be performed to generate a physical document structure description that divides page images into labelled regions corresponding to auxiliary document elements like figures, tables, footnotes and the like. Figure regions can be distinguished from text regions based on the relative lack of image units arranged in a line within the region, for example. Using this segmentation, knowledge of how the documents being processed are arranged (e.g., left-to-right, top-to-bottom), and, optionally, other inputted information such as document style, a "reading order" sequence for word images can also be generated. The term "image unit" is thus used herein to denote an identifiable segment of an image such as a number, character, glyph, symbol, word, phrase or other unit that can be reliably extracted. Advantageously, for purposes of document review and evaluation, the document image is segmented into sets of signs, symbols or other elements, such as words, which together form a single unit of understanding. Such single units of understanding are generally characterized in an image as being separated by a spacing greater than that which separates the elements forming a unit, or by some predetermined graphical emphasis, such as, for example, a surrounding box image or other graphical separator, which distinguishes one or more image units from other image units in the scanned document image. Such image units representing single units of understanding will be referred to hereinafter as "word units."

Advantageously, a discrimination step 30 is next performed to identify the image units which have insufficient information content to be useful in evaluating the subject matter content of the document being processed. One preferred method is to use the morphological function or stop word detection techniques disclosed in the copending U.S. patent application Ser. No. 07/794,190 filed concurrently herewith by Bloomberg et al., and entitled "Detecting Function Words Without Converting a Scanned Document to Character Codes."

This application discusses binary images. In this context, the term "image" refers to a representation of a two-dimensional data structure composed of pixels. A binary image is an image where a given pixel is either ON or OFF. Binary images are manipulated according to a number of operations wherein one or more source images are mapped onto a destination image. The results of such operations are generally referred to as images. The image that is the starting point of processing will sometimes be referred to as the original image or source image.

A morphological operation refers to an operation on a pixelmap image (a source image), that uses a local rule at each pixel to create another pixelmap image, the destination image. This rule depends both on the type of the desired operation to perform as well as on the chosen structuring element.

Pixels are defined to be ON if they are black and OFF if they are white. It should be noted that the designation of black as ON and white as OFF reflects the fact that most documents of interest have a black foreground and a white background. The techniques of the present invention could be applied to negative images as well. The discussion will be in terms of black on white, but the references to ON or OFF apply equally well to images which have been inverted and, therefore, the roles of these two states are reversed. In some cases the discussion makes reference to a "don't care" pixel which may be either an ON or an OFF pixel.

A structuring element (SE) refers to an image object of typically (but not necessarily) small size and simple shape that probes the source image and extracts various types of information from it via the chosen morphological operation. In the attached figures that show SEs, a solid circle is a hit, and an open circle is a miss. The center position is denoted by a cross. Squares that have neither solid nor open circles are "don't cares"; their value in the image (ON or OFF) is not probed. A binary SE is used to probe binary images in a binary morphological operation that operates on binary input images and creates an output binary image. The SE is defined by a center location and a number of pixel locations, each normally having a defined value (ON or OFF). The pixels defining the SE do not have to be adjacent each other. The center location need not be at the geometrical center of the pattern; indeed it need not even be inside the pattern. A solid SE refers to an SE having a periphery within which all pixels are ON. For example, a solid 2×2 SE is a 2×2 square of ON pixels. A solid SE need not be rectangular. A horizontal SE is generally one row of ON pixels and a vertical SE is generally one column of ON pixels of selected size. A hit-miss SE refers to an SE that specifies at least one ON pixel and at least one OFF pixel.

AND, OR and XOR are logical operations carried out between two images on a pixel-by-pixel basis.

NOT is a logical operation carried out on a single image on a pixel-by-pixel basis.

EXPANSION is scale operation characterized by a scale factor N, wherein each pixel in a source image becomes an N×N square of pixels, all having the same value as the original pixel.

REDUCTION is a scale operation characterized by a scale factor N in a threshold level M. REDUCTION with scale=N entails dividing the source image into N×N squares of pixels, mapping each such square in the source image to a single pixel on the destination image. The value for the pixel in the destination image is determined by the threshold level M, which is a number between 1 and $N^2$. If the number of ON pixels in the pixel square is greater or equal to M, the destination pixel is ON, otherwise it is OFF.

EROSION is a morphological operation wherein a given pixel in the destination image is turned ON if and only if the result of superimposing the SE center on the corresponding pixel location in the source image results in a match between all ON and OFF pixels in the SE and the underlying pixels in the source image. An EROSION will give one pixel in the destination image for every match. That is, at each pixel, it outputs 1 if the SE (shifted and centered at that pixel) is totally contained inside the original image foreground, and outputs 0 otherwise. Note that EROSION usually refers to operations using a SE with only hits and more generally matching operations with both hits and misses (often called a hit-miss transform). The term EROSION is used herein to include matching operations with both hits and misses, thus the hit-miss transform is the particular type of EROSION used herein.

DILATION is a morphological operation wherein a given pixel in the source image being ON causes the SE to be written into the destination image with the SE center at the corresponding location in the destination image. The SEs used for DILATION typically have no OFF pixels. The DILATION draws the SE as a set of pixels in the destination image for each pixel in the source image. Thus, the output image is the union of all shifted versions of the SE translated at all 1-pixels of the original image.

FillClip is a morphological operation where one image is used as a seed and is grown morphologically, clipping it at each growth step to the second image. For example, a fillClip could include a DILATION followed by logically ANDing the DILATION result with another image.

OPENING is a morphological operation that uses an image and a structuring element and consists of an EROSION followed by a DILATION. The result is to replicate the structuring element in the destination image for each match in the source image.

CLOSING is a morphological operation using an image and a structuring element. It includes a DILATION followed by an EROSION of the image by a structuring element. A CLOSE of an image is equivalent to the bit inverse of an OPEN on the (bit inverse) background.

UNION is a bitwise OR between two images. An intersection is a bitwise AND between two images.

Blurring is a DILATION of an image by a structuring element(s) consisting of two or more hits.

A mask refers to an image, normally derived from an original or source image, that contains substantially solid regions of ON pixels corresponding to regions of interest in the original image. The mask may also contain regions of ON pixels that do not correspond to regions of interest.

The various operations defined above are sometimes referred to in noun, adjective, and verb forms. For example, references to DILATION (noun form) may be in terms of DILATING the image or the image being DILATED (verb forms) or the image being subjected to a DILATION operation (adjective form). No difference in meaning is intended.

Morphological operations have several specific properties that simplify their use in the design of appropriate procedures. First, they are translationally invariant. A sideway shift of the image before transforming does not change the result, except to shift the result as well. Operations that are translationally invariant can be implemented with a high degree of parallelism, in that each point in the image is treated using the same rule. In addition, morphological operations satisfy two properties that make it easy to visualize their geometrical behavior. First, EROSION, DILATION, OPEN and CLOSE are increasing, which means that if image 1 is contained in image 2, then any of these morphological operations on image 1 will also be contained in the morphological operation on image 2. Second, a CLOSE is extensive and OPEN is antiextensive. This means that the original image is contained in the image transformed by CLOSE and the image transformed by OPEN is contained in the original image. The DILATION and EROSION operations are also extensive and antiextensive, respectively, if the center of the structuring element is located on a hit.

The OPEN and CLOSE operations also satisfy two more morphological properties:

(1) The result of the operation is independent of the position of the center of the structuring element.
(2) The operation is idempotent, which means that reapplying the OPEN or CLOSE to the resulting image will not change it.

An image unit means an identifiable segment of an image such as a word, number, character, glyph or other units that can be extracted reliably and have an underlying linguistic structure.

The term significant and its derivatives are used in this description to indicate the importance of particular characteristics of an image unit. An image unit with significant characteristics becomes a significant image unit in that it contains high value information which can be used for further processing of the document image. Significant characteristics of image units include a variety of classifiers such as length, width, location on a page of the document image, font, typeface and measurement by other parameters including, but not limited one or more cross-sections of a box (a cross-section being a sequence of ON or OFF pixels);

a number of ascenders associated with an image unit;

a number of descenders associated with an image unit;

average pixel density in an image unit;

a length of a topline contour of an image unit, including peaks and troughs;

a length of a base contouring of the image units, including peaks and troughs; and the location of image units with respect to neighboring image units, e.g., vertical position and horizontal inter-image unit spacing.

Figure 27:
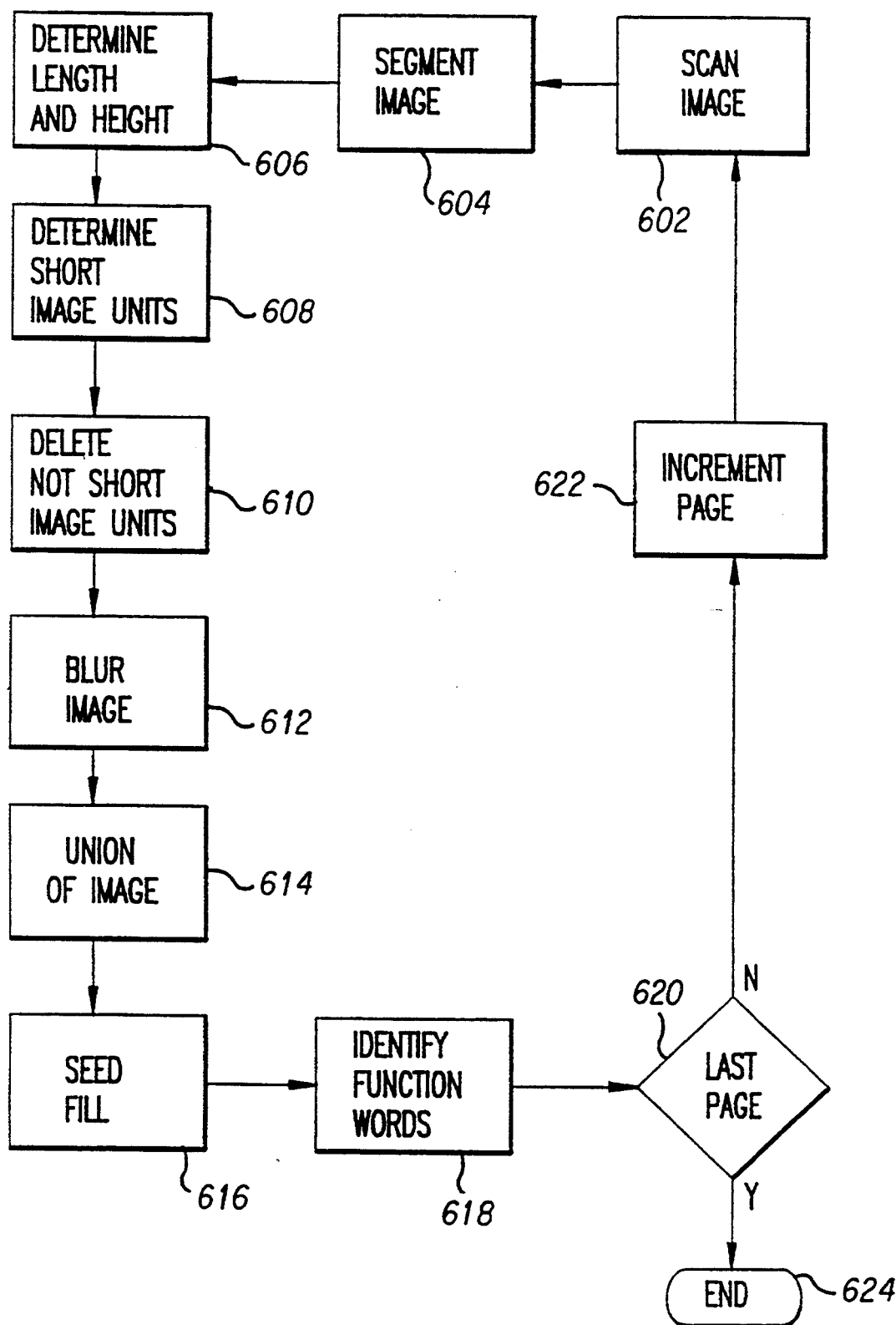
FIG. 27 is a flow chart of a preferred embodiment of a method according to the invention for detecting function words in a scanned document image without first converting the document image to character codes.

FIG. 27 is a flow chart of a preferred embodiment of a method according to the invention for detecting function words in a scanned document image without first converting the document image to character codes. An image of a page of a document is scanned in step 602 and the image is segmented into image units in step 604. The segmentation can be accomplished, for instance, by using first a technique to determine baselines of image units and then second a technique for providing bounding boxes around image units as described in the above incorporated concurrently filed U.S. patent application entitled "A Method of Deriving Wordshapes for Subsequent Comparison⇌ by Huttenlocher et al., U.S. patent application Ser. No. 07/794,391. In step 606, a length and height of each image unit in the image is determined, and short image units are determined in step 608 as image units of no more than a predetermined number of characters, preferably three characters or less in length. In step 610, image units which are not short image units are deleted from the image. In step 612, the image is blurred or smeared in a horizontal direction although the image units are not smeared together. This can be accomplished for example by CLOSING the image with a horizontal structuring element such as the structuring element of length 5 (i.e., 5 pixels) as shown in FIG. 5. The length of the horizontal structuring element used to blur the x-height characters in the image is dependent upon the width of the character type being used. Furthermore, other configurations of structuring elements may be used in the CLOSING operation to obtain the same smearing effect. However, the most efficient and effective way to smear characters of x-height is to use a horizontal structuring element as described above.

A UNION of erosions is taken in step 614 of the image using a set of ascender matching structuring elements such as those shown in FIGS. 29A-1, 29A-2, 29B-1, 29B-2, and 29C-1, 29C-2, and, a set of descender matching structuring elements such as those shown in FIGS. 30A-1, 30A-2, 30B-1, 30B-2, 30C-1 and 30C-2. The UNION taken in step 614 provides optional noise elimination filtering, and the UNION will provide a seed from which to fill short image unit masks in a subsequent seed filling operation such as the fillClip operation of step 616. The UNION of step 614 acts on all image units remaining in the image (i.e., only short image units in this case) and since the UNION of erosions was taken using a set of ascender matching structuring elements and a set of descender matching structuring elements, the image units that will be filled are those containing ascender and/or descender characters, i.e., function words. The function words are identified in step 18 as those image units which are filled short image unit masks. In step 620 a test occurs to determine whether a last page of the document has been scanned. If the last page has been scanned, then the method terminates at step 624, otherwise the page is incremented in step 622 and the incremented (next) page is scanned in step 602 whereupon the image (next page) is scanned and the previously described steps of the method are reiterated. Of course, all pages could be scanned and stored as bit map images in a memory prior to performing the function word identification procedures described above. Moreover, the image segmentation step can also be performed prior to practicing the present invention (and the segmented image stored in memory) since segmentation has utility for procedures other than with the present invention.

Figure 28:
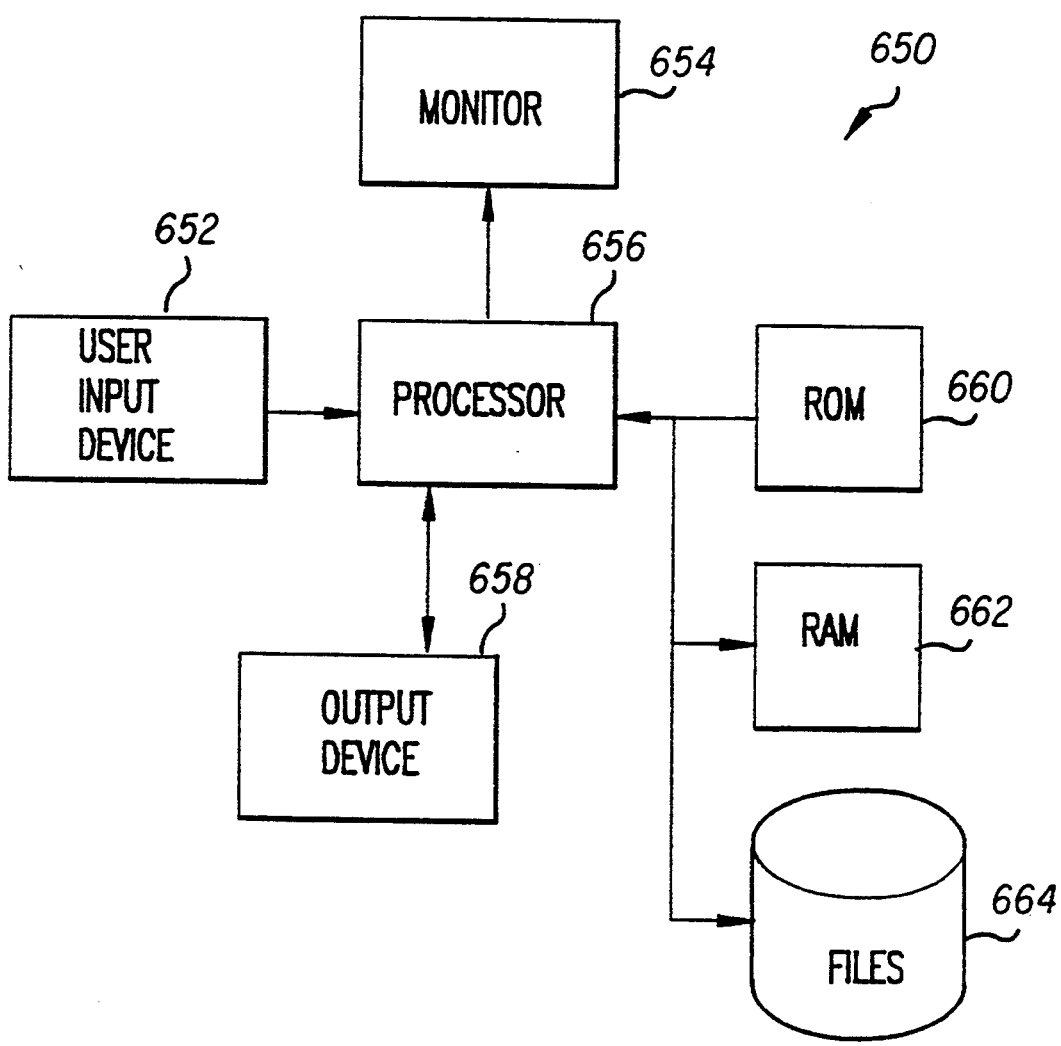
FIG. 28 is a block diagram of a preferred embodiment of an apparatus according to the invention for detecting function words in a scanned document image without first converting the document image to character codes.
Figures 1, 29C:
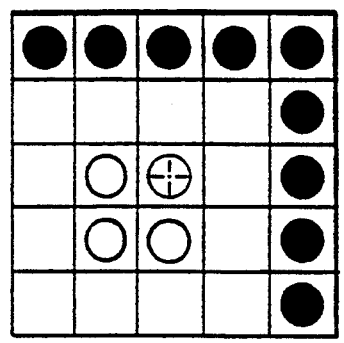
Figures 2, 29C:
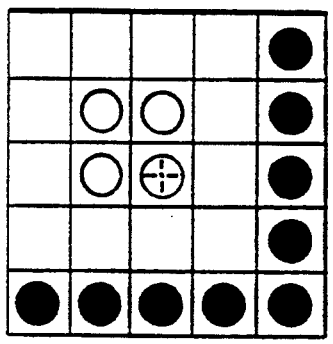
Figures 1, 29B:
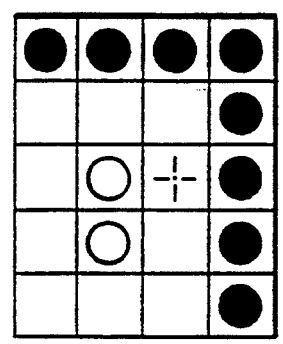
Figures 2, 29B:
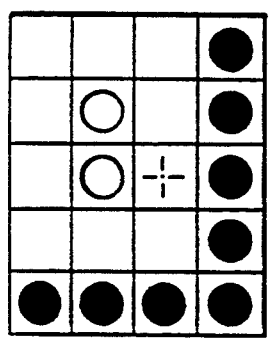
Figures 1, 29A:
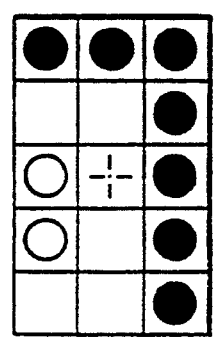
Figures 2, 29A:
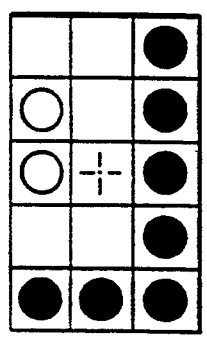
Figures 1, 30C:
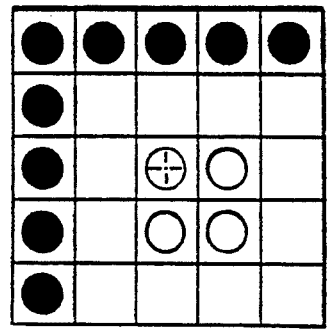
Figures 2, 30C:
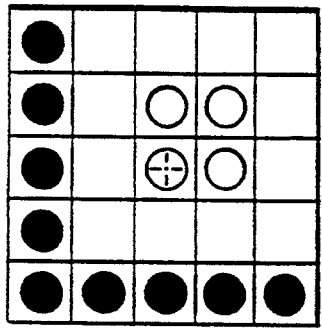
Figures 1, 30B:
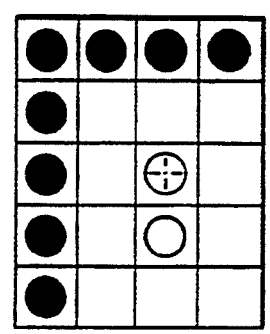
Figures 2, 30B:
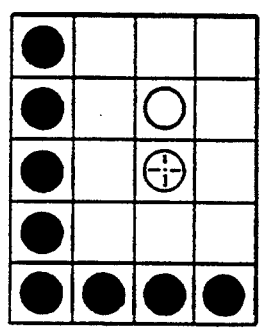
Figures 1, 30A:
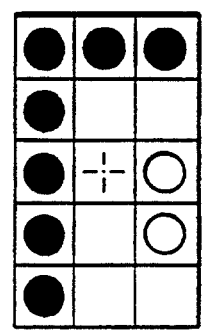
Figures 2, 30A:
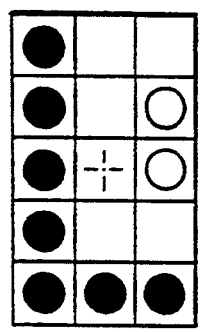
Figure 31:
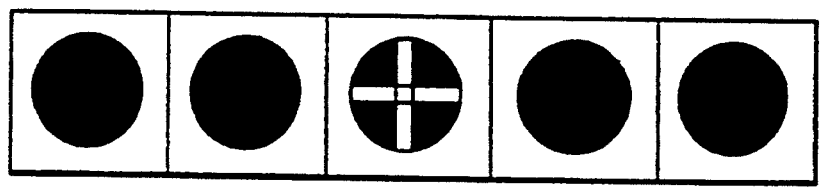
FIG. 31 shows a horizontal structuring element of length 5.

FIG. 28 is a block diagram of a preferred embodiment according to the invention of an apparatus 650 for detecting function words in a scanned document image without first converting the document image to character codes. The apparatus 650 includes a user input device 652 which includes, for example, one or more of an image scanner (optical or electronic) a keyboard, a touchscreen, a mouse, etc. The image scanner can be a stand-alone device, or part of a facsimile machine or document reproducing machine (copier). A processor 656 is connected to the input device 652 for processing the document image to segment the document image into image units, determine a length and height of each image unit, determine short image units as image units of preferably three characters or less in length, delete image units from the image that are not short image units, blur the image in a horizontal direction, take a UNION of erosions of the image using a set of ascender and descender matching structuring elements, fillClipping the image to provide short image unit masks filled for short image units with at least one ascender and short image unit masks filled for short image units with at least one descender, and identifying function words as those image units which are filled short image unit masks. Processor 656 operates to perform these functions in accordance with operating programs read from read only memory (ROM) 660, and by using random access memory (RAM) 662. Documents can be stored or retrieved from files 664, and processing results and user input information can be monitored on a CRT display monitor 654.

Next, in step 40, the image units not discriminated in step 30 are classified according to their relative information content, without decoding the image units being classified or reference to decoded image data, based on an evaluation of predetermined morphological image characteristics of the image units. One preferred method for defining the image unit image characteristics to be evaluated is to use the word shape derivation techniques disclosed in the copending U.S. patent application Ser. Nos. 07/794,391 filed concurrently herewith by D. Huttenlocher and M. Hopcroft, and entitled "A Method for Deriving Wordshapes for Subsequent Comparison,⇌. (It should be well noted that the present invention can compare image units within a document, but there is no comparison of image units to a list of known image units as in a dictionary entry or stop list.) As described in the aforesaid application, at least one, one-dimensional signal characterizing the shape of a word unit is derived; or an image function is derived defining a boundary enclosing the word unit, and the image function is augmented so that an edge function representing edges of the character string detected within the boundary is defined over its entire domain by a single independent variable within the closed boundary, without individually detecting and/or identifying the character or characters making up the word unit.

Figure 3B:
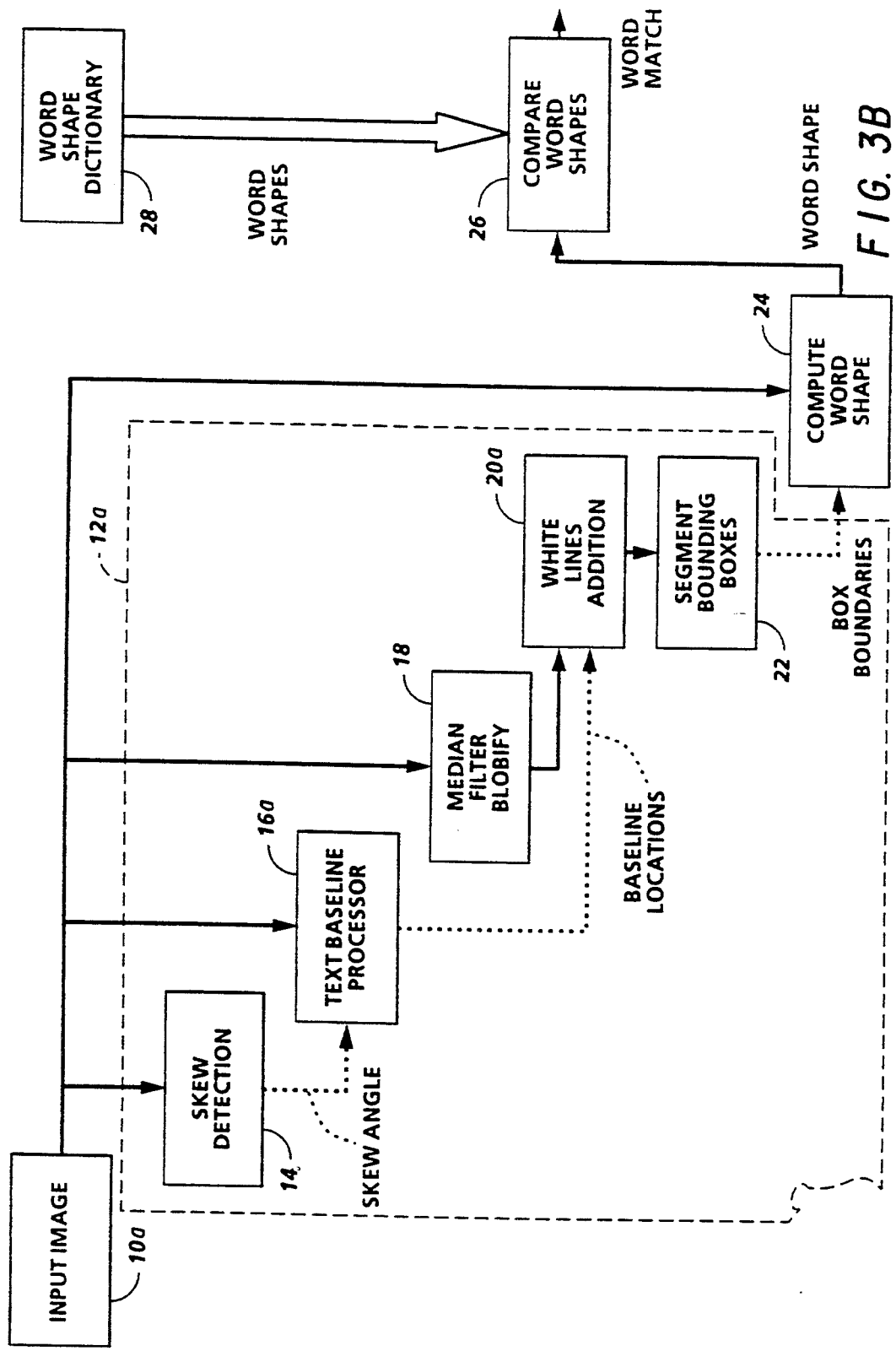
FIG. 3B shows a block system diagram of the arrangement of system components forming one embodiment of the inventive word shape recognition system.

More specifically, this application discloses as illustrated in FIG. 3A, a generalized image processing system, which covers numerous situations in which the present invention may find advantageous use. Generally, a source image may be derived from a source image derivation system 2, which may be a scanner, facsimile device, or storage system. The source image is forwarded to a computer processing device 4 which may be any of several well known devices including the inventive device described herein. In response to commands entered at user interface 6, processing device 4 produces an output at an output device 8a, which may be a printer, display, facsimile device or other storage device. In essence, as is shown in the upper portion of FIG. 3A and 3B, an input document is directed into a system and an output document is retrieved from it.

In the following description, an image is generally described as an image bitmap, where an image is represented as a plurality of image signals. These signals, commonly referred to as pixels, are typically denoted as black when intended to represent a corresponding mark or active position on a document from which they were produced. However, these constructs have been used to enable the description of the present invention, and are in no way intended to limit the domain of such to that of black-and-white or binary images. Rather, the present invention is generally applicable across a broad range of image representation techniques.

FIG. 3B, shows a system which embodies the present invention for deriving, defining, and comparing words in terms of their shapes. It will, of course, be recognized that each element of the system may be many devices, or may simply be a program operated within a single device. Beginning with an input bitmap 10a, whose source is indeterminate, and not part of the invention, a bitmap of an image is initially directed to a segmentation system 12a, in which words, or character strings, or other multi-character units of understanding, will be derived. Initially, the image bitmap passes through skew detector 14, which determines the angle of orientation of text in the image. Using information about the orientation of the image, and the image itself, at text baseline processor 16a, toplines and baselines of the text are determined, so that upper and lower boundaries of lines of text within the image are identified. At median filter 18, the function referred to as "blobify⇌ is performed, which operates on the image so that each word group in a line may be treated as a single unit. As used herein, "word⇌, "symbol string⇌ or "character string⇌ refers to a set of connected alphanumeric or punctuation elements, or more broadly, signs or symbols which together form a single unit of semantic understanding. It will be appreciated that these terms may also be used to refer to the images thereof. Such single units of understanding are characterized in an image as separated by a spacing greater than that which separates the elements, signs or symbols forming the unit. To the blobified image, a set of white lines are added at block 20a, to clearly separate adjacent lines of text. The white lines are based on baseline determinations provided by processor 16a. Using this information, i.e., the blobified words, which are clearly separated from adjacent words and words in adjacent lines, a bounding box is defined about the word at block 22, thereby identifying and enclosing the word.

Thereafter word shape signal computer 24 derives a word shape signal representing the individual words in the image, based on the original image and the bounding box determinations. This information is then available for use at a word shape comparator 26, for comparing word shape signals representative of known words from a word shape dictionary 28, with the as yet unidentified word shape signals. In an alternative embodiment word shape comparator 26 may be used to compare two or more word shapes determined from image 10a. More importantly, word shape comparator 26 is not limited to the comparison of word shapes from unrecognized strings of characters to known word shapes. In a simplified context, comparator 26 is merely an apparatus for comparing one word shape against another to produce a relative indication of the degree of similarity between the two shapes.

In general, a method accomplishing the invention includes the following steps. Once orientation of the image is established and line spacing and word group spacing is established, each word can be surrounded by a bounding box. A reference line is then created extending through the character string image. The reference line may be a block having a finite thickness ranging from two-thirds of the x height to one-third of the x height, or in fact it may have a zero width. At the resolution of the image, the distance from the reference line to the upper edge of the text contour or bounding box is measured in a direction perpendicular to the reference line. Similarly, measurements may be made from the reference line to the lower bounding box edge or to the text contour along the lower portion of the word, whichever is closer. Because the set of values derived computationally can be expressed in terms of position along the horizontal axis versus length, the signal can be considered a single independent variable or one dimensional signal. Either or both of these sets of values may be used to describe the word shape. Additionally, although possibly less desirable, it is well within the scope of the invention to measure the distance of a perpendicular line drawn from the top of the bounding box or the bottom of the bounding box, to the first contact with the word or the reference line, as desired.

With a system and process for word shape derivation given, the invention may also be considered mathematically. Considering image data i(x,y), which in one common case could be an array of image data in the form of a bitmap, a character set is identified in one of many methods, perhaps as described above, which defines a boundary enclosing the selected symbol string within a subset of the array of image data. From i(x,y), an edge signal e(x,y), which represents the edges of i(x,y) detected within the closed boundary, is derived. The edge signal is augmented by adding additional data to i(x,F) so that e(x,y) is a signal e' (x,y) defined over its entire domain with respect to a single dimension or variable within the closed boundary. One, two, or more signals may be derived from e' (x,y) which are each one dimensional signals g' (t), where g is a function of parameter t which is a reference frame dependent parameter.

Figure 18:
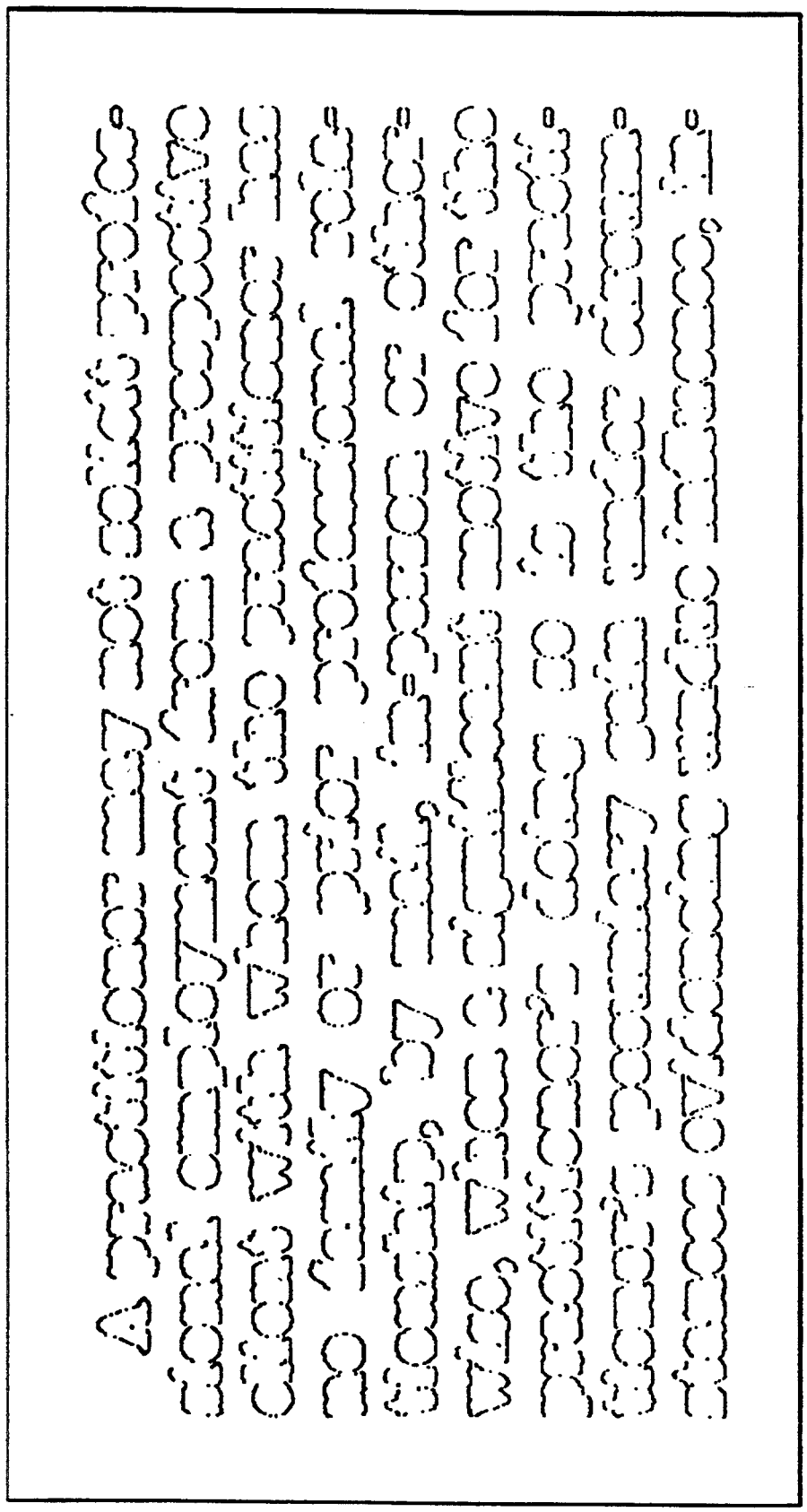
FIG. 18 illustrates the resulting contours formed by the derivation process illustrated in FIGS. 17A, B.

It is important to realize that the mathematical process used for the derivation of the one dimensional signal is essentially reversible up to the information it contains, e.g., a bitmap may be reconstructed from the upper and lower bitmap contours, as illustrated in FIG. 18. It will be noted that if the reference has a finite thickness and is therefore taken out of the image, that portion of the image is not identifiable, however, if it has a zero width the information still remains.

A recognition dictionary, or look up table of word shapes, can clearly be created through use of the described process. The process can be operated on using either scanned words as the source of the information, or in fact, they can be computer generated for a more "perfect⇌" dictionary.

To demonstrate the process of the invention, at FIG. 4, a sample image, taken from a public domain source is shown, having several lines of text contained therein. FIG. 4 demonstrates approximately how the image would appear on the page of text, while FIG. 5, shows a scanned image of the page, which demonstrates an enlargement of the image of a bitmap that would present problems to known OCR methods. Looking at, for example, the image of the word 50a "practitioner⇌ in the first line of the text image, it may be seen that several of the letters run together. Also, at the lower right hand portion of the image, circled and numbered 52, noise is present. Looking at the word "practitioner's⇌, circled and numbered 54, the running together of a punctuation mark and a letter is further noted.

Figure 6A:
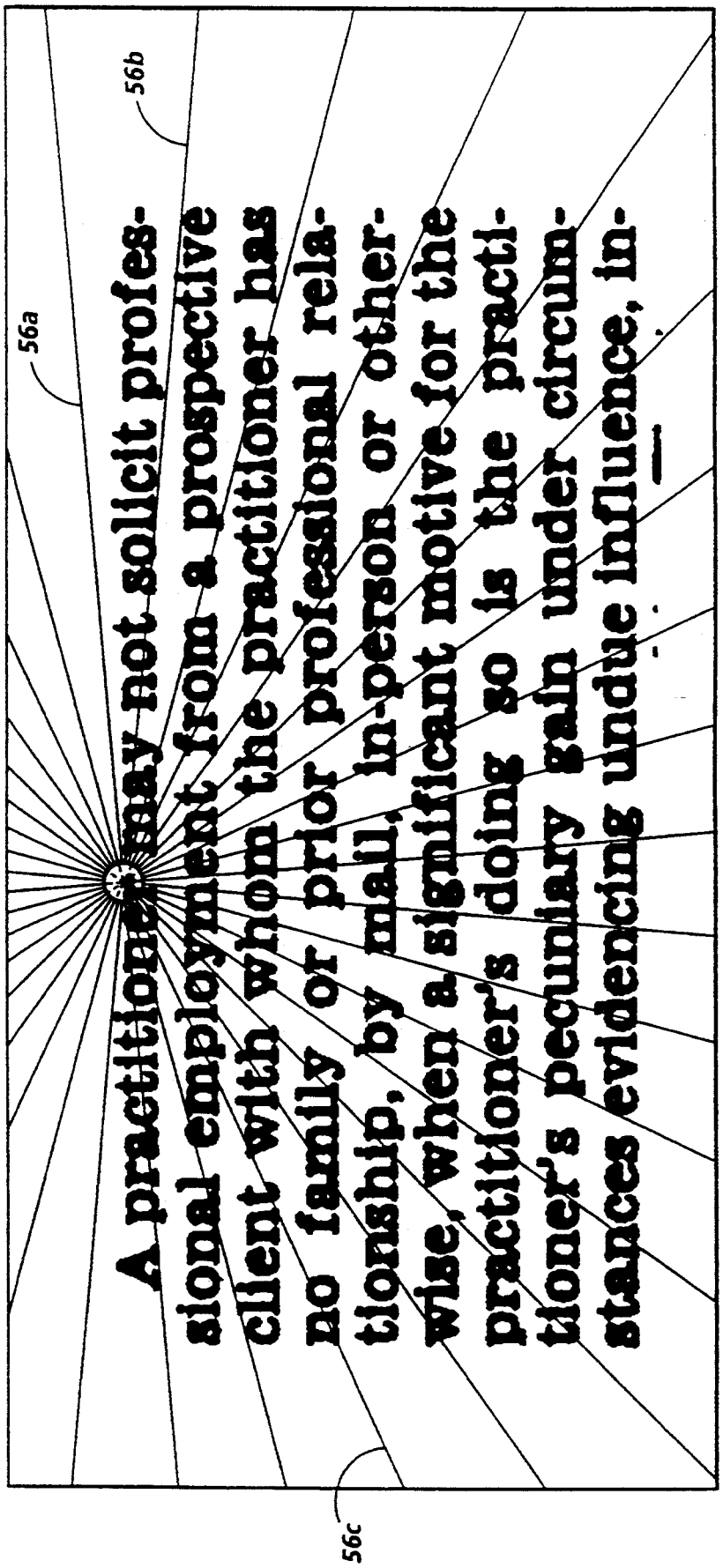

With reference again to FIG. 3B, in one possible embodiment of the invention, skew detector 14, may be implemented using a general method for determining the orientation of the text lines in the image. This method looks at a small number of randomly selected edge pixels (defined as a black pixel adjacent to at least one white pixel), and for each edge pixel considers, at FIG. 6A, a number of lines, 56a, 56b, 56c being examples, extending from the pixel at evenly spaced angular increments over a specified range of angles. The edge pixels are selected randomly from the set of all image pixels by the function RandomEdgePixel() (Appendix, page 243). FIGS. 6A (see lines 56a, 56b, 56c), 6B (see lines 58a, 58b, 58c) and 6C (see lines 60a, 60b, 60c) represent a series of increasingly smaller angular ranges over which the above mentioned technique is applied to illustrative edge pixels to accurately determine the angular orientation of the text within the image. Subsequent to finding edge pixels and defining the lines, skew detector 14 traces the path of each line, determining the lengths, in pixels, of strings of successive black pixels which are intersected by the line. Upon reaching the image boundary, an average black pixel string length is calculated by summing the lengths of the individual strings, and dividing the sum by the total number of distinct strings which were found. This operation is carried out for all the lines, thereby arriving at an average black pixel string length for each line extending from the selected edge pixel. These lengths are plotted on FIG. 6D as curve A, showing minima at approximately 0 and 3.14 radians. Curve A is a graphical representation of the summation/averaging function over each of a series of angled lines extending from the edge pixel, and spread over a range from 0 to $2\pi$ radians. Once a first minimum has been located, verification of the minimum (in the example, approximately 0 radians) is achieved by determining whether a second minimum exists at approximately $\pi$ radians from the first minimum. Upon verifying the existence of a second minima (in the example, approximately 3.14 or $\pi$ radians), a coarse skew angle is identified. Subsequently, it is necessary to more closely determine the skew angle of the text. This is accomplished by utilizing a number of lines which extend from a randomly selected edge pixel, where the lines differ by smaller angular increments, and the angular range is centered about the coarse skew angle. However, the fine skew angle may be determined by analyzing the total number of black pixels contained along a predetermined length of the lines. More specifically, the number of pixels over a unit distance are plotted as curve B on FIG. 6D, and the fine skew angle is determined by identifying the maxima of the curve. In other words, the point of the curve where the highest concentration of black pixels per unit line length exists, more accurately represents the angle of the text lines in the image. As shown by curve B, this results in a fine skew angle of approximately 0 radians, where the line intersects with the most black pixels along its length, and therefore is representative of the closest angle of orientation that needs to be determined.

Figure 6B:
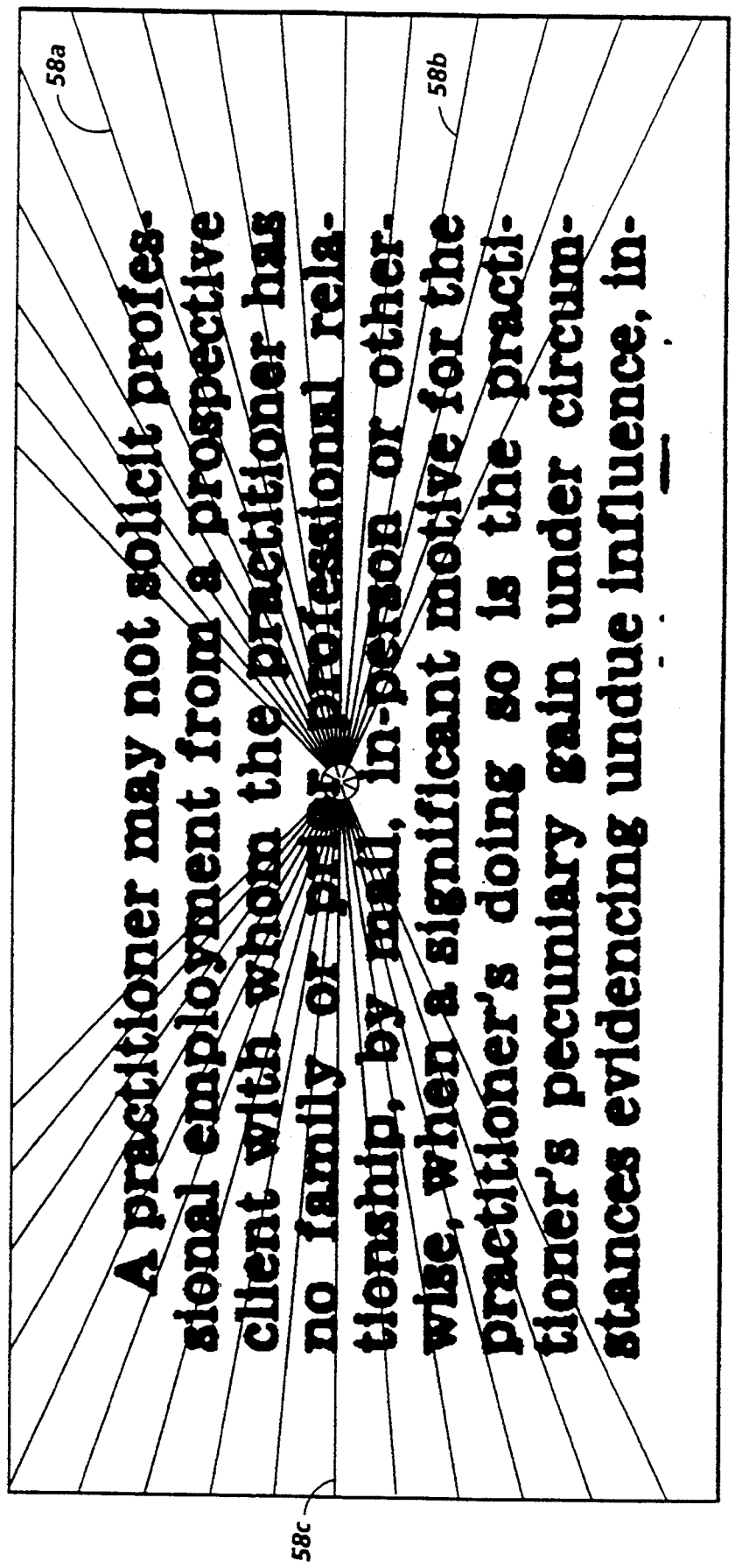
Figure 6C:
Figure 6D:
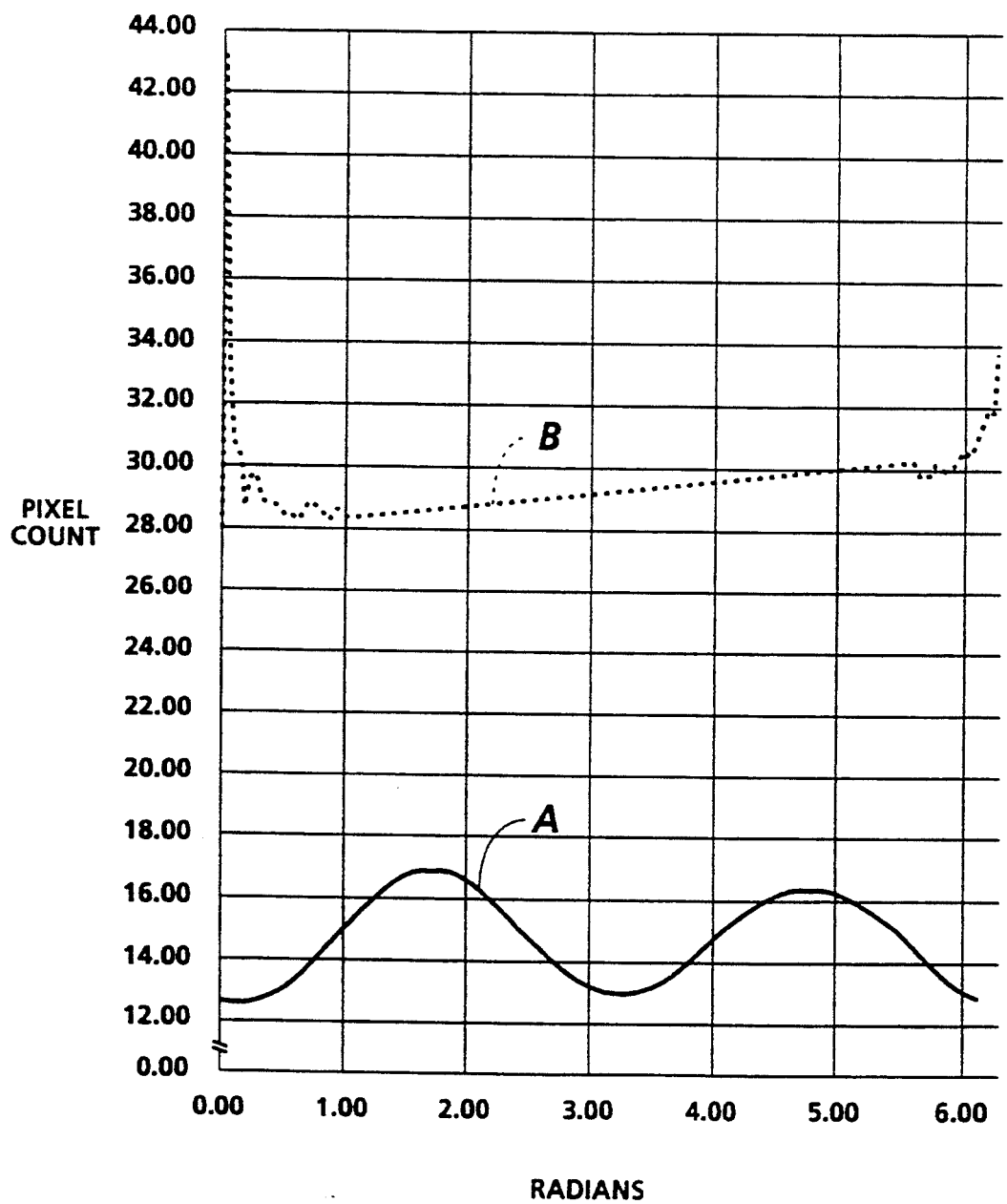
FIG. 6D shows graphs of the responses taken from the example text, which are used to determine the angle at which the example text is oriented in the image sample prior to further processing.

Alternatively, the skew angle may be determined as indicated by the NewFine() function (Appendix, page 245), which determines the skew angle using multiple iterations of the procedure described with respect to the fine angle determination. As indicated by FIGS. 6A, 6B, and 6C, each iteration would also use lines covering an increasingly smaller angular range, until a desired skew angle accuracy is reached. In the implementation illustrated by FIGS. 6A, 6B, and 6C, the desired accuracy is achieved by a series of three iterations, each using a series of 180 distinct angles about the selected edge pixel.

Figure 7A:
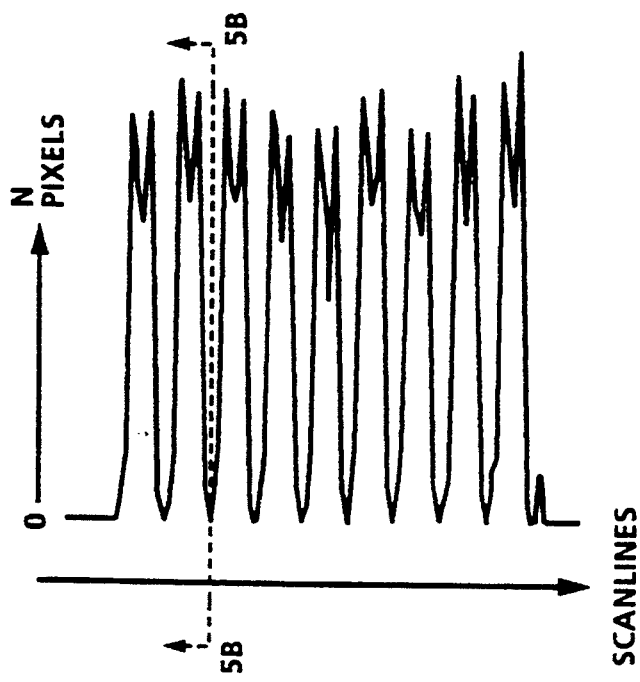
FIGS. 7A and 7B respectively show the derivation and use of a graph examining the sample image of the example text to determine baselines of text within the image.
Figure 7B:
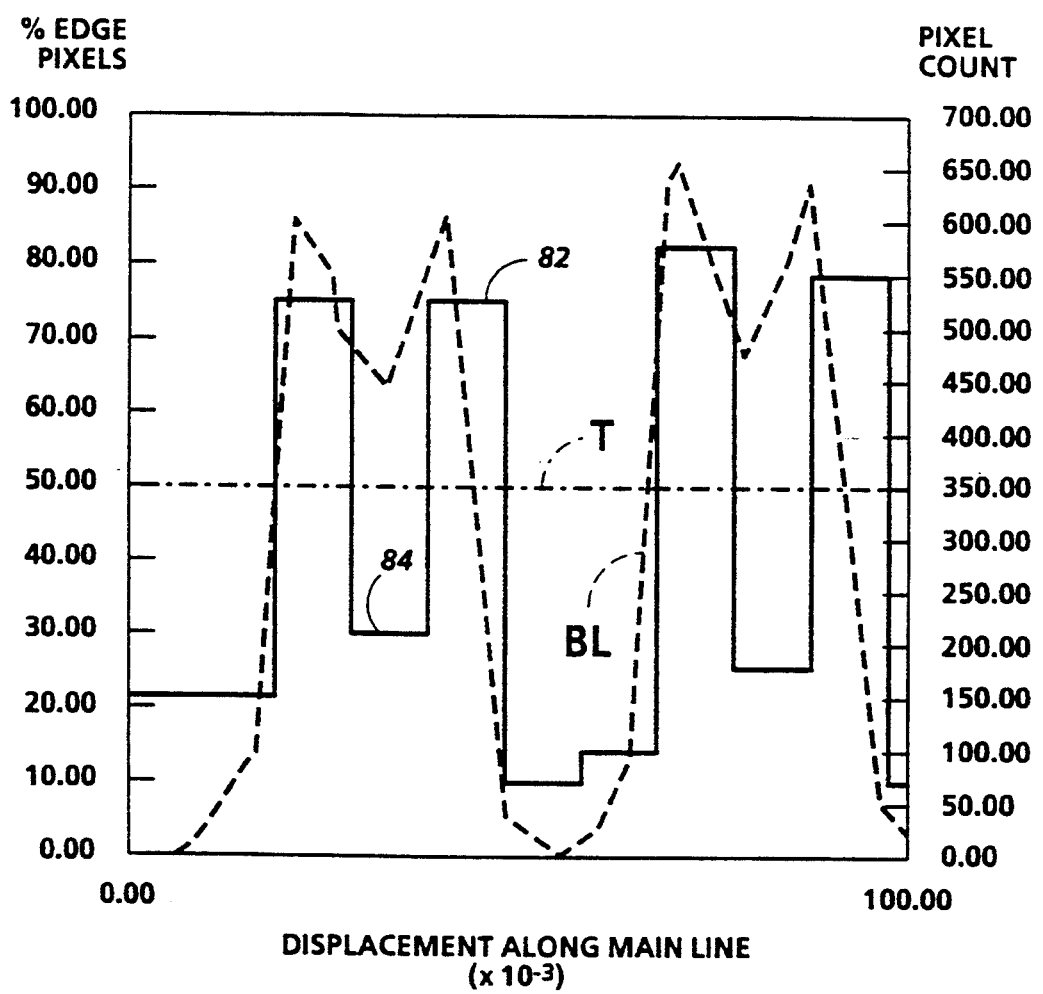

In the next process step, illustrated in the graphs of FIG. 7A and FIG. 7B, text baseline processor 16a identifies the characteristic lines, upper topline and lower baseline, of each line of text. The process steps executed by text baseline processor 16a are illustrated in detail in FIG. 8A and 8B. The histogram of FIG. 7A, shown to the left along the image, is derived by examining lines, at the resolution of the image, and oriented parallel to the skew orientation of the image, as defined by the previously determined skew angle. These parallel lines spanning the image are used to determine the number of black pixels intersected by each of the lines. Along lines passing through inter text line spaces, no black pixels should be intercepted, while along lines through the text, large numbers of black pixels should be intercepted.

More specifically, the function BaseLines(), (Appendix page 160), first finds the coordinates of a "main⇌" line, block 142, constructed through the center of the image and perpendicular to the text lines, as determined by the skew angle passed to the function as shown by block 140. Next, Line Engine Procedure 144 is executed, where by proceeding along the main line from one end to the other, at a series of points along the main line, perpendicular branch lines are constructed which extend outwardly from the main line for a fixed distance, block 146. Along the branch lines, the number of black vertical edge pixels are counted, block 148, and the number of black pixels intersected by the lines are counted, block 150, and summed for the opposing pairs of lines, block 152. Black vertical edge pixels, as counted by block 148, are defined as black pixels having a white neighboring pixel at either the upper or lower neighboring pixel position. LineEngine()procedure 144 is repeated until all points, and associated branch lines, along the main line have been processed, as determined by decision block 154. An x-height value may be returned from this procedure, which will subsequently be used by the word shape computer 24.

Subsequently, the counts for all the branch lines are analyzed to determine the branch line pairs having the highest ratio of black vertical edge pixels to black pixels. In general, those lines having the highest percentages would correspond to lines passing along the upper and lower edges of the characters which form the text lines. As illustrated in the enlarged view of FIG. 7B, a definite distinction exists between those branch lines having a high vertical edge pixel ratio, line 82, and those having a low ratio, line 84. Application of a filter mask and comparison of the maximum peaks within the mask enables the identification of those lines which represent the text toplines and baselines, for example, line 82. The process is implemented in the maxFilter.c module, beginning at line 57, the code for which is also incorporated in the newBaselines.c module at line 274, page 214. Baseline determination is described in further detail in a copending U.S. Patent Application, for a "Method for Determining Boundaries of Words in Text⇌, Huttenlocher et al., U.S. patent application Ser. No. 07/794,392, which has been previously incorporated herein by reference. An additional test may also be applied to the histogram operation of step 150. This added test, a boolean test, may be used to assure that a minimum run of black pixels was detected during the analysis of the line. For example, a flag, which is cleared at the start of each branch line analysis, may be set whenever a series of five sequential black pixels are detected along the line. This test would assure that small noise or image artifacts are not recognized as baselines due to a high vertical edge pixel ratio.

As an alternative method, it is possible to utilize the total number of black pixels lying along the branch lines to determine the locations of the baselines. Using histogram curve BL, which represents the number of black pixels counted along the branch lines, it is possible to determine which branch lines have the most black pixel intersections. Applying a threshold of the maximum allows the determination of the upper and lower characteristic line pairs for each text line. Hence, the rising and falling portions of the histogram curve BL, constitute the characteristic lines of the text, and the threshold would be used to specifically identify the localized maxima surrounding an intervening minima, thereby enabling identification of the baseline positions which would be used for further processing. More importantly, this alternative approach, illustrated as step 162, may be utilized to identify the upper and lower baselines of a baseline pair, based upon the slope of the BL histogram curve. It is important to note that there is little additional processing associated with the identification step as the histogram information was collected previously during step 150. Once the preliminary characteristic line or baseline pairs are identified, block 162, a verification step, block 164, is executed to verify that the baseline pairs are separated by more than a minimum distance, the minimum distance being established by calculating the average line pair separation for all line pairs in the image. After verification, the valid baseline information is stored by output block 166 for later use by the white line addition and segmentation blocks, 18 and 20a, respectively.

Figure 9:
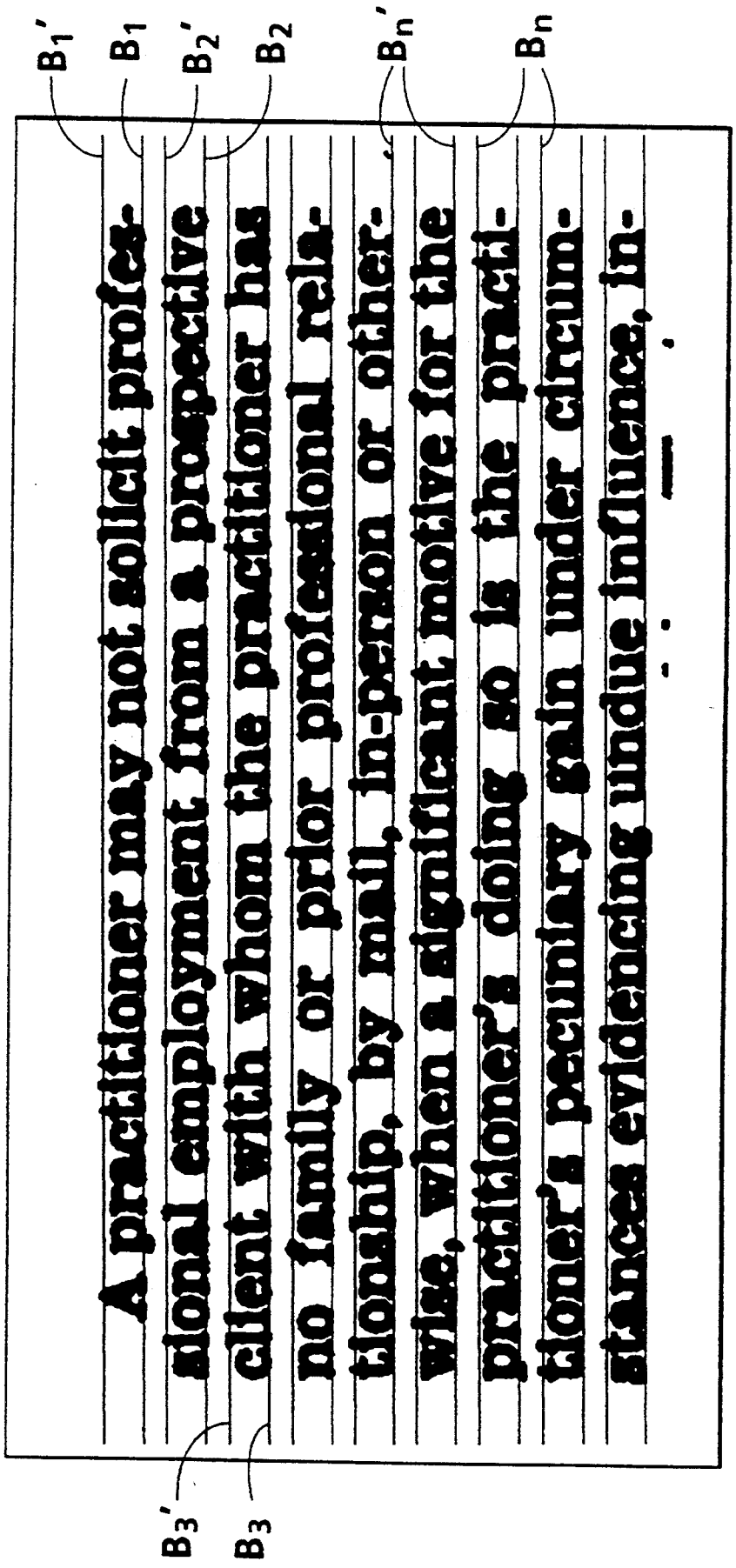
FIG. 9 shows the scanned image of the example text with baselines indicated thereon after derivation from the data shown in FIGS. 7A and 7B.

An important advantage of these baseline determination methods, are that they are highly insensitive to noise or extraneous marks in the interline space. FIG. 9 shows the result of the baseline determination on the example image of the sample text, showing that baseline pair, baseline and topline $B_n$ and $B_n'$, respectively, have been located on the image, indicating those portions of the image in which a predominant portion of the text occurs. While some portions of the character ascender strokes are outside the baselines, no detriment to the remainder of the process is noted. Of course, a smaller threshold value might enable the system to capture more of the ascending strokes.

Figure 10:
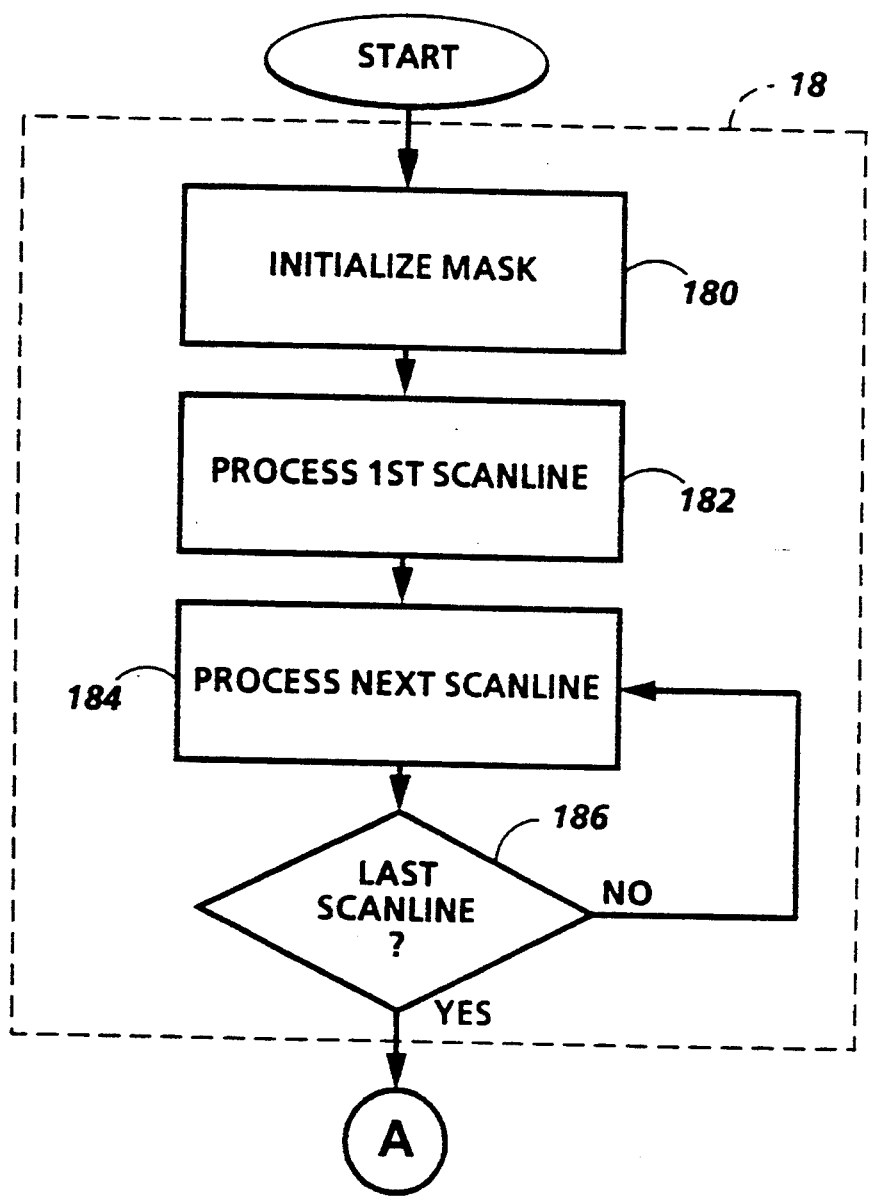
FIG. 10 is a flowchart illustrating the steps used in the application of a median filter to the image of FIG. 4.
Figure 11:
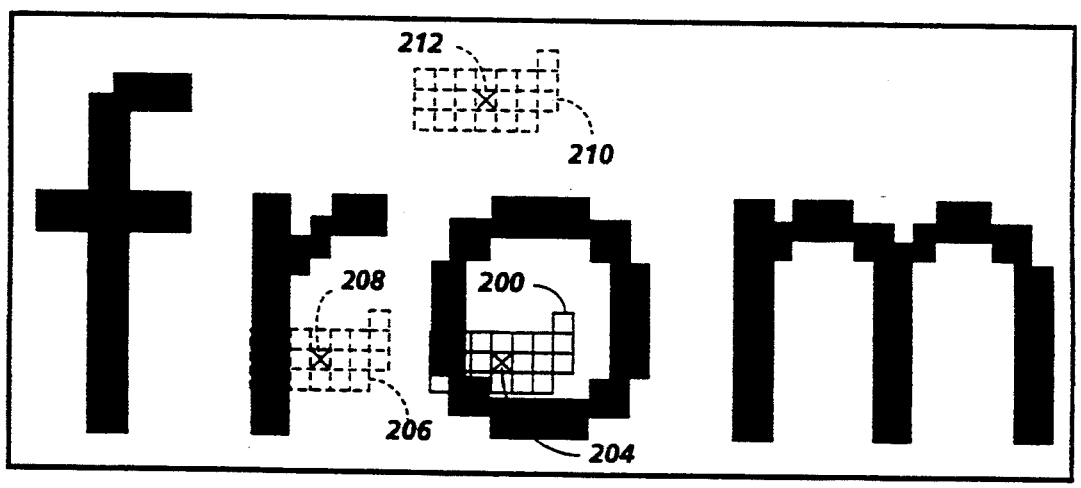
FIG. 11 is an enlarged pictorial representation of a portion of the image of FIG. 4, illustrating the application of the median filter.

With reference again to FIG. 3B in conjunction with FIGS. 10 and 11, the next process step is a word group isolation step. A filter 18 is applied to a copy of the image which results in an image that tends to render the word into blobs distinguishable from one another. The filter is applied with a small window, to each area, to render as black those areas that are partly black. As shown in FIG. 10, the blobify function (Appendix page 165) first initializes mask variables which establish the mask size and angle, block 180, and then processes the upper scanline to initialize the data array, block 182. Median filtering is accomplished by sequentially moving the mask window through the image, blocks 184 and 186, and whenever the number of black pixels appearing in the window exceeds a threshold value, the target pixel, about which the window is located, is set to black. FIG. 11, which illustrates some examples of the filter process, has a mask window 200 placed over a portion of the image. For example, with a twenty percent threshold and a generally rectangular mask having twenty-one pixels, arranged at an angel approximately equal to the skew determined for the text, the result of filtering in window 200 would be the setting of pixel 204 to black. Similarly, window 206, which primarily lies within the intercharacter spacing between the pixel representations of the letters "r⇌ and "o⇌, would cause pixel 208 to be set to black. On the other hand, window 210, which lies in the region between word groups, would not have a sufficient number of black pixels present within the window to cause pixel 212 to be set to black. The size, shape and orientation of mask window 200 is optimized to reduce the filling in between text lines, while maximizing the fill between letters common to a single word.

Figure 12:
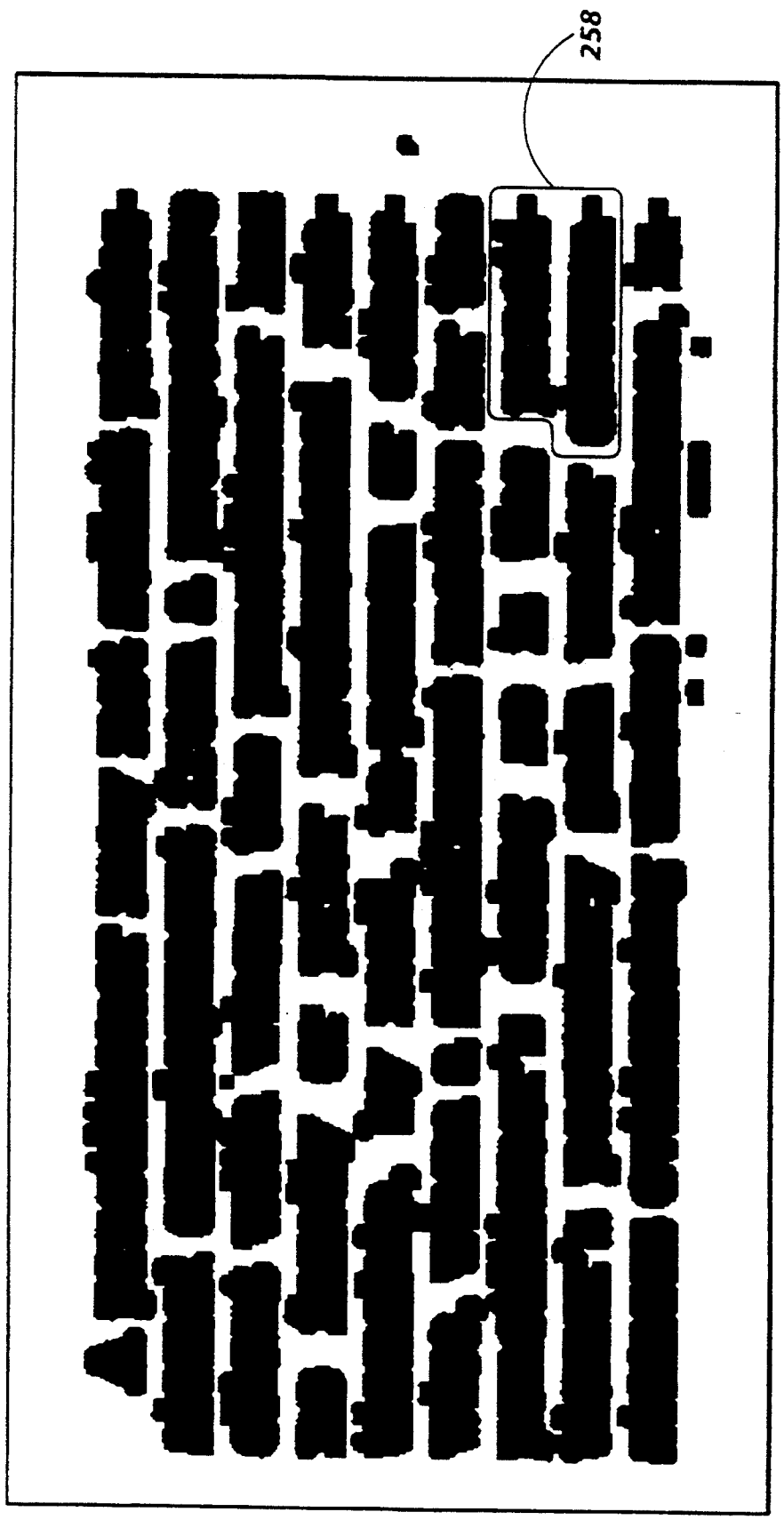
FIG. 12 demonstrates the resulting image after application of a median filter, a process known herein as blobifying, to the scanned image of the example text, which tends to render character strings as a single set of connected pixels.

As illustrated by FIG. 12, the result of the median filtering is that the relatively small spacing between characters in a word generally becomes inconsequential, and is filled with black pixels. Words become a single connected set of pixels, i.e., no white spaces completely separate characters in a single word. However, the relatively large spacing between character strings or between words, is a larger space outside of the ability of the filter to turn into black, and therefore serves to distinguish adjacent symbol strings. With reference now to FIGS. 9 and 12, it can be seen that the first two words of the sample text, "A⇌ and "practitioner⇌ have been "blobified⇌, as this process is referred to, so that, for example, the "p⇌ of "practitioner⇌ is no longer separated from the "r⇌ of that word. (Compare, FIG. 5). Once again, despite the blobifying or blurring of characters, "A⇌ and "practitioner⇌ remain as discrete blobs of connected symbols, or words.

Figure 13:
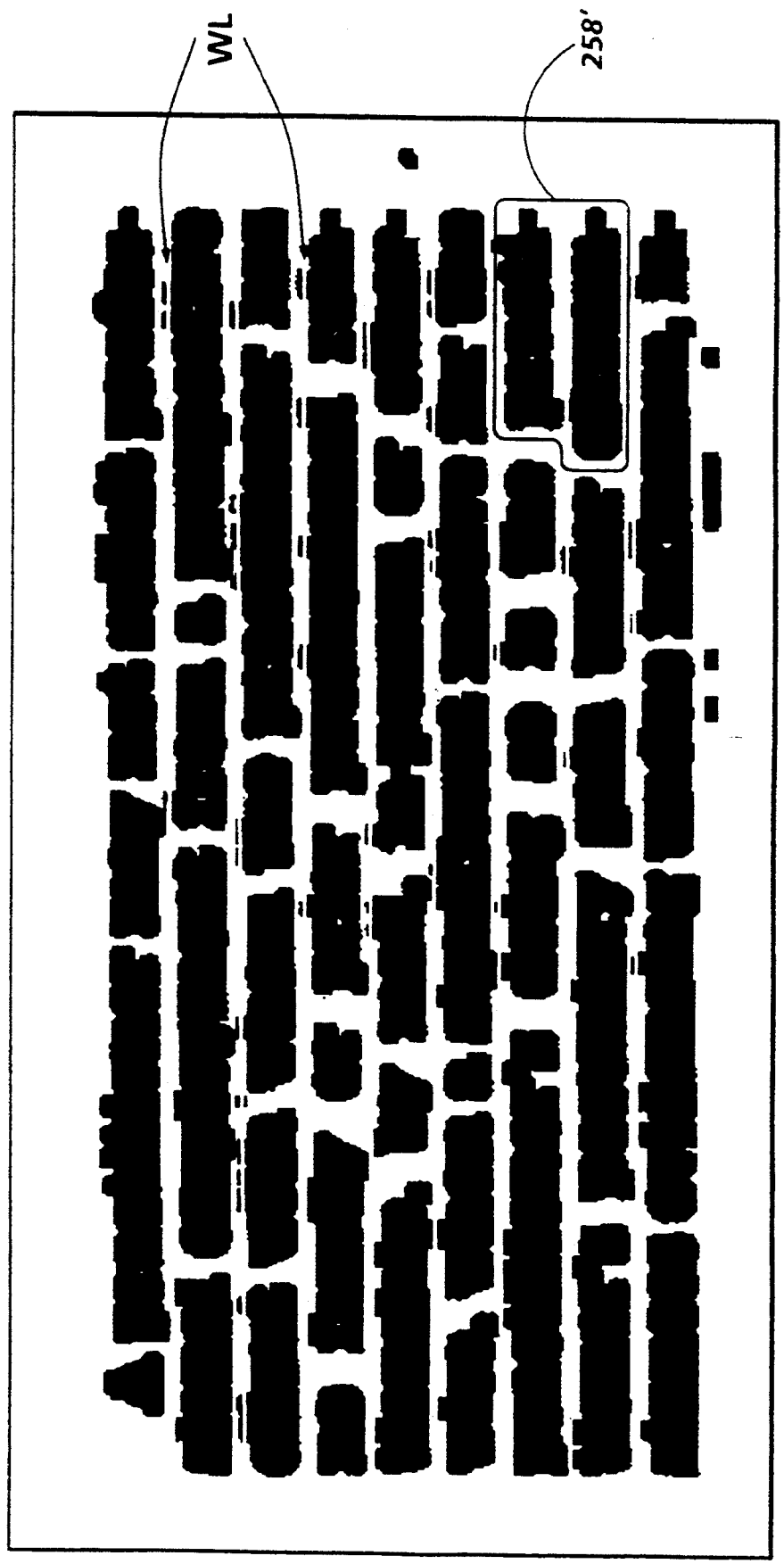
FIG. 13 shows a subsequent step in the process, in which lines of white pixels are added to the blurred image to clearly delineate a line of character strings from adjacent lines of character strings.

With reference again to FIG. 3B, as an adjunct to this step, white line addition 20a, superimposes upon the blobified image of FIG. 12 a series of white pixel lines to make certain that lines of text are maintained separately from adjacent lines of text (i.e., no overlapping of the filtered text lines). With reference to FIGS. 12 and 13, noting the circled areas 258 and 258', a combination of an ascender and descender has resulted in an interline merging of two words. The text line overlap illustrated in area 258 of FIG. 12 is exactly what is eliminated by superimposing the white lines on the blobified or filtered image.

Figure 14:
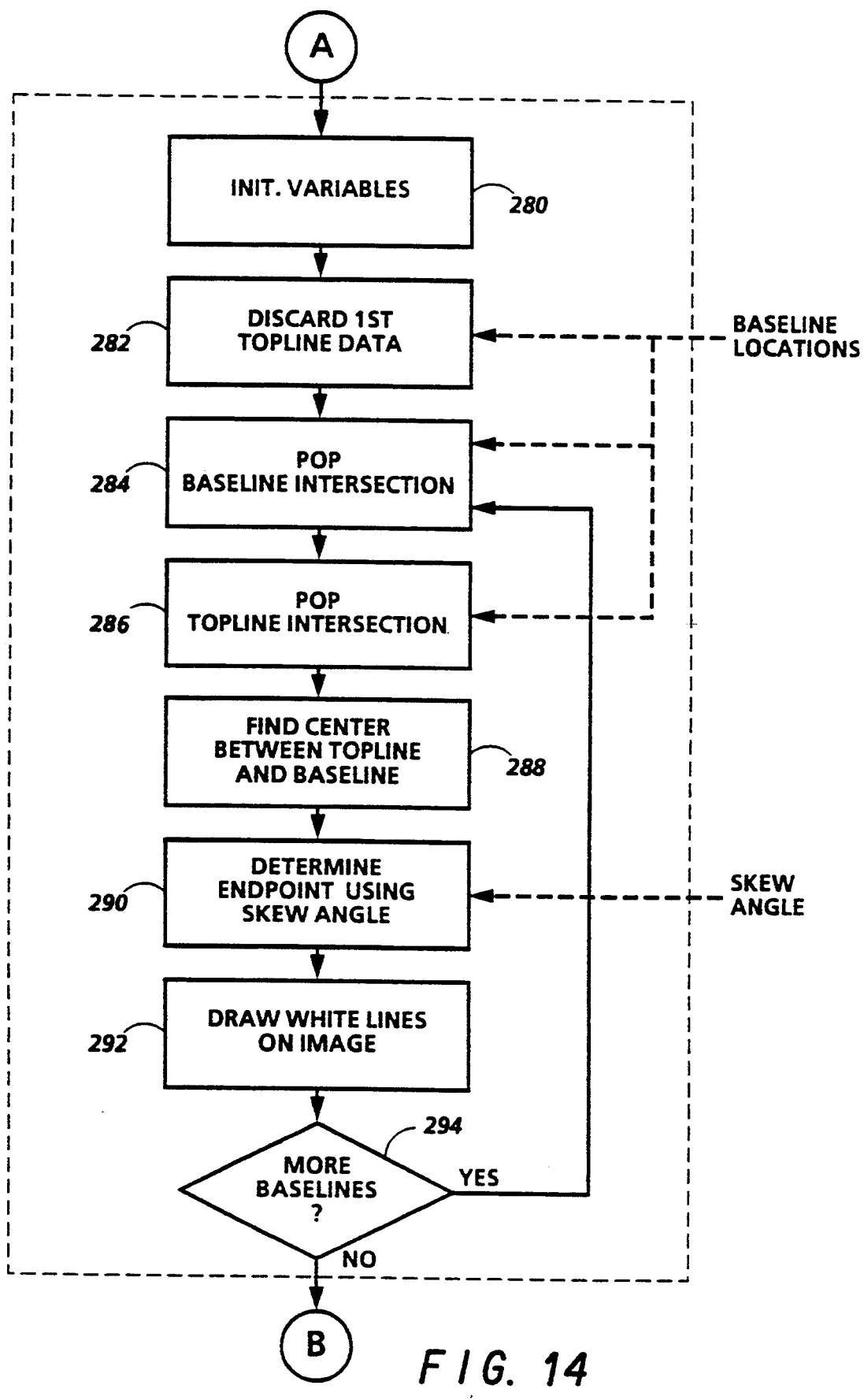
FIG. 14 is a flowchart illustrating the steps required to add the white lines of FIG. 13.

This superposition of white lines operation, the outcome of which is illustrated by FIG. 13, is carried out by the process illustrated in FIG. 14 as executed in the DrawMiddleLines() function (Appendix page 233). Generally, white lines WL are added to the image, approximately halfway between adjacent baseline and topline pairs, to assure that there is no cross-text line blobifying. Once again, FIG. 13 shows the result of white line addition to the blobified image of FIG. 12.

Referring now to FIG. 14, white line addition block 20a begins by initializing variables in step 280 and subsequently reads in the topline location from the baseline information of the first text line. The topline information is discarded, block 282, and the next baseline and topline locations are popped from the storage stack or list, blocks 284 and 286, respectively. With respect to the image, this baseline-topline pair respectively represents the bottom and top of adjacent text lines. Next, at step 288, the point lying at the center of the pair is located to provide a starting point for the white lines which are drawn from the center of the image in an outward direction. The endpoints of the white lines are calculated in step 290, using the skew angle determined by skew detector 14 of FIG. 3B. White lines are drawn or superimposed on the blobified image at step 292, and the process is continued until all text lines have been effectively separated, as controlled by test block 294.

With reference again to FIG. 3B, as a result of the blobify or median filtering, the position of bounding boxes about each connected set of pixels formed in the blobify step may be determined. Bounding boxes are placed only about those connected components or words that are in a text line lying between the superimposed white lines. The bounding boxes are placed at the orientation of the text line, by identifying the extreme points of each group of connected pixels in the direction of the text line, and in the direction orthogonal to the text line, as opposed to the image coordinate system. This operation is performed by the function FindBorders(), (Appendix, page 172). Generally, the FindBorders function steps through all pixels within the image to find the bounding boxes of the connected characters (Paint Component), to determine the coordinates of the upper left corner of each box, as well as the length and width of the box.

Figure 15A:
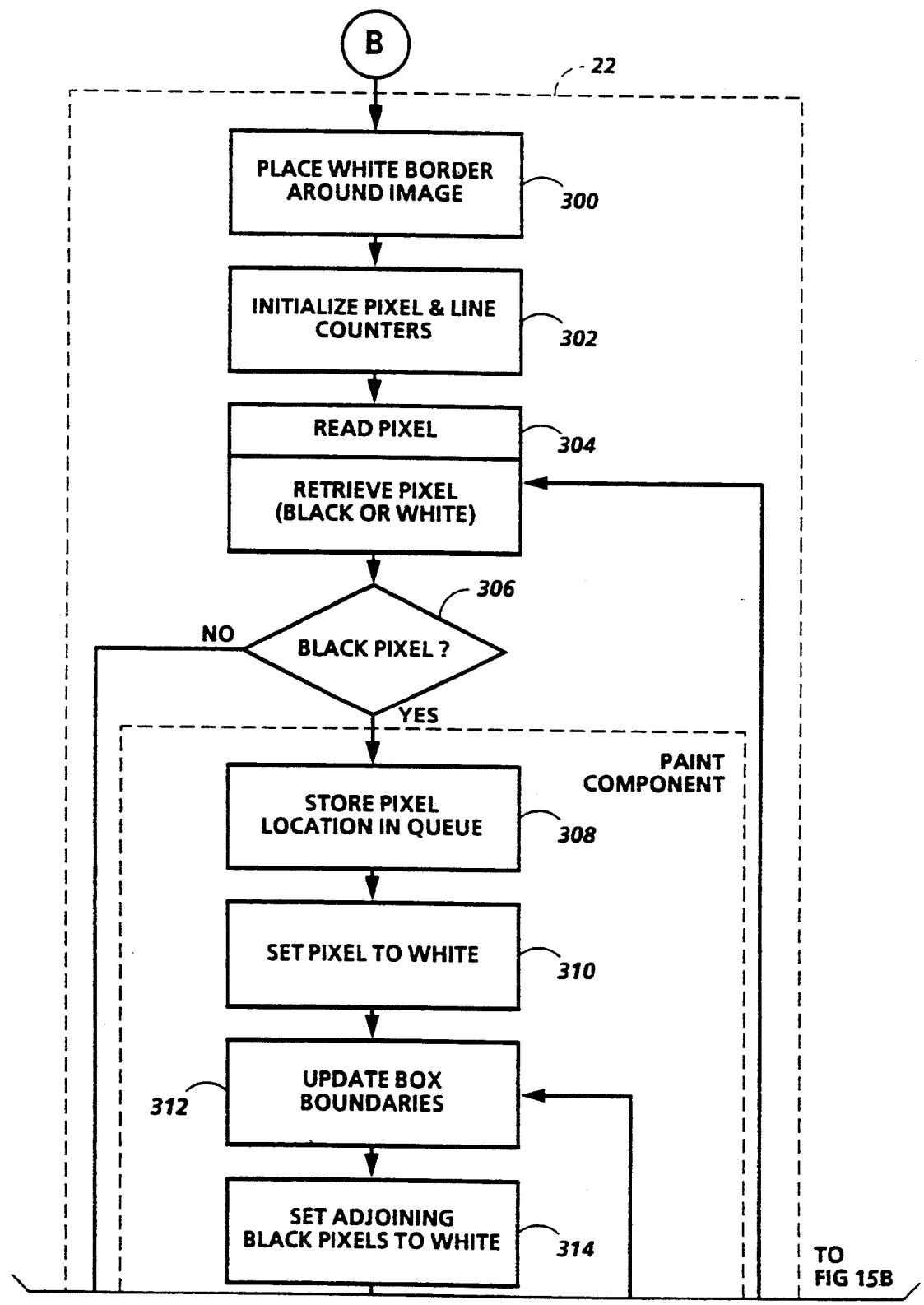
FIGS. 15A and 15B are flowcharts representing the procedure which is followed to segment the image data in accordance with the blurred image of FIG. 12.
Figure 15B:
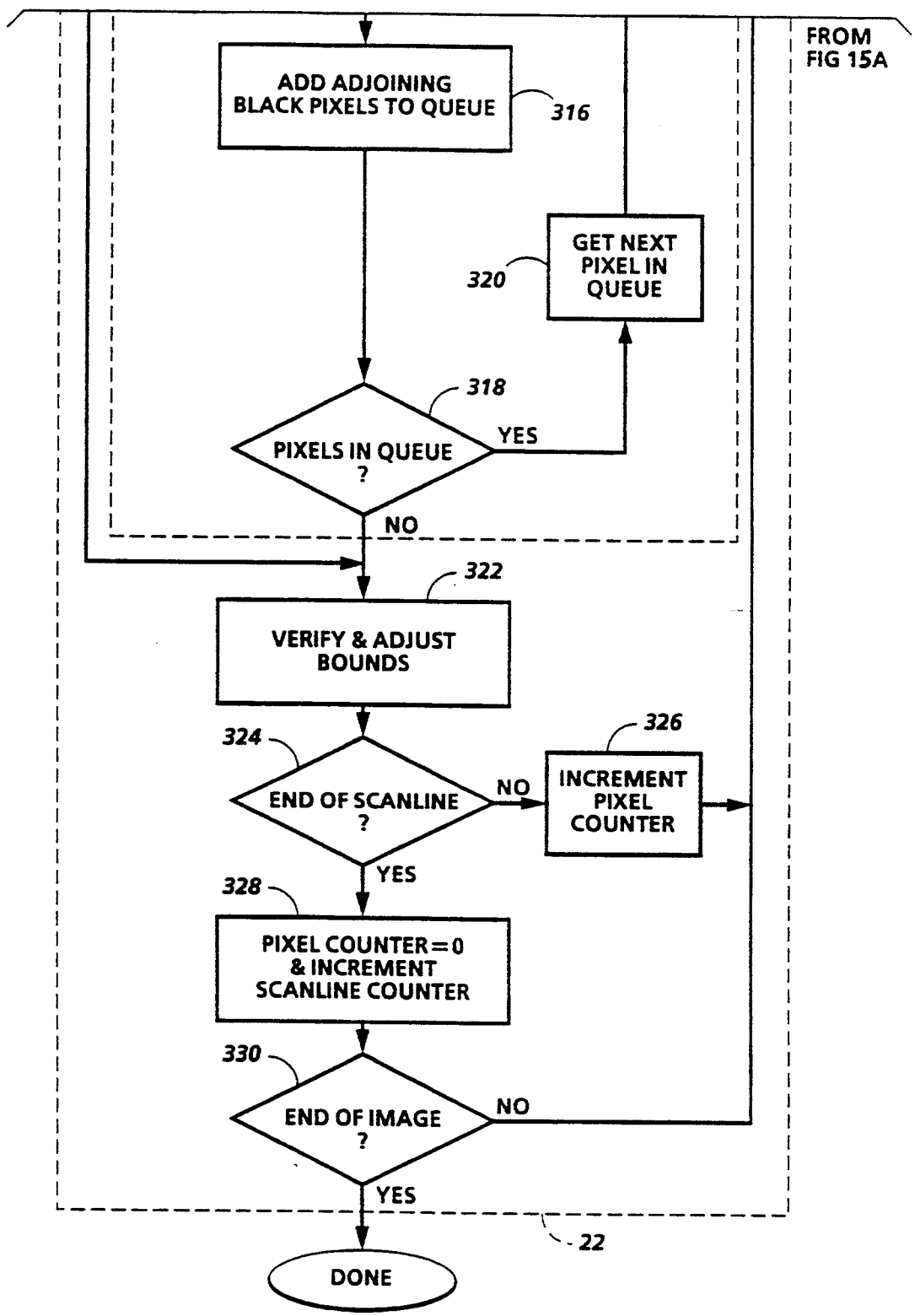

Referring now to FIGS. 15A and 15B, which detail the FindBorders() procedure, segmentation step 22 begins by placing a white border completely around the filtered image, step 300. This is done to avoid running outside the edge of the array of image pixels. Next, pixel and line counters, x and y, respectively, are initialized to the first pixel location inside the border. Calling the ReadPixel procedure, block 304, the pixel color (black or white) is returned and tested in block 306. If the pixel is white, no further processing is necessary and processing would continue at block 322. Otherwise, the PaintComponent() procedure (Appendix, page 171) is called and begins by storing the location of the black pixel in a queue, block 308. Subsequently, in a copy of the image, the pixel is set to white and the boundaries of the box, surrounding the connected pixels or components, are updated, blocks 310 and 312, respectively. Next, adjoining black pixels are set to white, block 314, and the locations of the black pixels are added to the end of the queue, block 316. At block 318 the queue pointers are tested to determine if the queue is empty. If not empty, the next pixel in the queue is retrieved, block 320, and processing continues at block 312. Otherwise, if the queue is empty, all of the connected black pixels will have been set to white and the box boundaries will reflect a box which encompasses the connected components. Subsequently, the boundaries of the box which encompasses the word segment are verified and may be adjusted to an orthogonal coordinate system oriented with respect to the skew of the text lines, block 322.

It will no doubt be apparent here that while finding each text line is an integral part of the described method, and serves to make the present embodiment more robust, other methods of deriving the information acquired by that step are possible. The primary use of the text line finding function is a) to determine x-height, and b) define the white line addition for separating interline blobs. Certainly this step may be removed, with a sacrifice in robustness, or other means of deriving the necessary information may be available.

The looping process continues at block 324 which checks pixel counter x to determine if the end of the scanline has been reached, and if not, increments the counter at block 326 before continuing the process at block 304. If the end of the scanline has been reached, pixel counter x is reset and scanline counter y is incremented at block 328. Subsequently, block 330 checks the value of scanline counter y to determine if the entire image has been processed. If so, processing is completed. Otherwise, processing continues at block 304 for the first pixel in the new scanline.

Thus, as shown in FIG. 16, for the word "practitioner⇌ the extremities of the connected character image define the bounding box. Once bounding boxes have been established, it is then possible at this step, to eliminate noise marks from further consideration. Noise marks are determined: 1) if a bounding box corner is outside the array of image pixels (Appendix, page 171); 2) if a box spans multiple text lines in the array (Appendix 229), or lies completely outside a text line; 3) if boxes are too small compared to a reference s, in either or both longitudinal or latitudinal directions, and accordingly are discarded. Noise marks 70a and 72 and others will not be considered words. The OnABaseline() function (Appendix, page 229) is an example of a function used to eliminate those boxes lying outside of the baseline boundaries.

Figure 17A:
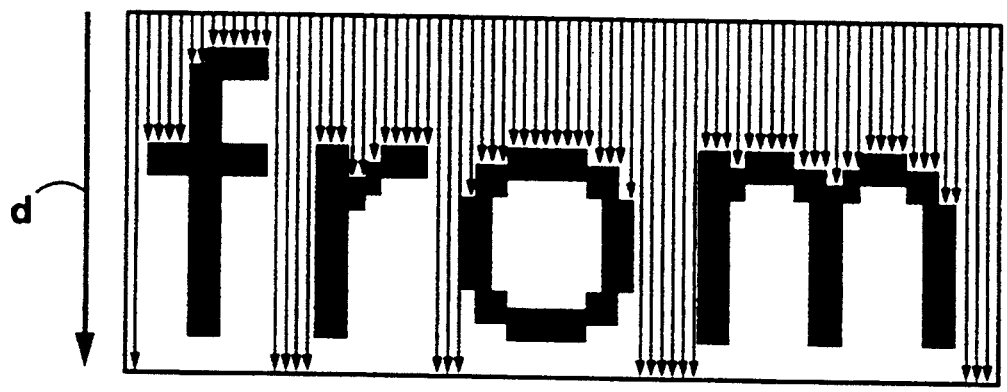
FIGS. 17A and 17B illustrate derivation of a single independent value signal, using the example word "from⇌", which appears in the sample image of example text.
Figure 17B:
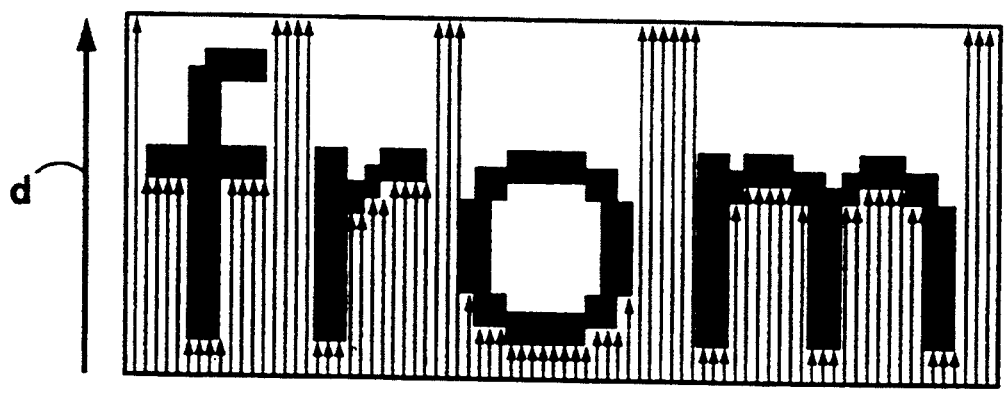

With reference to FIG. 3B, at word shape computer 24, a signal representing the image of a word, or at least a portion thereof, now isolated from its neighbors, is derived. The derived signal is referred to as a word shape contour. The shape contour for each word is determined using the MakeShell() function (Appendix, page 228). As illustrated in FIG. 17A, this function first moves along the top of each bounding box, and starting with each pixel location along the top of the box, scans downward relative to the page orientation, until either a black pixel, or the bottom of the box, is reached. A record of the set of distances d between the top of the box and the black pixel or box bottom is maintained. The set of distances d, accumulated over the length of the box, constitutes the top raw contour of the word shape. Subsequently, a bottom raw contour is produced in a similar manner as illustrated in FIG. 17B, for the same word depicted in FIG. 17A, by sequentially moving across the bottom of the box, and looking in an upwards direction, for either the first black pixel or the top of the bounding box.

Figure 19:
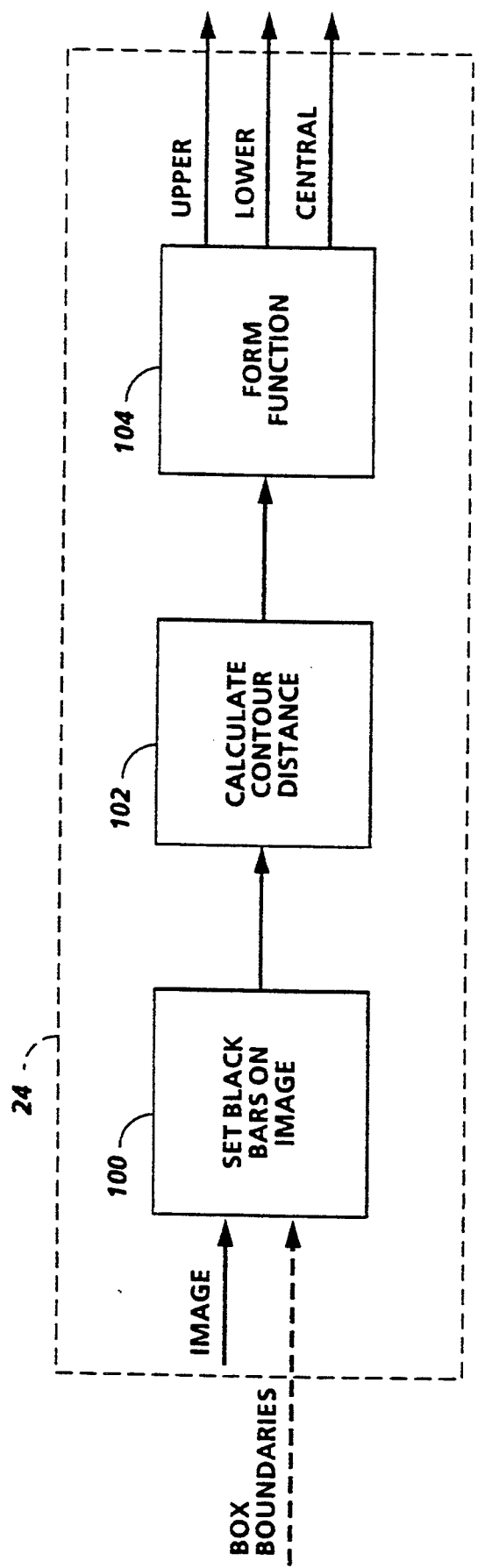
FIG. 19 illustrates the steps associated with deriving the word shape signals.

With reference now to FIG. 19, at block 100 which preferably operates on the actual image as opposed to the filtered image, which could be used in this step, one or more reference lines are established through each word. In other terms, the data representing the symbol string is augmented, so that it is defined over the range of the symbol string. In one embodiment, a blackout bar, which may have a finite thickness or a zero thickness is constructed through the word, preferably having an upper limit or reference line at approximately two thirds of the x height, and a lower limit or reference line at approximately one-third of the x height (which was determined at the baseline determination step). At contour calculation 102, a set of measurements is derived, for the distance d between the upper or lower edge of the bounding box, and the word, or the nearer of the reference line's closer edge of the black out bar. The calculation's measurements are made at the resolution of the image. With reference to FIG. 20A, where the calculation's measurements are illustrated pictorially, it can be seen that the reference lines serve to allow the signal that will ultimately be derived from this step to be defined at every sampling position over the length of the word. In a preferred embodiment, the calculation's measurements of d are actually generated from the contour data derived in accordance with FIGS. 17A, 17B previously collected, and are adjusted to limit the distance d with either the upper or lower edge of the blackout bar as indicated. In the embodiment shown in FIG. 20A, measurements are made from the upper line of the bounding box to the upper reference line of the word, although this is not a requirement. Thus, for example, the measurement could alternatively be made from the reference line to either the upper or lower bounding line, or the character. FIG. 20B better shows how the set of measurements is used to form the signal output from block 104. The contour is represented as a set of measurements distance d', relative to the reference line. Measurement d' is therefore derived from the measurements shown in FIG. 20A, which designate the stopping point of line d, and the known position of the black out bar. Calculating the distance relative to the reference line enables scaling of the word shape contours to a common x height, thereby facilitating any subsequent comparison of the shapes. Accordingly, the distances d' represent a measurement from the reference line or blackout bar to the outer limits of the letter, and in the absence of a letter, provide a zero measurement. These measurement might be derived directly, but the proposed indirect methods appear easier to implement. FIGS. 20C and 20D show that the sets of d' values can be plotted on a graph to form a one dimensional signal or curve representing the word shape. Details of the contour determination are contained in the function StoreOutlinePair() beginning in the Appendix at page 255. FIG. 18 is an image of the contour locations as established for the text sample of FIG. 4. It is important to note the informational content of FIG. 18, where, for the most part, it is relatively easy to recognize the words within the passage by their contours alone.

In studies of the information delivered by the appearance of English language words, it has been determined that in a majority of cases, words can be identified by viewing only approximately the top third of the image of the word. In other words, the upper portion of the word carries with it much of the information needed for identification thereof. In a significant portion of the remainder of cases, words that are unidentifiable by only the upper third of the image of the word, become identifiable when the identification effort includes the information carried by the lower third of the image of the word. A relatively small class of words requires information about the middle third of the word before identification can be made. It can thus be seen that a stepwise process might be used, which first will derive the upper word shape signal or contour, second will derive the lower word shape signal or contour, and thirdly derive a word shape signal central contour (from the reference line towards the word or bounding box), in a prioritized examination of word shape, as required. In the examples of FIG. 20A, 20B, and 20C, the word "from⇌ is fairly uniquely identifiable from its upper portion only. In the examples of FIG. 21A, 21B, 21C and 21D, the word "red⇌ is less uniquely identifiable from its upper portion, since it may be easily confused with the word "rod⇌, and perhaps the word "rad⇌. While the lower portion of the letter "a⇌ may distinguish "red⇌ and "rad⇌, it is doubtful that the lower portion of the letter "o⇌ will distinguish the words "red⇌ from "rod⇌. However, the central portions of "red⇌, "rad⇌, and "rod⇌ are quite distinct.

The image unit classification can be achieved, for example, by comparing the image units with other selected image units to identify equivalence classes of image units, such that each equivalence class contains most or all of the instances of a given word in the document. The equivalence classes can be formed by clustering the image units in the document based on the similarity of image unit classifiers, without actually decoding the contents of the image units, such as by conversion of the word images to character codes or other higher-level interpretation. Any of a number of different methods of comparison can be used. One technique that can be used, for example, is by correlating the raster images of the extracted image units using decision networks, such technique being described in a Research Report entitled "Unsupervised Construction of Decision networks for Pattern Classification⇌ by Casey et al., IBM Research Report, 1984, said document being incorporated by reference herein.

Preferred techniques that can be used to identify equivalence classes of word units are the word shape comparison techniques disclosed in U.S. patent application Ser. Nos. 07/796,119 and 07/795,169, filed concurrently herewith by Huttenlocher and Hopcroft, and by Huttenlocher, Hopcroft and Wayner, respectively, and entitled, respectively, "Optical Word Recognition By Examination of Word Shape,⇌ and "Method for Comparing Word Shapes⇌.

Figure 22:
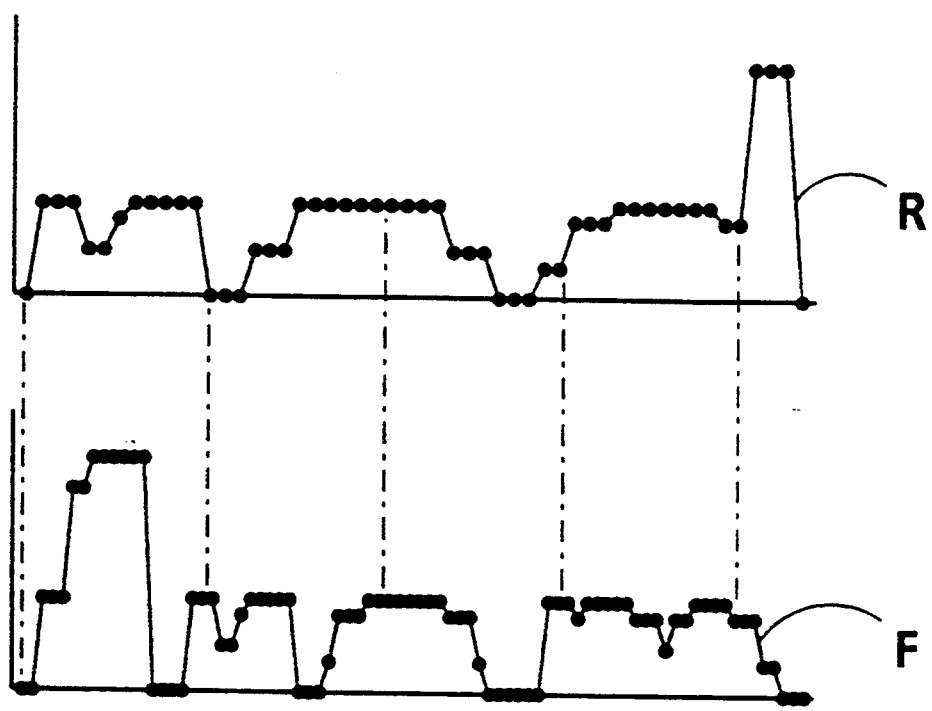
FIG. 22 shows a simple comparison of the signals derived for the words "red⇌" and "from⇌" using a signal normalization method.

For example, U.S. patent application Ser. No. 07/795,169 discloses, with reference to FIG. 3B, one manner in which a comparison is performed at word shape comparator 26. In one embodiment, the comparison is actually several small steps, each of which will be described. With reference to FIG. 22, generally, the two word shape signals, one a known word, the other for an unknown string of characters are compared to find out whether they are similar. However, in this case, signal R is the upper contour of the word "red⇌, while signal F is the upper contour of the word "from⇌. Actually, relatively few signals could be expected to be exactly identical, given typical distinctions between character fonts, reproduction methods, and scanned image quality. However, the word shape signals to be compared may be scaled with respect to one another, so that they have the same x-heights. This is achieved by determining the x-height of the pair of word shape contours to be compared. Once determined, the ratios of the x-heights are used to determine a scale factor to be applied to one of the contours. As the x-height is a characteristic measurement for fonts, it is used to determine the scaling factor in both the horizontal and vertical directions. An example of the scaling operation is found in the fontNorm.c file beginning at line 172, where the StoreOutlinePair() function carries out the scaling operation in both the x and y, horizontal and vertical, directions. Alternatively, the shape signals may be compared without normalization and a weighing factor imposed upon the portion of the measured difference due to the unequal lengths. Furthermore, the amplitude or height of the signals has been normalized to further reduce the impact of the font size on the word shape comparison.

Figure 23A:
FIGS. 23A, 23B, and 23C illustrate the details of the discrepancy in font height, and the method for normalization of such discrepancies.
Figure 23B:
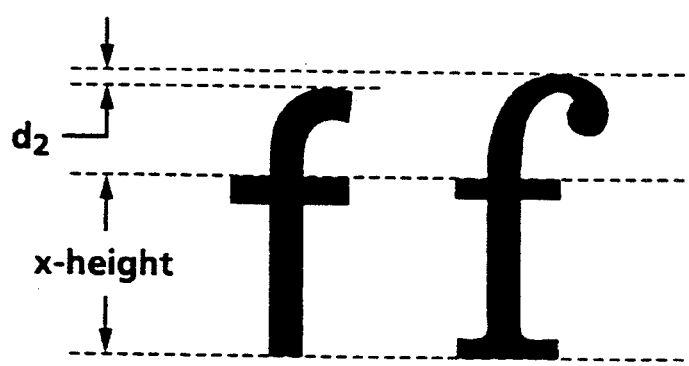
Figure 23C:
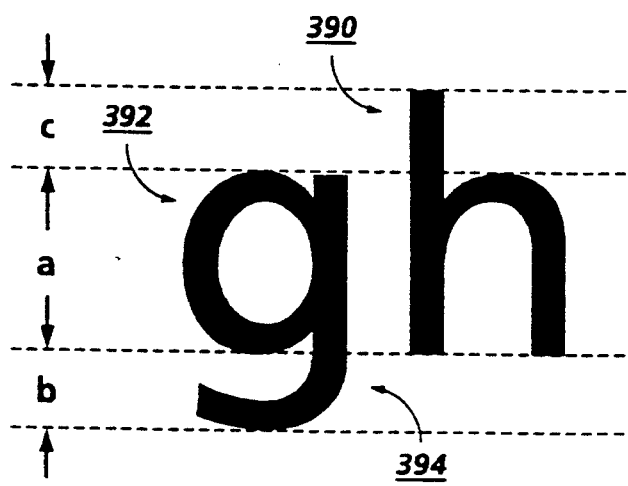

Referring next to FIGS. 23A–23C, which illustrate details of the ascender/descender normalization operation, each of the shape signals are normalized based upon a common relationship between the ascender and descender heights and the x-height of the text characters. As illustrated, the actual ascender heights of characters printed with supposedly similar font size, or what is now an appropriately scaled font size, may be slightly different. This occurs as a result of type faces or fonts which are small on body or large on body, implying that similar characters exhibit variations in height across fonts that are the same size, for example 24 point fonts. As an illustration, distance $d_1$ in FIG. 23A represents the difference in ascender height for two occurrences of the letter "h.⇌ Likewise, distance $d_2$ illustrates a similar difference between the heights of the letter "f⇌ in FIG. 23B. As illustrated in FIG. 23C, the typical character may be broken into three sections, ascender portion 390, x-height portion 392, and descender portion 394. In addition, the relative heights of these sections are illustrated as c, a, and b, respectively. Again, the normalization operation applied to the shape contours is found in the fontNorm.c module, beginning at page 183 of the Appendix. Applying the operations described with respect to StoreOutlinePair() function, page 255 of the Appendix, the areas of the contour lying above the x-height are scaled as follows:

$$f(t) = \frac{1.5}{a + c} \cdot f(t)$$

Similarly, the descenders are scaled by the following equation:

$$f(t) = \frac{1.5}{a + b} \cdot f(t)$$

where, in both cases, the value used in the numerator (1.5) is arrived at based upon observation of the relationship between ascender or descender heights and the x-height. Also included within the StoreOutlinePair() function is an operation to remove the portions of the contours which do not represent portions of the text string. These regions lie at the ends of the bounding boxes illustrated in FIG. 16. For example, the box surrounding the word "practitioner⇌" in FIG. 16 can be seen to extend beyond the actual word image. As further illustrated at the ends of the word "from⇌" in FIGS. 20A–20D, the contour does not contain useful information. By removing these regions from the contour shape, less error will be introduced into the comparison operations.

Subsequent to the normalization operation, standard signal processing steps can be used to determine the similarity or dissimilarity of the two signals being compared. Alternatively, the following equation may be used:

$$\Delta_{string} = \sqrt{\int_0^1 (f(x) - g'(x))^2 dx}$$

where $\Delta_{string}$ is the difference value between the two signals;
$f(x)$ is the known signal; and
$g'(x)$ is the unknown signal.

In a simple determination, the difference could be examined and if it is close to zero, such would be indicated that there would be almost no difference between the two signals. However, the greater the amount of difference, the more likely that the word was not the same as the word to which it was being compared.

It is important to note that the embodiments described herein, as supported by the code listings of the Appendix, compare the word shape contours using the upper and lower contours for each word in conjunction with one another. This is an implementation specific decision, and is not intended to limit the invention to comparisons using only the top and bottom contours in conjunction with one another. In fact, sufficient information may be contained within the upper contours alone so as to significantly reduce the requirements for a comparison of the lower contours, thereby saving considerable processing effort.

Figure 24:
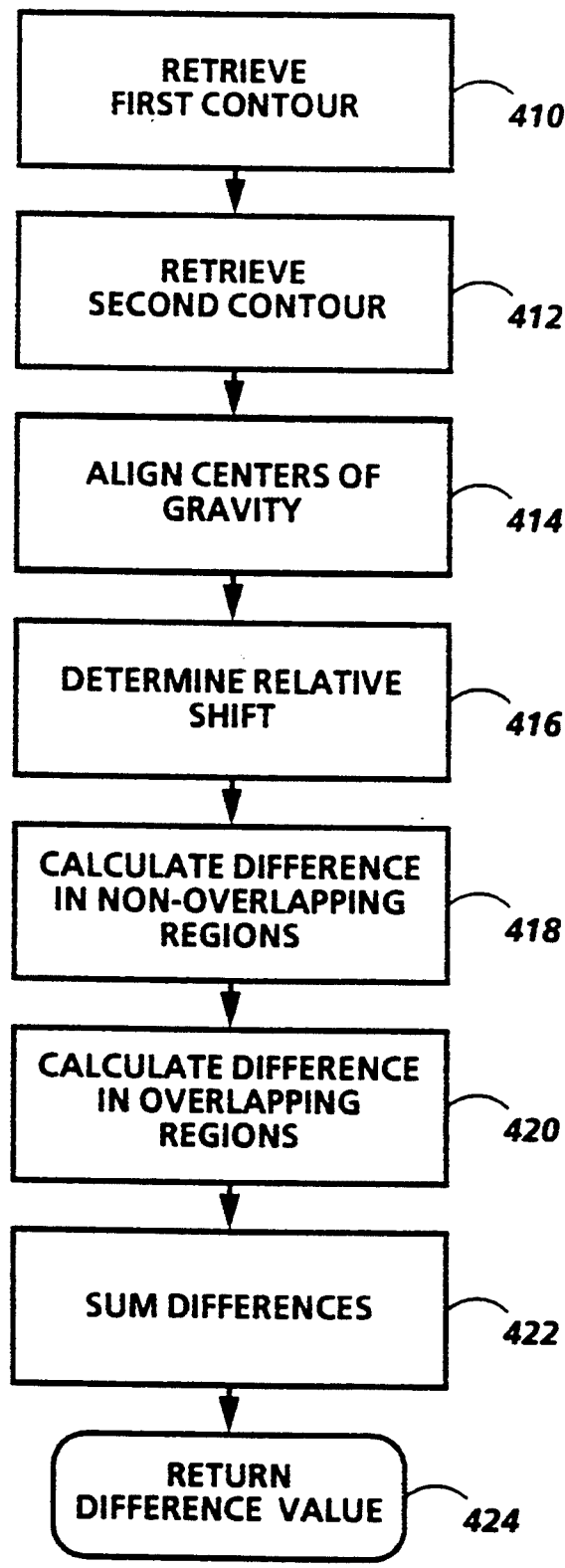
FIG. 24 is a flowchart detailing the steps used for one method of determining the relative difference between word shape contours.

The steps of this simplified comparison method, as first contemplated, are illustrated in FIG. 24. Beginning at step 410, the contour for the first word shape is retrieved from memory, and subsequently, the second word shape is retrieved by step 412. Next, the centers of gravity of the word shapes, defined by the upper and lower contours, are determined and aligned, step 414. The purpose of this step is to align the centers of the word contours to reduce the contour differences that would be attributable solely to any relative shift between the two sets of contours being compared. The center of gravity is determined by summing the areas under the curves (mass) and the distances between the contours (moments) which are then divided to give an indication of the center of gravity for the upper and lower contour pair. Once determined for both sets of contour pairs, the relative shift between the pairs is determined, step 416, and the contours are shifted prior to calculating the difference between the contours. The shifting of the contours is necessary to reduce any error associated with the establishment of the word shape boundaries and computation of the word shapes at block 24 of FIG. 3B. Step 418 handles those regions lying outside the overlapping range of the shifted contour pairs, determining the difference against a zero amplitude signal in the non-overlapping regions. This is done by summing the squared values of the upper and lower contours at the non-overlapping ends of the contours. Subsequently, the overlapping region of the contours are compared, step 420. The difference in this region is determined as the sum of the squared differences between the upper curves and the lower curves, as shown in the function L2Norm() on page 100 of the Appendix. Next, the values returned from steps 418 and 420 are added to determine a sum of the differences over the complete range defined by the shifted contours. This value may then be used as a relative indication of the similarity between the contour pairs for the two word shapes being compared.

An alternative to the center-of-gravity comparison method, uses a signal processing function known as time warping, as described in the article "Performance Tradeoffs in Dynamic Time Warping Algorithms for Isolated Word Recognition⇌, by Myers, Rabiner, and Rosenberg, IEEE Transactions on Acoustics, Speech, and Signal Processing, Vol. ASSP-28, No. 6, December 1980, and the book, "Time Warps, String Edits, and Macromolecules: The Theory and Practice of Sequence Comparison⇌, by Sankoff and Kruskal, Addison-Wesley Publishing Company, Inc., Reading, Mass., 1983, Chapters 1 and 4, and may be used to provide for compression and expansion of points along the contours until the best match is made. Then a score is derived based on the amount of difference between the contours being compared and the stretching required to make the contours match. Once again, the score provides a relative indication of the match between the two signals being compared.

Figure 25:
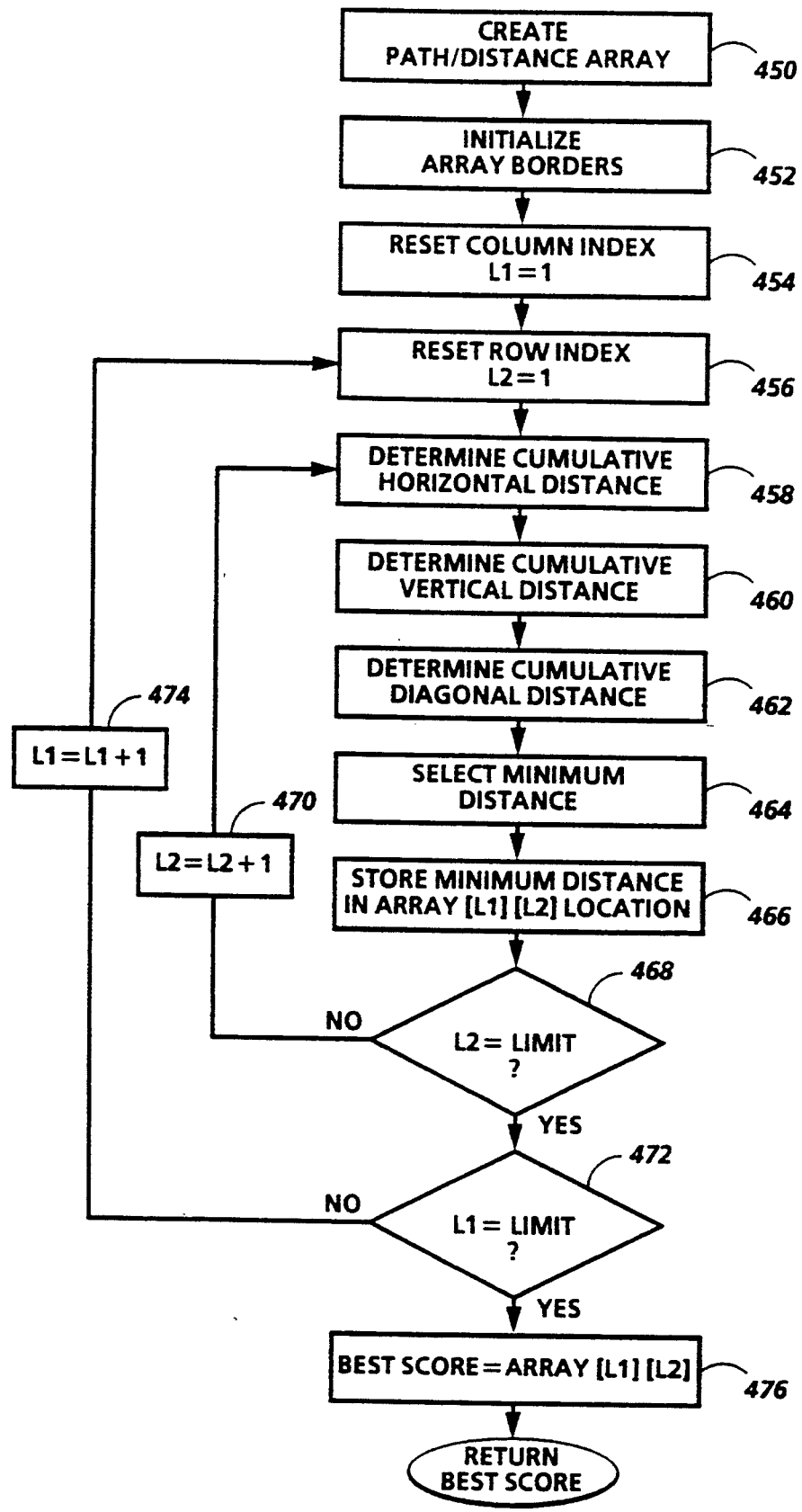
FIG. 25 is a flowchart detailing the steps of a second method for determining the relative difference between word shape contours.

Referring now to FIG. 25, which depicts the general steps of the dynamic warping method, the method relies on the use of a difference array or matrix to record the distances between each point of the first contour and points of the contour to which it is being compared. As illustrated in the figure, and detailed in the code listings contained in the Appendix, the process is similar for all of the measures which may be applied in the comparison.

First, the organization of the code is such that a data structure is used to dynamically control the operation of the various comparison functions. The structure Diff-Descriptor, the declaration for which is found on page 9 of the Appendix (see diff.h), contains variables which define the measure to be applied to the contours, as well as, other factors that will be used to control the comparison. These factors include: normalization of the contour lengths before comparison; separate comparisons for the upper and lower contours; a centerWeight factor to direct the warping path; a bandwidth to constrain the warp path; a topToBottom ratio which enables the top contour comparison to be weighted more or less with respect to the bottom contour comparison; and a hillToValley ratio to selectively control weighing the contour differences when an unknown contour is being compared to a known or model word shape contour. Interpretation of the various factors is actually completed in the diff2.c module at page 56 of the Appendix, although descMain.c at page 49 provides an illustration of the interpretation of the factors.

In general, each measure implements a comparison technique, however, each is optimized for a specific type of dynamic comparison, for example, a slope limited dynamic warp having a non-unitary centerweight and a topToBottom weight greater than one. The first level of selection enables the use of a slope-constrained warping function for comparison, an unconstrained warp, or a simple, non-warped, comparison. Within both of the warp comparison methods, there are both separate comparison functions, where the top and bottom contours are warped independently, and parallel comparison functions, where the warp is applied to both the top and bottom contours simultaneously. Specific details of the comparison functions are generally contained within the newMatch.c file beginning at page 101 of the Appendix.

In the general embodiment, the dynamic warping process starts by allocating space for the path/distance array, step 450, which will hold the distance values generated during the comparison and warping of one word shape contour with respect to another. After allocating space, the border regions of the array must be initialized as the process used by all the warping measures is an iterative process using data previously stored in the array for the determination of the cumulative difference between the contours. At step 452, the array borders are initialized. Initialization of the first row of the array entails the determination of the square of the difference between a first point on the first contour and each point on the second contour. Subsequent to border initialization, the column and row index values, L1 and L2, respectively, are reset to 1 to begin processing the individual, non-border, points along the contours.

Figure 26A:
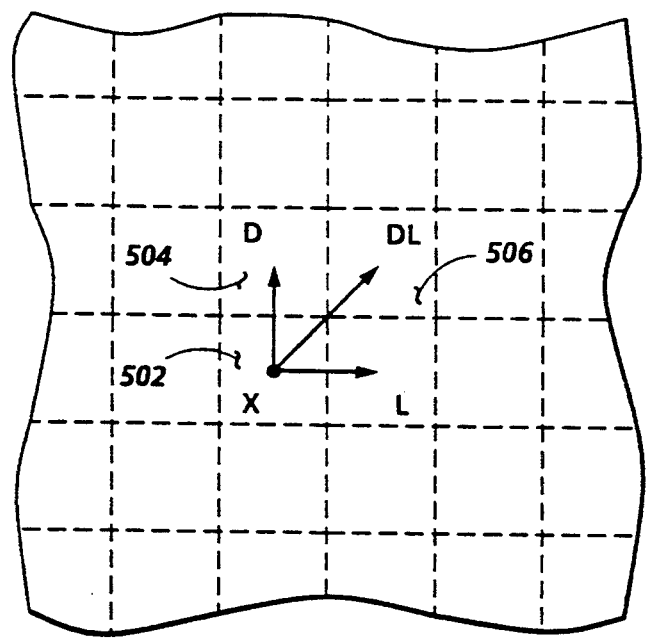
FIGS. 26A and 26B are respective illustrations of the relationship between the relative difference values calculated and stored in an array, for both a non-slope-constrained and a slope-constrained comparison.

Processing of the contours proceeds at steps 458 through 464, where the difference in distance between each point along the second contour, with respect to a point on the first contour is calculated. Moreover, this difference, or distance, is calculated and then summed with a previously determined difference value. In addition, some of the previously determined difference values may be weighted differently, for example, in one embodiment weights of the difference values along the array diagonal may be modified by a centerWeight weighing factor. As an illustration, the operation of the NewMatch() function, beginning at line 106 on page 103, at first, the distance (rest) is calculated as the sum of the squares of the differences between a point on the first contour and a point on the second contour, over the upper and lower contours, where the top contour difference is weighted by the topToBottom variable. This distance (rest) is used in subsequent iterations to determine the horizontal, vertical and diagonal difference values in the loop beginning at line 137 on page 103. To determine each of these values, the current distance value, represented by rest, would be added to the previous values in the down, left, and down-left array positions, the down-left position value being the diagonal position which is weighted by the centerWeight factor as previously described. Referring to FIG. 26A, which illustrates the positional relationship between a previously determined value X, at array location 502, and subsequent array locations, the value X might be added to the difference values of subsequent locations to accumulate the total difference calculations is shown. When calculating the difference value for array location 504, the value in location 502 would be used as the down value. Similarly, when calculating the value in location 506, the value of location 502 would be used as the center-weighted down-left, or diagonal, value. After calculating the three difference values, steps 458, 460, and 462, the process continues by selecting the smallest of the three values, step 464, for insertion into the current array position, step 466. As illustrated in the Appendix at line 144 of page 103, the FMin() function from page 101 returns the minimum of the three values previously calculated, the value being inserted into the storage array pointed to by pointer dc.

Subsequently, the process illustrated in FIG. 25 continues by determining the differences between the point on the first contour, represented by L1, to points on the second contour, represented by L2. Decision step 468 controls the iterative processing of the points along the second contour by testing for the end of the contour, or swath. In the implementation shown in the Appendix, the index variables i and j are used in place of L1 and L2 to control the difference calculation loops. As indicated in the code for the NewMatch function beginning on page 102 of the Appendix, the swath is referred to as the bandwidth, and is determined by a desired bandwidth which is adjusted for the slope defined by the contour lengths (see page 102, lines 83-89). If no limit has been reached, processing for the next point would continue at step 458 after the value of L2 was incremented at step 470. Similarly, decision step 472 controls the processing of each point along the first contour, in conjunction with incrementing step 474. Once all the points have been processed with respect to one another, as evidenced by an affirmative response in step 472, the relative difference score, best score, is contained in the farthest diagonal position of the array (L1, L2). Subsequently, the value determined at step 476 is returned as an indication of the dynamically warped difference between the contours being compared.

The code implementation found in the NewMatch() function on page 103 of the Appendix has optimized the execution of the aforedescribed warping process by reducing the large two-dimensional array to a pair of linear arrays which are updated as necessary. Due to this modification, the minimum difference, or best score, for the warp comparison value is found in the last location of the one-dimensional array. Furthermore, the final difference value, dc, may be subsequently normalized to account for the length differences between the two sets of contours being compared. Finally, such a value might subsequently be compared against a threshold or a set of similarly obtained difference values to determine whether the contours are close enough to declare a match between the words, or to determine the best match from a series of word shape comparisons.

> In yet another embodiment, the dynamic time warping process previously described may be altered to compare the difference values contained in the difference array to a threshold value on a periodic basis. Upon comparison, the process may be discontinued when it is determined that sufficient difference exists to determine that the contours being compared do not match one another, possibly saving valuable processing time. Moreover, the sequential operation of word shape comparator 26 might be done in conjunction with sequential output from word shape computer 24, thereby enabling the parallel processing of a textual image when searching for a keyword.

Having described a basic implementation of the dynamic warping comparison measures, the distinctions of the other dynamic warp comparison methods included in the Appendix and the application of the control factors previously mentioned will be briefly described to illustrate the numerous possible embodiments of the present invention. First, the method previously described may also be implemented with the slope of the warp path being constrained as it moves across the array. Details of the implementation are found in the SlopeCMatch() function beginning on page 111 of the Appendix. This measure is further illustrated graphically in FIG. 26B, where the value of array location 512, X, may be added to only the three subsequent array locations shown. For example, X may be added to array location 514, when considered as the d2L1 value for location 514. The nomenclature used for the variable names, and followed in the figure, is as follows: d2L1 refers to the array location which is down 2 rows and left one column, d1L1, refers to the lower left diagonal array location, and d1L2 refers to the array location that is down one column on left 2 rows from the current array location. In a similar manner, X may be added as the d1L2 value for the calculation of the cumulative difference value for array location 516.

Figure 26B:
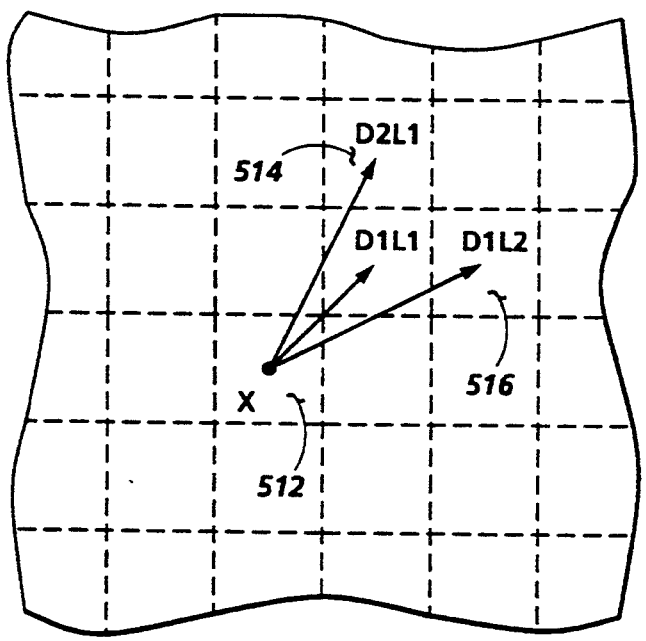

As is apparent from a comparison of FIGS. 26A and 26B, the slope constrained warping measure limits the warping path which can be followed during the generation of the cumulative difference value. The reason for implementing such a constraint is to prevent the warping process from removing, or compressing, a large area of one of the two contours being compared, without imposing a significant "cost⇌" to such a compression.

Next, the method previously described with respect to the parallel warping process may also be implemented on only one pair of contours at a time, for example, the upper contours of two word shapes. The functions SepMatch() and SepCMatch(), as found in the Appendix on pages 104 and 113, respectively, implement the separate matching measure in both the non-slope-constrained and slope-constrained fashions previously described. In general, these measures separately calculate the difference between the top or bottom contours of a pair of wordshapes. The general implementation indicated for the measures in the code shows that these measures are typically used sequentially, first determining the warped difference for the top contours, and then adding to it the warped difference from the bottom contour comparison, resulting in a total difference for the wordshapes.

By carrying out the comparison methods described in a "piece-wise⇌" cascaded fashion, further processing benefits may also be derived. More specifically, cascaded comparison would entail, first, utilizing the upper contours of the words being compared to identify a word, or at least narrow the set of possible alternatives and, second, using the lower contour comparison to provide complete identification. It is believed that such an approach to word shape comparison operation 26 would considerably reduce processing time spent on identifying unknown word shapes by comparison to a dictionary of known word shapes, 28, as illustrated in FIG. 3B. Important to the cascaded comparison, is the constraint that the top and bottom warps applied to the contours must be relatively equivalent. This requirement arises from the fact that the upper and lower curves have a relationship to a common word, and if this relationship is not maintained during the warp analysis, the accuracy of the comparison will be compromised.

Alternatively, the dynamic warping technique may be applied as described, with the addition of a function suitable for accumulating the relative warp applied to the upper and lower curves in achieving the best match. For example, when a known, non-italicized word shape is compared to an unknown word shape, a shift in the warp applied to the upper curve relative to the lower curve could be indicative of an italicized word, however, the length of the warped region will remain the same for the top and bottom warps. Such a technique may prove useful in the identification of important words within a larger body of text, as these words are occasionally italicized for emphasis.

One of the control factors which has not been previously described is the bandwidth factor. As implemented, the bandwidth factor controls the relative width of the signal band in which the warping signal will be constrained. More specifically, the band width limitation is implemented by defining a region about the array diagonal in which the warp path which traverses the array is constrained. The constraint is implemented by assigning large values to those areas outside of the band width, so as to make it highly unlikely that the path would exceed the constraint.

Another factor which was briefly mentioned is the topToBottom factor. When applied, the value of this variable is used to weight the difference value determined for the top contour warping process. Therefore, use of a number greater than one, will cause the upper contour difference to be weighted more heavily than the lower contour difference. A very large number would effectively eliminate the lower contour difference completely and, likewise, a zero value would eliminate the upper contour difference completely. This factor is generally considered important to enable the upper contour to be weighted in proportion to its information content, as it generally carries more information regarding the word than does the lower contour.

The hillToValley ratio is a variable which is usually applied in situations when a known, or model, set of word shape contours is being compared against a set of word shape contours from an unknown image. In exercising this option, the model set of contours is passed as the comparison measure functions, for example, NewMatch() on page 102 of the Appendix. When determining the difference between points on the contours, the comparison functions commonly call the function SquareDifference() on page 101 of the Appendix to determine the sum of the squared difference. SquareDifference() applies the hillToValley ratio to the squared difference whenever it determines that the value of the model contour is less than the contour being compared. The result of applying a hillToValley value greater than one is that the relative "cost⇌" of the difference when the model contour is less than the target contour is smaller than the same difference when the model contour is greater than the target contour. The basis for this type of weighing is that when comparing against a model contour, the comparison should treat those areas of the target contour that are subject to being "filled in⇌" during a scanning or similar digitizing operation with less weight than regions not likely to be filled in, as evidenced by contour positions below the model contour. For instance, the regions where ascenders and descenders meet the body of the character are likely to be filled in during scanning, thereby causing the target contour to have a gradual contour in those regions, whereas the model contour would most likely have a defined peak or valley in these regions. Hence, the contour value of the model would be less than the contour value of the target, even though the characters may have been identical. Therefore, the hillToValley variable attempts to minimize the impact to the calculated difference value over these regions.

It is important to note that the aforedescribed measures and control factors allow the comparison measures to be conducted in numerous permutations. However, the flexibility which these measures permit is intended to enhance the applicability of the comparison process, so that when information is known about a particular word shape contour, for example, a model contour generated from a computer generated character font, the measures may place reliance on that information to make the comparisons more robust.

The mathematical explanation of the word shape derivation process suggests that alternative methods of deriving the word shape signal exist. Some possible alternatives are the establishment of the one dimensional signal using an alternative coordinate scheme, for example polar coordinates. Another possibility is generation of signal g(t), where g(t) represents the direction from each contour point to the succeeding contour point, where t would represent the point number.

The image unit classification can also be achieved by comparing the image characteristics of the selected images with image characteristics corresponding to one or more selection criteria which can be predetermined or user selected. Depending on the particular application, the purpose(s) for which image units are being selected, and the relative importance of processing speed versus accuracy, for example, image unit classification schemes of different degrees of sophistication and complexity can be used. For example, useful image unit classifiers can include length, width, or other dimension of the image unit (e.g., medium frequency word image units or the largest figure); location or region of the document (including any selected figure or paragraph of a document image, e.g., headings, initial figures, one or more paragraphs or figures), font; typeface; cross-section (a cross-section being a sequence of pixels of similar state in an image unit); the number of ascenders; the number of descenders; the average pixel density; the length of the top line contour, including peaks and troughs; the length of the base contour, including peaks and troughs; and combinations of such classifiers. The various classifiers can also be given different weights for purposes of selecting image units for further processing.

One simple technique for efficiently combining classifiers to consolidate the information yielded by evaluating the image units according to individual classifiers is filtering through list intersection. For example, to identify key phrases, multiple lists of image units having separate image characteristics are created and intersected on the basis of the locations of the image units in the respective lists. As an example, an italicregion list formed of all image units, with their locations, that are located in a region (e.g., sentence or a graphical line) containing italics is intersected on the basis of page locations with a word-frequency list formed of all image units and their locations which occur with a frequency falling in a medium frequency range, thereby creating an emphasized-word list. A phrase-frequency list listing phrases occurring with a frequency falling within a predetermined range with their respective page locations is then intersected with the emphasized-word list to produce the set of phrases to be output as the key or most significant phrases. It will be appreciated that this list intersection technique can be extended to larger regions of the document image, such as, for example, paragraphs.

Image markings associated with an image unit, such as underlining, encircling or other form of notation, which highlight particular image units are another useful type of image unit classifier. A preferred morphological method for identifying handwritten graphical markings such as underlining and encircling is disclosed in copending U.S. application Ser. No. 07/794,275, filed concurrently herewith, by Bloomberg, and entitled "A Method and Apparatus for Image Hand Markup Detection", now U.S. Pat. No. 5,201,011.

In instances in which multiple page documents are processed, each page is processed and the data held in the memory 15 (see FIG. 2), as described above. The entirety of the data can then be processed.

Once the selected image units have been classified, further document processing (step 50) can be performed based on the classified image units. The technique described above can be used in many diverse applications. One application, for example, is to identify the most semantically significant portions of a document, based upon region criteria, the size of graphical image units such as figures, the frequency of occurrence of image units having a length falling within a selected range, and/or the frequency of occurrence of combinations of image units. Thus, for example, the number of times an image unit appears in its respective equivalence class can be used to construct a hierarchy of words and/or phrases, such hierarchy being useful for many functions. U.S. patent application Ser. No. 07/795,173, filed concurrently herewith by Cass et al., and entitled "Method and Apparatus for Determining the Frequency of Words in a Document Without Document Image Decoding," and U.S. patent application Ser. No. 07/794,555, filed concurrently by Withgott et al., and entitled "Method and Apparatus for Determining the Frequency of Phrases in a Document Without Document Image Decoding," describe preferred methods for determining word and phrase frequency within a document.

Other applications of the invention include modification of the document image to emphasize image units selected as being significant, as described in U.S. patent application Ser. No. 07/795,174, filed concurrently herewith by Huttenlocher et al., and entitled "Method and Apparatus for Automatic Modification of Selected Semantically Significant Image Segments Within a Document Without Document Image Decoding"; the creation of document extracts or summaries indicative of the subject matter contained within a document, as described in U.S. patent application Ser. No. 07/794,543, concurrently herewith by Withgott et al., and entitled "Method and Apparatus for Summarizing a Document Without Document Image Decoding" and annotating or supplementing a document with additional information relating to the document or selected image units thereof, such as, for example, incorporating translations of selected significant words or cross-references to other documents containing related information, as described in U.S. patent application Ser. No. 07/795,419, filed concurrently herewith by Withgott et al., and entitled "Method and Apparatus for Supplementing Significant Segments of a Document With Retrieved Information Without Document Image Decoding."

Moreover, if desired, the technique described above can be used in word recognition applications by comparing the segmented image unit classifiers determined above with a predefined set of image units, and selecting the image units with closest matching classifiers. It is noted, however, that the classifiers are determined without actually decoding the content of the image unit; only the selected classifiers of the image unit itself are used.

A salient feature provided by the technique of the invention is the processing, identification, comparison, or manipulation of image units without an accompanying requirement that the content of the image units be decoded, even for output. More particularly, image units are determined, processed and delivered for output without decoding, so that in essence, the actual content of the image units is never required to be determined. Thus, for example, in such applications as copier machines or electronic printers that can print or reproduce images directly from one document to another without regard to ASCII or other encoding/decoding requirements, image units can be identified, and processed using one or more morphological characteristic or property of the image unit. The processing may involve, for instance, comparison with other image units of unknown content, counting, producing a number corresponding to a number of matches with another unknown image unit, or other similar procedure. The image unit of unknown content can then be optically or electronically delivered for output, for example, to an image reproducing apparatus of a copier machine, an electronic memory, a visual display, or the like.

One of the advantages that results from the ability to perform such image unit processing without having to decode the image unit contents at any stage of the process is that the overall speed of image handling and manipulation can be significantly increased. In addition, document processing techniques that have been heretofore impractical to rapidly accomplish, such as automatically creating document summaries, generating significant word lists, automatically creating document annotations or enhancements, and so on, are enabled.

The present invention recognizes that image and character code files exhibit important differences in processing techniques. The method and apparatus of the invention exploits the visual properties of paper documents, for example, taking advantage of font and type face information, formatting and the presence and frequency of linguistic terms. This information can be used, for example, to draw a user's attention to a specific phrase or region in a text. The present invention includes methods that can operate even upon degraded or distorted documents, within reasonable limits.

For example, it has long been recognized that the location of a word unit in a text is significant for its role in classification. Typically, the most successfully employed characterization of location information has been proximity information, that is, information which distinguishes a word in text that occurs multiple times in close proximity. A viable alternative for location or region criteria is sensitivity to the notion of location of a word unit within a document which provides significant or additional weight to the document segment where the word unit is located. The significance of a particular word unit or document segment occurs in the context of graphical or textural emphasis as well as through frequency determinations. Thus, certain traditional information extraction techniques, as well as simple phrase spotting and relevance searches, can be augmented or replaced for either scanned images or images processed by optical character recognition. It will be appreciated moreover, that employing the above described techniques enables a significant characteristic or a region criteria to be automatically preprogrammed or interactively selected by a user. For example, the stored word units may be examined in a significant region of interest in the scanned document, which has been previously stored in memory or chosen interactively by the user. For example, a user could request display of all flowcharts in the document, or the user could request all documents with diagrams and annotations on a particular page.

It should be emphasized that the method described is not limited to a single document search, rather the method can also be applied to a portion of a document, or a corpus of documents. Also, once the selected document portions are located and retrieved, optical character recognition can be performed for visual document inspection. One of the primary aims of the present invention is to provide for the initial search and location of significant portions of a scanned document in a significant portion or region of the document. Thus, morphological image processing techniques are used for speedy computations without first converting the source document to character codes.

In addition, the invention enables the recognition of a small part of an image segment by discriminating segments of the image, then performing recognition techniques on the discriminated segments. The discriminated segments may include a relatively small part of the recognizable content of the image, and may include any non-content based segment, not merely an ASCII character. In addition, the recognition of an image segment can be accomplished without first converting the image to character code representations. Specifically, the image segment can be recognized by scanning the image and segmenting the image into segments. Then the segments are discriminated and recognized.

The image can be segmented, for example, into word units, glyphs or morphemes and the discrimination can be performed on any small part of the image or any section thereof, to recognize, for example, a contour, side, height, or the like. The criteria for discrimination may include for example, frequently occurring graphic symbols or words. The recognition step of the process can include, for example, optical character recognition or word shape recognition.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

APPENDIX
Section A

Jul 26 19:28 1991 args.h

```
1      /* Support for command line argument scanning.
2       *
3       * When a program is run from the shell, its name is followed by a number of
4       * required command line ARGUMENTS and then some optional command line OPTIONS.
5       * Each argument consists of a list of required PARAMETERS, each of which can
6       * be either an int, string, or float. Options are like arguments with the
7       * exception that their required parameters are predeced by a keyword denoting
8       * which option is being invoked.
9       *
10      * Required arguments are defined using the DefArg function. The format string
11      * consists of a list of data format specifiers (%d, %f, and %s for integer, float, and
12      * string, respectively) that specify the types of the parameters to the arguement.
13      * The documentation string should contain a one line description of the argument.
14      * It will be printed if the argument list cannot be scanned.
15      * The remaining arguments to DefArg are pointers to locations where the values of the
16      * command line arguments will be stored.
17      *
18      * Optional arguments are defined with the DefOption function. The format string
19      * is similar to the DefArg format string, but has a keyword before the format
20      * specifiers. The exists parameter is a pointer to BOOLEAN that is set to true
21      * iff an occurance of this option was successfully parsed from the command line.
22      * The remaining arguments are pointers to the locations where the values of the
23      * command line arguments will be stored.
24      *
25      * Short example:
26      * The following program expects one required command line argument that is a string
27      * and will be stored in s. In addition, it will accept three different optional
28      * keyword arguments. They are the keyword -int followed by an integer, with result
29      * stored in i; -float followed by a float stored in f; and -pair followed by a float
30      * and then an int, stored in f and i, respectively.
31      *
32      * Suppose the program is called foo. Here are some legal invocations:
33      * % foo hello
34      * % foo hello -int 1
35      * % foo hello -int 5 -float 10
36      * % foo hello -pair 1 2
37      *
38      * Here are some error invocations and responses
39      * % foo
40      * Usage:
41      *   scanArgs
42      *     filename
43      *     [-int <int>]
44      *     [-float <float>]
45      *     [-pair <float> <int>]
46      * % foo hello -int
47      * Option -int expects 1 parameters:
48      * -int <int>
49      *
50      *
51      *void main (int argc,char **argv)
```

```
52      *{
53      * int i;
54      * float f;
55      * char *s;
56      * BOOLEAN haveAString,haveAnInt,haveAFloat,haveAPair;
57      *
58      * DefArg("%s","filename",&s);
59      * DefOption("-int %d","-int <int>",&haveAnInt,&i);
60      * DefOption("-float %f","-float <float>",&haveAFloat,&f);
61      * DefOption("-pair %f %d","-pair <float> <int>",&haveAPair,&f,&i);
62      *
63      * ScanArgs(argc,argv);
64      *
65      * printf("%s\n",s);
66      * if (haveAPair)
67      *   printf("%f %d\n",f,i);
68      * if (haveAnInt)
69      *   printf("%d\n",i);
70      * if (haveAFloat)
71      *   printf("%f\n",f);
72      * if (haveAString)
73      *   printf("%s\n",s);
74      *}
75      *
76      */
77
78      /* Possible additions:
79      *  1) Passing NULL pointers as exists variables.
80      *  2) Predicate calculus for error checking.
81      *  3) Only need one DefArg call.
82      *  4) Combine with error.c to save program name info.
83      */
84      void DefArg(char *format,char *documentation,...);
85      void DefOption(char *format,char *documentation,BOOLEAN *exists,...);
86      void ScanArgs(int argc,char **argv);
87
88
```

Jan 11 17:00 1991 baselines.h

```
1       List BaseLines(Picture pict,double angle,char *plotFile);
2       #ifdef foo
3       int *count,
4                int **returnCoordx, int **returnCoordy);
5       #endif
6       void DrawBaseLines(Picture pict, List pointList, double angle);
```

Aug 23 13:03 1991 blobify.h

```
1       Picture Blobify(Picture old,int half_mask_size,double threshold);
2       Picture NewBlobify(Picture old,int halfMaskWidth,double threshold,double angle);
```

Aug 1 02:59 1991 boolean.h

```
1       typedef int BOOLEAN;
2       #define FALSE 0
3       #define TRUE (!FALSE)
```

Jan 11 17:00 1991 boxes.h

```
1       List FindBorders(Picture pict,double theta);
2       void DrawBox(Picture pict,Box box);
3       void DrawColorBox(Picture pict,Box box,int color);
```

Jul 26 13:42 1991 descriptors.h

```
1       typedef unsigned char *Descriptor,DescriptorElement;
2
3       void PrintField(char *s,int w);
4       void PrintDescriptor(Descriptor d,int *starCount,int *correctCount);
5       void PrintWords(char **words,int numberOfWords);
6       Descriptor ComputeDescriptor(int modelIndex,Dictionary models,
7                       Dictionary thisFont,int numberOfWords,
8                       DiffDescriptor dd);
9
10      #define MAX_FONTS (20)
11      #define MAX_WORDS (100)
12
13
```

Jan 16 12:55 1991 dict.h

```
1       /* Dictionary file have the following format:
2        * int magic number  = 1234567
3        * int numberOfEntries
4        * int infoStringLength  (includes the \0 at the end)
5        * char infoString[infoStringLength]
6        * OutlinePairBody[numberOfEntries]
7        */
8
9       typedef struct {
10        Box box;
11        float blackoutHeight;
12        int numberOfLegs;
13        int offset;
14        int width;
15        float *x;
16        float *top;
17        float *bottom;
18      } *OutlinePair,OutlinePairBody;
19
20      typedef struct {
21        Box box;
22        int numberOfLegs;
23        int *x;
24        int *top;
25        int *bottom;
26      } *RawOutlinePair,RawOutlinePairBody;
27
28      typedef struct {
29        int numberOfEntries;
30        char *infoString;
```

```
31        RawOutlinePair *rawOutlines;
32        OutlinePair *outlines;
33      } *Dictionary,DictionaryBody;
34
35      void WriteDictionary(Dictionary dict, char *filename);
36      Dictionary ReadDictionary(char *filename);
37      Dictionary NewDict(int numberOfEntries);
38      char *ArgListToString(int argc, char **argv);
```

Jul 30 23:04 1991 diff.h

```
1       typedef enum {L2,CONSTRAINED,WARP} DiffType;
2
3       typedef struct {
4         DiffType diffType;
5         BOOLEAN lengthNormalize;
6         BOOLEAN separate;
7         float centerWeight;
8         int bandWidth;
9         float topToBottom;
10        float hillToValley;
11        FILE *pathFP;
12      } *DiffDescriptor,DiffDescriptorBody;
13
14      Picture CompareDictionaries(Dictionary dict1, Dictionary dict2,DiffDescriptor dd);
15      void WritePictureAsAscii(Picture pict, char *filename,
16                       char *info1, char *info2);
17      float DiffPair(OutlinePair one, OutlinePair two,DiffDescriptor dd);
18      #ifdef foo
19      float DiffPairAndPath(OutlinePair one, OutlinePair two,DiffDescriptor dd);
20      #endif
21
22
23
```

Jan 15 18:56 1991 diff2.h

```
1       #ifdef OWNER
2       #define EXTERN
3       #else
4       #define EXTERN extern
5       #endif OWNER
6
7       EXTERN int FileCountX;
8       EXTERN int FileCountY;
9
10      float DiffPair(OutlinePair one, OutlinePair two, char *matchtype,
11               char *pathFile);
12
```

Jul 26 19:29 1991 error.h

```
1       /* Possible additions:
2        * 1) Variable numbers of parameters to DoError().
3        * 2) Error recovery language.
4        */
5       void DoError(char *string1,char *string2);
```

Aug 15 06:37 1991  fontNorm.h

```
1      void StoreRawOutlinePair(Dictionary dict, int dictEntry,
2                      Box box,int *bothX,int *topY, int *baseY,
3                      int numberOfLegs);
4
5      #define HIT_THE_BOX (10000)
6
```

Jan 11 17:00 1991  lines.h

```
1      typedef BOOLEAN pistFunc(Picture pict, int x, int y, BOOLEAN test,
2                      UCHAR color);
3
4      pistFunc DrawPiston, CountPiston, DistancePiston, BaseLinePiston;
5
6      void LineEngine(Picture pict, int x1, int y1, int x2, int y2, UCHAR color,
7                      pistFunc PerPixel);
8      void DrawLine(Picture pict, int x1, int y1, int x2, int y2, UCHAR color);
9      float CountLine(Picture pict, int x1, int y1, int x2, int y2);
10     int DistanceLine(Picture pict, int x1, int y1, int x2, int y2);
```

Jan 11 17:00 1991  lists.h

```
1      typedef struct {
2        void *car;
3        void *cdr;
4      } cellBody,*cell;
5
6      typedef cell List;
7      typedef void *mapFun(void *);
8      typedef void collectFun(void *);
9
10     List cdr(List);
11     void *car(List);
12     void *popIntern(List *);
13     BOOLEAN endp(List);
14     List cons(void *,List);
15     void map(List,mapFun);
16     List collect(List,collectFun);
17     int ListLength(List l);
18
19     #define push(a,l) ((l) = cons((a),(l)))
20     #define pop(l) (popIntern(&(l)))
21     #define nil ((List)NULL)
```

Jan 15 18:39 1991  match.h

```
1      #ifdef OWNER
2      #define EXTERN
3      #else
4      #define EXTERN extern
5      #endif OWNER
6
```

```
7      EXTERN int debug;
8
9      typedef struct {
10       float cost;
11       int xptr;
12       int yptr;
13     } elt;
14
15     #define MAXSEQLENGTH 800
16
17     float DPDiffPair(OutlinePair one, OutlinePair two);
18     float matchvecs(float *Vec1, int lenVec1, float *Vec2, int lenVec2);
19     float sq_distance(float x1, float x2);
20     float best_score (elt *array[][MAXSEQLENGTH], int lenVec1, int lenVec2);
21     void print_best_path(elt *array[][MAXSEQLENGTH], int lenVec1, int lenVec2,
22                 char *pathFile);
23     void print_array_costs(elt *array[][MAXSEQLENGTH], int lenVec1, int lenVec2);
24     void print_array_dirs(elt *array[][MAXSEQLENGTH], int lenVec1, int lenVec2);
25
26     /*
27     #ifndef debug
28     #define debug FALSE
29     #endif
30     */
31     #ifndef horweight
32     #define horweight 1.5
33     #endif
34
35     #ifndef verweight
36     #define verweight 1.5
37     #endif
38
39     #ifndef diagweight
40     #define diagweight 1.0
41     #endif
```

Jan 15 18:47 1991 matchparallel.h

```
1      float pl_DPDiffPair(OutlinePair one, OutlinePair two, char *pathFile);
2      float pl_matchvecs(float *Vec1t, float *Vec1b, int lenVec1, float *Vec2t, float *Vec2b, int lenVec2, char *pathFile);
3
4      float faster_pl_DPDiffPair(OutlinePair one, OutlinePair two, char *pathFile);
5      float faster_pl_matchvecs(float *Vec1t, float *Vec1b, int lenVec1, float *Vec2t, float *Vec2b, int lenVec2, char *pathFile);
6
7      float simple_pl_DPDiffPair(OutlinePair one, OutlinePair two);
8      float simple_pl_matchvecs(float *Vec1t, float *Vec1b, int lenVec1, float *Vec2t, float *Vec2b, int lenVec2);
```

Jul 9 16:01 1991 misc.h

```
1      /*
2       *
3       * misc.h - miscellaneous types and declarations
4       *
```

```
5      */
6
7      /* Some library routines that never seem to get declared */
8
9      /* Memory allocation functions */
10     extern void *malloc(unsigned size);
11     extern void *calloc(unsigned nelem, unsigned elsize);
12     extern void *realloc(void *p, unsigned size);
13     extern void free(void *p);
14
15     /* I don't feel like including setjmp.h */
16     /*
17     extern int _setjmp(jmp_buf env);
18     extern volatile void _longjmp(jmp_buf env, int val);
19     */
20
21     /* String-to-X functions */
22     extern int atoi(char *s);
23     extern double atof(char *s);
24
25     /* String functions */
26     extern int strcmp(char *s1, char *s2);
27     extern int strncmp(char *s1, char *s2, int n);
28     extern char *strcpy(char *d, char *s);
29     extern char *strncpy(char *d, char *s, int n);
30     int strlen(char *s);
31     extern char *strdup(char *);
32     extern char *strchr(char *s,char c);
33
34     /* stdio functions */
35     extern int fclose(FILE *stream);
36     extern int fread(char *ptr, int size, int nitems, FILE *stream);
37     extern int fwrite(char *ptr, int size, int nitems, FILE *stream);
38     /* these are necessary to avoid implicit declarations */
39     extern int _flsbuf();
40     extern int _filbuf();
41
42     /* Formatted I/O functions */
43     extern int printf(char *format, ...);
44     extern int scanf(char *format, ...);
45     extern int fprintf(FILE *stream, char *format, ...);
46     extern int fscanf(FILE *stream, char *format, ...);
47
48     /* and misc stuff */
49     extern volatile void exit(int val);
50
51     extern void perror(char *s);
52
```

Aug 1 02:59 1991 mylib.h

```
1      #include "error.h"
2      #include "boolean.h"
3      #include "lists.h"
4      #include "args.h"
5      #include "pict.h"
6      #include "read.h"
```

Aug 15 06:36 1991 newContour.h

```
1      void BoxToShell(Picture pict,Box box,List baseLinePoints,
2                Dictionary dict,int dictEntry,NormalizationDescriptor *nd);
3      void BarBoxList(Picture pict,List boxList,List baseLinePoints,
4                char *filename, char *infoString, NormalizationDescriptor *nd);
5
6
7
```

Jul 31 17:11 1991 newMatch.h

```
1      extern float hillToValley;
2      extern float L2Compare(OutlinePair o1,OutlinePair o2,float topToBottom);
3      extern float NewMatch(float *a1,float *a2,int aLength,float *b1,float *b2,int bLength,
4         float centerWeight,BOOLEAN lengthNormalize,int normalBandWidth,
5         float topToBottom);
6      extern float SepMatch(float *a1,int aLength,float *b1,int bLength,
7         float centerWeight,BOOLEAN lengthNormalize,int normalBandWidth);
8      extern float NewMatchAndPath(float *a1,float *a2,int aLength,float *b1,float *b2,
9         int bLength,float centerWeight,BOOLEAN lengthNormalize,int normalBandWidth,
10        float topToBottom,FILE *fp);
11     extern float SlopeCMatch(float *a1,float *a2,int aLength,float *b1,float *b2,int bLength,
12        float centerWeight,BOOLEAN lengthNormalize,float topToBottom);
13     extern float SepSlopeCMatch(float *a1,int aLength,float *b1,int bLength,
14        float centerWeight,BOOLEAN lengthNormalize);
15     extern float SlopeCMatchAndPath(float *a1,float *a2,int aLength,float *b1,float *b2,
16        int bLength,float centerWeight,BOOLEAN lengthNormalize,float topToBottom,
17        FILE *pathFP);
```

Jan 11 17:00 1991 numbers.h

```
1      void DrawNumber(Picture pict, int x, int y, int color, float scale, int n);
2
```

Jan 14 16:52 1991 orient.h

```
1      BOOLEAN Coarse(Picture pict, int coarseSamples, int coarseDirections,
2             float *orientation, char *plotFile);
3
4      float Fine(Picture pict,int fineSamples, int fineDirections,
5             int coarseDirections, float coarseAngle, char *plotFile);
6
7      float NewFine(Picture pict,int fineSamples, int fineDirections,
8             float angleStart,float angleEnd, char *plotFile);
```

Aug 23 19:19 1991 pict.h

```
1      typedef unsigned char UCHAR;
2
3      #define ROUND8(x) ((x%8)?(x+8-x%8):x)
4      #define ROUND16(x) ((x%16)?(x+16-x%16):x)
```

```
5       #define ROUND2(x) ((x%2)?(x+1):x)
6
7       typedef int Color;
8       #define COLOR_RED 0
9       #define COLOR_GREEN 1
10      #define COLOR_BLUE 2
11
12      typedef struct cmapstruct {
13        int numberOfEntries;
14        UCHAR *red;
15        UCHAR *green;
16        UCHAR *blue;
17      } ColorMapBody, *ColorMap;
18
19      typedef struct pstruct {
20        int width;
21        int height;
22        int depth;
23        int uchar_width;
24        ColorMap cmap;
25        UCHAR *data;
26      } PictureBody, *Picture;
27
28      void doerror(char *string1,char *string2);
29
30
31      ColorMap NewColorMap(int size);
32      void FreeColorMap(ColorMap cmap);
33      UCHAR ReadColorValue(ColorMap cmap, Color primary,int index);
34      UCHAR WriteColorValue(ColorMap cmap, int index, UCHAR red, UCHAR green,
35                  UCHAR blue);
36      Picture new_pict(int width,int height,int depth);
37      void free_pict(Picture pict);
38      Picture load_pict(char *filename);
39      Picture load_header(FILE *fp);
40      void write_pict(char *filename,Picture pict);
41      void write_header(FILE *fp, Picture pict);
42      /* int BytesPerScanline(Picture pict); */
43      #define BytesPerScanline(pict) (pict->uchar_width)
44
45      UCHAR ReadPixel(Picture pict,int x,int y);
46      void WritePixel(Picture pict,int x,int y,int color);
47      void WriteClippedPixel(Picture pict,int x,int y,int color);
48      void CopyPicture(Picture dest, Picture src);
49
```

Jul 26 13:09 1991  read.h

```
1       int ReadInt(FILE *fp);
2       int ReadFloat(FILE *fp);
3       char *ReadString(FILE *fp);
4
```

Aug 15 00:19 1991  types.h

```
1       typedef struct {
2         BOOLEAN noAscenderNormalize;
```

```
3      BOOLEAN noXHeightNormalize;
4    } NormalizationDescriptor;
5
6    typedef struct {
7      int x;
8      int y;
9      int width;
10     int height;
11     int pageX;
12     int pageY;
13     double angle;
14   } BoxBody, *Box;
15
16   typedef struct {
17     int x;
18     int y;
19   } PointBody,*Point;
20
21   Box MakeBox(int x,int y,int width,int height,double angle);
22   Point MakePoint(int x,int y);
```

Section B

Jul 26 13:25 1991 Makefile

```
1     CCFLAGS = -g -c -I/net/piglet/piglet-1c/hopcroft/new/include
2
3     INCLUDE = /net/piglet/piglet-1c/hopcroft/new/include/
4
5     ARGS = $(INCLUDE)args.h
6     BOOLEAN = $(INCLUDE)boolean.h
7     ERROR = $(INCLUDE)error.h
8     LISTS = $(INCLUDE)lists.h
9     MISC = $(INCLUDE)misc.h
10    PICT = $(INCLUDE)pict.h
11    READ = $(INCLUDE)read.h
12
13    OFUNS = args.o error.o pict.o lists.o read.o
14
15    mylib.a: $(OFUNS)
16          ld -r $(OFUNS) -o mylib.a
17
18    args.o:    args.c $(BOOLEAN) $(ERROR) $(MISC) $(ARGS)
19          gcc $(CCFLAGS) args.c
20
21    error.o:   error.c $(ERROR)
22          gcc $(CCFLAGS) error.c
23
24    pict.o:         pict.c $(BOOLEAN) $(ERROR) $(PICT)
25          gcc $(CCFLAGS) pict.c
26
27    lists.o:   lists.c $(BOOLEAN) $(LISTS)
28          gcc $(CCFLAGS) lists.c
29
```

```
30      read.o:             read.c $(MISC) $(READ)
31              gcc $(CCFLAGS) read.c
32
33
```

Jul 26 13:23 1991 args.c

```
1       #include <stdio.h>
2       #include <stdarg.h>
3       #include "error.h"
4       #include "boolean.h"
5       #include "misc.h"
6       #include "args.h"
7
8       #define MAX_NAME_LENGTH (50)
9       #define MAX_PARAMETERS (6)
10      #define MAX_OPTIONS (20)
11      #define MAX_ARGS (20)
12
13      typedef enum {INTEGER,FLOAT,STRING} ParamType;
14
15      typedef struct {
16        char *documentation;
17        int numberOfParameters;
18        ParamType types[MAX_PARAMETERS];
19        void *values[MAX_PARAMETERS];
20      } *Arg,ArgBody;
21
22      typedef struct {
23        char optionName[MAX_NAME_LENGTH+1];
24        char *documentation;
25        BOOLEAN *exists;
26        int numberOfParameters;
27        ParamType types[MAX_PARAMETERS];
28        void *values[MAX_PARAMETERS];
29      } *Option,OptionBody;
30
31      static BOOLEAN optionsRequired = TRUE;
32      static int numberOfArguments = 0;
33      static ArgBody args[MAX_ARGS];
34      static int numberOfOptions = 0;
35      static OptionBody options[MAX_OPTIONS];
36
37      void DefArg(char *format,char *documentation,....)
38      {
39        va_list ap;
40        char *p;
41        int i;
42        int parameterCounter;
43
44        if (numberOfArguments==MAX_ARGS)
45          DoError("DefArg: too many command line options now:\"%s\".\n",format);
46
47        args[numberOfArguments].documentation = documentation;
48
49        /* now parse the format string */
```

```
50      /* get option parameters */
51      va_start(ap,documentation);
52      for (p=format,parameterCounter=0;*p;p++){
53        if (*p=='%'){
54          if (parameterCounter==MAX_PARAMETERS)
55             DoError("Def Arg: too many parameters in \"%s\".\n",format);
56          p++;
57          switch (*p) {
58          case 'd':
59             args[numberOfArguments].types[parameterCounter] = INTEGER;
60             args[numberOfArguments].values[parameterCounter] = va_arg(ap, void *);
61             parameterCounter++;
62             break;
63          case 'f':
64             args[numberOfArguments].types[parameterCounter] = FLOAT;
65             args[numberOfArguments].values[parameterCounter] = va_arg(ap, void *);
66             parameterCounter++;
67             break;
68          case 's':
69             args[numberOfArguments].types[parameterCounter] = STRING;
70             args[numberOfArguments].values[parameterCounter] = va_arg(ap, void *);
71             parameterCounter++;
72             break;
73          default:
74             DoError("DefArg: bad option in \"%s\".\n",format);
75          }
76        }
77      }
78      args[numberOfArguments].numberOfParameters = parameterCounter;
79      ++numberOfArguments;
80      va_end(ap);
81    }
82
83    void DefOption(char *format,char *documentation,BOOLEAN *exists,...)
84    {
85      va_list ap;
86      char *optionName;
87      char *p;
88      int i;
89      int parameterCounter;
90
91      if (numberOfOptions==MAX_OPTIONS)
92         DoError("DefOption: too many command line options now:\"%s\".\n",format);
93
94      /* record exists so that *exists will be TRUE if this option is scanned */
95      options[numberOfOptions].exists = exists;
96
97      options[numberOfOptions].documentation = documentation;
98
99      /* now parse the format string */
100     p=format;
101     /* skip leading spaces */
102     while (*p==' ' && *p!='\0')
103        p++;
104
105     /* get the option name */
106     optionName = options[numberOfOptions].optionName;
107     i=0;
```

```
108      while (*p != '\0' && *p != ' ' && *p !='\t') {
109        if (i<MAX_NAME_LENGTH)
110          optionName[i++] = *p;
111        else
112          DoError("DefOptions: option name too long in \"%s\".\n",format);
113        p++;
114      }
115      optionName[i] = '\0';
116
117      /* get option parameters */
118      va_start(ap,exists);
119      for (parameterCounter=0;*p;p++){
120        if (*p=='%'){
121          if (parameterCounter == MAX_PARAMETERS)
122            DoError("DefOptions: too many parameters in \"%s\".\n",format);
123          p++;
124          switch (*p) {
125          case 'd':
126            options[numberOfOptions].types[parameterCounter] = INTEGER;
127            options[numberOfOptions].values[parameterCounter] = va_arg(ap, void *);
128            parameterCounter++;
129            break;
130          case 'f':
131            options[numberOfOptions].types[parameterCounter] = FLOAT;
132            options[numberOfOptions].values[parameterCounter] = va_arg(ap, void *);
133            parameterCounter++;
134            break;
135          case 's':
136            options[numberOfOptions].types[parameterCounter] = STRING;
137            options[numberOfOptions].values[parameterCounter] = va_arg(ap, void *);
138            parameterCounter++;
139            break;
140          default:
141            DoError("DefOptions: bad option in \"%s\".\n",format);
142          }
143        }
144      }
145      options[numberOfOptions].numberOfParameters = parameterCounter;
146      ++numberOfOptions;
147      va_end(ap);
148    }
149
150    void PrintHelp(char *name)
151    {
152      int i;
153      fprintf(stderr,"Usage:\n %s\n",name);
154      for (i=0;i<numberOfArguments;++i)
155        fprintf(stderr,"   %s\n",args[i].documentation);
156      for (i=0;i<numberOfOptions;++i)
157        fprintf(stderr,"   [%s]\n",options[i].documentation);
158      DoError("\n",NULL);
159    }
160
161    void ScanArgs(int argc,char **argv)
162    {
```

```
163     int i,j,k;
164
165     for (j=0;j<numberOfOptions;++j)
166      *(options[j].exists) = FALSE;
167
168     if (argc == 1 && optionsRequired)
169      PrintHelp(argv[0]);
170
171     i=1;
172     for (j=0;j<numberOfArguments;++j) {
173      if (i+args[j].numberOfParameters > argc) {
174       fprintf(stderr,"Required argument expects %d parameters:\n %s\n",
175              args[j].numberOfParameters,
176              args[j].documentation);
177      DoError("\n",NULL);
178      }
179      for (k=0;k<args[j].numberOfParameters;++k)
180       switch (args[j].types[k]) {
181       case INTEGER:
182          *(int *)(args[j].values[k]) = atoi(argv[i++]);
183          break;
184       case FLOAT:
185          *(float *)(args[j].values[k]) = atof(argv[i++]);
186          break;
187       case STRING:
188          *(char **)(args[j].values[k]) = argv[i++];
189          break;
190       default:
191          DoError("ScanArgs: internal error - bad type.\n",NULL);
192       }
193     }
194
195     while (i<argc) {
196      for (j=0;j<numberOfOptions;++j)
197       if (!strcmp(options[j].optionName,argv[i])) {
198          if (i+options[j].numberOfParameters >= argc) {
199           fprintf(stderr,"Option %s expects %d parameters:\n %s\n",
200                  options[j].optionName,
201                  options[j].numberOfParameters,
202                  options[j].documentation);
203          DoError("\n",NULL);
204          }
205          *(options[j].exists) = TRUE;
206          ++i;
207          for (k=0;k<options[j].numberOfParameters;++k)
208           switch (options[j].types[k]) {
209           case INTEGER:
210              *(int *)(options[j].values[k]) = atoi(argv[i++]);
211              break;
212           case FLOAT:
213              *(float *)(options[j].values[k]) = atof(argv[i++]);
214              break;
215           case STRING:
216              *(char **)(options[j].values[k]) = argv[i++];
217              break;
```

```
218           default:
219             DoError("ScanArgs: internal error - bad type.\n",NULL);
220           }
221           break;
222         }
223       if (j==numberOfOptions) {
224         fprintf(stderr,"Bad command line argument.\n");
225         PrintHelp(argv[0]);
226       }
227     }
228   }
229   #ifdef foo
230   void main (int argc,char **argv)
231   {
232    int i;
233    float f;
234    char *s;
235    BOOLEAN haveAString,haveAnInt,haveAFloat,haveAPair;
236
237    DefArg("%s","filename",&s);
238    DefOption("-int %d","-int <int> ",&haveAnInt,&i);
239    DefOption("-float %f","-float <float> ",&haveAFloat,&f);
240    DefOption("-pair %f %d","-pair <float> <int> ",&haveAPair,&f,&i);
241
242    ScanArgs(argc,argv);
243
244    printf("%s\n",s);
245    if (haveAPair)
246      printf("%f %d\n",f,i);
247    if (haveAnInt)
248      printf("%d\n",i);
249    if (haveAFloat)
250      printf("%f\n",f);
251    if (haveAString)
252      printf("%s\n",s);
253   }
254   #endif
```

Jul 26 12:57 1991 error.c

```
1     #include <stdio.h>
2     #include "error.h"
3
4     void DoError(char *string1,char *string2)
5     {
6      if (string2 == NULL)
7        printf(string1);
8      else
9        printf(string1,string2);
10     exit(-1);
11    }
12
```

Jul 26 12:57 1991 lists.c

```
1      #include "stdio.h"
2      #include "boolean.h"
3      #include "lists.h"
4
5      List cdr(List l)
6      {
7       if (l == NULL)
8         return l;
9       else
10        return l->cdr;
11     }
12
13     void *car(List l)
14     {
15      if (l == NULL)
16        return l;
17      else
18        return l->car;
19     }
20
21     void *popIntern(List *l)
22     {
23      List temp;
24      if (*l == NULL)
25        return *l;
26      else {
27       temp = (*l)->car;
28       *l = (*l)->cdr;
29       return temp;
30      }
31     }
32
33     BOOLEAN endp(List l)
34     {
35      return (l == NULL);
36     }
37
38     List cons(void *theCar,List theCdr)
39     {
40      cell temp;
41      temp = (cell)calloc(1,sizeof(cellBody));
42      if (temp == NULL) {
43       printf("Cons: out of memory\n");
44       exit(-1);
45      }
46      temp->car = theCar;
47      temp->cdr = theCdr;
48      return temp;
49     }
50
51     void map(List l,mapFun f)
52     {
53      while (l != NULL) {
54       (*f)(l->car);
55       l = l->cdr;
```

```
56      }
57    }
58
59    List collect(List l,collectFun c)
60    {
61     List temp;
62     while (l!=NULL) {
63      (*c)(l->car);
64      temp = l;
65      l = l->cdr;
66      free(temp);
67     }
68    }
69
70    int ListLength(List l)
71    {
72     int count=0;
73     while (l != NULL) {
74      ++count;
75      l = l->cdr;
76     }
77     return count;
78    }
```

Aug 23 19:20 1991 pict.c

```
1     #include <stdio.h>
2     #include <math.h>
3     #include <rasterfile.h>
4     #include "boolean.h"
5     #include "error.h"
6     #include "pict.h"
7
8     static UCHAR bitmasks[] = { 0x80,0x40,0x20,0x10,0x8,0x4,0x2,0x1 };
9
10    ColorMap NewColorMap(int size)
11    {
12     ColorMap cmap;
13     if (size > 256)
14      DoError("NewColorMap: size greater than 256.",NULL);
15     if (size < 1)
16      DoError("NewColorMap: size less than 1.",NULL);
17     if ((cmap = (ColorMap)calloc(1,sizeof(ColorMapBody)))==NULL)
18      DoError("NewColorMap: cannot allocate space.",NULL);
19     cmap->numberOfEntries = size;
20     cmap->red = (UCHAR *)calloc(size,sizeof(UCHAR));
21     cmap->green = (UCHAR *)calloc(size,sizeof(UCHAR));
22     cmap->blue = (UCHAR *)calloc(size,sizeof(UCHAR));
23     if ((cmap->red == NULL)||(cmap->green == NULL)||(cmap->blue == NULL))
24      DoError("NewColorMap: cannot allocate space.",NULL);
25     return cmap;
26    }
27
28    void FreeColorMap(ColorMap cmap)
29    {
30     if (cmap != NULL) {
```

```
31      if (cmap->red != NULL)
32        free(cmap->red);
33      if (cmap->green != NULL)
34        free(cmap->green);
35      if (cmap->blue != NULL)
36        free(cmap->blue);
37      free(cmap);
38    }
39  }
40
41  UCHAR ReadColorValue(ColorMap cmap, Color primary, int index)
42  {
43    if (index > cmap->numberOfEntries)
44      DoError("ReadColorValue: index too big.",NULL);
45    if (primary = COLOR_RED)
46      return *(cmap->red+index);
47    if (primary = COLOR_GREEN)
48      return *(cmap->green+index);
49    if (primary = COLOR_BLUE)
50      return *(cmap->blue+index);
51    DoError("ReadColorValue: bad primary color.",NULL);
52  }
53
54  UCHAR WriteColorValue(ColorMap cmap, int index, UCHAR red, UCHAR green,
55                  UCHAR blue)
56  {
57    if (index > cmap->numberOfEntries)
58      DoError("WriteColorValue: index too big.",NULL);
59    *(cmap->red+index)=red;
60    *(cmap->green+index)=green;
61    *(cmap->blue+index)=blue;
62  }
63
64  Picture new_pict(width,height,depth)
65  int width,height,depth;
66  {
67    Picture pict;
68    int uchar_width;
69
70    if ((pict = (Picture)calloc(1,sizeof(PictureBody))) == NULL)
71      DoError("new_pict: cannot allocate space",NULL);
72    pict->width = width;
73    pict->height = height;
74    pict->depth = depth;
75    pict->cmap = NULL;
76    if (pict->depth == 32)
77      uchar_width = pict->width*4;
78    else if (pict->depth == 8)
79      uchar_width = ROUND2(pict->width);
80    else if (pict->depth == 1)
81      uchar_width = ROUND16(pict->width) >> 3;
82    else
83      DoError("new_pict: only depths of 1 and 8 are supported\n",NULL);
84    pict->uchar_width = uchar_width;
85
86    pict->data = (UCHAR *) calloc(uchar_width * pict->height , sizeof(UCHAR));
87    if (pict->data == NULL)
```

```
88      DoError("new_pict: cannot allocate space\n",NULL);
89      return pict;
90    }
91
92    void free_pict(pict)
93    Picture pict;
94    {
95     if (pict->data != NULL)
96       free(pict->data);
97     FreeColorMap(pict->cmap);
98     free(pict);
99    }
100
101   Picture load_pict(fn)
102   char *fn;
103   {
104    FILE *fp;
105    Picture pict;
106    int uchar_width;
107    struct rasterfile header;
108
109    if ((pict = (Picture)calloc(1,sizeof(PictureBody))) == NULL)
110      DoError("load_pict: cannot allocate space",NULL);
111
112    if ((fp = fopen(fn, "r")) == NULL)
113      DoError("load_pict: error opening input file %s\n",fn);
114
115    /* WARNING - this fread is VERY unsafe! If assumes that the C compiler
116     * puts all fields of a structure adjacent. This is not always the case.
117     * It appears that it works with gcc on a sparcstation, but may not work
118     * on other systems. */
119    fread(&header,sizeof(struct rasterfile),1,fp);
120    if (header.ras_magic != RAS_MAGIC)
121      DoError("load_pict: only supports rasterfile format\n",NULL);
122    if ((header.ras_type != RT_STANDARD)||
123       (header.ras_maptype != RMT_NONE)||
124       (header.ras_maplength != 0))
125      DoError("load_pict: unsupported rasterfile format\n",NULL);
126
127    pict->width = header.ras_width;
128    pict->height = header.ras_height;
129    pict->depth = header.ras_depth;
130
131    if (pict->depth == 32)
132      uchar_width = pict->width * 4;
133    else if (pict->depth == 8)
134      uchar_width = ROUND2(pict->width);
135    else if (pict->depth == 1)
136      uchar_width = ROUND16(pict->width) >> 3;
137    else
138      DoError("load_pict: only depths of 1, 8, and 32 are supported\n",NULL);
139    pict->uchar_width = uchar_width;
140
141    pict->data = (UCHAR *) calloc(uchar_width * pict->height, sizeof(UCHAR));
142    if (pict->data == NULL)
143      DoError("load_pict: cannot allocate space\n",NULL);
144
145    fread(pict->data, sizeof(UCHAR), uchar_width*pict->height, fp);
```

```
146       fclose(fp);
147       return pict;
148     }
149
150     Picture load_header(FILE *fp)
151     {
152      Picture pict;
153      int uchar_width;
154      struct rasterfile header;
155
156      if ((pict = (Picture)calloc(1,sizeof(PictureBody))) == NULL)
157        DoError("load_header: cannot allocate space",NULL);
158
159     /* WARNING - this fread is VERY unsafe! It assumes that the C compiler
160      * puts all fields of a structure adjacent. This is not always the case.
161      * It appears that it works with gcc on a sparcstation, but may not work
162      * on other systems. */
163      if (fread(&header,sizeof(struct rasterfile),1,fp) != 1)
164        DoError("load_header: error reading header",NULL);
165      if (header.ras_magic != RAS_MAGIC)
166        DoError("load_pict: only supports rasterfile format\n",NULL);
167      if ((header.ras_type != RT_STANDARD)||
168         (header.ras_maptype != RMT_NONE) ||
169         (header.ras_maplength != 0))
170        DoError("load_pict: unsupported rasterfile format\n",NULL);
171
172      pict->width = header.ras_width;
173      pict->height = header.ras_height;
174      pict->depth = header.ras_depth;
175
176      if (pict->depth == 32)
177        uchar_width = pict->width * 4;
178      else if (pict->depth == 8)
179        uchar_width = ROUND2(pict->width);
180      else if (pict->depth == 1)
181        uchar_width = ROUND16(pict->width) >> 3;
182      else
183        DoError("load_header: only depths of 1, 8, and 32 are supported\n",NULL);
184      pict->uchar_width = uchar_width;
185      pict->data = NULL;
186
187      return pict;
188     }
189
190    void write_pict(fn, pict)
191    char *fn;
192    Picture pict;
193    {
194     FILE *fp;
195     int uchar_width;
196     struct rasterfile header;
197
198     if ((fp = fopen(fn, "w")) == NULL)
199       DoError("write_pict: error opening output file %s\n",fn);
200
201     header.ras_magic = RAS_MAGIC;
202     header.ras_width = pict->width;
```

```
203    header.ras_height = pict->height;
204    header.ras_depth = pict->depth;
205    header.ras_length = pict->uchar_width*pict->height;
206    header.ras_type = RT_STANDARD;
207    if (pict->cmap == NULL) {
208      header.ras_maptype = RMT_NONE;
209      header.ras_maplength = 0;
210  /* WARNING - this fwrite is VERY unsafe! If assumes that the C compiler
211   * puts all fields of a structure adjacent. This is not always the case.
212   * It appears that it works with gcc on a sparcstation, but may not work
213   * on other systems. */
214      if (fwrite(&header,sizeof(struct rasterfile),1,fp) != 1)
215        DoError("write_pict: error writing header",NULL);
216    }
217    else {
218      header.ras_maptype = RMT_EQUAL_RGB;
219      header.ras_maplength = pict->cmap->numberOfEntries*3;
220  /* WARNING - this fwrite is VERY unsafe! If assumes that the C compiler
221   * puts all fields of a structure adjacent. This is not always the case.
222   * It appears that it works with gcc on a sparcstation, but may not work
223   * on other systems. */
224      if (fwrite(&header,sizeof(struct rasterfile),1,fp) != 1)
225        DoError("write_pict: error writing header",NULL);
226      fwrite(pict->cmap->red,sizeof(UCHAR),pict->cmap->numberOfEntries,fp);
227      fwrite(pict->cmap->green,sizeof(UCHAR),pict->cmap->numberOfEntries,fp);
228      fwrite(pict->cmap->blue,sizeof(UCHAR),pict->cmap->numberOfEntries,fp);
229    }
230
231    uchar_width = pict->uchar_width;
232    fwrite(pict->data, sizeof(UCHAR), uchar_width*pict->height, fp);
233    fclose(fp);
234  }
235
236  void write_header(FILE *fp, Picture pict)
237  {
238    struct rasterfile header;
239
240    header.ras_magic = RAS_MAGIC;
241    header.ras_width = pict->width;
242    header.ras_height = pict->height;
243    header.ras_depth = pict->depth;
244    header.ras_length = pict->uchar_width*pict->height;
245    header.ras_type = RT_STANDARD;
246    header.ras_maptype = RMT_NONE;
247    header.ras_maplength = 0;
248  /* WARNING - this fwrite is VERY unsafe! If assumes that the C compiler
249   * puts all fields of a structure adjacent. This is not always the case.
250   * It appears that it works with gcc on a sparcstation, but may not work
251   * on other systems. */
252    fwrite(&header,sizeof(struct rasterfile),1,fp);
253  }
254
255  #define BytesPerScanline(pict) (pict->uchar_width)
256
257  UCHAR ReadPixel(pict,x,y)
258  Picture pict;
259  int x,y;
260  {
```

```
261       if (pict->depth == 8)
262         return *(pict->data+y*BytesPerScanline(pict)+x);
263       else if (pict->depth == 1)
264         return ((*(pict->data+y*BytesPerScanline(pict)+(x>>3))) &
265             bitmasks[x%8])?1:0;
266       else
267         DoError("ReadPixel: only depths of 1 and 8 are supported\n",NULL);
268     }
269
270     void WritePixel(pict,x,y,color)
271     Picture pict;
272     int x,y;
273     UCHAR color;
274     {
275       if (x<0||x>=pict->width||y<0||y>=pict->height) {
276         char s[256];
277         sprintf(s,"%d %d",x,y);
278         DoError("WritePixel: Out of bounds: ",s);
279       }
280       if (pict->depth == 8)
281         *(pict->data+y*pict->uchar_width+x) = color;
282       else if (pict->depth == 1)
283         if (color)
284           *(pict->data+y*BytesPerScanline(pict)+(x>>3)) |= bitmasks[x%8];
285         else
286           *(pict->data+y*BytesPerScanline(pict)+(x>>3)) &= ~bitmasks[x%8];
287       else
288         DoError("WritePixel: only depths of 1 and 8 are supported\n",NULL);
289     }
290
291     void WriteClippedPixel(pict,x,y,color)
292     Picture pict;
293     int x,y;
294     UCHAR color;
295     {
296       if (x<0||x>=pict->width||y<0||y>=pict->height) {
297         return;
298       }
299       if (pict->depth == 8)
300         *(pict->data+y*pict->uchar_width+x) = color;
301       else if (pict->depth == 1)
302         if (color)
303           *(pict->data+y*BytesPerScanline(pict)+(x>>3)) |= bitmasks[x%8];
304         else
305           *(pict->data+y*BytesPerScanline(pict)+(x>>3)) &= ~bitmasks[x%8];
306       else
307         DoError("WritePixel: only depths of 1 and 8 are supported\n",NULL);
308     }
309
310     void CopyPicture(Picture dest, Picture src)
311     {
312       int uchar_width;
313       dest->width = src->width;
314       dest->height = src->height;
315       dest->depth = src->depth;
316       dest->uchar_width = BytesPerScanline(src);
317       uchar_width = BytesPerScanline(src);
```

```
318        memcpy(dest->data,src->data,uchar_width*src->height);
319      }
```

Jul 26 13:15 1991  read.c

```
1     #include <stdio.h>
2     #include "misc.h"
3     #include "read.h"
4
5     #define MAX_STRING_LEN (255)
6
7     int ReadInt(FILE *fp)
8     {
9      char s[MAX_STRING_LEN];
10     int x;
11
12     fgets(s,MAX_STRING_LEN,fp);
13     while (sscanf(s,"%d",&x)!=1)
14       fprintf(stderr,"ReadInt: integer expected - reenter.\n");
15     return x;
16    }
17
18    int ReadFloat(FILE *fp)
19    {
20     char s[MAX_STRING_LEN];
21     float x;
22
23     fgets(s,MAX_STRING_LEN,fp);
24     while (sscanf(s,"%f",&x)!=1)
25       fprintf(stderr,"ReadFloat: integer expected - reenter.\n");
26     return x;
27    }
28
29    char *ReadString(FILE *fp)
30    {
31     char s[MAX_STRING_LEN];
32     char *endPtr;
33
34     fgets(s,MAX_STRING_LEN,fp);
35     endPtr = strchr(s,'\n');
36     if (endPtr != NULL)
37       *endPtr = '\0';
38     return strdup(s);
39    }
40
```

Section C

Aug 13 00:13 1991  Makefile

```
1     CCFLAGS = -g -c -I/net/piglet/piglet-1c/hopcroft/new/include
2
3     EXTRNS = /net/piglet/piglet-1c/hopcroft/error/error.o\
4              /net/piglet/piglet-1c/hopcroft/new/pict/pict.o \
```

```
5    /net/piglet/piglet-1c/hopcroft/lists/lists.o
6
7    ARGS_MODULE = /net/piglet/piglet-1c/hopcroft/new/ScanArgs/args.o
8
9    SOURCES = Makefile diff2.c dmain.c l2Norm2.c match.c matchparallel.c single.c
10   EXTRNSOURCES = /net/piglet/piglet-1c/hopcroft/error/error.c \
11   /net/piglet/piglet-1c/hopcroft/new/pict/pict.c \
12   /net/piglet/piglet-1c/hopcroft/lists/lists.c
13
14
15   INCLUDE = /net/piglet/piglet-1c/hopcroft/new/include/
16   ARGS = $(INCLUDE)args.h
17   BASELINES = $(INCLUDE)baselines.h
18   BLOBIFY = $(INCLUDE)blobify.h
19   BOOLEAN = $(INCLUDE)boolean.h
20   BOXES = $(INCLUDE)boxes.h
21   CONTOUR = $(INCLUDE)newContour.h
22   DESCRIPTORS = $(INCLUDE)descriptors.h
23   DICT = $(INCLUDE)dict.h
24   DIFF = $(INCLUDE)diff.h
25   DIFF2 = $(INCLUDE)diff2.h
26   ERROR = $(INCLUDE)error.h
27   LINES = $(INCLUDE)lines.h
28   LISTS = $(INCLUDE)lists.h
29   MATCH = $(INCLUDE)match.h
30   MATCHPARALLEL = $(INCLUDE)matchparallel.h
31   MISC = $(INCLUDE)misc.h
32   MYLIB = $(INCLUDE)mylib.h
33   NEWMATCH = $(INCLUDE)newMatch.h
34   ORIENT = $(INCLUDE)orient.h
35   PICT = $(INCLUDE)pict.h
36   READ = $(INCLUDE)read.h
37   TYPES = $(INCLUDE)types.h
38
39   INCSOURCES = $(BASELINES) $(BLOBIFY) $(BOOLEAN) $(BOXES) $(CONTOUR) \
40   $(DICT) $(DIFF) $(DIFF2) $(LINES) $(LISTS) $(MATCH) $(MATCHPARALLEL) \
41   $(ORIENT) $(PICT) $(TYPES)
42
43   anomalies:   anomalies.o diff2.o newMatch.o ../main/dict.o
44           gcc anomalies.o diff2.o newMatch.o ../main/dict.o $(EXTRNS) -lm -o $@
45
46   descriptors: descMain.o descriptors.o diff2.o newMatch.o newL2.o ../main/dict.o
47           gcc descMain.o descriptors.o diff2.o newMatch.o newL2.o ../main/dict.o ../lib/mylib.a
             -lm -o $@
48
49   drawBlobs:  drawBlobs.o ../main/dict.o
50           gcc drawBlobs.o ../main/dict.o ../lib/mylib.a -lm -o $@
51
52   compare:    diff2.o dmain.o newMatch.o ../main/dict.o
53           gcc dmain.o diff2.o newMatch.o ../main/dict.o \
54   $(EXTRNS) -lm -o $@
55
56   equiv: equiv.o descriptors.o diff2.o newMatch.o newL2.o ../main/dict.o
57           gcc equiv.o descriptors.o diff2.o newMatch.o newL2.o ../main/dict.o ../lib/mylib.a -lm
             -o $@
58
59   extract:    extract.o ../main/dict.o
60           gcc extract.o ../main/dict.o $(EXTRNS) -o $@
```

```
61
62      l2Norm:         l2Norm2.o ../main/dict.o
63          gcc l2Norm2.o ../main/dict.o $(EXTRNS) -lm -o $@
64
65      recogDesc:   recogDesc.o ../main/dict.o diff2.o newMatch.o newL2.o
66          gcc recogDesc.o ../main/dict.o diff2.o newMatch.o newL2.o ../lib/mylib.a -lm -o $@
67
68      resample:    resample.o ../main/dict.o
69          gcc resample.o ../main/dict.o $(EXTRNS) -lm -o $@
70
71      single:         single.o newMatch.o diff2.o newL2.o ../main/dict.o
72          gcc single.o newMatch.o diff2.o newL2.o ../main/dict.o ../lib/mylib.a -lm -o $@
73
74      sortMatrix:  sortMatrix.o
75          gcc sortMatrix.o $(EXTRNS) -o $@
76
77      printAll:    printIncludes printExtrns printCode
78
79      printCode:   $(SOURCES)
80          /usr/5bin/pr -n3 $(SOURCES) | lpr -PWeeklyWorldNews
81
82      printExtrns: $(EXTRNSOURCES)
83          /usr/5bin/pr -n3 $(EXTRNSOURCES) | lpr -PWeeklyWorldNews
84
85      printIncludes:   $(INCSOURCES)
86          /usr/5bin/pr -n3 $(INCSOURCES) | lpr -PWeeklyWorldNews
87
88      anomalies.o:    anomalies.c $(ERROR) $(TYPES) $(PICT) $(DICT) $(DIFF) $(MISC)
89          gcc $(CCFLAGS) anomalies.c
90
91      descriptors.o:  descriptors.c $(MYLIB) $(TYPES) $(DICT) $(DIFF) $(MISC) $(DESCRIPTORS)
92          gcc $(CCFLAGS) descriptors.c
93
94      descMain.o: descMain.c $(MYLIB) $(TYPES) $(DICT) $(DIFF) $(DESCRIPTORS)
95          gcc $(CCFLAGS) descMain.c
96
97      diff2.o: diff2.c $(BOOLEAN) $(TYPES) $(PICT) $(DIFF2) $(NEWMATCH)
98          gcc $(CCFLAGS) diff2.c
99
100     dmain.o: dmain.c $(BOOLEAN) $(PICT) $(DIFF)
101         gcc $(CCFLAGS) dmain.c
102
103     drawBlobs.o:    drawBlobs.c $(MYLIB) $(TYPES) $(DICT)
104         gcc $(CCFLAGS) drawBlobs.c
105
106     equiv.o:    equiv.c $(MYLIB) $(TYPES) $(DICT) $(DIFF) $(DESCRIPTORS)
107         gcc $(CCFLAGS) equiv.c
108
109     extract.o:  extract.c $(BOOLEAN) $(TYPES) $(DICT)
110         gcc $(CCFLAGS) extract.c
111
112     l2Norm2.o:  l2Norm2.c $(BOOLEAN) $(TYPES) $(ERROR) $(DICT)
113         gcc $(CCFLAGS) l2Norm2.c
114
115     match.o: match.c $(BOOLEAN) $(TYPES) $(PICT) $(DIFF2) $(MATCH) $(MATCHPARALLEL)
116         gcc $(CCFLAGS) match.c
117
118     matchparallel.o: matchparallel.c $(BOOLEAN) $(TYPES) $(PICT) $(DIFF2) \
```

```
119         $(MATCH) $(MATCHPARALLEL)
120           gcc $(CCFLAGS) matchparallel.c
121
122     newL2.o:    newL2.c $(BOOLEAN) $(ERROR) $(TYPES) $(DICT)
123           gcc $(CCFLAGS) newL2.c
124
125     newMatch.o: newMatch.c $(ERROR) $(MISC) $(NEWMATCH) $(DICT) $(TYPES)
126           gcc $(CCFLAGS) newMatch.c
127
128     recogDesc.o:      recogDesc.c $(MYLIB) $(TYPES) $(DICT) $(DIFF)
129           gcc $(CCFLAGS) recogDesc.c
130
131     resample.o: resample.c $(BOOLEAN) $(TYPES) $(ERROR) $(DICT)
132           gcc $(CCFLAGS) resample.c
133
134     single.o:   single.c $(MYLIB) $(TYPES) $(DICT) $(DIFF) $(DIFF2) $(MATCH)
                    $(MATCHPARALLEL)
135           gcc $(CCFLAGS) single.c
136
137     sortMatrix.o:     sortMatrix.c $(ERROR) $(PICT)
138           gcc $(CCFLAGS) sortMatrix.c
```

Jul 9 19:36 1991 anomalies.c

```
1       #include <stdio.h>
2       #include "error.h"
3       #include "types.h"
4       #include "pict.h"
5       #include "dict.h"
6       #include "diff.h"
7       #include "misc.h"
8
9       #define MAX_STRING_LEN (100)
10      #define MAX_DICTIONARIES (15)
11      #define MAX_WORDS (100)
12      #define MAX_ENTRIES (MAX_WORDS*MAX_WORDS)
13
14      typedef struct {
15        float score;
16        int x;
17        int y;
18      } *CompareTuple,CompareTupleBody;
19
20
21      int ReadInt(FILE *fp)
22      {
23        char s[MAX_STRING_LEN];
24        int x;
25
26        fgets(s,MAX_STRING_LEN,fp);
27        while (sscanf(s,"%d",&x)!=1)
28          fprintf(stderr,"ReadInt: integer expected - reenter.\n");
29        return x;
30      }
31
32      char *ReadString(FILE *fp)
```

```
33      {
34        char s[MAX_STRING_LEN];
35        char *endPtr;
36
37        fgets(s,MAX_STRING_LEN,fp);
38        endPtr = strchr(s,'\n');
39        if (endPtr != NULL)
40          *endPtr = '\0';
41        return strdup(s);
42      }
43
44      int TupleLessThan(CompareTuple *x,CompareTuple *y)
45      {
46        if ((*x)->score == (*y)->score)
47          return 0;
48        else if ((*x)->score < (*y)->score)
49          return -1;
50        else
51          return 1;
52      }
53
54      int CountAnomalies(Dictionary d1, Dictionary d2,char *dName1,char *dName2,char
        **words,FILE *outfp)
55      {
56        CompareTupleBody scoreBodies[MAX_ENTRIES];
57        CompareTuple scores[MAX_ENTRIES];
58        Picture pict;
59        int x,y,i,j;
60        int anomalies;
61
62        pict = CompareDictionaries(d1,d2);
63
64        for (y=0,i=0;y<pict->height;++y)
65          for (x=0;x<pict->width;++x) {
66            CompareTuple temp;
67     /*     temp = (CompareTuple)calloc(1,sizeof(CompareTupleBody));
68            if (temp==NULL)
69                DoError("%s: cannot allocate space.\n",argv[0]);
70     */
71            temp = scoreBodies+i;
72            temp->score = *((float *)(pict->data)+x+y*pict->width);
73            temp->x = x;
74            temp->y = y;
75            scores[i] = temp;
76            ++i;
77          }
78        qsort(scores,i,sizeof(CompareTuple),TupleLessThan);
79        for (j=0,anomalies=0;j<d1->numberOfEntries;++j)
80          if (scores[j]->x != scores[j]->y) {
81            fprintf(outfp,"%s:%s   %s:%s\n",dName1,words[scores[j]->x],
82                          dName2,words[scores[j]->y]);
83            ++anomalies;
84          }
85
86        free_pict(pict);
87        return anomalies;
88      }
```

```
89
90      void main(int argc,char **argv)
91      {
92       char *outFile, *listFile;
93       int numberOfDictionaries;
94       Dictionary dictionaries[MAX_DICTIONARIES];
95       char *names[MAX_DICTIONARIES];
96       char *words[MAX_WORDS];
97       int numberOfWords;
98       FILE *listfp,*outfp;
99       int anomalies[MAX_DICTIONARIES][MAX_DICTIONARIES];
100      int i,x,y;
101
102      if (argc != 3)
103       DoError("Usage: %s listfile outfile.\n",argv[0]);
104      listFile = argv[1];
105      outFile = argv[2];
106
107      if ((listfp = fopen(listFile,"r"))==NULL)
108       DoError("Error opening file %s.\n",listFile);
109
110      /* Read in the number of words in each dictionary */
111      numberOfWords = ReadInt(listfp);
112      if (numberOfWords > MAX_WORDS)
113       DoError("%s: too many words.\n",argv[0]);
114
115      /* Read in the words */
116      for (i=0;i<numberOfWords;++i) {
117       words[i] = ReadString(listfp);
118      }
119
120      /* Read in the number of dictionaries */
121      numberOfDictionaries = ReadInt(listfp);
122      if (numberOfDictionaries > MAX_DICTIONARIES)
123       DoError("%s: too many dicitionaries.\n",argv[0]);
124
125      /* Read in the dictionaries and their names */
126      for (i=0;i<numberOfDictionaries;++i) {
127       names[i] = ReadString(listfp);
128       dictionaries[i] = ReadDictionary(names[i]);
129      }
130
131      /* Check to see that all dictionaries have the same number of shapes as the specified number
         of words. */
132      for (i=1;i<numberOfDictionaries;++i)
133       if (dictionaries[i]->numberOfEntries != numberOfWords)
134        DoError("Dictionary %s has wrong number of entries.\n",names[i]);
135
136      /* Write the results */
137      if ((outfp = fopen(outFile,"w"))==NULL)
138       DoError("Error opening %s for output.\n",outFile);
139      fprintf(outfp,"Words:\n");
140      for (i=0;i<numberOfWords;++i)
141       fprintf(outfp,"%d: %s\n",i,words[i]);
142      fprintf(outfp,"\n");
143      fprintf(outfp,"Dictionaries:\n");
144      for (i=0;i<numberOfDictionaries;++i)
```

```
145         fprintf(outfp,"%d: %s\n",i,names[i]);
146         fprintf(outfp,"\n");
147
148     /* Fill in the anomaly counts */
149      for (y=0;y<numberOfDictionaries;++y)
150       for (x=0;x<numberOfDictionaries;++x) {
151         anomalies[y][x] =
          CountAnomalies(dictionaries[y],dictionaries[x],names[y],names[x],words,outfp);
152         printf("(%d,%d): %d\n",x,y,anomalies[y][x]);
153       }
154
155      fprintf(outfp,"\n\n");
156      fprintf(outfp,"    ");
157      for (x = 0; x < numberOfDictionaries; x++)
158       fprintf(outfp,"%7d ", x);
159      fprintf(outfp, "\n");
160      for (y=0;y<numberOfDictionaries;++y) {
161       fprintf(outfp, " %3d ", y);
162       for (x=0;x<numberOfDictionaries;++x)
163         fprintf(outfp,"%7d ",anomalies[y][x]);
164       fprintf(outfp, "\n");
165      }
166      fclose(outfp);
167
168     }
```

Jul 31 17:14 1991 descMain.c

```
1     #include <stdio.h>
2     #include "mylib.h"
3     #include "types.h"
4     #include "dict.h"
5     #include "diff.h"
6     #include "descriptors.h"
7
8     void PrintDescriptors(Dictionary models,char *modelName,char **wordNames,
9                    int numberOfFonts,Dictionary fonts[],
10                   char **fontNames,int numberOfWords,
11                   DiffDescriptor dd)
12    {
13     int modelIndex,fontIndex;
14     int starCount,correctCount;
15     Descriptor thisDescriptor;
16     int lineCount;
17
18     printf("\f\n");
19     PrintWords(wordNames,numberOfWords);
20     lineCount = 0;
21     starCount = 0;
22     correctCount = 0;
23     for (modelIndex=0;modelIndex<numberOfWords;++modelIndex) {
24      printf("%s %s\n",modelName,wordNames[modelIndex]);
25      ++lineCount;
26      for (fontIndex=0;fontIndex<numberOfFonts;++fontIndex) {
27       thisDescriptor =
         ComputeDescriptor(modelIndex,models,fonts[fontIndex],numberOfWords,dd);
```

```
28          printf(" ");
29          PrintField(fontNames[fontIndex],20);
30          PrintDescriptor(thisDescriptor,&starCount,&correctCount);
31          printf("\n");
32          ++lineCount;
33        }
34        if (lineCount>30) {
35          printf("\f\n");
36          PrintWords(wordNames,numberOfWords);
37          lineCount = 0;
38        }
39      }
40      fprintf(stdout,"There were %d mismatches ",starCount-
        numberOfWords*numberOfFonts);
41      fprintf(stdout,"better than %d correct matches. (%6.2f%)\n",
42              numberOfWords*numberOfFonts,
43              (float)(numberOfWords*numberOfFonts)/(float)starCount);
44      fprintf(stdout,"There were %d correctly matched words out of %d. (%6.2f%)\n",
45              correctCount,numberOfWords*numberOfFonts,
46              (float)correctCount/(float)numberOfWords/numberOfFonts);
47    }
48
49    void main(int argc,char **argv)
50    {
51      char *listFile;
52      Dictionary models;
53      char *modelName;
54      int numberOfFonts;
55      Dictionary fonts[MAX_FONTS];
56      char *fontNames[MAX_FONTS];
57      char *wordNames[MAX_WORDS];
58      int numberOfWords;
59      float centerWeight;
60      int normalBandWidth;
61      BOOLEAN
        lengthNormalize,useL2,slopeConstrain,warp,topToBottomOption,hillToValleyOption;
62      BOOLEAN separate;
63      float topToBottom,hillToValleyLocal;
64      FILE *listfp;
65      int i,x,y;
66      DiffDescriptorBody dd;
67
68      centerWeight = 1.0;
69      normalBandWidth = 20;
70      topToBottom = 1.0;
71      hillToValleyLocal = 1.0;
72      DefArg("%s","listFile",&listFile);
73      DefOption("-L2","-L2",&useL2);
74      DefOption("-slopeConstrain %f","-slopeConstrain <center weight>",
75              &slopeConstrain,&centerWeight);
76      DefOption("-warp %f %d","-warp <center weight> <band width>",
77              &warp,&centerWeight,&normalBandWidth);
78      DefOption("-separate","-separate",&separate);
79      DefOption("-normalize","-normalize",&lengthNormalize);
80      DefOption("-topToBottom %f","-topToBottom
        <ratio>",&topToBottomOption,&topToBottom);
81      DefOption("-hillToValley %f","-hillToValley
```

```
             <ratio>",&hillToValleyOption,&hillToValleyLocal);
82           ScanArgs(argc,argv);
83
84           if ((listfp = fopen(listFile,"r"))==NULL)
85             DoError("Error opening file %s.\n",listFile);
86
87           /* Read in the number of words in each dictionary */
88           numberOfWords = ReadInt(listfp);
89           if (numberOfWords > MAX_WORDS)
90             DoError("%s: too many words.\n",argv[0]);
91
92           /* Read in the words */
93           for (i=0;i<numberOfWords;++i) {
94             wordNames[i] = ReadString(listfp);
95           }
96
97           /* Read in the model dictionary */
98           modelName = ReadString(listfp);
99           models = ReadDictionary(modelName);
100
101          /* Read in the number of dictionaries */
102          numberOfFonts = ReadInt(listfp);
103          if (numberOfFonts > MAX_FONTS)
104            DoError("%s: too many dictionaries.\n",argv[0]);
105
106          /* Read in the dictionaries and their names */
107          for (i=0;i<numberOfFonts;++i) {
108            fontNames[i] = ReadString(listfp);
109            fonts[i] = ReadDictionary(fontNames[i]);
110          }
111
112          /* Check to see that all dictionaries have the same number of shapes as the specified number
             of words. */
113          for (i=1;i<numberOfFonts;++i)
114            if (fonts[i]->numberOfEntries < numberOfWords)
115              DoError("Dictionary %s has too few entries.\n",fontNames[i]);
116          if (models->numberOfEntries < numberOfWords)
117            DoError("Model dictionary has too few of entries.\n",NULL);
118
119
120          if (useL2) {
121            fprintf(stdout,"Using L2 on length normalized shapes.\n");
122            dd.diffType = L2;
123          }
124          else if (slopeConstrain) {
125            fprintf(stdout,"Using dynamic time warping with slope contrained to [0.5,2].\n");
126            dd.diffType = CONSTRAINED;
127            dd.separate = separate;
128            if (separate)
129              fprintf(stdout,"Top and bottom warped separately.\n");
130            else
131              fprintf(stdout,"Top and bottom warped together.\n");
132          }
133          else {
134            fprintf(stdout,"Using dynamic time warping with bandwidth %d.\n",normalBandWidth);
135            dd.diffType = WARP;
136            dd.bandWidth = normalBandWidth;
137            dd.separate = separate;
```

```
138         if (separate)
139            fprintf(stdout,"Top and bottom warped separately.\n");
140         else
141            fprintf(stdout,"Top and bottom warped together.\n");
142       }
143       if (!useL2) {
144         fprintf(stdout,"Center weight = %f.\n",centerWeight);
145         dd.centerWeight = centerWeight;
146         if (lengthNormalize) {
147            dd.lengthNormalize = TRUE;
148            fprintf(stdout,"Scores normalized by signal length.\n");
149         }
150         else
151            dd.lengthNormalize = FALSE;
152       }
153       dd.hillToValley = hillToValleyLocal;
154       dd.topToBottom = topToBottom;
155       dd.pathFP = NULL;
156
157       fprintf(stdout,"Words:\n");
158       for (i=0;i<numberOfWords;++i)
159          fprintf(stdout,"%d: %s\n",i,wordNames[i]);
160       fprintf(stdout,"\n");
161       fprintf(stdout,"Model font is %s.\n",modelName);
162       fprintf(stdout,"Fonts:\n");
163       for (i=0;i<numberOfFonts;++i)
164          fprintf(stdout,"%d: %s\n",i,fontNames[i]);
165       fprintf(stdout,"\n");
166
167
          PrintDescriptors(models,modelName,wordNames,numberOfFonts,fonts,fontNames,numberOfWords,&dd);
168       }
```

Jul 26 13:48 1991 descriptors.c

```
1      #include <stdio.h>
2      #include "mylib.h"
3      #include "types.h"
4      #include "dict.h"
5      #include "diff.h"
6      #include "misc.h"
7      #include "descriptors.h"
8
9      typedef struct {
10        float score;
11        int word;
12     } *CompareTuple,CompareTupleBody;
13
14     int TupleLessThan(CompareTuple x,CompareTuple y)
15     {
16       if (x->score == y->score)
17          return 0;
18       else if (x->score < y->score)
19          return -1;
20       else
```

```
21        return 1;
22      }
23
24      int CompareDescriptorElements(Descriptor x,Descriptor y)
25      {
26       if (*x = = *y)
27         return 0;
28       else if (*x < *y)
29         return -1;
30       else
31         return 1;
32      }
33
34      Descriptor ComputeDescriptor(int modelIndex,Dictionary models,Dictionary thisFont,int numberOfWords,
35                              DiffDescriptor dd)
36      {
37       DescriptorElement descriptor[MAX_WORDS+1];
38       CompareTupleBody results[MAX_WORDS];
39       int i;
40
41       for (i=0;i<numberOfWords;++i) {
42         results[i].score =
      DiffPair(*(models->outlines+modelIndex),*(thisFont->outlines+i),dd);
43         results[i].word = i;
44       }
45       qsort(results,thisFont->numberOfEntries,sizeof(CompareTupleBody),TupleLessThan);
46       for (i=0;i<numberOfWords;++i) {
47         descriptor[i] = results[i].word+1;  /* Descriptor values are one greater than word indices */
48         if (results[i].word == modelIndex) {
49           ++i;
50           break;
51         }
52       }
53       descriptor[i] = '\0';
54       qsort(descriptor,i,sizeof(DescriptorElement),CompareDescriptorElements);
55       return (Descriptor)strdup((char *)descriptor);
56      }
57
58      void PrintField(char *s,int w)
59      {
60       int i,l;
61       printf("%s",s);
62       l = w-strlen(s);
63       for (i=0;i<l;++i)
64         printf(" ");
65      }
66
67      void PrintDescriptor(Descriptor d,int *starCount,int *correctCount)
68      {
69       int i=1;       /* Descriptor values are one greater than word indices */
70       int temp;
71       temp = *starCount;
72       if (*d == '\0') {
73         printf("*");
74         ++*starCount;
```

```
75      }
76      while (*d != '\0') {
77       while (i++ < *d)
78         printf(" ");
79       printf("*");
80       ++*starCount;
81       d++;
82      }
83      if (*starCount-temp == 1)
84        ++*correctCount;
85    }
86
87    void PrintWords(char **words,int numberOfWords)
88    {
89     int lengths[MAX_WORDS];
90     int i,j;
91     int maxLength = 0;
92
93     maxLength = 0;
94     for (i=0;i<numberOfWords;++i) {
95      lengths[i] = strlen(words[i]);
96      if (lengths[i] > maxLength)
97        maxLength = lengths[i];
98     }
99
100    for (j=0;j<maxLength;++j) {
101     printf("            ");
102     for (i=0;i<numberOfWords;++i)
103      if (j<lengths[i])
104          printf("%c",*(words[i]+j));
105     else
106          printf(" ");
107     printf("\n");
108    }
109   }
110
111
```

Jul 31 17:11 1991 diff2.c

```
1     #include <stdio.h>
2     #include "boolean.h"
3     #include "types.h"
4     #include "error.h"
5     #include "pict.h"
6     #include "dict.h"
7     #include "diff.h"
8     #include "newMatch.h"
9
10
11    extern double fabs(double);
12
13    /* Dynamic programming version of DiffPair */
14    inline float DiffPair(OutlinePair one, OutlinePair two,
15                    DiffDescriptor dd)
16    {
```

```
17        hillToValley = dd->hillToValley;
18        if ((dd->separate)&&(dd->pathFP!=NULL))
19          DoError("DiffPair: separate cannot be used with pathfile option.\n",NULL);
20        switch (dd->diffType) {
21        case CONSTRAINED:
22          if (dd->pathFP != NULL)
23            return SlopeCMatchAndPath(one->top,one->bottom,one->numberOfLegs,
24                            two->top,two->bottom,two->numberOfLegs,
25                            dd->centerWeight,dd->lengthNormalize,dd->topToBottom,
26                            dd->pathFP);
27          else
28            if (dd->separate)
29              return
                  SepSlopeCMatch(one->top,one->numberOfLegs,two->top,two->numberOfLegs,
30                        dd->centerWeight,dd->lengthNormalize)*dd->topToBottom +
31
                  SepSlopeCMatch(one->bottom,one->numberOfLegs,two->bottom,two->numberOfLegs,
32                        dd->centerWeight,dd->lengthNormalize);
33            else
34              return SlopeCMatch(one->top,one->bottom,one->numberOfLegs,
35                            two->top,two->bottom,two->numberOfLegs,
36                            dd->centerWeight,dd->lengthNormalize,dd->topToBottom);
37          break;
38        case L2:
39          if (dd->pathFP != NULL)
40            DoError("DiffPair: L2 does not support path computation.\n",NULL);
41          else
42            return L2Compare(one,two,dd->topToBottom);
43          break;
44        case WARP:
45          if (dd->pathFP != NULL)
46            return NewMatchAndPath(one->top,one->bottom,one->numberOfLegs,
47                            two->top,two->bottom,two->numberOfLegs,
48                            dd->centerWeight,dd->lengthNormalize,dd->bandWidth,
49                            dd->topToBottom,
50                            dd->pathFP);
51          else
52            if (dd->separate)
53              return SepMatch(one->top,one->numberOfLegs,two->top,two->numberOfLegs,
54
                        dd->centerWeight,dd->lengthNormalize,dd->bandWidth)*dd->topToBottom +
55
                  SepMatch(one->bottom,one->numberOfLegs,two->bottom,two->numberOfLegs,
56                        dd->centerWeight,dd->lengthNormalize,dd->bandWidth);
57            else
58              return
                  NewMatch(one->top,one->bottom,one->numberOfLegs,two->top,two->bottom,
                        two->numberOfLegs,
59                            dd->centerWeight,dd->lengthNormalize,dd->bandWidth,
60                            dd->topToBottom);
61          break;
62        default:
63          DoError("DiffPair: internal error.\n",NULL);
64        }
65      }
```

```
66
67   #ifdef foo
68   inline float DiffPairAndPath(OutlinePair one, OutlinePair two,
69                   float centerWeight,BOOLEAN lengthNormalize,int
                     normalBandWidth,
70                   char *filename,BOOLEAN doPath)
71   {
72    FILE *fp;
73    float score;
74    if ((fp=fopen(filename,"w"))==NULL)
75     DoError("DiffPairAndMatch: error opening output file %s.\n",filename);
76    score = NewMatchAndPath(one->top,one->bottom,one->numberOfLegs,
77                   two->top,two->bottom,two->numberOfLegs,
78                   centerWeight,lengthNormalize,normalBandWidth,
79                   fp,doPath);
80    fclose(fp);
81    return score;
82   }
83   #endif
84
85   BOOLEAN IsSymmetric(Picture pict)
86   {
87    int x,y;
88    float maxDiff = 0;
89    for (y=0;y<pict->height;++y)
90     for (x=0;x<pict->width;++x) {
91      float temp = fabs (*((float *)(pict->data)+pict->width*y+x) -
92                   *((float *)(pict->data)+pict->width*x+y));
93      if (temp > maxDiff)
94        maxDiff = temp;
95     }
96    fprintf(stderr,"maxDiff = %f.\n",maxDiff);
97    if (maxDiff > 0.01)
98     return FALSE;
99    return TRUE;
100  }
101
102  /* Given the names of two dictionary files, compute the squared difference
103   * between every pair of shapes in the cross product of the dictionaries.
104   * The result is a matrix printed to stdout. The width and height are
105   * followed by the matrix entries in row major order. The output is in
106   * ascii to facilitate reading by a Symbolics. */
107  Picture CompareDictionaries(Dictionary dict1, Dictionary dict2,DiffDescriptor dd)
108  {
109   Picture pict;
110   int x,y;
111   pict = new_pict(dict2->numberOfEntries,
112             dict1->numberOfEntries,
113             32);
114
115   for (y=0;y<pict->height;++y)
116    for (x=0;x<pict->width;++x) {
117     /* for output files when printing and match */
118     printf("---> (%d,%d) <---\n",y,x);
119     *((float *)(pict->data)+pict->width*y+x) =
120       DiffPair(*(dict1->outlines+y),
121            *(dict2->outlines+x),
```

```
122              dd);
123          }
124       if (!IsSymmetric(pict))
125          fprintf(stderr,"Matrix is not symmetric.\n");
126       return pict;
127    }
128
129    void WritePictureAsAscii(Picture pict,char *filename,
130                             char *info1, char *info2)
131    {
132      FILE *fp;
133      int x,y;
134      int count;
135
136      if ((fp = fopen(filename,"w"))==NULL)
137         DoError("WritePictureAsAscii: error opening output file\n",NULL);
138      fprintf(fp,"%s\n",info1);
139      fprintf(fp,"%s\n",info2);
140      fprintf(fp,"#\n");
141      fprintf(fp,"%d\n%d\n",pict->width,pict->height);
142      fprintf(fp, "%3s ", "");
143      for (x = 0; x < pict->width; x++)
144         fprintf(fp,"%7d ", x);
145      fprintf(fp, "\n");
146      for (y=0;y<pict->height; ++y) {
147        fprintf(fp, " %3d ", y);
148        count = 1;
149        for (x=0;x<pict->width; ++x) {
150          fprintf(fp,"%7.3f ",*(((float *)pict->data)++));
151  /*      if ((pict->width > 10) && (!((count++)%10)))
152            fprintf(fp,"\n");
153  */    }
154      fprintf(fp, "\n");
155      }
156      fclose(fp);
157    }
```

Jul 22 15:21 1991 dmain.c

```
1     #include <stdio.h>
2     #include <math.h>
3     #include <values.h>
4     #include "boolean.h"
5     #include "types.h"
6     #include "pict.h"
7     #include "dict.h"
8     #include "diff.h"
9     #include "match.h"
10    #include "matchparallel.h"
11
12
13    void main(int argc,char **argv)
14    {
15      Picture pict;
16      char *infile1,*infile2,*outfile,*format;
17      Dictionary dict1,dict2;
```

```
18
19      if (argc != 5) {
20        printf("Usage:\n");
21        printf("  %s infile1 infile2 outfile format\n",argv[0]);
22        printf("  where format is either ascii or pict.\n");
23        exit(-1);
24      }
25
26      infile1 = argv[1];
27      infile2 = argv[2];
28      outfile = argv[3];
29      format = argv[4];
30
31      dict1 = ReadDictionary(infile1);
32      dict2 = ReadDictionary(infile2);
33      pict = CompareDictionaries(dict1,dict2,1,TRUE,20,FALSE);
34      if (!strcmp(format,"pict"))
35        write_pict(outfile,pict);
36      else
37        WritePictureAsAscii(pict,outfile,dict1->infoString,dict2->infoString);
38    }
```

Aug 15 20:20 1991 drawBlobs.c

```
1     #include <stdio.h>
2     #include "mylib.h"
3     #include "types.h"
4     #include "dict.h"
5
6     #define WIDTH (800)
7     #define H_MARGIN (20)
8     #define V_MARGIN (60)
9     #define H_SPACING (20)
10    #define V_SPACING (150) /* Must be greater than 2*X_HEIGHT */
11    #define X_HEIGHT (17)
12
13    extern int irint(double);
14
15    void DrawVLine(Picture pict,int x,int yt,int yb)
16    {
17      int i;
18      for (i=yt;i<yb;++i)
19        WritePixel(pict,x,i,1);
20    }
21
22    void DrawOutline(Picture pict,OutlinePair o,int x,int y)
23    {
24      int i,top,bottom;
25      for (i=0;i<o->numberOfLegs;++i) {
26        top = irint(-*(o->top+i)*X_HEIGHT);
27        bottom = irint(*(o->bottom+i)*X_HEIGHT+X_HEIGHT);
28        DrawVLine(pict,i+x,top+y,bottom+y);
29      }
30    }
31
32    int main(int argc,char **argv)
```

```
33      {
34        char *infile,*outfile;
35        Dictionary dict;
36        Picture pict;
37        int i,totalLegs,totalLines;
38        int x,y,newX;
39
40        DefArg("%s %s","infile outfile",&infile,&outfile);
41        ScanArgs(argc,argv);
42
43        dict = ReadDictionary(infile);
44
45        for (i=0,totalLegs=H_MARGIN,totalLines=V_MARGIN;i<dict->numberOfEntries;++i) {
46         OutlinePair thisOutline = *(dict->outlines+i);
47         totalLegs += thisOutline->numberOfLegs + H_SPACING;
48         if (totalLegs > WIDTH) {
49          totalLines += V_SPACING;
50          totalLegs = H_MARGIN + thisOutline->numberOfLegs + H_SPACING;
51          if (totalLegs > WIDTH)
52             DoError("%s: Shape is too wide.\n",argv[0]);
53         }
54        }
55
56        pict = new_pict(WIDTH,totalLines+V_MARGIN*2,1);
57
58        for (i=0,x=H_MARGIN,y=V_MARGIN;i<dict->numberOfEntries;++i) {
59         OutlinePair thisOutline = *(dict->outlines+i);
60
61         newX = x + thisOutline->numberOfLegs + H_SPACING;
62         if (newX > WIDTH) {
63          newX = H_MARGIN+thisOutline->numberOfLegs+H_SPACING;
64          x = H_MARGIN;
65          y += V_SPACING;
66         }
67
68         DrawOutline(pict,*(dict->outlines+i),x,y);
69
70         x = newX;
71        }
72
73        write_pict(outfile,pict);
74      }
```

Jul 26 16:47 1991 equiv.c

```
1       #include <stdio.h>
2       #include "mylib.h"
3       #include "types.h"
4       #include "dict.h"
5       #include "diff.h"
6       #include "descriptors.h"
7
8       void PrintEquivalenceClasses(int numberOfWords,char **wordNames,
9                       int numberOfFonts,Dictionary fonts[],char **fontNames,
10                      DiffDescriptor dd)
11      {
```

```
12        Descriptor descriptors[MAX_FONTS*MAX_FONTS];
13        int matchesWord[MAX_WORDS];
14        int word,font1,font2,i;
15        int totalDifferent,totalWords;
16        int numberOfPairs;
17
18        for (word=0;word<numberOfWords;++word) {
19         for (font1=0,numberOfPairs=0;font1<numberOfFonts;++font1)
20          for (font2=0;font2<font1;++font2)
21             descriptors[numberOfPairs++] = ComputeDescriptor(word,fonts[font1],
22                                     fonts[font2],numberOfWords,dd);
23         for (i=0;i<numberOfWords;++i)
24           matchesWord[i] = 0;
25         for (i=0;i<numberOfPairs;++i) {
26          Descriptor p;
27          p = descriptors[i];
28          while (*p!='\0')
29              matchesWord[*p++ - 1]++;
30         }
31         for (i=0,totalDifferent=0,totalWords=0;i<numberOfWords;++i) {
32          if (matchesWord[i])
33              ++totalDifferent;
34          totalWords += matchesWord[i];
35         }
36         printf("%20s:\t\t%6d %6.2f %6d %6.2f\n",wordNames[word],totalWords,
37              (float)totalWords/numberOfPairs,totalDifferent,
38              (float)totalDifferent/(float)totalWords*numberOfPairs);
39         fprintf(stderr,"%20s:\t\t%6d %6.2f %6d %6.2f\n",wordNames[word],totalWords,
40              (float)totalWords/numberOfPairs,totalDifferent,
41              (float)totalDifferent/(float)totalWords*numberOfPairs);
42        }
43       }
44
45
46       void main(int argc,char **argv)
47       {
48        char *listFile;
49        int numberOfFonts;
50        Dictionary fonts[MAX_FONTS];
51        char *fontNames[MAX_FONTS];
52        char *wordNames[MAX_WORDS];
53        int numberOfWords;
54        float centerWeight;
55        int normalBandWidth;
56        BOOLEAN
lengthNormalize,useL2,slopeConstrain,warp,topToBottomOption,hillToValleyOption;
57        float topToBottom,hillToValleyLocal;
58        FILE *listfp;
59        int i,x,y;
60        DiffDescriptorBody dd;
61
62        centerWeight = 1.0;
63        normalBandWidth = 20;
64        topToBottom = 1.0;
65        hillToValleyLocal = 1.0;
66        DefArg("%s","listFile",&listFile);
67        DefOption("-L2","-L2",&useL2);
```

```
 68     DefOption("-slopeConstrain %f","-slopeConstrain <center weight>",
 69             &slopeConstrain,&centerWeight);
 70     DefOption("-warp %f %d","-warp <center weight> <band width>",
 71             &warp,&centerWeight,&normalBandWidth);
 72     DefOption("-normalize","-normalize",&lengthNormalize);
 73     DefOption("-topToBottom %f","-topToBottom
            <ratio>",&topToBottomOption,&topToBottom);
 74     DefOption("-hillToValley %f","-hillToValley
            <ratio>",&hillToValleyOption,&hillToValleyLocal);
 75     ScanArgs(argc,argv);
 76
 77     if ((listfp = fopen(listFile,"r"))==NULL)
 78       DoError("Error opening file %s.\n",listFile);
 79
 80     /* Read in the number of words in each dictionary */
 81     numberOfWords = ReadInt(listfp);
 82     if (numberOfWords > MAX_WORDS)
 83       DoError("%s: too many words.\n",argv[0]);
 84
 85     /* Read in the words */
 86     for (i=0;i<numberOfWords;++i) {
 87       wordNames[i] = ReadString(listfp);
 88     }
 89
 90     /* Read in the number of dictionaries */
 91     numberOfFonts = ReadInt(listfp);
 92     if (numberOfFonts > MAX_FONTS)
 93       DoError("%s: too many dictionaries.\n",argv[0]);
 94
 95     /* Read in the dictionaries and their names */
 96     for (i=0;i<numberOfFonts;++i) {
 97       fontNames[i] = ReadString(listfp);
 98       fonts[i] = ReadDictionary(fontNames[i]);
 99     }
100
101     /* Check to see that all dictionaries have the same number of shapes as the specified number
        of words. */
102     for (i=1;i<numberOfFonts;++i)
103       if (fonts[i]->numberOfEntries < numberOfWords)
104         DoError("Dictionary %s has too few entries.\n",fontNames[i]);
105
106     if (useL2) {
107       printf("Using L2 on length normalized shapes.\n");
108       dd.diffType = L2;
109     }
110     else if (slopeConstrain) {
111       printf("Using dynamic time warping with slope contrained to [0.5,2].\n");
112       dd.diffType = CONSTRAINED;
113     }
114     else {
115       printf("Using dynamic time warping with bandwidth %d.\n",normalBandWidth);
116       dd.diffType = WARP;
117       dd.bandWidth = normalBandWidth;
118     }
119     if (!useL2) {
120       printf("Center weight = %f.\n",centerWeight);
121       dd.centerWeight = centerWeight;
```

```
122        if (lengthNormalize) {
123          dd.lengthNormalize = TRUE;
124          printf("Scores normalized by signal length.\n");
125        }
126        else
127          dd.lengthNormalize = FALSE;
128      }
129      dd.hillToValley = hillToValleyLocal;
130      dd.topToBottom = topToBottom;
131      dd.pathFP = NULL;
132
133      printf("Fonts:\n");
134      for (i=0;i<numberOfFonts;++i)
135        printf("%d: %s\n",i,fontNames[i]);
136      printf("\n");
137
138
         PrintEquivalenceClasses(numberOfWords,wordNames,numberOfFonts,fonts,fontNames,&dd);
139    }
140
141
142
143
144
145
146
```

Jul 3 14:31 1991 extract.c

```
1      #include <stdio.h>
2      #include <math.h>
3      #include <values.h>
4      #include "boolean.h"
5      #include "types.h"
6      #include "dict.h"
7
8      #define MAX_STRING_LEN 100
9      int ReadInt(FILE *fp)
10     {
11       char s[MAX_STRING_LEN];
12       int x;
13
14       fgets(s,MAX_STRING_LEN,fp);
15       while (sscanf(s,"%d",&x)!=1)
16         fprintf(stderr,"ReadInt: integer expected - reenter.\n");
17       return x;
18     }
19
20     void main(int argc,char **argv)
21     {
22       char *infile,*listFile,*outfile;
23       Dictionary dict1,dict2;
24       int i;
25       int numberOfEntries;
26       FILE *fp;
27
```

```
28      if (argc != 4) {
29        printf("Usage:\n");
30        printf("   %s infile listfile outfile\n",argv[0]);
31        exit(-1);
32      }
33
34      infile = argv[1];
35      listFile = argv[2];
36      outfile = argv[3];
37
38      dict1 = ReadDictionary(infile);
39
40      if ((fp=fopen(listFile,"r"))==NULL)
41        DoError("%s: error reading list file.\n",argv[0]);
42
43      numberOfEntries = ReadInt(fp);
44      if (numberOfEntries < 0)
45        DoError("%s: list file must have a positive number of elements.\n",argv[0]);
46      printf("Copying %d shapes.\n",numberOfEntries);
47
48      dict2 = NewDict(numberOfEntries);
49
50      dict2->infoString = dict1->infoString;
51      for (i=0;i<numberOfEntries;++i) {
52        int shape;
53        shape = ReadInt(fp);
54        if ((shape<0)||(shape>=dict1->numberOfEntries))
55          DoError("%s: bad shape index.\n",argv[0]);
56        *(dict2->outlines+i) = *(dict1->outlines+shape);
57        *(dict2->rawOutlines+i) = *(dict1->rawOutlines+shape);
58      }
59      fclose(fp);
60      WriteDictionary(dict2,outfile);
61
62    }
```

Jun 14 16:12 1991 l2Norm.c

```
1     #include <stdio.h>
2     #include <values.h>
3     #include <string.h>
4     #include "boolean.h"
5     #include "types.h"
6     #include "error.h"
7     #include "dict.h"
8
9     float L2Norm(OutlinePair signal, int startOffset,
10                 OutlinePair model)
11    {
12      float *top1,*top2,*bottom1,*bottom2;
13      int i,overlap;
14      float sum;
15      float temp;
16
17      if ((startOffset < 0) ||
```

```
18        (startOffset + model->numberOfLegs > signal->numberOfLegs))
19          DoError("L2Norm: the model must overlap the signal.\n",NULL);
20
21        top1 = signal->top+startOffset;
22        top2 = model->top;
23        bottom1 = signal->bottom+startOffset;
24        bottom2 = model->bottom;
25
26        overlap = signal->numberOfLegs - startOffset;
27        if (overlap > model->numberOfLegs)
28         overlap = model->numberOfLegs;
29
30        for (i=0,sum=0;i<overlap;++i) {
31         temp = *top1++ - *top2++;
32         sum += temp * temp;
33         temp = *bottom1++ - *bottom2++;
34         sum += temp * temp;
35        }
36
37        return sum;
38       }
39
40       OutlinePair LookupShape(char c, Dictionary models)
41       {
42       /* dictionary file has the following order:
43         ABCDEFGHIJKLMNOPQRSTUVWXYZ
44         abcdefghijklmnopqrstuvwxyz
45         0123456789
46         ,.
47       */
48        int shapeIndex;
49        if ((c>='a'&&c<='z'))
50         shapeIndex = c-'a';
51        else if (c == ',')
52         shapeIndex = 26;
53        else if (c == '.')
54         shapeIndex = 27;
55        else
56         DoError("LookupShape: have no shape one of the characters.\n",NULL);
57        return *(models->outlines+shapeIndex);
58       }
59
60
61       #define MAX_STRING_LENGTH 30
62       #define MAX_SHIFT 10
63       #define MAX_OVERLAP 5
64       float L2CompareWithString(OutlinePair signal, char *string,
65                                 Dictionary models)
66       {
67        float *costMatrix;
68        int *pathMatrix;
69        int numberOfChars;
70        int letterIndex, startOffset;
71        float *cursor;
72        int left;
73        int right;
74        OutlinePair modelShapes[MAX_STRING_LENGTH];
```

```
75      char *charCursor;
76      float minValue;
77      float temp;
78      int i,oldLeft,oldRight,minIndex;;
79
80      /* Make sure input string is not too long. */
81      numberOfChars = strlen(string);
82      if (numberOfChars >= MAX_STRING_LENGTH)
83        DoError("L2CompareWithString: string is too long.\n",NULL);
84
85      /* Allocate space for dynamic programming array. */
86      /* For now, be a space hog. */
87      costMatrix = (float *)calloc(signal->numberOfLegs*numberOfChars,
88                          sizeof(float));
89      pathMatrix = (int *)calloc(signal->numberOfLegs*numberOfChars,
90                          sizeof(int));
91      if ((costMatrix == NULL)||(pathMatrix == NULL))
92        DoError("L2CompareWithString: cannot allocate space.\n",NULL);
93
94      /* Lookup the shapes corresponding to the characters in the string. */
95      charCursor = string;
96      for (i=0;i<numberOfChars;++i)
97        modelShapes[i]=LookupShape(*charCursor++,models);
98
99      /* Since the cost matrix is larger than the region containing valid
100      * alignments, first fill in the array with large costs. Later, some
101      * of these will be overwritten. */
102     cursor = costMatrix;
103     for (i=0;i<signal->numberOfLegs*numberOfChars;++i)
104       *cursor++ = MAXFLOAT;
105
106     /* Fill in leftmost column */
107     left = 0;
108     right = MAX_SHIFT;
109     for (startOffset=left;startOffset<right;++startOffset)
110       if (startOffset + modelShapes[0]->numberOfLegs <=
111           signal->numberOfLegs)
112         *(costMatrix+startOffset*numberOfChars) =
113            L2Norm(signal, startOffset, modelShapes[0]);
114
115     /* Now do the rest of the columns */
116     for (letterIndex = 1; letterIndex < numberOfChars; ++letterIndex) {
117       oldLeft = left;
118       oldRight = right;
119       left += modelShapes[letterIndex-1]->numberOfLegs;
120       right += modelShapes[letterIndex-1]->numberOfLegs + MAX_SHIFT;
121       for (startOffset=left;startOffset<right;++startOffset) {
122         if (startOffset + modelShapes[letterIndex]->numberOfLegs <=
123             signal->numberOfLegs) {
124           temp = L2Norm(signal, startOffset, modelShapes[letterIndex]);
125
126     /* This could be made quite a bit faster since for each start offset,
127     * we just add an element to the set we are minimizing over. */
128           minValue = MAXFLOAT;
129     /* *(costMatrix+oldLeft*numberOfChars+letterIndex-1); */
130           minIndex = oldLeft;
131           for (i=oldLeft;(i<oldRight)&&(i<startOffset);++i) {
132             float temp2;
```

```
133            temp2 = *(costMatrix+i*numberOfChars+letterIndex-1);
134            if (temp2 < minValue) {
135          minIndex = i;
136            minValue = temp2;
137          }
138        }
139      *(costMatrix+startOffset*numberOfChars+letterIndex) =
140          minValue + temp;
141      *(pathMatrix+startOffset*numberOfChars+letterIndex) =
142          minIndex;
143    } /* End of if */
144
145    } /* for startOffset */
146   } /* for letterIndex */
147
148   /* Now that all the costs have been filled in, find the cheapest */
149   if (right-1+modelShapes[numberOfChars-1]->numberOfLegs+MAX_SHIFT <
150      signal->numberOfLegs)
151   /* In this case, the chain of letter shapes does not span the signal. */
152     minValue = MAXFLOAT;
153   else {
154    minValue = MAXFLOAT;
155    minIndex = left;
156    for (i=left;(i<right)&&(i<signal->numberOfLegs);++i) {
157     float temp2;
158     temp2 = *(costMatrix+i*numberOfChars+numberOfChars-1);
159     if (temp2 < minValue) {
160         minIndex = i;
161         minValue = temp2;
162     }
163    }
164   }
165
166   free(costMatrix);
167   free(pathMatrix);
168   return minValue;
169  }
170
171  void PrintPath(int *pm, int width, int height, int index)
172  {
173   int i;
174   for (i=width-1;i>=0;--i) {
175    printf("%d ",index);
176    index = *(pm+index*width+i);
177   }
178   printf("\n");
179  }
180
181  void PrintMatrix(float *m,int width, int height)
182  {
183   int i;
184   int j;
185   for (i=0;i<height;++i) {
186    printf("%d: ",i);
187    for (j=0;j<width;++j)
188     printf("%6.2e ",*m++);
189    printf("\n");
```

```
190       }
191     }
192
193     typedef struct CTuple {
194       int index;
195       float value;
196     } CompareTuple;
197
198     int TupleLessThan(CompareTuple *t1, CompareTuple *t2)
199     {
200       return t1->value > t2->value;
201     }
202
203     void L2CompareDictToString(Dictionary unknownDict,
204                     char *string,
205                     Dictionary modelDict,
206                     BOOLEAN isBatch)
207     {
208       CompareTuple *results;
209       int i;
210
211       if ((results = (CompareTuple *)calloc(unknownDict->numberOfEntries,
212                              sizeof(CompareTuple))) ==
213         NULL)
214       DoError("L2CompareDictToString: cannot allocate space.\n",NULL);
215
216       for (i=0;i<unknownDict->numberOfEntries;++i) {
217         (*(results+i)).index = i;
218         (*(results+i)).value = L2CompareWithString(*(unknownDict->outlines+i),
219                                 string,
220                                 modelDict);
221       }
222
223       qsort(results,
224             unknownDict->numberOfEntries,
225             sizeof(CompareTuple),
226             TupleLessThan);
227
228       if (isBatch) {
229         printf("%d(%f)\n",(*results).index,(*results).value);
230       }
231       else {
232         printf("\n");
233         for (i=0;(i<5)&&(i<unknownDict->numberOfEntries);++i)
234           printf("%d: %f\n",(*(results+i)).index,(*(results+i)).value);
235         printf("\n");
236       }
237
238       free(results);
239     }
240
241     void main(int argc,char **argv)
242     {
243       char *unknowns,*models;
244       char s[MAX_STRING_LENGTH+1];
245       Dictionary unknownDict, modelDict;
246       int selection;
```

```
247     char *crPointer;
248     BOOLEAN done = FALSE;
249     BOOLEAN batch;
250     char *words;
251
252     if (argc != 3 && argc != 4) {
253      printf("Usage:\n");
254      printf(" %s <unknowns> <alphabet> [<batch wordlist>]\n",argv[0]);
255      printf(" If the batch file is not specified, the program runs\n");
256      printf(" in interactive mode.\n");
257      exit(-1);
258     }
259
260     unknowns = argv[1];
261     models = argv[2];
262     if (argc == 4) {
263      batch = TRUE;
264      words = argv[3];
265     } else
266      batch = FALSE;
267
268     unknownDict = ReadDictionary(unknowns);
269     modelDict = ReadDictionary(models);
270
271     if (batch) {
272      FILE *fp;
273      if ((fp = fopen(words,"r"))==NULL)
274       DoError("l2Norm: can't open input file %s.\n",words);
275      while (!done) {
276       fgets(s,MAX_STRING_LENGTH,fp);
277       if ((s[0] == '\0') || (s[0] == '\n'))
278           done = TRUE;
279       else {
280           crPointer = strchr(s,'\n');
281           if (crPointer != NULL)
282            *crPointer = '\0';
283           printf("%s: ",s);
284           L2CompareDictToString(unknownDict,s,modelDict,TRUE);
285       }
286      }
287     }
288     else {
289      while (!done) {
290       printf("Enter a word to search for: ");
291       fgets(s,MAX_STRING_LENGTH,stdin);
292       if ((s[0] == '\0') || (s[0] == '\n'))
293           done = TRUE;
294       else {
295           crPointer = strchr(s,'\n');
296           if (crPointer != NULL)
297            *crPointer = '\0';
298           printf("Comparing shape %s to the image\n",s);
299           L2CompareDictToString(unknownDict,s,modelDict,FALSE);
300       }
301      }
302     }
303    }
304
```

```
Jun 18 17:00 1991 l2Norm2.c

1      #include <stdio.h>
2      #include <values.h>
3      #include <string.h>
4      #include "boolean.h"
5      #include "types.h"
6      #include "error.h"
7      #include "dict.h"
8
9      #define MAX_STRING_LENGTH 30
10     #define MAX_SIGNAL_LENGTH 300
11     #define MAX_SHIFT 10
12
13     #define MIN(a,b) ((a)<(b)?(a):(b))
14     #define MAX(a,b) ((a)>(b)?(a):(b))
15
16     typedef struct {
17      int numberOfSymbols;
18      int signalLength;
19      float *costs;
20     } *CorrelationSet,CorrelationSetBody;
21
22     CorrelationSet NewCorrelationSet(int numberOfSymbols,int signalLength)
23     {
24      CorrelationSet temp;
25      if ((temp = (CorrelationSet)calloc(1,sizeof(CorrelationSetBody)))==NULL)
26       DoError("NewCorrelationSet: cannot allocate space.\n",NULL);
27      temp->numberOfSymbols = numberOfSymbols;
28      temp->signalLength = signalLength;
29      if ((temp->costs = (float *)calloc(numberOfSymbols*signalLength,sizeof(float)))==NULL)
30       DoError("NewCorrelationSet: cannot allocate space.\n",NULL);
31      return temp;
32     }
33
34     #ifdef foo
35     float CorrelationValue(CorrelationSet c,int symbol,int offset)
36     {
37      return *(c->costs+symbol*c->signalLength+offset);
38     }
39
40     void SetCorrelationValue(CorrelationSet c,int symbol,int offset,float value)
41     {
42      *(c->costs+symbol*c->signalLength+offset) = value;
43     }
44     #endif
45     #define CorrelationValue(c,s,o) (*((c)->costs+(s)*(c)->signalLength+(o)))
46     #define SetCorrelationValue(c,s,o,v) (*((c)->costs+(s)*(c)->signalLength+(o))=(v))
47
48     int CorrelationSetSize(CorrelationSet c)
49     {
50      return c->numberOfSymbols;
51     }
52
53     int CorrelationSetWidth(CorrelationSet c)
54     {
55      return c->signalLength;
```

```
56      }
57
58      void PrintCorrelation(CorrelationSet c,int character)
59      {
60        int i;
61
62        for (i=0;i<c->signalLength;++i) {
63          printf("%d:%6.2f\n",i,*(c->costs+character*c->signalLength+i));
64        }
65        printf("\n");
66      }
67
68      float L2Norm(OutlinePair signal, int startOffset,
69                   OutlinePair model)
70      {
71        float *top1,*top2,*bottom1,*bottom2;
72        int i,overlap;
73        float sum;
74        float temp;
75
76        if ((startOffset < 0) ||
77            (startOffset + model->numberOfLegs > signal->numberOfLegs))
78          DoError("L2Norm: the model must overlap the signal.\n",NULL);
79
80        top1 = signal->top+startOffset;
81        top2 = model->top;
82        bottom1 = signal->bottom+startOffset;
83        bottom2 = model->bottom;
84
85        overlap = signal->numberOfLegs - startOffset;
86        if (overlap > model->numberOfLegs)
87          overlap = model->numberOfLegs;
88
89        for (i=0,sum=0;i<overlap;++i) {
90          temp = *top1++ - *top2++;
91          sum += temp * temp;
92          temp = *bottom1++ - *bottom2++;
93          sum += temp * temp;
94        }
95
96        return sum;
97      }
98
99      CorrelationSet PreProcessSignalWithChars(OutlinePair signal,Dictionary charDict)
100     {
101       CorrelationSet cSet;
102       int thisChar,offset;
103       OutlinePair charSignal;
104
105       cSet = NewCorrelationSet(charDict->numberOfEntries,signal->numberOfLegs);
106
107       for (thisChar = 0; thisChar < charDict->numberOfEntries; ++thisChar) {
108         charSignal = *(charDict->outlines+thisChar);
109         for (offset = 0; offset < signal->numberOfLegs-charSignal->numberOfLegs+1;
     ++offset)
110           SetCorrelationValue(cSet,thisChar,offset,L2Norm(signal,offset,charSignal));
111       }
```

```
112     return cSet;
113   }
114
115   CorrelationSet *PreProcessDictionaryWithChars(Dictionary signalDict,Dictionary charDict)
116   {
117     CorrelationSet *correlationSets;
118     int thisWord;
119
120     correlationSets = (CorrelationSet
        *)calloc(signalDict->numberOfEntries,sizeof(CorrelationSet));
121     if (correlationSets == NULL)
122       DoError("PreProcessDicitonary: cannot allocate space.\n",NULL);
123     for (thisWord = 0; thisWord < signalDict->numberOfEntries; ++thisWord) {
124       *(correlationSets+thisWord) =
        PreProcessSignalWithChars(*(signalDict->outlines+thisWord),charDict);
125       printf("%d ",thisWord);
126     }
127     return correlationSets;
128   }
129
130   CorrelationSet PreProcessSignalWithBlanks(OutlinePair signal)
131   {
132     CorrelationSet cSet;
133     int blankWidth,offset;
134     int numberOfLegs = signal->numberOfLegs;
135
136     cSet = NewCorrelationSet(MAX_SHIFT,numberOfLegs);
137
138     for (offset = 0; offset < numberOfLegs ; ++offset) {
139       SetCorrelationValue(cSet,0,offset,0);
140     }
141     for (offset = 0; offset < numberOfLegs ; ++offset) {
142       float top,bottom;
143       top = *(signal->top+offset);
144       bottom = *(signal->bottom+offset);
145       SetCorrelationValue(cSet,1,offset,top*top+bottom*bottom);
146     }
147     for (blankWidth = 2; blankWidth < MAX_SHIFT; ++blankWidth) {
148       for (offset = 0; offset < numberOfLegs-blankWidth+1 ; ++offset) {
149         float top,bottom,temp;
150         top = *(signal->top+offset+blankWidth-1);
151         bottom = *(signal->bottom+offset+blankWidth-1);
152         temp = top*top+bottom*bottom+CorrelationValue(cSet,blankWidth-1,offset);
153         SetCorrelationValue(cSet,blankWidth,offset,temp);
154       }
155     }
156     return cSet;
157   }
158
159   CorrelationSet *PreProcessDictionaryWithBlanks(Dictionary signalDict)
160   {
161     CorrelationSet *correlations;
162     int thisWord;
163
164     correlations = (CorrelationSet
        *)calloc(signalDict->numberOfEntries,sizeof(CorrelationSet));
165
```

```
166   for (thisWord = 0; thisWord < signalDict->numberOfEntries; ++thisWord) {
167     *(correlations+thisWord) =
        PreProcessSignalWithBlanks(*(signalDict->outlines+thisWord));
168     printf("%d ",thisWord);
169   }
170   return correlations;
171 }
172
173 int LookupShapeIndex(char c, Dictionary models)
174 {
175 /* dictionary file has the following order:
176    ABCDEFGHIJKLMNOPQRSTUVWXYZ
177    abcdefghijklmnopqrstuvwxyz
178    0123456789
179    ,.
180 */
181   int shapeIndex;
182   if ((c>='a'&&c<='z'))
183     shapeIndex = c-'a';
184   else if (c == ',')
185     shapeIndex = 26;
186   else if (c == '.')
187     shapeIndex = 27;
188   else
189     DoError("LookupShape: have no shape one of the characters.\n",NULL);
190   return shapeIndex;
191 }
192
193
194 float L2CompareWithString(int signalIndex,
195                   char *string,
196                   CorrelationSet charCorrelations,
197                   CorrelationSet blankCorrelations,
198                   Dictionary signalDict,
199                   Dictionary models)
200 {
201 /* Allocate space for dynamic programming array. */
202 /* For now, be a space hog. */
203   float costMatrix[MAX_SIGNAL_LENGTH][MAX_STRING_LENGTH];
204   int pathMatrix[MAX_SIGNAL_LENGTH][MAX_STRING_LENGTH];
205   char *charCursor;
206   OutlinePair modelShapes[MAX_STRING_LENGTH];
207   int modelIndices[MAX_STRING_LENGTH];
208   int numberOfChars;
209
210   int letterIndex, startOffset;
211   int left,right;
212   int searchLeft,searchRight,rightEdge;
213   float minValue;
214   float temp;
215   int i,oldLeft,oldRight,minIndex;
216   int signalLength;
217
218   signalLength = (*(signalDict->outlines+signalIndex))->numberOfLegs;
219
220 /* Make sure input string is not too long. */
221   numberOfChars = strlen(string);
```

```
222      if (numberOfChars >= MAX_STRING_LENGTH)
223        DoError("L2CompareWithString: string is too long.\n",NULL);
224
225      /* Make sure signal is not too long. */
226      if (signalLength >= MAX_SIGNAL_LENGTH)
227        DoError("L2CompareWithString: signal is too long.\n",NULL);
228
229      /* Lookup the indices of the signals corresponding to the characters in the string. */
230      charCursor = string;
231      for (i=0;i<numberOfChars;++i) {
232        modelIndices[i] = LookupShapeIndex(*charCursor++,models);
233        modelShapes[i] = *(models->outlines+modelIndices[i]);
234      }
235
236      /* Since the cost matrix is larger than the region containing valid
237       * alignments, first fill in the array with large costs. Later, some
238       * of these will be overwritten. */
239      /* WARNING: does MAXFLOAT + smallFloat == MAXFLOAT or does it roll? */
240      {
241        float *cursor;
242        cursor = &(costMatrix[0][0]);
243        for (i=0;i<MAX_SIGNAL_LENGTH*MAX_STRING_LENGTH;++i)
244          *cursor++ = MAXFLOAT;
245      }
246
247      /* Fill in leftmost column */
248      left = 0;
249      right = MIN(MAX_SHIFT,signalLength-modelShapes[0]->numberOfLegs);
250      for (startOffset=left;startOffset<right;++startOffset)
251        costMatrix[startOffset][0] = CorrelationValue(blankCorrelations,startOffset,startOffset) +
252                   CorrelationValue(charCorrelations,modelIndices[0],startOffset);
253
254      /* Now do the rest of the columns */
255      for (letterIndex = 1; letterIndex < numberOfChars; ++letterIndex) {
256        oldLeft = left;
257        oldRight = right;
258        left += modelShapes[letterIndex-1]->numberOfLegs;
259        /* If string of characters is too long for this signal, abort by returning a large cost. */
260        if (left>=signalLength)
261          return MAXFLOAT;
262        right += modelShapes[letterIndex-1]->numberOfLegs + MAX_SHIFT;
263        right = MIN(right,signalLength-modelShapes[letterIndex]->numberOfLegs+1);
264
265        for (startOffset=left;startOffset<right;++startOffset) {
266          temp = CorrelationValue(charCorrelations,modelIndices[letterIndex],startOffset);
267
268      /* This could be made quite a bit faster since for each start offset,
269       * we just add an element to the set we are minimizing over. */
270
271          searchLeft = startOffset-modelShapes[letterIndex-1]->numberOfLegs-MAX_SHIFT;
272          searchLeft = MAX(searchLeft,oldLeft);
273          rightEdge = searchLeft+modelShapes[letterIndex-1]->numberOfLegs;
274          searchRight = startOffset-modelShapes[letterIndex-1]->numberOfLegs;
275          searchRight = MIN(searchRight,oldRight);
276
277          minIndex = searchLeft;
278          minValue = costMatrix[searchLeft][letterIndex-1] +
```

```
279              CorrelationValue(blankCorrelations,startOffset-rightEdge,rightEdge);
280
281       for (i=searchLeft;i<searchRight;++i,++rightEdge) {
282          float temp;
283          temp = costMatrix[i][letterIndex-1] +
284             CorrelationValue(blankCorrelations,startOffset-rightEdge,rightEdge);
285          if (temp < minValue) {
286             minIndex = i;
287             minValue = temp;
288          }
289       }
290
291       costMatrix[startOffset][letterIndex] = minValue+temp;
292       pathMatrix[startOffset][letterIndex] = minIndex;
293     } /* for startOffset */
294    } /* for letterIndex */
295
296
297    /* fill in the costs for blanks at the end of the word */
298     rightEdge = left+modelShapes[letterIndex-1]->numberOfLegs;
299     for (startOffset=left;startOffset<right;++startOffset,++rightEdge) {
300      if (rightEdge+MAX_SHIFT >= signalLength) {
301        costMatrix[startOffset][letterIndex-1] +=
302           CorrelationValue(blankCorrelations,signalLength-1-rightEdge,rightEdge);
303      }
304      else {
305       /* this chain of letters does not span the word */
306        costMatrix[startOffset][letterIndex-1] = MAXFLOAT;
307      }
308    }
309
310    /* keep minIndex for debugging pruposes */
311     minIndex = left;
312     minValue = costMatrix[left][letterIndex-1];
313     for (i=left;i<right;++i) {
314      float temp;
315      temp = costMatrix[i][letterIndex-1];
316      if (temp < minValue) {
317        minIndex = i;
318        minValue = temp;
319      }
320    }
321
322    return minValue;
323   }
324
325   void PrintPath(int *pm, int width, int height, int index)
326   {
327    int i;
328    for (i=width-1;i>=0;--i) {
329      printf("%d ",index);
330      index = *(pm+index*width+i);
331    }
332    printf("\n");
333   }
334
335   void PrintMatrix(float *m,int width, int height)
336   {
```

```
337       int i;
338       int j;
339       for (i=0;i<height;++i) {
340         printf("%d: ",i);
341         for (j=0;j<width;++j)
342           printf("%6.2e ",*m++);
343         printf("\n");
344       }
345     }
346
347     typedef struct CTuple {
348       int index;
349       float value;
350     } CompareTuple;
351
352     int TupleLessThan(CompareTuple *t1, CompareTuple *t2)
353     {
354       return t1->value > t2->value;
355     }
356
357     void L2CompareDictToString(char *string,
358                                CorrelationSet *charCorrelations,
359                                CorrelationSet *blankCorrelations,
360                                Dictionary signalDict,
361                                Dictionary modelDict,
362                                BOOLEAN isBatch)
363     {
364       CompareTuple *results;
365       int i;
366
367       if ((results = (CompareTuple *)calloc(signalDict->numberOfEntries,
368                                             sizeof(CompareTuple))) ==
369         NULL)
370         DoError("L2CompareDictToString: cannot allocate space.\n",NULL);
371
372       for (i=0;i<signalDict->numberOfEntries;++i) {
373         (*(results+i)).index = i;
374         (*(results+i)).value = L2CompareWithString(i,string,
375                                                    *(charCorrelations+i),
376                                                    *(blankCorrelations+i),
377                                                    signalDict,
378                                                    modelDict);
379       }
380
381       qsort(results,
382             signalDict->numberOfEntries,
383             sizeof(CompareTuple),
384             TupleLessThan);
385
386       if (isBatch) {
387         printf("%d(%f)\n",(*results).index,(*results).value);
388       }
389       else {
390         printf("\n");
391         for (i=0;(i<5)&&(i<signalDict->numberOfEntries);++i)
392           printf("%d: %f\n",(*(results+i)).index,(*(results+i)).value);
393         printf("\n");
394       }
```

```
395
396       free(results);
397      }
398
399     void PrintDictStats(Dictionary dict)
400     {
401       int i,sum=0;
402       printf("Dictionary has %d entries.\n",dict->numberOfEntries);
403       for (i=0;i<dict->numberOfEntries;++i)
404         sum += (*(dict->outlines+i))->numberOfLegs;
405       printf("The total length of the shape contours is %d pixels.\n",sum);
406     }
407
408     void main(int argc,char **argv)
409     {
410       char *unknowns,*models;
411       char s[MAX_STRING_LENGTH+1];
412       Dictionary unknownDict, modelDict;
413       int selection;
414       char *crPointer;
415       BOOLEAN done = FALSE;
416       BOOLEAN batch;
417       char *words;
418       CorrelationSet *charCorrelations;
419       CorrelationSet *blankCorrelations;
420
421       if (argc != 3 && argc != 4) {
422         printf("Usage:\n");
423         printf("  %s <unknowns> <alphabet> [<batch wordlist>]\n",argv[0]);
424         printf("  If the batch file is not specified, the program runs\n");
425         printf("  in interactive mode.\n");
426         exit(-1);
427       }
428
429       unknowns = argv[1];
430       models = argv[2];
431       if (argc == 4) {
432         batch = TRUE;
433         words = argv[3];
434       } else
435         batch = FALSE;
436
437       unknownDict = ReadDictionary(unknowns);
438       modelDict = ReadDictionary(models);
439
440       PrintDictStats(unknownDict);
441       printf("Preprocessing...\n");
442       charCorrelations = PreProcessDictionaryWithChars(unknownDict,modelDict);
443       blankCorrelations = PreProcessDictionaryWithBlanks(unknownDict);
444       printf("done.\n");
445
446       if (batch) {
447         FILE *fp;
448         if ((fp = fopen(words,"r"))==NULL)
449           DoError("l2Norm: can't open input file %s.\n",words);
450         while (!done) {
451           fgets(s,MAX_STRING_LENGTH,fp);
452           if ((s[0] == '\0') || (s[0] == '\n'))
```

```
453          done = TRUE;
454        else {
455          crPointer = strchr(s,'\n');
456          if (crPointer != NULL)
457            *crPointer = '\0';
458          printf("%s: ",s);
459
             L2CompareDictToString(s,charCorrelations,blankCorrelations,unknownDict,modelDic
             t,TRUE);
460        }
461      }
462    }
463    else {
464      while (!done) {
465        printf("Enter a word to search for: ");
466        fgets(s,MAX_STRING_LENGTH,stdin);
467        if ((s[0] == '\0') || (s[0] == '\n'))
468          done = TRUE;
469        else {
470          crPointer = strchr(s,'\n');
471          if (crPointer != NULL)
472            *crPointer = '\0';
473          printf("Comparing shape %s to the image\n",s);
474
             L2CompareDictToString(s,charCorrelations,blankCorrelations,unknownDict,modelDic
             t,FALSE);
475        }
476      }
477    }
478  }
479
```

Jan 15 21:32 1991 match.c

```
1    /*
2     * match.c
3     * align 2 sequences
4     *
5     * run as: match seq1 seq2
6     *
7     */
8
9    /*
10    * TO DO: 1) don't compute over parts of array outside of constraints
11    *        2) distance score for top and bottom paths
12    */
13
14   #include <stdio.h>
15   #include <math.h>
16
17   #include "boolean.h"
18   #include "types.h"
19   #include "error.h"
20   #include "pict.h"
21   #include "dict.h"
22   #include "diff.h"
23   #include "diff2.h"
24   #include "match.h"
```

```
25
26    #ifndef MAXLINE
27    #define MAXLINE 256
28    #endif
29
30    #ifndef MAXNAME
31    #define MAXNAME 128
32    #endif
33
34    #ifndef TRUE
35    #define TRUE 1
36    #endif
37
38    #ifndef FALSE
39    #define FALSE 0
40    #endif
41
42    int matchcntr = 1; /* used for writing out set number of matches */
43
44    /*
45    void
46    main(argc,argv)
47    int argc;
48    char *argv[];
49    {
50    */
51     /*
52      * read in multiple parameter files, write out selected fields as shorts
53      */
54    /*
55     int i,j;
56     int seqlength;
57     float matchvecs();
58
59     float test[MAXSEQLENGTH];
60     float ref[MAXSEQLENGTH];
61    */
62     /*
63      * read in args
64      */
65    /*
66     debug = FALSE;
67
68     for (;argc > 1 && (argv[1][0] == '-'); argc--, argv++)
69      {
70       switch (argv[1][1])
71          {
72           case 'd':
73            debug = TRUE;
74            break;
75           case 'h':
76            horweight = (float)atoi(&argv[1][2]);
77            break;
78           case 'v':
79            verweight = (float)atoi(&argv[1][2]);
80            break;
81           case 'x':
82            diagweight = (float)atoi(&argv[1][2]);
```

```
83            break;
84          default:
85            printf ("match: unknown switch %s.\n", argv[1]);
86            exit (1);
87          }
88        }
89
90     if (argc != 1)
91       {
92         printf ("Usage: match [-b<begsamp> -d(debug) -e<endsamp>\n");
93         printf ("argc: %d\n", argc);
94         exit (1);
95       }
96    */
97     /* debugging */
98    /* for (i = 0; i < 5; i++)
99        test[i] = (float)i;
100      for (i = 5; i < 10; i++)
101        test[i] = (float)(.5 * (i - 4) + 5);
102      for (i = 0; i < 5; i++)
103        ref[i] = 1.5 * i;
104      matchvecs(test, 10, ref, 5);
105
106    }
107    */
108
109    /*
110    float DPDiffPair(OutlinePair one, OutlinePair two)
111    {
112     if (one == two){
113       printf("matches\n");
114       return(0.0);
115     }
116     else {
117       printf("no match\n");
118       return(1.0);
119     }
120    }
121    */
122
123    float DPDiffPair(OutlinePair one, OutlinePair two)
124     /*
125      * question, should top and bottom distance be forced to be computed together?
126      * use another distance score to check how far off the two are?
127      */
128
129    {
130     float topscore;
131     float bottomscore;
132
133     if (debug) printf("top: ");
134     topscore = matchvecs(one->top, one->numberOfLegs,
135                  two->top, two->numberOfLegs);
136     if (debug) printf(" bottom: ");
137     bottomscore = matchvecs(one->bottom, one->numberOfLegs,
138                  two->bottom, two->numberOfLegs);
139     return (topscore + bottomscore);
140    }
```

```
141
142     float matchvecs(float *Vec1, int lenVec1, float *Vec2, int lenVec2)
143         /*
144          * Computes the best path between one and two.
145          * Allows 2/1 expansion/compression
146          */
147     {
148       float dist, mindist, hor, vert, diag;
149       float bestscore;
150       int i1, i2;
151       int xdir, ydir;
152
153       elt *array[MAXSEQLENGTH][MAXSEQLENGTH];
154       elt *aelt;
155
156       /* initialize array */
157
158       for (i1 = 0; i1 < lenVec1; i1++) {
159        for (i2 = 0; i2 < lenVec2; i2++) {
160          array[i1][i2] = (elt *) malloc(sizeof (elt));
161          if (array[i1][i2] == NULL) {
162              fprintf(stderr,
163                      "Sorry, not enough space to malloc array elts in pl_matchvecs\n BYE!");
164              exit(1);
165          }
166        }
167       }
168
169       /*
170        * compute match
171        */
172       /* initialize */
173       aelt = array[0][0];
174       aelt->cost = sq_distance(Vec1[0], Vec2[0]);
175       aelt->xptr = 0;
176       aelt->yptr = 0;
177       /* bottom row */
178       i2 = 0;
179       for (i1 = 1; i1 < lenVec1; i1++) {
180         dist = sq_distance(Vec1[i1], Vec2[i2]);
181         aelt = array[i1][i2];
182         aelt->cost = array[i1 - 1][i2]->cost + horweight * dist;
183         aelt->xptr = -1;
184         aelt->yptr = 0;
185       }
186       /* left column */
187       i1 = 0;
188       for (i2 = 1; i2 < lenVec2; i2++) {
189         dist = sq_distance(Vec1[i1], Vec2[i2]);
190         aelt = array[i1][i2];
191         aelt->cost = array[i1][i2 - 1]->cost + verweight * dist;
192         aelt->xptr = 0;
193         aelt->yptr = -1;
194       }
195       /* middle */
196       for (i1 = 1; i1 < lenVec1; i1++) {
197        for (i2 = 1; i2 < lenVec2; i2++) {
198          dist = sq_distance(Vec1[i1], Vec2[i2]);
```

```
199        hor = array[i1 - 1][i2]->cost + horweight * dist;
200        xdir = -1;
201        ydir = 0;
202        mindist = hor;
203        vert = array[i1][i2 - 1]->cost + verweight * dist;
204        if (vert < mindist) {
205            xdir = 0;
206            ydir = -1;
207            mindist = vert;
208        }
209        diag = array[i1 - 1][i2 - 1]->cost + diagweight * dist;
210        if (diag < mindist) {
211            xdir = -1;
212            ydir = -1;
213            mindist = diag;
214        }
215        aelt = array[i1][i2];
216        aelt-> cost = mindist;
217        aelt-> xptr = xdir;
218        aelt-> yptr = ydir;
219      }
220    }
221
222    bestscore = best_score(array, lenVec1, lenVec2);
223   #ifdef foo
224    if (debug) {
225      print_best_path(array, lenVec1, lenVec2);
226   /*   print_array_costs(array, lenVec1, lenVec2);
227      print_array_dirs(array, lenVec1, lenVec2);
228   */
229      printf("best score: %f\n", bestscore);
230    }
231   #endif
232
233    for (i1 = 0; i1 < lenVec1; i1++) {
234     for (i2 = 0; i2 < lenVec2; i2++) {
235      free(array[i1][i2]);
236     }
237    }
238
239    return(bestscore);
240   }
241
242   float
243   sq_distance(float x1, float x2)
244   {
245    float dist;
246    float epsilon = .001;
247
248    /*
249     * quantization makes many values identical, use of epsilon encourages shortest path
250     */
251
252    dist = x1 - x2;
253    dist *= dist;
254    dist += epsilon;
255    return(dist);
256   }
```

```
257
258    /*
259    float parallel_distance(OutlinePair one, OutlinePair two, int ptr1, int ptr2)
260    {
261      float topdist, bottomdist;
262
263      topdist = one->top[ptr1] - two->top[ptr2];
264      topdist *= topdist;
265
266      bottomdist = one->bottom[ptr1] - two->bottom[ptr2];
267      bottomdist *= bottomdist;
268
269      return(topdist + bottomdist);
270    }
271    */
272
273    float
274    best_score (elt *array[][MAXSEQLENGTH], int lenVec1, int lenVec2)
275    {
276      /* assume all of Vec1 and Vec2 are used, so just take value at end */
277
278      return(array[lenVec1 - 1][lenVec2 - 1]->cost);
279    }
280
281    /*
282     * *********************
283     * debugging functions
284     */
285    #ifdef foo
286    void
287    print_best_path(elt *array[][MAXSEQLENGTH], int lenVec1, int lenVec2)
288    {
289      char path[MAXNAME];
290      int x, y;
291      elt *aelt;
292      FILE *ofp;
293
294      x = lenVec1 - 1;
295      y = lenVec2 - 1;
296
297      sprintf(path, "/net/piglet/piglet/speech/fchen/pics/paths/p%d.txt", FileCountY);
298
299      ofp = fopen (path, "a");
300      if(ofp == NULL)
301        printf("Cannot open output file %s.\n", path);
302
303    /* fprintf(ofp, " %3s %3s %6s\n", "x", "y", "cost");
304    */
305      while (x > 0 || y > 0) {
306        aelt = array[x][y];
307        fprintf(ofp, " %3d %3d %6.2f\n", x, y, aelt->cost);
308        x += aelt->xptr;
309        y += aelt->yptr;
310      }
311    /* fprintf(ofp, " \"match %d\n\n", matchcntr++);
312    */
313      fprintf(ofp, " \"match %d %d\n\n", FileCountX, FileCountY);
314      fclose(ofp);
```

```
315     }
316     #endif
317     static float sqr(float x)
318     {
319       return x*x;
320     }
321
322     void print_best_path(elt *array[][MAXSEQLENGTH], int lenVec1, int lenVec2,
323                 char *outFileName)
324     {
325       int x, y;
326       elt *aelt;
327       FILE *outFile;
328       float dist = 0;
329
330       x = lenVec1 - 1;
331       y = lenVec2 - 1;
332
333       if ((outFile = (FILE *)fopen(outFileName,"w"))==NULL)
334         DoError("single: Cannot open output file %s.\n", outFileName);
335
336       while (x > 0 || y > 0) {
337         aelt = array[x][y];
338         fprintf(outFile, "%3d %3d %6.2f\n", x, y, aelt->cost);
339         dist += sqrt(sqr(aelt->xptr)+sqr(aelt->yptr));
340         x += aelt->xptr;
341         y += aelt->yptr;
342       }
343       fclose(outFile);
344       printf("distance = %f\n",dist);
345     }
346
347
348     void
349     print_array_costs(elt *array[][MAXSEQLENGTH], int lenVec1, int lenVec2)
350     {
351
352       int x, y;
353
354       for (y = 0; y < lenVec2; y++){
355         for (x = 0; x < lenVec1; x++){
356           printf("%7.2f ",array[x][y]->cost);
357         }
358         printf("\n");
359       }
360     }
361
362     void
363     print_array_dirs(elt *array[][MAXSEQLENGTH], int lenVec1, int lenVec2)
364     {
365
366       int x, y;
367
368       for (y = 0; y < lenVec2; y++){
369         for (x = 0; x < lenVec1; x++){
370           printf("%2d:%2d  ", array[x][y]->xptr, array[x][y]->yptr);
371         }
372         printf("\n");
```

```
373        }
374      }
```

Jul 7 14:28 1991 matchparallel.c

```
1     /*
2      * matchparallel.c
3      * align 2 sequences
4      *
5      * dependent on match.c
6      */
7
8     /*
9      * TO DO: 1) don't compute over parts of array outside of constraints
10     *
11     */
12
13    #include <stdio.h>
14    #include <math.h>
15    #include "boolean.h"
16    #include "types.h"
17    #include "error.h"
18    #include "pict.h"
19    #include "dict.h"
20    #include "diff.h"
21    #include "diff2.h"
22    #include "match.h"
23    #include "matchparallel.h"
24
25    #ifndef MAXLINE
26    #define MAXLINE 256
27    #endif
28
29    #ifndef MAXNAME
30    #define MAXNAME 128
31    #endif
32
33    #ifndef TRUE
34    #define TRUE 1
35    #endif
36
37    #ifndef FALSE
38    #define FALSE 0
39    #endif
40
41    #ifndef max
42    #define max(a,b) ((a) > (b) ? (a) : (b))
43    #endif
44
45    #ifndef min
46    #define min(a,b) ((a) < (b) ? (a) : (b))
47    #endif
48
49    /*
50     * ********************
51     * parallel match with full search
52     * ********************
```

```
53       */
54
55       float pl_DPDiffPair(OutlinePair one, OutlinePair two, char *pathFile)
56         /*
57          * question, should top and bottom distance be forced to be computed together?
58          * use another distance score to check how far off the two are?
59          */
60
61       {
62         float score;
63
64         score = pl_matchvecs(one->top, one->bottom, one->numberOfLegs,
65                     two->top, two->bottom, two->numberOfLegs,
66                       pathFile);
67         return (score);
68       }
69
70       float pl_matchvecs(float *Vec1t, float *Vec1b, int lenVec1,
71                   float *Vec2t, float *Vec2b, int lenVec2,
72                   char *pathFile)
73         /*
74          * Computes the best path between one and two.
75          * Allows 2/1 expansion/compression
76          */
77       {
78        float dist, mindist, hor, vert, diag;
79        float bestscore;
80        int i1, i2;
81        int xdir, ydir;
82
83        elt *array[MAXSEQLENGTH][MAXSEQLENGTH];
84        elt *aelt;
85
86        /* initialize array */
87
88        for (i1 = 0; i1 < lenVec1; i1++) {
89         for (i2 = 0; i2 < lenVec2; i2++) {
90          array[i1][i2] = (elt *) malloc(sizeof (elt));
91          if (array[i1][i2] == NULL) {
92              fprintf(stderr,
93                      "Sorry, not enough space to malloc array elts in pl_matchvecs\n BYE!");
94              exit(1);
95          }
96         }
97        }
98
99        /*
100        * compute match
101        */
102       /* initialize */
103       aelt = array[0][0];
104       aelt->cost = sq_distance(Vec1t[0], Vec2t[0]) + sq_distance(Vec1b[0], Vec2b[0]);
105       aelt->xptr = 0;
106       aelt->yptr = 0;
107       /* bottom row */
108       i2 = 0;
109       for (i1 = 1; i1 < lenVec1; i1++) {
110        dist = sq_distance(Vec1t[i1], Vec2t[i2]) + sq_distance(Vec1b[i1], Vec2b[i2]);
```

```
111       aelt = array[i1][i2];
112       aelt->cost = array[i1 - 1][i2]->cost + horweight * dist;
113       aelt->xptr = -1;
114       aelt->yptr = 0;
115     }
116     /* left column */
117     i1 = 0;
118     for (i2 = 1; i2 < lenVec2; i2++) {
119       dist = sq_distance(Vec1t[i1], Vec2t[i2]) + sq_distance(Vec1b[i1], Vec2b[i2]);
120       aelt = array[i1][i2];
121       aelt->cost = array[i1][i2 - 1]->cost + verweight * dist;
122       aelt->xptr = 0;
123       aelt->yptr = -1;
124     }
125     /* middle */
126     for (i1 = 1; i1 < lenVec1; i1++) {
127      for (i2 = 1; i2 < lenVec2; i2++) {
128       dist = sq_distance(Vec1t[i1], Vec2t[i2]) + sq_distance(Vec1b[i1], Vec2b[i2]);
129       hor = array[i1 - 1][i2]->cost + horweight * dist;
130       xdir = -1;
131       ydir = 0;
132       mindist = hor;
133       vert = array[i1][i2 - 1]->cost + verweight * dist;
134       if (vert < mindist) {
135          xdir = 0;
136          ydir = -1;
137          mindist = vert;
138       }
139       diag = array[i1 - 1][i2 - 1]->cost + diagweight * dist;
140       if (diag < mindist) {
141          xdir = -1;
142          ydir = -1;
143          mindist = diag;
144       }
145       aelt = array[i1][i2];
146       aelt-> cost = mindist;
147       aelt-> xptr = xdir;
148       aelt-> yptr = ydir;
149      }
150     }
151
152     bestscore = best_score(array, lenVec1, lenVec2);
153     if (pathFile)
154       print_best_path(array, lenVec1, lenVec2, pathFile);
155
156
157     for (i1 = 0; i1 < lenVec1; i1++) {
158      for (i2 = 0; i2 < lenVec2; i2++) {
159        free(array[i1][i2]);
160      }
161     }
162
163     return(bestscore);
164    }
165
166
167    /*
168    * *********************
```

```
169   * faster parallel match
170   * not optimal because warp is limited to swath of width "bw"
171   * *********************
172   */
173
174   float faster_pl_DPDiffPair(OutlinePair one, OutlinePair two, char *pathFile)
175    /*
176     * question, should top and bottom distance be forced to be computed together?
177     * use another distance score to check how far off the two are?
178     */
179
180   {
181     float score;
182
183     score = faster_pl_matchvecs(one->top, one->bottom, one->numberOfLegs,
184                     two->top, two->bottom, two->numberOfLegs,
185                     pathFile);
186     return (score);
187   }
188
189   float faster_pl_matchvecs(float *Vec1t, float *Vec1b, int lenVec1,
190                     float *Vec2t, float *Vec2b, int lenVec2,
191                     char *pathFile)
192      /*
193       * Computes the best path between one and two.
194       * Allows 2/1 expansion/compression only within a band
195       */
196   {
197     float dist, mindist, hor, vert, diag;
198     float bestscore;
199     float ratio;
200     int i1, i2;
201     int xdir, ydir;
202     int beg, end, center;
203     int b;                /* pointer to border */
204     int border;           /* width of border on right side of swath */
205
206     elt *array[MAXSEQLENGTH][MAXSEQLENGTH];
207     elt *aelt;
208
209     float infinity = 1.0e30;
210     int bw = 20;
211
212     ratio = (float)lenVec1 / (float)lenVec2;
213     border = (int) (ratio + .999999);
214   /* if (debug)
215       printf("ratio: %f\n", ratio);
216   */ /* initialize array */
217
218     for (i1 = 0; i1 < lenVec1; i1++) {
219      for (i2 = 0; i2 < lenVec2; i2++) {
220       array[i1][i2] = (elt *) malloc(sizeof (elt));
221       if (array[i1][i2] == NULL) {
222          fprintf(stderr,
223                "Sorry, not enough space to malloc array elts in pl_matchvecs\n BYE!");
224          exit(1);
225       }
226      }
```

```
227     }
228
229     /*
230      * compute match
231      */
232     /* initialize */
233     aelt = array[0][0];
234     aelt->cost = sq_distance(Vec1t[0], Vec2t[0]) + sq_distance(Vec1b[0], Vec2b[0]);
235     aelt->xptr = 0;
236     aelt->yptr = 0;
237     /* bottom row */
238     i2 = 0;
239     end = bw + border + 1;
240     for (i1 = 1; i1 < end; i1++) {
241       dist = sq_distance(Vec1t[i1], Vec2t[i2]) + sq_distance(Vec1b[i1], Vec2b[i2]);
242       aelt = array[i1][i2];
243       aelt->cost = array[i1 - 1][i2]->cost + horweight * dist;
244       aelt->xptr = -1;
245       aelt->yptr = 0;
246     }
247     /*
248      * swath
249      *
250      * set the elt before beg and at end to infinity, then the compute distances normally
251      * for the row
252      */
253     for (i2 = 1; i2 < lenVec2; i2++) {
254       center = i2 * ratio;
255       beg = max(1, center - bw);
256       end = min(lenVec1, center + bw + 1);
257     /*  if (debug)
258         printf("center: %d, beg: %d, end: %d\n", center, beg, end);
259     */  /* beg */
260       aelt = array[beg - 1][i2];
261       aelt->xptr = 0;
262       aelt->yptr = -1;
263       if (beg == 1) {
264         dist = sq_distance(Vec1t[0], Vec2t[i2]) + sq_distance(Vec1b[0], Vec2b[i2]);
265         aelt->cost = array[0][i2 - 1]->cost + verweight * dist;
266       }
267       else {
268         aelt->cost = infinity;
269       }
270       /* end */
271     /*  if (end < lenVec1) {
272     */
273       for (b = end; b < min(end+border,lenVec1); b++) {
274     /*    if (debug)
275             printf("b: %d ", b);
276     */    aelt = array[b][i2];
277         aelt->cost = infinity;
278         aelt->xptr = -1;
279         aelt->yptr = 0;
280       }
281       for (i1 = beg; i1 < end; i1++) {
282         dist = sq_distance(Vec1t[i1], Vec2t[i2]) + sq_distance(Vec1b[i1], Vec2b[i2]);
283         hor = array[i1 - 1][i2]->cost + horweight * dist;
```

```
284         xdir = -1;
285         ydir = 0;
286         mindist = hor;
287         vert = array[i1][i2 - 1]->cost + verweight * dist;
288         if (vert < mindist) {
289             xdir = 0;
290             ydir = -1;
291             mindist = vert;
292         }
293         diag = array[i1 - 1][i2 - 1]->cost + diagweight * dist;
294         if (diag < mindist) {
295             xdir = -1;
296             ydir = -1;
297             mindist = diag;
298         }
299         aelt = array[i1][i2];
300         aelt-> cost = mindist;
301         aelt-> xptr = xdir;
302         aelt-> yptr = ydir;
303         }
304     }
305
306     bestscore = best_score(array, lenVec1, lenVec2);
307     if (pathFile)
308       print_best_path(array, lenVec1, lenVec2,pathFile);
309
310     for (i1 = 0; i1 < lenVec1; i1++) {
311      for (i2 = 0; i2 < lenVec2; i2++) {
312       free(array[i1][i2]);
313      }
314     }
315
316     return(bestscore);
317 }
318
319
320 /*
321  * ********************
322  * fastest parallel match
323  * warp limited to swath bw, plus no backtracking
324  * ********************
325  */
326
327 float simple_pl_DPDiffPair(OutlinePair one, OutlinePair two)
328     /*
329      * question, should top and bottom distance be forced to be computed together?
330      * use another distance score to check how far off the two are?
331      */
332
333 {
334   float score;
335
336     score = simple_pl_matchvecs(one->top, one->bottom, one->numberOfLegs,
337                     two->top, two->bottom, two->numberOfLegs);
338     return (score);
339 }
340
```

```
341  void PrintArrayRow(float *array,int width)
342  {
343   int i;
344   for (i=0;i<width;++i)
345     printf("%2.2f ",*array++);
346   printf("\n");
347  }
348
349  void PrintArray(float *array,int height,int width,int signalWidth)
350  {
351   int i;
352   for (i=0;i<height;++i) {
353     printf("%d: ",i);
354     PrintArrayRow(array+i*width,signalWidth);
355   }
356  }
357
358  float simple_pl_matchvecs(float *Vec1t, float *Vec1b, int lenVec1, float *Vec2t, float *Vec2b, int lenVec2)
359      /*
360       * Computes the best path between one and two within a band.
361       * Allows 2/1 expansion/compression only within a band.
362       */
363  {
364    float dist, mindist, hor, vert, diag;
365    float bestscore;
366    float ratio;
367    int i1, i2;
368    int xdir, ydir;
369    int beg, end, center;
370    int b;              /* pointer to border */
371    int border;         /* width of border on right side of swath */
372
373    float array[MAXSEQLENGTH][MAXSEQLENGTH];
374
375    float infinity = 1.0e30;
376    int bw = 20;
377
378    ratio = (float)lenVec1/ (float)lenVec2;
379    border = (int) (ratio + .999999);
380  /* if (debug)
381     printf("ratio: %f\n", ratio);
382  */ /* initialize array */
383
384
385    /*
386     * compute match
387     */
388    /* initialize */
389    array[0][0] = sq_distance(Vec1t[0], Vec2t[0]) + sq_distance(Vec1b[0], Vec2b[0]);
390
391    /* bottom row */
392    i2 = 0;
393    end = bw + border + 1;
394    for (i1 = 1; i1 < end; i1++) {
395      dist = sq_distance(Vec1t[i1], Vec2t[i2]) + sq_distance(Vec1b[i1], Vec2b[i2]);
396      array[i1][i2] = array[i1 - 1][i2] + horweight * dist;
397    }
```

```
398         /*
399          * swath
400          *
401          * set the elt before beg and at end to infinity, then the compute distances normally
402          * for the row
403          */
404         for (i2 = 1; i2 < lenVec2; i2++) {
405          center = i2 * ratio;
406          beg = max(1, center - bw);
407          end = min(lenVec1, center + bw + 1);
408         /*   if (debug)
409              printf("center: %d, beg: %d, end: %d\n", center, beg, end);
410         */  /* beg */
411          if (beg == 1) {
412           dist = sq_distance(Vec1t[0], Vec2t[i2]) + sq_distance(Vec1b[0], Vec2b[i2]);
413           array[beg - 1][i2] = array[0][i2 - 1] + verweight * dist;
414          }
415          else {
416           array[beg - 1][i2] = infinity;
417          }
418          /* end */
419          for (b = end; b < min(end+border,lenVec1); b++) {
420         /*    if (debug)
421               printf("b: %d ", b);
422         */
423            array[b][i2] = infinity;
424          }
425          for (i1 = beg; i1 < end; i1++) {
426           dist = sq_distance(Vec1t[i1], Vec2t[i2]) + sq_distance(Vec1b[i1], Vec2b[i2]);
427           hor = array[i1 - 1][i2] + horweight * dist;
428           mindist = hor;
429           vert = array[i1][i2 - 1] + verweight * dist;
430           if (vert < mindist) {
431               mindist = vert;
432           }
433           diag = array[i1 - 1][i2 - 1] + diagweight * dist;
434           if (diag < mindist) {
435               mindist = diag;
436           }
437           array[i1][i2] = mindist;
438          }
439         }
440
441         bestscore = array[lenVec1 - 1][lenVec2 - 1];
442         if (debug) {
443          printf("best score: %f\n", bestscore);
444         }
445
446         return(bestscore);
447        }
```

Jul 24 17:16 1991 newL2.c

```
1       #include <stdio.h>
2       #include <math.h>
3       #include "boolean.h"
4       #include "types.h"
```

```c
#include "error.h"
#include "dict.h"

#define NORMAL_LENGTH (100.0)
#define MAX_SLOPE (2.0)
#define BIG_NUM (10.0e20)

void ResampleOutlinePair(OutlinePair a,float newToOldFactor)
/* Resample an outline pair using linear interpolation. */
{
  int newWidth,oldWidth,i;
  int oldLeft,oldRight;
  float oldCenter;
  float *newX,*newTop,*newBottom;
  float *xCursor,*topCursor,*bottomCursor;

oldWidth = a->numberOfLegs;
  newWidth = irint(newToOldFactor*oldWidth);

newX = (float *)calloc(newWidth,sizeof(float));
  newTop = (float *)calloc(newWidth,sizeof(float));
  newBottom = (float *)calloc(newWidth,sizeof(float));
  if ((newX==NULL)||(newTop==NULL)||(newBottom==NULL))
    DoError("ResampleOutlinePair: cannot allocate space.\n",NULL);

xCursor = newX;
  topCursor = newTop;
  bottomCursor = newBottom;

for (i=0;i<newWidth;++i) {
    oldCenter = i/(float)newWidth*(float)oldWidth;
    oldLeft = irint(floor(oldCenter));
    oldRight = irint(ceil(oldCenter));
    if (oldLeft==oldRight) {
      *xCursor++ = *(a->x+oldLeft);
      *topCursor++ = *(a->top+oldLeft);
      *bottomCursor++ = *(a->bottom+oldLeft);
    }
    else {
      float slope;
      slope = *(a->x+oldRight)-*(a->x+oldLeft);
      *xCursor++ = *(a->x+oldLeft) + (oldCenter-oldLeft)*slope;
      slope = *(a->top+oldRight)-*(a->top+oldLeft);
      *topCursor++ = *(a->top+oldLeft) + (oldCenter-oldLeft)*slope;
      slope = *(a->bottom+oldRight)-*(a->bottom+oldLeft);
      *bottomCursor++ = *(a->bottom+oldLeft) + (oldCenter-oldLeft)*slope;
    }
  } free(a->x);
  free(a->top);
  free(a->bottom);

a->x = newX;
  a->top = newTop;
  a->bottom = newBottom;
  a->numberOfLegs = newWidth;
}
```

```
63
64      float L2Norm(OutlinePair signal, int startOffset,
65              OutlinePair model,float topToBottom)
66      {
67        float *top1,*top2,*bottom1,*bottom2;
68        int i,overlap;
69        float sum;
70        float temp;
71
72        if ((startOffset < 0) ||
73          (startOffset + model->numberOfLegs > signal->numberOfLegs))
74          DoError("L2Norm: the model must overlap the signal.\n",NULL);
75
76        top1 = signal->top+startOffset;
77        top2 = model->top;
78        bottom1 = signal->bottom+startOffset;
79        bottom2 = model->bottom;
80
81        overlap = signal->numberOfLegs - startOffset;
82        if (overlap > model->numberOfLegs)
83          overlap = model->numberOfLegs;
84
85        for (i=0,sum=0;i<overlap;++i) {
86          temp = *top1++ - *top2++;
87          sum += temp * temp * topToBottom;
88          temp = *bottom1++ - *bottom2++;
89          sum += temp * temp;
90        }
91
92        return sum;
93      }
94
95      float L2Compare(OutlinePair o1,OutlinePair o2,float topToBottom)
96      {
97        float slope = (float)o1->width/(float)o2->width;
98        if ((slope>MAX_SLOPE)||(1/slope>MAX_SLOPE))
99          return BIG_NUM;
100       if (o1->numberOfLegs != NORMAL_LENGTH)
101         ResampleOutlinePair(o1,NORMAL_LENGTH/o1->numberOfLegs);
102       if (o2->numberOfLegs != NORMAL_LENGTH)
103         ResampleOutlinePair(o2,NORMAL_LENGTH/o2->numberOfLegs);
104       return L2Norm(o1,0,o2,topToBottom);
105     }
106
```

Aug 14 20:54 1991 newMatch.c

```
1       #include <stdio.h>
2       #include "mylib.h"
3       #include "misc.h"
4       #include "types.h"
5       #include "dict.h"
6       #include "newMatch.h"
7
8       #define MAX_SIGNAL_LENGTH (800)
9       #define MAX_SLOPE (2.0)
10      #define BIG_NUM (10e20)
```

```
typedef enum {NONE,LEFT,DOWN,DOWNLEFT,D1L1,D2L1,D1L2} Direction;

extern double sqrt(double);
extern double cos(double);
extern double atan(double);
extern int irint(double);

/* Assumes that a represents the model and b represents the unknown.
 * Weights places where the model is lower than the unknown more than
 * cases where the model is higher than the unknown.  The idea here is
 * that valleys can be filled in by bleeding together, but that noise
 * can rarely make a contour be too tall for extended periods.
 */
float hillToValley = 1.0;
inline float SquareDifference(float a,float b)
{
 float temp = a-b;
 if (temp<0)
   return temp*temp;
 else
   return temp*temp*hillToValley*hillToValley;
/*  return (a-b)*(a-b); */
} inline float FMax(float a,float b)
{
 if (a>b)
   return a;
 else
   return b;
} inline float FMin(float a,float b)
{
 if (a<b)
   return a;
 else
   return b;
} inline int IMax(int a,int b)
{
 if (a>b)
   return a;
 else
   return b;
} inline int IMin(int a,int b)
{
 if (a<b)
   return a;
 else
   return b;
}
```

```
68   float NewMatch(float *a1,float *a2,int aLength,float *b1,float *b2,int bLength,
69              float centerWeight,BOOLEAN lengthNormalize,int normalBandWidth,
70              float topToBottom)
71   {
72    float costs0[MAX_SIGNAL_LENGTH+1];
73    float costs1[MAX_SIGNAL_LENGTH+1];
74    int i,j,start,end,bandWidth,shift;
75    int realStart,realEnd,center,oldEnd;
76    float slope,angle;
77    float *a1c,*a2c,*cd,*cl,*cdl,*dc;
78    float oldCost,b1v,b2v,returnVal;
79
80    if (aLength>MAX_SIGNAL_LENGTH||bLength>MAX_SIGNAL_LENGTH)
81      DoError("NewMatch: maximum signal length exceeded.\n",NULL);
82
83    slope = (float)aLength/(float)bLength;
84
85    if ((slope>MAX_SLOPE)||(1/slope>MAX_SLOPE)) {
86     return BIG_NUM;
87    }
88    angle = atan(slope);
89    bandWidth = irint(normalBandWidth/cos(angle));
90    center = 0;
91    realStart = center-bandWidth/2;
92    realEnd = realStart+bandWidth;
93    end = FMin(realEnd,aLength);
94
95    a1c = a1; /* a1 cursor */
96    a2c = a2; /* a2 cursor */
97    b1v = *b1; /* b1 value */
98    b2v = *b2; /* b2 value */
99    dc = costs0;
100   *dc++ = BIG_NUM;
101   oldCost = *dc++ =
        SquareDifference(*a1c++,b1v)*topToBottom+SquareDifference(*a2c++,b2v);
102
103   for (j=1;j<end;++j)
104    oldCost = *dc++ =
        oldCost+SquareDifference(*a1c++,b1v)*topToBottom+SquareDifference(*a2c++,b2v);
105
106   for (i=1;i<bLength;++i) {
107    /* Compute new center of band */
108    center = irint(slope*i);
109    realStart = center-bandWidth/2;
110    realEnd = realStart+bandWidth;
111    start = FMax(realStart,0);
112    oldEnd = end;
113    end = FMin(realEnd,aLength);
114    shift = end-oldEnd;
115
116    /* put large numbers where bands don't overlap */
117    for (j=0;j<shift;++j)
118     *dc++ = BIG_NUM;
119
120    a1c = a1+start; /* a1 cursor */
121    a2c = a2+start; /* a2 cursor */
122    b1v = *(b1+i); /* b1 value */
123    b2v = *(b2+i); /* b2 value */
```

```
124     if (i&1) {
125       cd = costs1+start-1+1;  /* cursor down ??? What about -1??? */
126       cdl = costs0+start-1+1; /* cursor down left */
127       cl = costs0+start+1;    /* cursor left */
128       dc = costs1+start+1;    /* destination cursor */
129     }
130     else {
131       cd = costs0+start-1+1;  /* cursor down */
132       cdl = costs1+start-1+1; /* cursor down left */
133       cl = costs1+start+1;    /* cursor left */
134       dc = costs0+start+1;    /* destination cursor */
135     }
136     *cd = BIG_NUM;
137     for (j=start;j<end;++j){
138       float down,left,downLeft,rest;
139       down = *cd++ + rest;
140       left = *cl++ + rest;
141       downLeft = *cdl++ + rest*centerWeight;
142       rest = SquareDifference(*a1c++,b1v)*topToBottom+
143           SquareDifference(*a2c++,b2v);
144       *dc++ = FMin(FMin(down,left),downLeft);
145     }
146   }
147
148   i--;
149   if (i&1)
150     dc = costs1+aLength-1+1;
151   else
152     dc = costs0+aLength-1+1;
153   returnVal = *dc;
154
155   if (lengthNormalize)
156     return returnVal/sqrt(aLength*aLength+bLength*bLength);
157   else
158     return returnVal;
159 }
160
161
162 float SepMatch(float *a1,int aLength,float *b1,int bLength,
163           float centerWeight,BOOLEAN lengthNormalize,int normalBandWidth)
164 {
165   float costs0[MAX_SIGNAL_LENGTH+1];
166   float costs1[MAX_SIGNAL_LENGTH+1];
167   int i,j,start,end,bandWidth,shift;
168   int realStart,realEnd,center,oldEnd;
169   float slope,angle;
170   float *a1c,*cd,*cl,*cdl,*dc;
171   float oldCost,b1v,returnVal;
172
173   if (aLength>MAX_SIGNAL_LENGTH||bLength>MAX_SIGNAL_LENGTH)
174     DoError("NewMatch: maximum signal length exceeded.\n",NULL);
175
176   slope = (float)aLength/(float)bLength;
177
178   if ((slope>MAX_SLOPE)||(1/slope>MAX_SLOPE)) {
179     return BIG_NUM;
180   }
181   angle = atan(slope);
```

```
182    bandWidth = irint(normalBandWidth/cos(angle));
183    center = 0;
184    realStart = center-bandWidth/2;
185    realEnd = realStart+bandWidth;
186    end = FMin(realEnd,aLength);
187
188    a1c = a1; /* a1 cursor */
189    b1v = *b1; /* b1 value */
190    dc = costs0;
191    *dc++ = BIG_NUM;
192    oldCost = *dc++ = SquareDifference(*a1c++,b1v);
193
194    for (j=1;j<end;++j)
195      oldCost = *dc++ = oldCost+SquareDifference(*a1c++,b1v);
196
197    for (i=1;i<bLength;++i){
198      /* Compute new center of band */
199      center = irint(slope*i);
200      realStart = center-bandWidth/2;
201      realEnd = realStart+bandWidth;
202      start = FMax(realStart,0);
203      oldEnd = end;
204      end = FMin(realEnd,aLength);
205      shift = end-oldEnd;
206
207      /* put large numbers where bands don't overlap */
208      for (j=0;j<shift;++j)
209        *dc++ = BIG_NUM;
210
211      a1c = a1+start; /* a1 cursor */
212      b1v = *(b1+i); /* b1 value */
213      if (i&1) {
214        cd = costs1+start-1+1; /* cursor down ??? What about -1??? */
215        cdl = costs0+start-1+1; /* cursor down left */
216        cl = costs0+start+1; /* cursor left */
217        dc = costs1+start+1; /* destination cursor */
218      }
219      else {
220        cd = costs0+start-1+1; /* cursor down */
221        cdl = costs1+start-1+1; /* cursor down left */
222        cl = costs1+start+1; /* cursor left */
223        dc = costs0+start+1; /* destination cursor */
224      }
225      *cd = BIG_NUM;
226      for (j=start;j<end;++j) {
227        float down,left,downLeft,rest;
228        down = *cd++ + rest;
229        left = *cl++ + rest;
230        downLeft = *cdl++ + rest*centerWeight;
231        rest = SquareDifference(*a1c++,b1v);
232        *dc++ = FMin(FMin(down,left),downLeft);
233      }
234    }
235
236    i--;
237    if (i&1)
238      dc = costs1+aLength-1+1;
239    else
```

```
240      dc = costs0+aLength-1+1;
241      returnVal = *dc;
242
243      if (lengthNormalize)
244        return returnVal/sqrt(aLength*aLength+bLength*bLength);
245      else
246        return returnVal;
247    }
248
249    #define WIDTH (800)
250    #define H_MARGIN (20)
251    #define V_MARGIN (40)
252    #define H_SPACING (20)
253    #define V_SPACING (100) /* Must be greater than 2*X_HEIGHT */
254    #define X_HEIGHT (17)
255    void DrawVLine(Picture pict,int x,int yt,int yb)
256    {
257      int i;
258      for (i=yt;i<yb;++i)
259        WritePixel(pict,x,i,1);
260    }
261
262    void DrawOutline(Picture pict,int numberOfLegs,float *tops,float *bottoms,int x,int y)
263    {
264      int i,top,bottom;
265      for (i=0;i<numberOfLegs;++i) {
266        top = irint(-*(tops+i)*X_HEIGHT);
267        bottom = irint(*(bottoms+i)*X_HEIGHT+X_HEIGHT);
268        DrawVLine(pict,i+x,top+y,bottom+y);
269      }
270    }
271
272    void PrintPath(float *a1,float *a2,int aLength,float *b1,float *b2,int bLength,
273              Direction path[MAX_SIGNAL_LENGTH][MAX_SIGNAL_LENGTH],int i,
274              float returnVal,
275              FILE *pathFP)
276    {
277      int x,y,j;
278      int length = 0;
279      int index = 0;
280      float newTop1[MAX_SIGNAL_LENGTH],newBottom1[MAX_SIGNAL_LENGTH];
281      float newTop2[MAX_SIGNAL_LENGTH],newBottom2[MAX_SIGNAL_LENGTH];
282
283      y = i;
284      x = aLength-1;
285      while (path[y][x]!=NONE) {
286       switch (path[y][x]) {
287       case DOWN:
288         x--;
289         break;
290       case LEFT:
291         y--;
292         break;
293       case D1L1:
294       case DOWNLEFT:
295         x--;
296         y--;
297         break;
```

```
298      case D2L1:
299        x-=2;
300        y--;
301        break;
302      case D1L2:
303        x--;
304        y-=2;
305        break;
306      default:
307        DoError("NewMatchAndPath: Internal error - bad case.\n",NULL);
308      }
309      ++length;
310    }
311
312    y = i;
313    x = aLength-1;
314    while (path[y][x]!=NONE) {
315      if (index>=MAX_SIGNAL_LENGTH)
316        DoError("NewMatchAddPath: warped signal is too long.\n",NULL);
317      newTop1[length-index] = a1[x];
318      newBottom1[length-index] = a2[x];
319      newTop2[length-index] = b1[y];
320      newBottom2[length-index] = b2[y];
321      switch (path[y][x]) {
322      case DOWN:
323        x--;
324        break;
325      case LEFT:
326        y--;
327        break;
328      case D1L1:
329      case DOWNLEFT:
330        x--;
331        y--;
332        break;
333      case D2L1:
334        x-=2;
335        y--;
336        break;
337      case D1L2:
338        x--;
339        y-=2;
340        break;
341      default:
342        DoError("NewMatchAndPath: Internal error - bad case.\n",NULL);
343      }
344      ++index;
345    }
346    if (index>=MAX_SIGNAL_LENGTH)
347      DoError("NewMatchAddPath: warped signal is too long.\n",NULL);
348    newTop1[length-index] = a1[x];
349    newBottom1[length-index] = a2[x];
350    newTop2[length-index] = b1[y];
351    newBottom2[length-index] = b2[y];
352    ++index;
353
354    for (j=0;j<index;++j)
355      fprintf(pathFP,"%d %f\n",j,newTop1[j]);
```

```
356       fprintf(pathFP,"\"top1\n\n");
357
358       for (j=0;j<index;++j)
359        fprintf(pathFP,"%d %f\n",j,newTop2[j]);
360       fprintf(pathFP,"\"top2\n\n");
361
362       for (j=0;j<index;++j)
363        fprintf(pathFP,"%d %f\n",j,-newBottom1[j]);
364       fprintf(pathFP,"\"bottom1\n\n");
365
366       for (j=0;j<index;++j)
367        fprintf(pathFP,"%d %f\n",j,-newBottom2[j]);
368       fprintf(pathFP,"\"bottom2\n\n");
369
370       {
371        Picture pict;
372        pict =
     new_pict(IMax(index,IMax(aLength,bLength))*2+H_SPACING+H_MARGIN*2,V_MARGIN*
     2+2*V_SPACING,1);
373         DrawOutline(pict,aLength,a1,a2,H_MARGIN,V_MARGIN);
374         DrawOutline(pict,bLength,b1,b2,H_MARGIN+aLength+H_SPACING,V_MARGIN);
375
376         DrawOutline(pict,index,newTop1,newBottom1,H_MARGIN,V_MARGIN+V_SPACING);
377
     DrawOutline(pict,index,newTop2,newBottom2,H_MARGIN+index+H_SPACING,V_MARGI
     N+V_SPACING);
378         DrawOutline(pict,index,newTop2,newBottom2,H_MARGIN,V_MARGIN+V_SPACING*2);
379         write_pict("out.pict",pict);
380       }
381
382       {
383        float checksum;
384        fprintf(pathFP,"%d %f\n",0,checksum);
385        for (j=0,checksum=0;j<index;++j) {
386         checksum+=SquareDifference(newTop1[j],newTop2[j])+
387            SquareDifference(newBottom1[j],newBottom2[j]);
388         fprintf(pathFP,"%d %f\n",j,checksum);
389        }
390        printf("checksum, score = %6.2f, %6.2f\n",checksum,returnVal);
391       }
392     }
393
394
395
396     float NewMatchAndPath(float *a1,float *a2,int aLength,float *b1,float *b2,int bLength,
397                float centerWeight,BOOLEAN lengthNormalize,int normalBandWidth,
398                float topToBottom,FILE *pathFP)
399     {
400       Direction path[MAX_SIGNAL_LENGTH][MAX_SIGNAL_LENGTH],*pc;
401       int x,y;
402       float costs0[MAX_SIGNAL_LENGTH+1];
403       float costs1[MAX_SIGNAL_LENGTH+1];
404       int i,j,start,end,bandWidth,shift;
405       int realStart,realEnd,center,oldEnd;
406       float slope,angle;
407       float *a1c,*a2c,*cd,*cl,*cdl,*dc;
408       float oldCost,b1v,b2v,returnVal;
409
```

```
410    if (aLength>MAX_SIGNAL_LENGTH||bLength>MAX_SIGNAL_LENGTH)
411      DoError("NewMatch: maximum signal length exceeded.\n",NULL);
412
413    slope = (float)aLength/(float)bLength;
414
415    if ((slope>MAX_SLOPE)||(1/slope>MAX_SLOPE)) {
416      return BIG_NUM;
417    }
418    angle = atan(slope);
419    bandWidth = irint(normalBandWidth/cos(angle));
420    center = 0;
421    realStart = center-bandWidth/2;
422    realEnd = realStart+bandWidth;
423    end = FMin(realEnd,aLength);
424
425    a1c = a1; /* a1 cursor */
426    a2c = a2; /* a2 cursor */
427    b1v = *b1; /* b1 value */
428    b2v = *b2; /* b2 value */
429    dc = costs0;
430    pc = &(path[0][0]);
431    *dc++ = BIG_NUM;
432    oldCost = *dc++ =
       SquareDifference(*a1c++,b1v)*topToBottom+SquareDifference(*a2c++,b2v);
433    *pc++ = NONE;
434
435    for (j=1;j<end;++j) {
436      oldCost = *dc++ =
       oldCost+SquareDifference(*a1c++,b1v)*topToBottom+SquareDifference(*a2c++,b2v);
437      *pc++ = DOWN;
438    }
439
440    #ifdef foo
441     printf("%6d ",0);
442     for (j=0;j<end;++j)
443      printf("%6.2f ",costs0[j+1]);
444    #endif
445
446    for (i=1;i<bLength;++i) {
447     /* Compute new center of band */
448     center = irint(slope*i);
449     realStart = center-bandWidth/2;
450     realEnd = realStart+bandWidth;
451     start = FMax(realStart,0);
452     oldEnd = end;
453     end = FMin(realEnd,aLength);
454     shift = end-oldEnd;
455
456     /* put large numbers where bands don't overlap */
457     for (j=0;j<shift;++j) {
458    /*   printf("%6.2f ",BIG_NUM); */
459      *dc++ = BIG_NUM;
460     }
461   /*   printf("\n%6d ",i); */
462
463     a1c = a1+start; /* a1 cursor */
464     a2c = a2+start; /* a2 cursor */
465     b1v = *(b1+i); /* b1 value */
```

```
466      b2v = *(b2+i); /* b2 value */
467      pc = &(path[i][start]);
468      if (i&1) {
469        cd = costs1+start-1+1; /* cursor down ??? What about -1??? */
470        cdl = costs0+start-1+1; /* cursor down left */
471        cl = costs0+start+1; /* cursor left */
472        dc = costs1+start+1; /* destination cursor */
473      }
474      else {
475        cd = costs0+start-1+1; /* cursor down */
476        cdl = costs1+start-1+1; /* cursor down left */
477        cl = costs1+start+1; /* cursor left */
478        dc = costs0+start+1; /* destination cursor */
479      }
480      *cd = BIG_NUM;
481      for (j=start;j<end; ++j) {
482        float down,left,downLeft,rest;
483        rest = SquareDifference(*a1c++,b1v)*topToBottom +
             SquareDifference(*a2c++,b2v);
484        down = *cd++ + rest;
485        left = *cl++ + rest;
486        downLeft = *cdl++ + rest*centerWeight;
487
488        if (down < left)
489            if (down < downLeft) {
490    /*        printf("%6.2f ",down); */
491            *dc++ = down;
492            *pc++ = DOWN;
493            }
494            else {
495    /*        printf("%6.2f ",downLeft); */
496            *dc++ = downLeft;
497            *pc++ = DOWNLEFT;
498            }
499        else
500            if (downLeft < left) {
501    /*        printf("%6.2f ",downLeft); */
502            *dc++ = downLeft;
503            *pc++ = DOWNLEFT;
504            }
505            else {
506    /*        printf("%6.2f ",left); */
507            *dc++ = left;
508            *pc++ = LEFT;
509            }
510      }
511    }
512
513    i--;
514    if (i&1)
515      dc = costs1+aLength-1+1;
516    else
517      dc = costs0+aLength-1+1;
518    returnVal = *dc;
519
520  #ifdef foo
521    if (!doPath) {
522      y = i;
```

```
523        x = aLength-1;
524        while (path[y][x]!=NONE) {
525         switch (path[y][x]) {
526         case DOWN:
527             x--;
528             break;
529         case LEFT:
530             y--;
531             break;
532         case DOWNLEFT:
533             x--;
534             y--;
535             break;
536         default:
537             DoError("NewMatchAndPath: Internal error.- bad case.\n",NULL);
538         }
539         fprintf(pathFP,"%d %d\n",x,y);
540        }
541        fprintf(pathFP,"%d %d\n",x,y);
542       }
543       else {}
544    #endif
545       PrintPath(a1,a2,aLength,b1,b2,bLength,path,i,returnVal,pathFP);
546
547       if (lengthNormalize)
548        return returnVal/sqrt(aLength*aLength + bLength*bLength);
549       else
550        return returnVal;
551     }
552
553
554    float SlopeCMatch(float *a1,float *a2,int aLength,float *b1,float *b2,int bLength,
555                     float centerWeight,BOOLEAN lengthNormalize,float topToBottom)
556    {
557     float costs0[MAX_SIGNAL_LENGTH+2];
558     float costs1[MAX_SIGNAL_LENGTH+2];
559     float costs2[MAX_SIGNAL_LENGTH+2];
560     float slope,minVal;
561     int i,j;
562     int bottom,top;
563     float *cd1l1,*cd2l1,*cd1l2;
564     float *a1c,*a2c,*cd,*cl,*cdl,*dc;
565     float b1v,b2v,returnVal;
566
567    /* printf("sc:\n"); */
568
569     if (aLength>MAX_SIGNAL_LENGTH||bLength>MAX_SIGNAL_LENGTH)
570       DoError("SlopeCMatch: maximum signal length exceeded.\n",NULL);
571
572     slope = (float)aLength/(float)bLength;
573     if ((slope>MAX_SLOPE)||(1/slope>MAX_SLOPE)) {
574       return BIG_NUM;
575     }
576
577     for (i=0;i<aLength+2;++i) {
578      costs2[i] = BIG_NUM;
579      costs1[i] = BIG_NUM;
580      costs0[i] = BIG_NUM;
```

```
581     }
582
583     costs0[2] = SquareDifference(*a1,*b1)*topToBottom+SquareDifference(*a2,*b2);
584
585     for (i=1;i<bLength;++i) {
586      bottom = IMax(i/2,2*i+aLength-2*bLength);
587      top = IMin(2*i,i/2+aLength-bLength/2)+1;
588
589      a1c = a1+bottom; /* a1 cursor */
590      a2c = a2+bottom; /* a2 cursor */
591      b1v = *(b1+i); /* b1 value */
592      b2v = *(b2+i); /* b2 value */
593
594      switch (i%3) {
595      case 0:
596       dc = costs0+bottom-2+2;
597       cd2l1 = costs2+bottom-2+2;
598       cd1l2 = costs1+bottom-1+2;
599       cd1l1 = costs2+bottom-1+2;
600       break;
601      case 1:
602       dc = costs1+bottom-2+2;
603       cd2l1 = costs0+bottom-2+2;
604       cd1l2 = costs2+bottom-1+2;
605       cd1l1 = costs0+bottom-1+2;
606       break;
607      case 2:
608       dc = costs2+bottom-2+2;
609       cd2l1 = costs1+bottom-2+2;
610       cd1l2 = costs0+bottom-1+2;
611       cd1l1 = costs1+bottom-1+2;
612       break;
613      }
614      *dc++ = BIG_NUM;
615      *dc++ = BIG_NUM;
616      for (j=bottom;j<top;++j) {
617       float d2l1,d1l2,d1l1,rest;
618       rest = SquareDifference(*a1c++,b1v)*topToBottom+
619         SquareDifference(*a2c++,b2v);
620       d1l1 = *cd1l1++ + rest*centerWeight;
621       d1l2 = *cd1l2++ + rest;
622       d2l1 = *cd2l1++ + rest;
623
624       *dc++ = FMin(FMin(d1l1,d2l1),d1l2);
625      }
626
627      switch (i%3) {
628      case 0:
629       dc = costs0;
630       break;
631      case 1:
632       dc = costs1;
633       break;
634      case 2:
635       dc = costs2;
636       break;
637      }
638
```

```
639    #ifdef foo
640      minVal = BIG_NUM;
641      printf("%6d: ",i);
642      for (j=0;j<aLength+2;++j) {
643       if (*dc <= minVal)
644          minVal = *dc;
645       if (*dc++ >= BIG_NUM)
646          printf(" ");
647       else
648          printf("*");
649      }
650      printf("   %6.2f\n",minVal);
651    #endif
652     }
653
654     --i;
655     switch (i%3) {
656     case 0:
657      dc = costs0;
658      break;
659     case 1:
660      dc = costs1;
661      break;
662     case 2:
663      dc = costs2;
664      break;
665     }
666     returnVal = *(dc+aLength-1+2);
667
668     if (lengthNormalize)
669      return returnVal/sqrt(aLength*aLength+bLength*bLength);
670     else
671      return returnVal;
672    }
673
674
675    float SepSlopeCMatch(float *a1,int aLength,float *b1,int bLength,
676                  float centerWeight,BOOLEAN lengthNormalize)
677    {
678     float costs0[MAX_SIGNAL_LENGTH+2];
679     float costs1[MAX_SIGNAL_LENGTH+2];
680     float costs2[MAX_SIGNAL_LENGTH+2];
681     float slope,minVal;
682     int i,j;
683     int bottom,top;
684     float *cd1l1,*cd2l1,*cd1l2;
685     float *a1c,*cd,*cl,*cdl,*dc;
686     float b1v,returnVal;
687
688     if (aLength>MAX_SIGNAL_LENGTH||bLength>MAX_SIGNAL_LENGTH)
689      DoError("SlopeCMatch: maximum signal length exceeded.\n",NULL);
690
691     slope = (float)aLength/(float)bLength;
692     if ((slope>MAX_SLOPE)||(1/slope>MAX_SLOPE)) {
693      return BIG_NUM;
694     }
695
696     for (i=0;i<aLength+2;++i) {
```

```
697        costs2[i] = BIG_NUM;
698        costs1[i] = BIG_NUM;
699        costs0[i] = BIG_NUM;
700      }
701
702      costs0[2] = SquareDifference(*a1,*b1);
703
704      for (i=1;i<bLength;++i) {
705       bottom = IMax(i/2,2*i+aLength-2*bLength);
706       top = IMin(2*i,i/2+aLength-bLength/2)+1;
707
708       a1c = a1+bottom; /* a1 cursor */
709       b1v = *(b1+i); /* b1 value */
710
711       switch (i%3) {
712       case 0:
713        dc = costs0+bottom-2+2;
714        cd2l1 = costs2+bottom-2+2;
715        cd1l2 = costs1+bottom-1+2;
716        cd1l1 = costs2+bottom-1+2;
717        break;
718       case 1:
719        dc = costs1+bottom-2+2;
720        cd2l1 = costs0+bottom-2+2;
721        cd1l2 = costs2+bottom-1+2;
722        cd1l1 = costs0+bottom-1+2;
723        break;
724       case 2:
725        dc = costs2+bottom-2+2;
726        cd2l1 = costs1+bottom-2+2;
727        cd1l2 = costs0+bottom-1+2;
728        cd1l1 = costs1+bottom-1+2;
729        break;
730       }
731       *dc++ = BIG_NUM;
732       *dc++ = BIG_NUM;
733       for (j=bottom;j<top;++j) {
734        float d2l1,d1l2,d1l1,rest;
735        rest = SquareDifference(*a1c++,b1v);
736        d1l1 = *cd1l1++ + rest*centerWeight;
737        d1l2 = *cd1l2++ + rest;
738        d2l1 = *cd2l1++ + rest;
739
740        *dc++ = FMin(FMin(d1l1,d2l1),d1l2);
741       }
742
743       switch (i%3) {
744       case 0:
745        dc = costs0;
746        break;
747       case 1:
748        dc = costs1;
749        break;
750       case 2:
751        dc = costs2;
752        break;
753       }
754      }
755
```

```
756      --i;
757      switch (i%3) {
758      case 0:
759        dc = costs0;
760        break;
761      case 1:
762        dc = costs1;
763        break;
764      case 2:
765        dc = costs2;
766        break;
767      }
768      returnVal = *(dc+aLength-1+2);
769
770      if (lengthNormalize)
771        return returnVal/sqrt(aLength*aLength+bLength*bLength);
772      else
773        return returnVal;
774    }
775
776
777    float SlopeCMatchAndPath(float *a1,float *a2,int aLength,float *b1,float *b2,int bLength,
778                   float centerWeight,BOOLEAN lengthNormalize,float topToBottom,
779                   FILE *pathFP)
780    {
781      Direction path[MAX_SIGNAL_LENGTH][MAX_SIGNAL_LENGTH],*pc;
782      float costs0[MAX_SIGNAL_LENGTH+2];
783      float costs1[MAX_SIGNAL_LENGTH+2];
784      float costs2[MAX_SIGNAL_LENGTH+2];
785      float slope,minVal;
786      int i,j;
787      int bottom,top;
788      float *cd1l1,*cd2l1,*cd1l2;
789      float *a1c,*a2c,*cd,*cl,*cdl,*dc;
790      float b1v,b2v,returnVal;
791
792    /* printf("sc:\n"); */
793
794      if (aLength>MAX_SIGNAL_LENGTH||bLength>MAX_SIGNAL_LENGTH)
795        DoError("SlopeCMatch: maximum signal length exceeded.\n",NULL);
796
797      slope = (float)aLength/(float)bLength;
798      if ((slope>MAX_SLOPE)||(1/slope>MAX_SLOPE)) {
799        return BIG_NUM;
800      }
801
802      for (i=0;i<aLength+2;++i) {
803        costs2[i] = BIG_NUM;
804        costs1[i] = BIG_NUM;
805        costs0[i] = BIG_NUM;
806      }
807
808      pc = &(path[0][0]);
809      *pc++ = NONE;
810      costs0[2] = SquareDifference(*a1,*b1)*topToBottom+SquareDifference(*a2,*b2);
```

```
811
812     for (i=1;i<bLength;++i) {
813      bottom = IMax(i/2,2*i+aLength-2*bLength);
814      top = IMin(2*i,i/2+aLength-bLength/2)+1;
815
816      a1c = a1+bottom; /* a1 cursor */
817      a2c = a2+bottom; /* a2 cursor */
818      b1v = *(b1+i); /* b1 value */
819      b2v = *(b2+i); /* b2 value */
820
821      switch (i%3) {
822      case 0:
823       dc = costs0+bottom-2+2;
824       cd2l1 = costs2+bottom-2+2;
825       cd1l2 = costs1+bottom-1+2;
826       cd1l1 = costs2+bottom-1+2;
827       break;
828      case 1:
829       dc = costs1+bottom-2+2;
830       cd2l1 = costs0+bottom-2+2;
831       cd1l2 = costs2+bottom-1+2;
832       cd1l1 = costs0+bottom-1+2;
833       break;
834      case 2:
835       dc = costs2+bottom-2+2;
836       cd2l1 = costs1+bottom-2+2;
837       cd1l2 = costs0+bottom-1+2;
838       cd1l1 = costs1+bottom-1+2;
839       break;
840      }
841      *dc++ = BIG_NUM;
842      *dc++ = BIG_NUM;
843      pc = &(path[i][bottom]);
844      for (j=bottom;j<top;++j) {
845       float d2l1,d1l2,d1l1,rest;
846
847       rest = SquareDifference(*a1c++,b1v)*topToBottom+
848          SquareDifference(*a2c++,b2v);
849       d1l1 = *cd1l1++ + rest*centerWeight;
850       d1l2 = *cd1l2++ + rest;
851       d2l1 = *cd2l1++ + rest;
852
853       if (d1l1<d1l2)
854          if (d1l1<d2l1) {
855            *dc++ = d1l1;
856            *pc++ = D1L1;
857          }
858          else {
859            *dc++ = d2l1;
860            *pc++ = D2L1;
861          }
862       else
863          if (d1l2<d2l1) {
864            *dc++ = d1l2;
865            *pc++ = D1L2;
866          }
867          else {
868            *dc++ = d2l1;
```

```
869            *pc++ = D2L1;
870          }
871        }
872
873        switch (i%3) {
874        case 0:
875          dc = costs0;
876          break;
877        case 1:
878          dc = costs1;
879          break;
880        case 2:
881          dc = costs2;
882          break;
883        }
884        minVal = BIG_NUM;
885        printf("%6d: ",i);
886        for (j=0;j<aLength+2;++j) {
887          if (*dc <= minVal)
888             minVal = *dc;
889          if (*dc++ >= BIG_NUM)
890             printf(" ");
891          else
892             printf("*");
893        }
894        printf("   %6.2f\n",minVal);
895     }
896
897     --i;
898     switch (i%3) {
899     case 0:
900       dc = costs0;
901       break;
902     case 1:
903       dc = costs1;
904       break;
905     case 2:
906       dc = costs2;
907       break;
908     }
909     returnVal = *(dc+aLength-1+2);
910
911     PrintPath(a1,a2,aLength,b1,b2,bLength,path,i,returnVal,pathFP);
912
913     if (lengthNormalize)
914       return returnVal/sqrt(aLength*aLength+bLength*bLength);
915     else
916       return returnVal;
917   }
918
```

Aug 2 02:29 1991 recogDesc.c

```
1     #include <stdio.h>
2     #include "mylib.h"
3     #include "types.h"
4     #include "dict.h"
```

```
5    #include "diff.h"
6
7    #define BIG_NUM (10e10)
8    #define MAX_WORDS (100)
9    #define MAX_FONTS (10)
10
11   extern double sqrt(double);
12
13   float CompareNumericDescriptors(float *a,float *b,int length)
14   {
15    int i;
16    float sum;
17    for (i=0,sum=0;i<length;++i) {
18     sum += (*a-*b)*(*a-*b);
19     ++a;
20     ++b;
21    }
22    return sqrt(sum);
23   }
24
25   float *ComputeNumericDescriptor(int modelIndex,Dictionary models,
26                                   Dictionary *fonts,int numberOfFonts,int numberOfWords,
27                                   DiffDescriptor dd,
28                                   float *sd,float *avg)
29   {
30    float *d;
31    int i,j;
32    float temp;
33    float sumxx[MAX_WORDS];
34    float sdev[MAX_WORDS];
35    float sumsdev,sumscore;
36
37    if ((d = (float *)calloc(numberOfWords,sizeof(float)))==NULL)
38     DoError("ComputeNumericDescriptor: cannot allocate space.\n",NULL);
39    for (j=0;j<numberOfWords;++j)
40     sumxx[j]=0;
41    for (i=0;i<numberOfFonts;++i)
42     for (j=0;j<numberOfWords;++j) {
43      temp=DiffPair(*(models->outlines+modelIndex),*(fonts[i]->outlines+j),dd);
44      if (temp < BIG_NUM) {
45          d[j]+=temp;
46          sumxx[j]+=temp*temp;
47      }
48     }
49
50    if (numberOfFonts > 1) {
51     float sum,minsdev,maxsdev;
52     for (j=0;j<numberOfWords;++j)
53      sdev[j] = sqrt((numberOfFonts*sumxx[j]-d[j]*d[j])/numberOfFonts/(numberOfFonts-1));
54     for (j=0,sumsdev=0,sumscore=0;j<numberOfWords;++j) {
55      sumsdev += sdev[j];
56      sumscore += d[j];
57     }
58     *sd = sumsdev/numberOfWords;
59     *avg = sumscore/numberOfWords;
60    }
61
62    for (j=0;j<numberOfWords;++j)
```

```
63        d[j]/=numberOfFonts;
64
65      return d;
66    }
67
68    typedef struct {
69      float score;
70      int x;
71      int y;
72    } *CompareTuple,CompareTupleBody;
73
74    int TupleLessThan(CompareTuple *x,CompareTuple *y)
75    {
76      if ((*x)->score == (*y)->score)
77        return 0;
78      else if ((*x)->score < (*y)->score)
79        return -1;
80      else
81        return 1;
82    }
83
84
85    void DoDescriptors(Dictionary models,char *modelName,char **wordNames,
86                      int numberOfFonts,Dictionary *fonts,char **fontNames,
87                      int numberOfWords,DiffDescriptor dd)
88    {
89      float *descriptors[MAX_WORDS];
90      int classes[MAX_WORDS][MAX_WORDS];
91      float sdev[MAX_WORDS],avg[MAX_WORDS];
92      CompareTupleBody tuples[MAX_WORDS*MAX_WORDS];
93      CompareTuple scores[MAX_WORDS*MAX_WORDS];
94      int i,x,y,j;
95      int count;
96    /* float threshold = 0.22; */
97      float threshold = 0.42;
98
99      for (i=0;i<numberOfWords;++i) {
100       descriptors[i] =
     ComputeNumericDescriptor(i,models,fonts,numberOfFonts,numberOfWords,dd,
101                                   sdev+i,avg+i);
102       fprintf(stdout,"%s: %6.4f %6.4f\n",wordNames[i],avg[i],sdev[i]);
103     }
104     fprintf(stdout,"\n\n");
105
106     for (y=0;y<numberOfWords;++y)
107       for (x=0;x<numberOfWords;++x)
108         classes[y][x] =
     (CompareNumericDescriptors(descriptors[y],descriptors[x],numberOfWords)
109                   < threshold);
110
111
112   #ifdef foo
113     for (y=0,i=0;y<numberOfWords;++y)
114       for (x=0;x<y;++x) {
115         CompareTuple temp;
116   /*
117       temp = (CompareTuple)calloc(1,sizeof(CompareTupleBody));
118       if (temp==NULL)
```

```
119          DoError(": cannot allocate space.\n",NULL);
120     */
121        temp = tuples+i;
122        temp->score =
     CompareNumericDescriptors(descriptors[y],descriptors[x],numberOfWords);
123        temp->x = x;
124        temp->y = y;
125        scores[i] = temp;
126        ++i;
127      }
128      qsort(scores,i,sizeof(CompareTuple),TupleLessThan);
129
130      for (j=0;j<i;++j)
131        fprintf(stdout,"(%s,%s):
     %f\n",wordNames[scores[j]->y],wordNames[scores[j]->x],scores[j]->score);
132    #endif
133
134      fprintf(stdout,"\n\n");
135      for (i=0;i<numberOfWords;++i) {
136       CompareTuple temp;
137       float *thisDesc;
138       float junk;
139       thisDesc =
     ComputeNumericDescriptor(i,models,&models,1,numberOfWords,dd,&junk,&junk);
140       for (j=0;j<numberOfWords;++j) {
141        temp = tuples+j;
142        temp->score = CompareNumericDescriptors(thisDesc,descriptors[j],numberOfWords);
143        temp->y = i;
144        temp->x = j;
145        scores[j] = temp;
146       }
147       qsort(scores,numberOfWords,sizeof(CompareTuple),TupleLessThan);
148
149       fprintf(stdout,"%s: ",wordNames[i]);
150       for (j=0;j<5&&j<numberOfWords;++j) {
151        fprintf(stdout,"%s ",wordNames[scores[j]->x]);
152        if (scores[j]->x == i)
153            break;
154       }
155       if (scores[j]->x==i)
156        fprintf(stdout,"\n");
157       else {
158        for (;j<numberOfWords;++j)
159            if (scores[j]->x==i)
160              break;
161        fprintf(stdout," (%d more)\n",j-5);
162       }
163
164       fprintf(stdout," ");
165       count = 0;
166       for (j=0;j<numberOfWords;++j)
167        if (classes[scores[0]->x][j]) {
168            fprintf(stdout,"%s ",wordNames[j]);
169            ++count;
170            if (count > 5)
171              break;
172        }
173       if (j<numberOfWords) {
```

```
174      for (count=0;j<numberOfWords;++j)
175          if (classes[scores[0]->x][j])
176            ++count;
177        fprintf(stdout," (% more)\n",count);
178      }
179      else
180      fprintf(stdout,"\n");
181
182      free(thisDesc);
183    }
184  }
185
186  void main(int argc,char **argv)
187  {
188    char *listFile;
189    Dictionary models;
190    char *modelName;
191    int numberOfFonts;
192    Dictionary fonts[MAX_FONTS];
193    char *fontNames[MAX_FONTS];
194    char *wordNames[MAX_WORDS];
195    int numberOfWords;
196    float centerWeight;
197    int normalBandWidth;
198    BOOLEAN
     lengthNormalize,useL2,slopeConstrain,warp,topToBottomOption,hillToValleyOption;
199    BOOLEAN separate;
200    float topToBottom,hillToValleyLocal;
201    FILE *listfp;
202    int i,x,y;
203    DiffDescriptorBody dd;
204
205    centerWeight = 1.0;
206    normalBandWidth = 20;
207    topToBottom = 1.0;
208    hillToValleyLocal = 1.0;
209    DefArg("%s","listFile",&listFile);
210    DefOption("-L2","-L2",&useL2);
211    DefOption("-slopeConstrain %f","-slopeConstrain <center weight>",
212        &slopeConstrain,&centerWeight);
213    DefOption("-warp %f %d","-warp <center weight> <band width>",
214        &warp,&centerWeight,&normalBandWidth);
215    DefOption("-separate","-separate",&separate);
216    DefOption("-normalize","-normalize",&lengthNormalize);
217    DefOption("-topToBottom %f","-topToBottom
     <ratio>",&topToBottomOption,&topToBottom);
218    DefOption("-hillToValley %f","-hillToValley
     <ratio>",&hillToValleyOption,&hillToValleyLocal);
219    ScanArgs(argc,argv);
220
221    if ((listfp = fopen(listFile,"r"))==NULL)
222      DoError("Error opening file %s.\n",listFile);
223
224    /* Read in the number of words in each dictionary */
225    numberOfWords = ReadInt(listfp);
226    if (numberOfWords > MAX_WORDS)
227      DoError("%s: too many words.\n",argv[0]);
228
```

```
229      /* Read in the words */
230      for (i=0;i<numberOfWords;++i) {
231       wordNames[i] = ReadString(listfp);
232      }
233
234      /* Read in the model dictionary */
235      modelName = ReadString(listfp);
236      models = ReadDictionary(modelName);
237
238      /* Read in the number of dictionaries */
239      numberOfFonts = ReadInt(listfp);
240      if (numberOfFonts > MAX_FONTS)
241       DoError("%s: too many dictionaries.\n",argv[0]);
242
243      /* Read in the dictionaries and their names */
244      for (i=0;i<numberOfFonts;++i) {
245       fontNames[i] = ReadString(listfp);
246       fonts[i] = ReadDictionary(fontNames[i]);
247      }
248
249      /* Check to see that all dictionaries have the same number of shapes as the specified number
         of words. */
250      for (i=1;i<numberOfFonts;++i)
251       if (fonts[i]->numberOfEntries < numberOfWords)
252        DoError("Dictionary %s has too few entries.\n",fontNames[i]);
253      if (models->numberOfEntries < numberOfWords)
254       DoError("Model dictionary has too few of entries.\n",NULL);
255
256
257      if (useL2) {
258       fprintf(stdout,"Using L2 on length normalized shapes.\n");
259       dd.diffType = L2;
260      }
261      else if (slopeConstrain) {
262       fprintf(stdout,"Using dynamic time warping with slope contrained to [0.5,2].\n");
263       dd.diffType = CONSTRAINED;
264       dd.separate = separate;
265       if (separate)
266        fprintf(stdout,"Top and bottom warped separately.\n");
267       else
268        fprintf(stdout,"Top and bottom warped together.\n");
269      }
270      else {
271       fprintf(stdout,"Using dynamic time warping with bandwidth %d.\n",normalBandWidth);
272       dd.diffType = WARP;
273       dd.bandWidth = normalBandWidth;
274       dd.separate = separate;
275       if (separate)
276        fprintf(stdout,"Top and bottom warped separately.\n");
277       else
278        fprintf(stdout,"Top and bottom warped together.\n");
279      }
280      if (!useL2) {
281       fprintf(stdout,"Center weight = %f.\n",centerWeight);
282       dd.centerWeight = centerWeight;
283       if (lengthNormalize) {
284        dd.lengthNormalize = TRUE;
285        fprintf(stdout,"Scores normalized by signal length.\n");
```

```
286         }
287        else
288          dd.lengthNormalize = FALSE;
289       }
290       dd.hillToValley = hillToValleyLocal;
291       dd.topToBottom = topToBottom;
292       dd.pathFP = NULL;
293
294       fprintf(stdout,"Words:\n");
295       for (i=0;i<numberOfWords;++i)
296         fprintf(stdout,"%d: %s\n",i,wordNames[i]);
297       fprintf(stdout,"\n");
298       fprintf(stdout,"Model font is %s.\n",modelName);
299       fprintf(stdout,"Fonts:\n");
300       for (i=0;i<numberOfFonts;++i)
301         fprintf(stdout,"%d: %s\n",i,fontNames[i]);
302       fprintf(stdout,"\n");
303
304
          DoDescriptors(models,modelName,wordNames,numberOfFonts,fonts,fontNames,numberOfWords,&dd);
305       }
```

Jun 18 16:20 1991 resample.c

```
1      #include <stdio.h>
2      #include <values.h>
3      #include <string.h>
4      #include <floatingpoint.h>
5      #include "boolean.h"
6      #include "types.h"
7      #include "error.h"
8      #include "dict.h"
9
10     void Resample(OutlinePair signal,float factor)
11     {
12      int i,count;
13      float pivot;
14      float delFactor;
15      float *oldTop,*newTop;
16      float *oldBottom,*newBottom;
17      float *topSPtr,*topDPtr;
18      float *bottomSPtr,*bottomDPtr;
19
20      delFactor = 1.0 - factor;
21      for (i=0,count=0,pivot=0.0;i<signal->numberOfLegs;++i) {
22       if (pivot>=1.0) {
23         pivot -= 1.0;
24         pivot += delFactor;
25       }
26       else {
27         pivot += delFactor;
28         ++count;
29       }
30      }
31
32      newTop = (float *)calloc(count,sizeof(float));
```

```
33      newBottom = (float *)calloc(count,sizeof(float));
34      if ((newTop==NULL)||(newBottom==NULL))
35        DoError("Resample: cannot allocate space.\n",NULL);
36
37      oldTop = signal->top;
38      oldBottom = signal->bottom;
39
40      topSPtr = signal->top;
41      bottomSPtr = signal->bottom;
42      topDPtr = newTop;
43      bottomDPtr = newBottom;
44      for (i=0,pivot=0.0;i<signal->numberOfLegs;++i) {
45        if (pivot>=1.0) {
46          pivot -= 1.0;
47          pivot += delFactor;
48          ++topSPtr;
49          ++bottomSPtr;
50        }
51        else {
52          pivot += delFactor;
53          *topDPtr++ = *topSPtr++;
54          *bottomDPtr++ = *bottomSPtr++;
55        }
56      }
57
58      signal->top = newTop;
59      signal->bottom = newBottom;
60      signal->numberOfLegs = count;
61
62      free(oldTop);
63      free(oldBottom);
64    }
65
66    void main(int argc,char **argv)
67    {
68      char *inFile,*outFile;
69      float factor;
70      int i;
71      Dictionary dict;
72
73      if (argc != 4) {
74        fprintf(stderr,"Usage:\n");
75        fprintf(stderr," %s <input file> <output file> <compression factor>\n",argv[0]);
76        fprintf(stderr,"Compresses shapes horizontally.\n");
77        exit(-1);
78      }
79
80      if ((factor>=1.0)||(factor<0.0))
81        DoError("%s: factor must be between 0 and 1.\n",argv[0]);
82
83      inFile = argv[1];
84      outFile = argv[2];
85      factor = atof(argv[3]);
86
87      dict = ReadDictionary(inFile);
88
89      for (i=0;i<dict->numberOfEntries;++i)
90        Resample(*(dict->outlines+i),factor);
```

```
91
92        WriteDictionary(dict,outFile);
93      }
```

Jul 31 16:48 1991 sepMatch.c

```
1       #include <stdio.h>
2       #include "mylib.h"
3       #include "misc.h"
4
5       #define MAX_SIGNAL_LENGTH (800)
6       #define MAX_SLOPE (2.0)
7       #define BIG_NUM (10e20)
8
9       typedef enum {NONE,LEFT,DOWN,DOWNLEFT,D1L1,D2L1,D1L2} Direction;
10
11      extern double sqrt(double);
12      extern double cos(double);
13      extern double atan(double);
14      extern int irint(double);
15
16      /* Assumes that a represents the model and b represents the unknown.
17       * Weights places where the model is lower than the unknown more than
18       * cases where the model is higher than the unknown.  The idea here is
19       * that valleys can be filled in by bleeding together, but that noise
20       * can rarely make a contour be too tall for extended periods.
21       */
22      float hillToValley = 1.0;
23      inline float SquareDifference(float a,float b)
24        {
25         float temp = a-b;
26         if (temp<0)
27           return temp*temp;
28         else
29           return temp*temp*hillToValley*hillToValley;
30      /*   return (a-b)*(a-b); */
31        }
32
33      inline float FMax(float a,float b)
34        {
35         if (a>b)
36           return a;
37         else
38           return b;
39        }
40
41      inline float FMin(float a,float b)
42        {
43         if (a<b)
44           return a;
45         else
46           return b;
47        }
48
49      inline int IMax(int a,int b)
50        {
51         if (a>b)
52           return a;
```

```
53      else
54        return b;
55    }
56
57    inline int IMin(int a,int b)
58    {
59     if (a<b)
60       return a;
61     else
62       return b;
63    }
64
65    float NewMatch(float *a1,float *a2,int aLength,float *b1,float *b2,int bLength,
66             float centerWeight,BOOLEAN lengthNormalize,int normalBandWidth,
67             float topToBottom)
68    {
69     float costs0[MAX_SIGNAL_LENGTH+1];
70     float costs1[MAX_SIGNAL_LENGTH+1];
71     int i,j,start,end,bandWidth,shift;
72     int realStart,realEnd,center,oldEnd;
73     float slope,angle;
74     float *a1c,*a2c,*cd,*cl,*cdl,*dc;
75     float oldCost,b1v,b2v,returnVal;
76
77     if (aLength>MAX_SIGNAL_LENGTH||bLength>MAX_SIGNAL_LENGTH)
78       DoError("NewMatch: maximum signal length exceeded.\n",NULL);
79
80     slope = (float)aLength/(float)bLength;
81
82     if ((slope>MAX_SLOPE)||(1/slope>MAX_SLOPE)) {
83       return BIG_NUM;
84     }
85     angle = atan(slope);
86     bandWidth = irint(normalBandWidth/cos(angle));
87     center = 0;
88     realStart = center-bandWidth/2;
89     realEnd = realStart+bandWidth;
90     end = FMin(realEnd,aLength);
91
92     a1c = a1; /* a1 cursor */
93     a2c = a2; /* a2 cursor */
94     b1v = *b1; /* b1 value */
95     b2v = *b2; /* b2 value */
96     dc = costs0;
97     *dc++ = BIG_NUM;
98     oldCost = *dc++ =
    SquareDifference(*a1c++,b1v)*topToBottom+SquareDifference(*a2c++,b2v);
99
100    for (j=1;j<end;++j)
101      oldCost = *dc++ =
    oldCost+SquareDifference(*a1c++,b1v)*topToBottom+SquareDifference(*a2c++,b2v);
102
103    for (i=1;i<bLength;++i) {
104     /* Compute new center of band */
105     center = irint(slope*i);
106     realStart = center-bandWidth/2;
107     realEnd = realStart+bandWidth;
108     start = FMax(realStart,0);
```

```
109      oldEnd = end;
110      end = FMin(realEnd,aLength);
111      shift = end-oldEnd;
112
113      /* put large numbers where bands don't overlap */
114      for (j=0;j<shift;++j)
115        *dc++ = BIG_NUM;
116
117      a1c = a1+start; /* a1 cursor */
118      a2c = a2+start; /* a2 cursor */
119      b1v = *(b1+i); /* b1 value */
120      b2v = *(b2+i); /* b2 value */
121      if (i&1) {
122        cd = costs1+start-1+1; /* cursor down ??? What about -1??? */
123        cdl = costs0+start-1+1; /* cursor down left */
124        cl = costs0+start+1; /* cursor left */
125        dc = costs1+start+1; /* destination cursor */
126      }
127      else {
128        cd = costs0+start-1+1; /* cursor down */
129        cdl = costs1+start-1+1; /* cursor down left */
130        cl = costs1+start+1; /* cursor left */
131        dc = costs0+start+1; /* destination cursor */
132      }
133      *cd = BIG_NUM;
134      for (j=start;j<end;++j) {
135        float down,left,downLeft,rest;
136        down = *cd++ + rest;
137        left = *cl++ + rest;
138        downLeft = *cdl++ + rest*centerWeight;
139        rest = SquareDifference(*a1c++,b1v)*topToBottom+
140            SquareDifference(*a2c++,b2v);
141        *dc++ = FMin(FMin(down,left),downLeft);
142      }
143    }
144
145    i--;
146    if (i&1)
147      dc = costs1+aLength-1+1;
148    else
149      dc = costs0+aLength-1+1;
150    returnVal = *dc;
151
152    if (lengthNormalize)
153      return returnVal/sqrt(aLength*aLength+bLength*bLength);
154    else
155      return returnVal;
156  }
157
158
159  void PrintPath(float *a1,float *a2,int aLength,float *b1,float *b2,int bLength,
160        Direction path[MAX_SIGNAL_LENGTH][MAX_SIGNAL_LENGTH],int i,
161        float returnVal,
162        FILE *pathFP)
163  {
164    int x,y,j;
165    int length = 0;
166    int index = 0;
```

```
167       float newTop1[MAX_SIGNAL_LENGTH],newBottom1[MAX_SIGNAL_LENGTH];
168       float newTop2[MAX_SIGNAL_LENGTH],newBottom2[MAX_SIGNAL_LENGTH];
169
170       y = i;
171       x = aLength-1;
172       while (path[y][x]!=NONE) {
173        switch (path[y][x]) {
174        case DOWN:
175         x--;
176         break;
177        case LEFT:
178         y--;
179         break;
180        case D1L1:
181        case DOWNLEFT:
182         x--;
183         y--;
184         break;
185        case D2L1:
186         x-=2;
187         y--;
188         break;
189        case D1L2:
190         x--;
191         y-=2;
192         break;
193        default:
194         DoError("NewMatchAndPath: Internal error - bad case.\n",NULL);
195        }
196        ++length;
197       }
198
199       y = i;
200       x = aLength-1;
201       while (path[y][x]!=NONE) {
202        if (index>=MAX_SIGNAL_LENGTH)
203         DoError("NewMatchAddPath: warped signal is too long.\n",NULL);
204        newTop1[length-index] = a1[x];
205        newBottom1[length-index] = a2[x];
206        newTop2[length-index] = b1[y];
207        newBottom2[length-index] = b2[y];
208        switch (path[y][x]) {
209        case DOWN:
210         x--;
211         break;
212        case LEFT:
213         y--;
214         break;
215        case D1L1:
216        case DOWNLEFT:
217         x--;
218         y--;
219         break;
220        case D2L1:
221         x-=2;
222         y--;
223         break;
224        case D1L2:
```

```
225      x--;
226      y-=2;
227      break;
228    default:
229      DoError("NewMatchAndPath: Internal error - bad case.\n",NULL);
230    }
231    ++index;
232  }
233  if (index>=MAX_SIGNAL_LENGTH)
234    DoError("NewMatchAddPath: warped signal is too long.\n",NULL);
235  newTop1[length-index] = a1[x];
236  newBottom1[length-index] = a2[x];
237  newTop2[length-index] = b1[y];
238  newBottom2[length-index] = b2[y];
239  ++index;
240
241  for (j=0;j<index;++j)
242    fprintf(pathFP,"%d %f\n",j,newTop1[j]);
243  fprintf(pathFP,"\"top1\n\n");
244
245  for (j=0;j<index;++j)
246    fprintf(pathFP,"%d %f\n",j,newTop2[j]);
247  fprintf(pathFP,"\"top2\n\n");
248
249  for (j=0;j<index;++j)
250    fprintf(pathFP,"%d %f\n",j,-newBottom1[j]);
251  fprintf(pathFP,"\"bottom1\n\n");
252
253  for (j=0;j<index;++j)
254    fprintf(pathFP,"%d %f\n",j,-newBottom2[j]);
255  fprintf(pathFP,"\"bottom2\n\n");
256
257  {
258    float checksum;
259    fprintf(pathFP,"%d %f\n",0,checksum);
260    for (j=0,checksum=0;j<index;++j) {
261      checksum+=SquareDifference(newTop1[j],newTop2[j])+
262        SquareDifference(newBottom1[j],newBottom2[j]);
263      fprintf(pathFP,"%d %f\n",j,checksum);
264    }
265    printf("checksum, score = %6.2f, %6.2f\n",checksum,returnVal);
266  }
267 }
268
269
270
271 float NewMatchAndPath(float *a1,float *a2,int aLength,float *b1,float *b2,int bLength,
272                      float centerWeight,BOOLEAN lengthNormalize,int normalBandWidth,
273                      float topToBottom,FILE *pathFP)
274 {
275   Direction path[MAX_SIGNAL_LENGTH][MAX_SIGNAL_LENGTH],*pc;
276   int x,y;
277   float costs0[MAX_SIGNAL_LENGTH+1];
278   float costs1[MAX_SIGNAL_LENGTH+1];
279   int i,j,start,end,bandWidth,shift;
280   int realStart,realEnd,center,oldEnd;
281   float slope,angle;
282   float *a1c,*a2c,*cd,*cl,*cdl,*dc;
```

```
283     float oldCost,b1v,b2v,returnVal;
284
285     if (aLength>MAX_SIGNAL_LENGTH||bLength>MAX_SIGNAL_LENGTH)
286       DoError("NewMatch: maximum signal length exceeded.\n",NULL);
287
288     slope = (float)aLength/(float)bLength;
289
290     if ((slope>MAX_SLOPE)||(1/slope>MAX_SLOPE)) {
291       return BIG_NUM;
292     }
293     angle = atan(slope);
294     bandWidth = irint(normalBandWidth/cos(angle));
295     center = 0;
296     realStart = center-bandWidth/2;
297     realEnd = realStart+bandWidth;
298     end = FMin(realEnd,aLength);
299
300     a1c = a1; /* a1 cursor */
301     a2c = a2; /* a2 cursor */
302     b1v = *b1; /* b1 value */
303     b2v = *b2; /* b2 value */
304     dc = costs0;
305     pc = &(path[0][0]);
306     *dc++ = BIG_NUM;
307     oldCost = *dc++ =
        SquareDifference(*a1c++,b1v)*topToBottom+SquareDifference(*a2c++,b2v);
308     *pc++ = NONE;
309
310     for (j=1;j<end;++j) {
311       oldCost = *dc++ =
        oldCost+SquareDifference(*a1c++,b1v)*topToBottom+SquareDifference(*a2c++,b2v);
312       *pc++ = DOWN;
313     }
314
315     #ifdef foo
316      printf("%6d ",0);
317      for (j=0;j<end;++j)
318        printf("%6.2f ",costs0[j+1]);
319     #endif
320
321     for (i=1;i<bLength;++i) {
322      /* Compute new center of band */
323      center = irint(slope*i);
324      realStart = center-bandWidth/2;
325      realEnd = realStart+bandWidth;
326      start = FMax(realStart,0);
327      oldEnd = end;
328      end = FMin(realEnd,aLength);
329      shift = end-oldEnd;
330
331      /* put large numbers where bands don't overlap */
332      for (j=0;j<shift;++j) {
333     /*   printf("%6.2f ",BIG_NUM); */
334        *dc++ = BIG_NUM;
335      }
336     /*  printf("\n%6d ",i); */
337
338      a1c = a1+start; /* a1 cursor */
```

```
339        a2c = a2+start; /* a2 cursor */
340        b1v = *(b1+i); /* b1 value */
341        b2v = *(b2+i); /* b2 value */
342        pc = &(path[i][start]);
343        if (i&1) {
344          cd = costs1+start-1+1; /* cursor down ??? What about -1??? */
345          cdl = costs0+start-1+1; /* cursor down left */
346          cl = costs0+start+1; /* cursor left */
347          dc = costs1+start+1; /* destination cursor */
348        }
349        else {
350          cd = costs0+start-1+1; /* cursor down */
351          cdl = costs1+start-1+1; /* cursor down left */
352          cl = costs1+start+1; /* cursor left */
353          dc = costs0+start+1; /* destination cursor */
354        }
355        *cd = BIG_NUM;
356        for (j=start;j<end;++j) {
357          float down,left,downLeft,rest;
358          rest = SquareDifference(*a1c++,b1v)*topToBottom +
               SquareDifference(*a2c++,b2v);
359          down = *cd++ + rest;
360          left = *cl++ + rest;
361          downLeft = *cdl++ + rest*centerWeight;
362
363          if (down < left)
364            if (down < downLeft) {
365   /*         printf("%6.2f ",down); */
366              *dc++ = down;
367              *pc++ = DOWN;
368            }
369            else {
370   /*         printf("%6.2f ",downLeft); */
371              *dc++ = downLeft;
372              *pc++ = DOWNLEFT;
373            }
374          else
375            if (downLeft < left) {
376   /*         printf("%6.2f ",downLeft); */
377              *dc++ = downLeft;
378              *pc++ = DOWNLEFT;
379            }
380            else {
381   /*         printf("%6.2f ",left); */
382              *dc++ = left;
383              *pc++ = LEFT;
384            }
385        }
386      }
387
388      i--;
389      if (i&1)
390        dc = costs1+aLength-1+1;
391      else
392        dc = costs0+aLength-1+1;
393      returnVal = *dc;
394
```

```
395    #ifdef foo
396     if (!doPath) {
397      y = i;
398      x = aLength-1;
399      while (path[y][x]!=NONE) {
400       switch (path[y][x]) {
401       case DOWN:
402           x--;
403           break;
404       case LEFT:
405           y--;
406           break;
407       case DOWNLEFT:
408           x--;
409           y--;
410           break;
411       default:
412           DoError("NewMatchAndPath: Internal error - bad case.\n",NULL);
413       }
414       fprintf(pathFP,"%d %d\n",x,y);
415      }
416      fprintf(pathFP,"%d %d\n",x,y);
417     }
418     else {}
419    #endif
420     PrintPath(a1,a2,aLength,b1,b2,bLength,path,i,returnVal,pathFP);
421
422     if (lengthNormalize)
423      return returnVal/sqrt(aLength*aLength+bLength*bLength);
424     else
425      return returnVal;
426    }
427
428
429    float SlopeCMatch(float *a1,float *a2,int aLength,float *b1,float *b2,int bLength,
430               float centerWeight,BOOLEAN lengthNormalize,float topToBottom)
431    {
432     float costs0[MAX_SIGNAL_LENGTH+2];
433     float costs1[MAX_SIGNAL_LENGTH+2];
434     float costs2[MAX_SIGNAL_LENGTH+2];
435     float slope,minVal;
436     int i,j;
437     int bottom,top;
438     float *cd1l1,*cd2l1,*cd1l2;
439     float *a1c,*a2c,*cd,*cl,*cdl,*dc;
440     float b1v,b2v,returnVal;
441
442    /* printf("sc:\n"); */
443
444     if (aLength>MAX_SIGNAL_LENGTH||bLength>MAX_SIGNAL_LENGTH)
445      DoError("SlopeCMatch: maximum signal length exceeded.\n",NULL);
446
447     slope = (float)aLength/(float)bLength;
448     if ((slope>MAX_SLOPE)||(1/slope>MAX_SLOPE)) {
449      return BIG_NUM;
450     }
451
452     for (i=0;i<aLength+2;++i) {
```

```
453      costs2[i] = BIG_NUM;
454      costs1[i] = BIG_NUM;
455      costs0[i] = BIG_NUM;
456    }
457
458    costs0[2] = SquareDifference(*a1,*b1)*topToBottom+SquareDifference(*a2,*b2);
459
460    for (i=1;i<bLength;++i) {
461      bottom = IMax(i/2,2*i+aLength-2*bLength);
462      top = IMin(2*i,i/2+aLength-bLength/2)+1;
463
464      a1c = a1+bottom;  /* a1 cursor */
465      a2c = a2+bottom;  /* a2 cursor */
466      b1v = *(b1+i);    /* b1 value */
467      b2v = *(b2+i);    /* b2 value */
468
469      switch (i%3) {
470      case 0:
471        dc = costs0+bottom-2+2;
472        cd2l1 = costs2+bottom-2+2;
473        cd1l2 = costs1+bottom-1+2;
474        cd1l1 = costs2+bottom-1+2;
475        break;
476      case 1:
477        dc = costs1+bottom-2+2;
478        cd2l1 = costs0+bottom-2+2;
479        cd1l2 = costs2+bottom-1+2;
480        cd1l1 = costs0+bottom-1+2;
481        break;
482      case 2:
483        dc = costs2+bottom-2+2;
484        cd2l1 = costs1+bottom-2+2;
485        cd1l2 = costs0+bottom-1+2;
486        cd1l1 = costs1+bottom-1+2;
487        break;
488      }
489      *dc++ = BIG_NUM;
490      *dc++ = BIG_NUM;
491      for (j=bottom;j<top;++j) {
492        float d2l1,d1l2,d1l1,rest;
493        rest = SquareDifference(*a1c++,b1v)*topToBottom+
494          SquareDifference(*a2c++,b2v);
495        d1l1 = *cd1l1++ + rest*centerWeight;
496        d1l2 = *cd1l2++ + rest;
497        d2l1 = *cd2l1++ + rest;
498
499        *dc++ = FMin(FMin(d1l1,d2l1),d1l2);
500      }
501
502      switch (i%3) {
503      case 0:
504        dc = costs0;
505        break;
506      case 1:
507        dc = costs1;
508        break;
509      case 2:
510        dc = costs2;
```

```
511       break;
512     }
513
514 #ifdef foo
515     minVal = BIG_NUM;
516     printf("%6d: ",i);
517     for (j=0;j<aLength+2;++j) {
518      if (*dc <= minVal)
519          minVal = *dc;
520      if (*dc++ >= BIG_NUM)
521          printf(" ");
522      else
523          printf("*");
524     }
525     printf("    %6.2f\n",minVal);
526 #endif
527    }
528
529    --i;
530    switch (i%3) {
531    case 0:
532     dc = costs0;
533     break;
534    case 1:
535     dc = costs1;
536     break;
537    case 2:
538     dc = costs2;
539     break;
540    }
541    returnVal = *(dc+aLength-1+2);
542
543    if (lengthNormalize)
544     return returnVal/sqrt(aLength*aLength+bLength*bLength);
545    else
546     return returnVal;
547 }
548
549
550 float SlopeCMatchAndPath(float *a1,float *a2,int aLength,float *b1,float *b2,int bLength,
551                 float centerWeight,BOOLEAN lengthNormalize,float topToBottom,
552                 FILE *pathFP)
553 {
554  Direction path[MAX_SIGNAL_LENGTH][MAX_SIGNAL_LENGTH],*pc;
555  float costs0[MAX_SIGNAL_LENGTH+2];
556  float costs1[MAX_SIGNAL_LENGTH+2];
557  float costs2[MAX_SIGNAL_LENGTH+2];
558  float slope,minVal;
559  int i,j;
560  int bottom,top;
561  float *cd1l1,*cd2l1,*cd1l2;
562  float *a1c,*a2c,*cd,*cl,*cdl,*dc;
563  float b1v,b2v,returnVal;
564
565  /* printf("sc:\n"); */
566
567  if (aLength>MAX_SIGNAL_LENGTH||bLength>MAX_SIGNAL_LENGTH)
568     DoError("SlopeCMatch: maximum signal length exceeded.\n",NULL);
```

```
slope = (float)aLength/(float)bLength;
if ((slope>MAX_SLOPE)||(1/slope>MAX_SLOPE)) {
 return BIG_NUM;
} for (i=0;i<aLength+2;++i) {
 costs2[i] = BIG_NUM;
 costs1[i] = BIG_NUM;
 costs0[i] = BIG_NUM;
} pc = &(path[0][0]);
*pc++ = NONE;
costs0[2] = SquareDifference(*a1,*b1)*topToBottom+SquareDifference(*a2,*b2);

for (i=1;i<bLength;++i) {
 bottom = IMax(i/2,2*i+aLength-2*bLength);
 top = IMin(2*i,i/2+aLength-bLength/2)+1;

a1c = a1+bottom; /* a1 cursor */
 a2c = a2+bottom; /* a2 cursor */
 b1v = *(b1+i); /* b1 value */
 b2v = *(b2+i); /* b2 value */ switch (i%3) {
 case 0:
  dc = costs0+bottom-2+2;
  cd2l1 = costs2+bottom-2+2;
  cd1l2 = costs1+bottom-1+2;
  cd1l1 = costs2+bottom-1+2;
  break;
 case 1:
  dc = costs1+bottom-2+2;
  cd2l1 = costs0+bottom-2+2;
  cd1l2 = costs2+bottom-1+2;
  cd1l1 = costs0+bottom-1+2;
  break;
 case 2:
  dc = costs2+bottom-2+2;
  cd2l1 = costs1+bottom-2+2;
  cd1l2 = costs0+bottom-1+2;
  cd1l1 = costs1+bottom-1+2;
  break;
 }
 *dc++ = BIG_NUM;
 *dc++ = BIG_NUM;
 pc = &(path[i][bottom]);
 for (j=bottom;j<top;++j) {
  float d2l1,d1l2,d1l1,rest;

rest = SquareDifference(*a1c++,b1v)*topToBottom+
      SquareDifference(*a2c++,b2v);
  d1l1 = *cd1l1++ + rest*centerWeight;
  d1l2 = *cd1l2++ + rest;
  d2l1 = *cd2l1++ + rest;

if (d1l1<d1l2)
```

```
627        if (d1l1<d2l1) {
628          *dc++ = d1l1;
629          *pc++ = D1L1;
630        }
631        else {
632          *dc++ = d2l1;
633          *pc++ = D2L1;
634        }
635      else
636        if (d1l2<d2l1) {
637          *dc++ = d1l2;
638          *pc++ = D1L2;
639        }
640        else {
641          *dc++ = d2l1;
642          *pc++ = D2L1;
643        }
644    }
645
646    switch (i%3) {
647    case 0:
648      dc = costs0;
649      break;
650    case 1:
651      dc = costs1;
652      break;
653    case 2:
654      dc = costs2;
655      break;
656    }
657    minVal = BIG_NUM;
658    printf("%6d: ",i);
659    for (j=0;j<aLength+2;++j) {
660      if (*dc <= minVal)
661         minVal = *dc;
662      if (*dc++ >= BIG_NUM)
663         printf(" ");
664      else
665         printf("*");
666    }
667    printf("   %6.2f\n",minVal);
668  }
669
670  --i;
671  switch (i%3) {
672  case 0:
673    dc = costs0;
674    break;
675  case 1:
676    dc = costs1;
677    break;
678  case 2:
679    dc = costs2;
680    break;
681  }
682  returnVal = *(dc+aLength-1+2);
683
```

```
684       PrintPath(a1,a2,aLength,b1,b2,bLength,path,i,returnVal,pathFP);
685
686       if (lengthNormalize)
687         return returnVal/sqrt(aLength*aLength+bLength*bLength);
688       else
689         return returnVal;
690     }
691
```

Jul 31 17:14 1991 single.c

```
1     #include <stdio.h>
2     #include "mylib.h"
3     #include "types.h"
4     #include "dict.h"
5     #include "diff.h"
6     #include "match.h"
7     #include "matchparallel.h"
8
9     main(argc, argv)
10    int argc;
11    char *argv[];
12    {
13      char *dictFile1,*dictFile2,*outFile;
14      int shape1,shape2;
15      Dictionary dict1,dict2;
16      float score;
17      char *matchType;
18      float centerWeight,normalBandWidth,topToBottom,hillToValleyLocal;
19      DiffDescriptorBody dd;
20      FILE *pathFP;
21      BOOLEAN useL2,slopeConstrain,warp,lengthNormalize,topToBottomOption,hillToValleyOption;
22      BOOLEAN separate;
23
24      centerWeight = 1.0;
25      normalBandWidth = 20;
26      topToBottom = 1.0;
27      hillToValleyLocal = 1.0;
28      DefArg("%s %d %s %d %s","dict1 shape1 dict2 shape2 outfile",&dictFile1,&shape1,
29             &dictFile2,&shape2,&outFile);
30      DefOption("-L2","-L2",&useL2);
31      DefOption("-slopeConstrain %f","-slopeConstrain <center weight>",
32             &slopeConstrain,&centerWeight);
33      DefOption("-warp %f %f","-warp <center weight> <band width>",
34             &warp,&centerWeight,&normalBandWidth);
35      DefOption("-separate","-separate",&separate);
36      DefOption("-normalize","-normalize",&lengthNormalize);
37      DefOption("-topToBottom %f","-topToBottom <ratio>",&topToBottomOption,&topToBottom);
38      DefOption("-hillToValley %f","-hillToValley <ratio>",&hillToValleyOption,&hillToValleyLocal);
39      ScanArgs(argc,argv);
40
41      dict1 = ReadDictionary(dictFile1);
42      dict2 = ReadDictionary(dictFile2);
43
```

```
44      if ((shape1 >= dict1->numberOfEntries) || (shape1 < 0) ||
45          (shape2 >= dict2->numberOfEntries) || (shape2 < 0))
46        DoError("%s: bad shape number.\n",argv[0]);
47
48      if ((pathFP=fopen(outFile,"w"))==NULL)
49        DoError("single: error opening output file %s.\n",outFile);
50
51      if (useL2) {
52        fprintf(stdout,"Using L2 on length normalized shapes.\n");
53        dd.diffType = L2;
54      }
55      else if (slopeConstrain) {
56        fprintf(stdout,"Using dynamic time warping with slope contrained to [0.5,2].\n");
57        dd.diffType = CONSTRAINED;
58        dd.separate = separate;
59        if (separate)
60          fprintf(stdout,"Top and bottom warped separately.\n");
61        else
62          fprintf(stdout,"Top and bottom warped together.\n");
63      }
64      else {
65        fprintf(stdout,"Using dynamic time warping with bandwidth %d.\n",normalBandWidth);
66        dd.diffType = WARP;
67        dd.bandWidth = normalBandWidth;
68        dd.separate = separate;
69        if (separate)
70          fprintf(stdout,"Top and bottom warped separately.\n");
71        else
72          fprintf(stdout,"Top and bottom warped together.\n");
73      }
74      if (!useL2) {
75        fprintf(stdout,"Center weight = %f.\n",centerWeight);
76        dd.centerWeight = centerWeight;
77        if (lengthNormalize) {
78          dd.lengthNormalize = TRUE;
79          fprintf(stdout,"Scores normalized by signal length.\n");
80        }
81        else
82          dd.lengthNormalize = FALSE;
83      }
84      dd.hillToValley = hillToValleyLocal;
85      dd.topToBottom = topToBottom;
86      dd.pathFP = pathFP;
87      fprintf(stdout,"Top to bottom ratio = %6.2f.\n",topToBottom);
88      fprintf(stdout,"Hill to Valley ratio = %6.2f.\n",hillToValleyLocal);
89
90      score = DiffPair(*(dict1->outlines+shape1),
91                      *(dict2->outlines+shape2),
92                      &dd);
93
94      fclose(pathFP);
95
96      printf("Score = %f\n",score);
97    }
```

Jul 23 20:24 1991 slopeMatch.c

```
1    float SlopeConstrainedMatch(float *a1,float *a2,int aLength,
2                                float *b1,float *b2,int bLength,
3                                float maxSlope)
4    {
5      float costs[MAX_SIGNAL_LENGTH][MAX_SIGNAL_LENGTH];
6      char down[MAX_SIGNAL_LENGTH][MAX_SIGNAL_LENGTH];
7      char left[MAX_SIGNAL_LENGTH][MAX_SIGNAL_LENGTH];
8    }
```

Jul 12 14:36 1991 sortMatrix.c

```
1    #include <stdio.h>
2    #include "error.h"
3    #include "pict.h"
4
5    #define MAX_ENTRIES 5000
6
7    typedef struct {
8      float score;
9      int x;
10     int y;
11   } *CompareTuple,CompareTupleBody;
12
13   int TupleLessThan(CompareTuple *x,CompareTuple *y)
14   {
15     if ((*x)->score == (*y)->score)
16       return 0;
17     else if ((*x)->score < (*y)->score)
18       return -1;
19     else
20       return 1;
21   }
22
23   void PrintTuple(CompareTuple a,FILE *fp)
24   {
25     fprintf(fp,"(%d,%d): %f\n",a->x,a->y,a->score);
26   }
27
28   void main(int argc,char **argv)
29   {
30     Picture pict;
31     int i,j;
32     int x,y;
33     char *infile;
34     CompareTuple scores[MAX_ENTRIES];
35
36     if (argc != 2)
37       DoError("Usage: %s infile.\n",argv[0]);
38     infile = argv[1];
39
40     pict = load_pict(infile);
41     if (pict->width*pict->height > MAX_ENTRIES)
42       DoError("%s: matrix has too manyt entries.\n",argv[0]);
```

```
43
44          for (y=0,i=0;y<pict->height;++y)
45           for (x=0;x<pict->width;++x) {
46             CompareTuple temp;
47             temp = (CompareTuple)calloc(1,sizeof(CompareTupleBody));
48             if (temp = = NULL)
49                 DoError("%s: cannot allocate space.\n",argv[0]);
50             temp->score = *((float *)(pict->data)+x+y*pict->width);
51             temp->x = x;
52             temp->y = y;
53             scores[i] = temp;
54             ++i;
55           }
56          qsort(scores,i,sizeof(CompareTuple),TupleLessThan);
57          for (j=0;j<i;++j)
58           PrintTuple(scores[j],stdout);
59         }
60
```

Section D

Aug 26 17:54 1991 Makefile

```
1       CCFLAGS = -g -c -I/net/piglet/piglet-1c/hopcroft/new/include
2
3       OFUNS = blobify.o orient.o lines.o newBaselines.o newMain.o types.o \
4       newBlobify.o boxes.o newContour.o numbers.o fontNorm.o \
5       dict.o
6
7       ALPHAOFUNS = orient.o lines.o baselines.o newMain.o types.o \
8       blobify.o boxes.o newContour.o numbers.o alphaNorm.o \
9       dict.o
10
11
12      SOURCES = Makefile baselines.c blobify.c boxes.c dict.c dmain.c getAll.c\
13      getOutline.c lines.c newContour.c newDiff2.c newMain.c\
14      numbers.c orient.c overlay.c fontNorm.c testFine.c types.c
15
16      EXTRNS = /net/piglet/piglet-1c/hopcroft/error/error.o\
17      /net/piglet/piglet-1c/hopcroft/new/pict/pict.o \
18      /net/piglet/piglet-1c/hopcroft/lists/lists.o
19
20      INCLUDE = /net/piglet/piglet-1c/hopcroft/new/include/
21      MISC = $(INCLUDE)misc.h
22      BOOLEAN = $(INCLUDE)boolean.h
23      LINES = $(INCLUDE)lines.h
24      LISTS = $(INCLUDE)lists.h
25      PICT = $(INCLUDE)pict.h
26      TYPES = $(INCLUDE)types.h
27      MYLIB = $(INCLUDE)mylib.h
28      ORIENT = $(INCLUDE)orient.h
29      BASELINES = $(INCLUDE)baselines.h
30      BLOBIFY = $(INCLUDE)blobify.h
31      BOXES = $(INCLUDE)boxes.h
32      CONTOUR = $(INCLUDE)newContour.h
```

```
33    DIFF = $(INCLUDE)diff.h
34    DICT = $(INCLUDE)dict.h
35    ERROR = $(INCLUDE)error.h
36    FONTNORM = $(INCLUDE)fontNorm.h
37
38    orient:     $(OFUNS)
39        gcc $(OFUNS) $(HOME)/new/lib/mylib.a /usr/lib/debug/malloc.o -lm -o $@
40
41    newBlobify: newBlobify.o
42        gcc newBlobify.o ../lib/mylib.a -lm -o $@
43
44    makeAlphabet:    $(ALPHAOFUNS)
45        gcc $(ALPHAOFUNS) /usr/lib/debug/malloc.o $(EXTRNS) -lm -o $@
46
47    overlay:    overlay.o
48        gcc overlay.o $(EXTRNS) -o $@
49
50    testFine:   testFine.o lines.o guassian.o types.o
51        gcc testFine.o lines.o guassian.o types.o $(EXTRNS) -lm -o $@
52
53    boxes:      boxes.o lines.o types.o
54        gcc boxes.o lines.o types.o $(HOME)/new/lib/mylib.a -lm -o $@
55
56    getOutline: dict.o getOutline.o
57        gcc getOutline.o dict.o $(EXTRNS) -lm -o $@
58
59    getAll:     dict.o getAll.o
60        gcc getAll.o dict.o $(EXTRNS) -lm -o $@
61
62    maxFilter:  maxFilter.o
63        gcc maxFilter.o $(HOME)/new/lib/mylib.a -lm -o $@
64
65    myWc: myWc.o
66        gcc myWc.o $(EXTRNS) -o $@
67
68    printCode:  $(SOURCES)
69        /usr/5bin/pr -n3 $(SOURCES) | lpr -PWeeklyWorldNews
70
71    newBaselines.o:   newBaselines.c $(BOOLEAN) $(PICT) $(TYPES) $(LISTS) $(LINES)\
72    $(BASELINES)
73        gcc $(CCFLAGS) newBaselines.c
74
75    blobify.o:  blobify.c $(BOOLEAN) $(PICT) $(BLOBIFY)
76        gcc $(CCFLAGS) blobify.c
77
78    boxes.o:        boxes.c $(BOOLEAN) $(PICT) $(TYPES) $(BOXES)
79        gcc $(CCFLAGS) boxes.c
80
81    dict.o:         dict.c $(BOOLEAN) $(TYPES) $(ERROR) $(PICT) $(DICT)
82        gcc $(CCFLAGS) dict.c
83
84    dmain.o: dmain.c $(BOOLEAN) $(PICT) $(DIFF)
85        gcc $(CCFLAGS) dmain.c
86
87    getAll.o: getAll.c $(BOOLEAN) $(TYPES) $(PICT) $(DICT)
88        gcc $(CCFLAGS) getAll.c
89
```

```
90    getOutline.o: getOutline.c $(BOOLEAN) $(TYPES) $(PICT) $(DICT)
91        gcc $(CCFLAGS) getOutline.c
92
93    guassian.o:      guassian.c
94        gcc $(CCFLAGS) guassian.c
95
96    lines.o:    lines.c $(BOOLEAN) $(PICT) $(LINES)
97        gcc $(CCFLAGS) lines.c
98
99    maxFilter.o: maxFilter.c $(MYLIB)
100       gcc $(CCFLAGS) maxFilter.c
101
102   myWc.o:         myWc.c $(BOOLEAN) $(ERROR)
103       gcc $(CCFLAGS) myWc.c
104
105   newBlobify.o:     newBlobify.c $(MYLIB) $(BLOBIFY)
106       gcc $(CCFLAGS) newBlobify.c
107
108   newContour.o:    newContour.c $(BOOLEAN) $(PICT) $(TYPES) $(LINES) \
109   $(LISTS) $(CONTOUR) $(FONTNORM)
110       gcc $(CCFLAGS) newContour.c
111
112   newDiff2.o: newDiff2.c $(BOOLEAN) $(TYPES) $(PICT) $(DIFF)
113       gcc $(CCFLAGS) newDiff2.c
114
115   newMain.o:       newMain.c $(BOOLEAN) $(PICT) $(LISTS) $(LINES) \
116   $(ORIENT) $(BASELINES) $(BLOBIFY) $(BOXES) $(CONTOUR) $(ORIENT)
117       gcc $(CCFLAGS) newMain.c
118
119   numbers.o:  numbers.c $(BOOLEAN) $(PICT) $(LINES)
120       gcc $(CCFLAGS) numbers.c
121
122   orient.o:    orient.c $(BOOLEAN) $(TYPES) $(PICT) $(ORIENT) $(LINES)
123       gcc $(CCFLAGS) orient.c
124
125   overlay.o:   overlay.c $(BOOLEAN) $(PICT)
126       gcc $(CCFLAGS) overlay.c
127
128   postproc.o: postproc.c $(BOOLEAN) $(TYPES) $(ERROR) $(PICT) $(DICT)
129       gcc $(CCFLAGS) postproc.c
130
131   alphaNorm.o: alphaNorm.c $(BOOLEAN) $(TYPES) $(ERROR) $(PICT) $(DICT) $(FONTNORM)
132       gcc $(CCFLAGS) alphaNorm.c
133
134   fontNorm.o: fontNorm.c $(BOOLEAN) $(TYPES) $(ERROR) $(PICT) $(DICT) $(FONTNORM)
135       gcc $(CCFLAGS) fontNorm.c
136
137   testFine.o:   testFine.c
138       gcc $(CCFLAGS) testFine.c
139
140   types.o:        types.c $(TYPES) $(ERROR)
141       gcc $(CCFLAGS) types.c
142
```

Aug 5 15:45 1991 alphaNorm.c

```
1     #include <stdio.h>
```

```
2    #include <math.h>
3    #include "boolean.h"
4    #include "types.h"
5    #include "error.h"
6    #include "pict.h"
7    #include "dict.h"
8    #include "fontNorm.h"
9
10   /* This file is just like fontNorm.c, but assumes that the input is data for an alphabet
     dictionary.
11    * This data is
12    *
13    * a-z
14    *
15    * A-Z
16    *
17    * 0-9
18    *
19    * |!@#$%^&*()+\-={}[];:/<>?
20    *
21    * '`"~
22    *
23    * _,.
24    *
25    * The x height will be measured from the x(23).  The ascender height will be measured
26    * from the l(11).
27    */
28
29   #define X_HEIGHT_SHAPE 23
30   #define ASC_HEIGHT_SHAPE 11
31
32   extern double ceil(double);
33   extern int irint(double);
34
35
36   #define UP 0
37   #define DOWN 1
38   typedef int Direction;
39
40   extern Picture thePict;
41
42   void StoreRawOutlinePair(Dictionary dict, int dictEntry,
43                    Box box,int *bothX,int *topY, int *baseY,
44                    int numberOfLegs)
45   {
46    RawOutlinePair temp;
47    int i;
48    int *xCursor,*topCursor,*bottomCursor;
49
50    temp = (RawOutlinePair)calloc(1,sizeof(RawOutlinePairBody));
51    if (temp == NULL)
52     DoError("StoreRawOutlinePair: cannot allocate space\n",NULL);
53
54    temp->box = box;
55    temp->numberOfLegs = numberOfLegs;
56
57    temp->x = (int *)calloc(temp->numberOfLegs,sizeof(int));
58    temp->top = (int *)calloc(temp->numberOfLegs,sizeof(int));
```

```
59      temp->bottom = (int *)calloc(temp->numberOfLegs,sizeof(int));
60      if ((temp->x == NULL) ||
61        (temp->top == NULL) ||
62        (temp->bottom == NULL))
63        DoError("StoreRawOutlinePair: cannot allocate space\n",NULL);
64
65      xCursor = temp->x;
66      topCursor = temp->top;
67      bottomCursor = temp->bottom;
68
69      for (i=0;i<numberOfLegs;++i) {
70       *xCursor++ = *bothX++;
71       *topCursor++ = *topY++;
72       *bottomCursor++ = *baseY++;
73      }
74      *(dict->rawOutlines+dictEntry) = temp;
75    }
76
77    int RawOutlineWidth(RawOutlinePair a,int middleLine)
78    {
79     int i,numberOfLegs,right,left;
80     int *topCursor,*bottomCursor;
81     int topValue,bottomValue;
82
83     numberOfLegs = a->numberOfLegs;
84
85     topCursor = a->top;
86     bottomCursor = a->bottom;
87     for (i=0;i<numberOfLegs;++i) {
88      topValue = *topCursor++;
89      bottomValue = *bottomCursor++;
90
91      if (topValue != HIT_THE_BOX) {
92       topValue = middleLine - topValue;
93       if (topValue<0)
94          topValue = 0;
95      }
96      else
97       topValue = 0;
98
99      if (bottomValue != HIT_THE_BOX) {
100      bottomValue = bottomValue - middleLine;
101      if (bottomValue < 0)
102         bottomValue = 0;
103     }
104     else
105      bottomValue = 0;
106
107     if ((bottomValue != 0)||(topValue != 0))
108      break;
109    }
110    left = i;
111
112    topCursor = a->top+numberOfLegs-1;
113    bottomCursor = a->bottom+numberOfLegs-1;
114    for (i=numberOfLegs-1;i>=0;--i) {
115     topValue = *topCursor--;
116     bottomValue = *bottomCursor--;
```

```
117
118       if (topValue != HIT_THE_BOX) {
119        topValue = middleLine - topValue;
120        if (topValue<0)
121            topValue = 0;
122       }
123       else
124        topValue = 0;
125
126       if (bottomValue != HIT_THE_BOX) {
127        bottomValue = bottomValue - middleLine;
128        if (bottomValue < 0)
129            bottomValue = 0;
130       }
131       else bottomValue = 0;
132
133       if ((topValue != 0)||(bottomValue !=0))
134        break;
135      }
136      right = i+1;
137
138      return right-left;
139     }
140
141     void ResampleOutlinePair(OutlinePair a,float newToOldFactor)
142     /* Resample an outline pair using linear interpolation. */
143     {
144      int newWidth,oldWidth,i;
145      int oldLeft,oldRight;
146      float oldCenter;
147      float *newX,*newTop,*newBottom;
148      float *xCursor,*topCursor,*bottomCursor;
149
150      oldWidth = a->numberOfLegs;
151      newWidth = irint(newToOldFactor*oldWidth);
152
153      newX = (float *)calloc(newWidth,sizeof(float));
154      newTop = (float *)calloc(newWidth,sizeof(float));
155      newBottom = (float *)calloc(newWidth,sizeof(float));
156      if ((newX==NULL)||(newTop==NULL)||(newBottom==NULL))
157        DoError("ResampleOutlinePair: cannot allocate space.\n",NULL);
158
159      xCursor = newX;
160      topCursor = newTop;
161      bottomCursor = newBottom;
162
163      for (i=0;i<newWidth;++i) {
164       oldCenter = i/(float)newWidth*(float)oldWidth;
165       oldLeft = irint(floor(oldCenter));
166       oldRight = irint(ceil(oldCenter));
167       if (oldLeft==oldRight) {
168         *xCursor++ = *(a->x+oldLeft);
169         *topCursor++ = *(a->top+oldLeft);
170         *bottomCursor++ = *(a->bottom+oldLeft);
171       }
172       else {
173        float slope;
174        slope = *(a->x+oldRight)-*(a->x+oldLeft);
```

```
175       *xCursor++ = *(a->x+oldLeft) + (oldCenter-oldLeft)*slope;
176       slope = *(a->top+oldRight)-*(a->top+oldLeft);
177       *topCursor++ = *(a->top+oldLeft) + (oldCenter-oldLeft)*slope;
178       slope = *(a->bottom+oldRight)-*(a->bottom+oldLeft);
179       *bottomCursor++ = *(a->bottom+oldLeft) + (oldCenter-oldLeft)*slope;
180     }
181   }
182
183   free(a->x);
184   free(a->top);
185   free(a->bottom);
186
187   a->x = newX;
188   a->top = newTop;
189   a->bottom = newBottom;
190   a->numberOfLegs = newWidth;
191 }
192
193 void StoreOutlinePair(Dictionary dict, int dictEntry,
194                 int middleLine,int fontXHeight,
195                 int ascenderHeight)
196 /* This routine normalizes the raw outline pair stored in dict at dictEntry using the following
197  * operations:
198  * 1) For the top contour, shift so that the middle line is at y=0 and negate so that the
199  *    higher points are greater than 0. For the bottom, shift so that middle line is at y=0,
200  *    but don't flip. Thus, lower points have y coordinates greater than 0.
201  *    Consider points whose value is HIT_THE_BOX to be at y=0. These correspond to gaps
202  *    between the letters.
203  * 2) Compress top and bottom y coordinates by 1/fontXHeight so that the coordinates at the
204  *    distance of the fontXHeight have value 1. Note that 1 is an arbitrary number. It is
205  *    unlikely that a signal will have parts that are the x height above the center line
206  *    anyway.
207  *    FOR TOP CONTOUR,
208  *    IF HEIGHT IS GREATER THAN XHEIGHT, SCALE DIFFERENCE BY 1.5/ASCENDER_HEIGHT.
209  *    ELSE SCALE DIFFERENCE BY 1/XHEIGHT.
210  *    FOR BOTTOM CONTOUR,
211  *    SCALE BY 1.5/ASCENDER_HEIGHT.
212  * 3) Compress the x coordinates by the same factor as in step 2. Note that this does not
213  *    actually resample the contour. NOW DO THIS WITH RESAMPLE. USE SCALE FACTOR OF
214  *    20/XHEIGHT.
215  * 4) Remove left and right ends of the contour that have y values of zero. This is so the
216  *    contour starts where the word starts, rather than at the edge of its bouding box.
217  * 5) Resample the contour to stretch by firstFontXwidth/fontxWidth. KILL THIS OPERATION.
218  */
219 {
220   RawOutlinePair raw;
221   OutlinePair temp;
222   int i,numberOfLegs;
223   int y;
224   int offset;
225
226   int *xSCursor,*topSCursor,*bottomSCursor;
227   float *xDCursor,*topDCursor,*bottomDCursor;
228   float *xCursor,*topCursor,*bottomCursor;
      int left,right;
```

```
229     float foffset;
230
231     raw = *(dict->rawOutlines+dictEntry);
232
233     temp = (OutlinePair)calloc(1,sizeof(OutlinePairBody));
234     if (temp == NULL)
235       DoError("StoreOutlinePair: cannot allocate space\n",NULL);
236
237     temp->x = (float *)calloc(raw->numberOfLegs,sizeof(float));
238     temp->top = (float *)calloc(raw->numberOfLegs,sizeof(float));
239     temp->bottom = (float *)calloc(raw->numberOfLegs,sizeof(float));
240     if ((temp->x == NULL) ||
241        (temp->top == NULL) ||
242        (temp->bottom == NULL))
243       DoError("StoreOutlinePair: cannot allocate space\n",NULL);
244
245     temp->box = raw->box;
246     temp->blackoutHeight = 0;
247     temp->numberOfLegs = raw->numberOfLegs;
248     offset = temp->offset = *(raw->x);
249     temp->width = *(raw->x+raw->numberOfLegs-1) - temp->offset;
250
251     xDCursor = temp->x;
252     topDCursor = temp->top;
253     bottomDCursor = temp->bottom;
254     xSCursor = raw->x;
255     topSCursor = raw->top;
256     bottomSCursor = raw->bottom;
257
258     numberOfLegs = raw->numberOfLegs;
259     for (i=0;i<numberOfLegs;++i) {
260  /*    *xDCursor++ = (float)(*xSCursor++ - offset)/fontXHeight; */
261       if (*topSCursor==HIT_THE_BOX) {
262         y = 0;
263         topSCursor++;
264       }
265       else {
266         y = middleLine - *topSCursor++;
267         if (y<0)
268            y = 0;
269       }
270       if (y>fontXHeight/2)
271         *topDCursor++ = (float)y *1.5 / ascenderHeight;
272       else
273         *topDCursor++ = (float)y / fontXHeight;
274
275       if (*bottomSCursor==HIT_THE_BOX) {
276         y = 0;
277         bottomSCursor++;
278       }
279       else {
280         y = *bottomSCursor++ - middleLine;
281         if (y<0)
282            y = 0;
283       }
284       if (y>fontXHeight/2)
285         *bottomDCursor++ = (float)y / fontXHeight;
286       else
```

```
287            *bottomDCursor++ = (float)y *1.5 / ascenderHeight;
288          }
289
290          /* Now try to remove parts of the contour on to the left and right of the
291           * word shape that are at height 0 */
292
293          /* Find left edge */
294          topDCursor = temp->top;
295          bottomDCursor = temp->bottom;
296          for (i=0;i<numberOfLegs;++i) {
297            if ((*topDCursor++ != 0)||(*bottomDCursor++ !=0))
298              break;
299          }
300          left = i;
301
302          /* Find right edge */
303          topDCursor = temp->top+numberOfLegs-1;
304          bottomDCursor = temp->bottom+numberOfLegs-1;
305          for (i=numberOfLegs-1;i>=0;--i) {
306            if ((*topDCursor-- != 0)||(*bottomDCursor-- !=0))
307              break;
308          }
309          right = i+1;
310
311          /* Clip the ends of the contour at left and right */
312          xDCursor = temp->x;
313          topDCursor = temp->top;
314          bottomDCursor = temp->bottom;
315          xCursor = temp->x+left;
316          topCursor = temp->top+left;
317          bottomCursor = temp->bottom+left;
318          foffset = *xSCursor;
319          for (i=left;i<right;++i) {
320            *xDCursor++ = *xCursor++ - foffset;
321            *topDCursor++ = *topCursor++;
322            *bottomDCursor++ = *bottomCursor++;
323          }
324          temp->numberOfLegs = right-left;
325
326          *(dict->outlines+dictEntry) = temp;
327          ResampleOutlinePair(*(dict->outlines+dictEntry),(float)20/(float)fontXHeight);
328        }
329
330        static int lineSpacing;
331        int OrderOutlinePair(OutlinePair *o1,OutlinePair *o2)
332        {
333          int yDistance;
334          int xDistance;
335          yDistance = (*o1)->box->pageY - (*o2)->box->pageY;
336          if (yDistance<lineSpacing && yDistance > -lineSpacing) {
337            xDistance = (*o1)->box->pageX - (*o2)->box->pageX;
338            return xDistance;
339          }
340          return yDistance;
341        }
342
343        void SortDictionary(Dictionary dict)
344        {
```

```
345      lineSpacing = 20;
346      qsort(dict->rawOutlines,dict->numberOfEntries,sizeof(RawOutlinePair),
347          OrderOutlinePair);
348     }
349
350     /* WARNING - assumes at least on entry is not equal to HIT_THE_BOX */
351     float MaxTopValue(RawOutlinePair o)
352     {
353      int i;
354      float maxValue;
355      maxValue = *(o->top);
356      for (i=0;i<o->numberOfLegs;++i)
357       if (*(o->top+i)>maxValue && (*o->top+i)!=HIT_THE_BOX)
358         maxValue = *(o->top+i);
359      return maxValue;
360     }
361
362     /* WARNING - assumes at least on entry is not equal to HIT_THE_BOX */
363     float MinTopValue(RawOutlinePair o)
364     {
365      int i;
366      float minValue;
367      minValue = *(o->top);
368      for (i=0;i<o->numberOfLegs;++i)
369       if (*(o->top+i)<minValue && (*o->top+i)!=HIT_THE_BOX)
370         minValue = *(o->top+i);
371      return minValue;
372     }
373
374     #define HIST_SIZE 100
375     void HistogramMax(int *data,int dataLength,int offset,int sign,int *histogram)
376     {
377      int i,bin;
378
379      if (sign>0) {
380       int maxValue;
381
382       maxValue = *data;
383       for (i=0;i<dataLength;++i)
384        if (data[i]!=HIT_THE_BOX) {
385            maxValue = data[i];
386            break;
387        }
388       for (;i<dataLength;++i)
389        if (data[i]!=HIT_THE_BOX && data[i]>maxValue)
390            maxValue = data[i];
391       if (maxValue != HIT_THE_BOX) {
392        bin = maxValue-offset;
393        if ((bin>=0)&&(bin<HIST_SIZE))
394            histogram[bin]++;
395       }
396      }
397      else {
398       int minValue;
399       minValue = *data;
400       for (i=0;i<dataLength;++i)
401        if (data[i]!=HIT_THE_BOX) {
402            minValue = data[i];
```

```
403          break;
404       }
405      for (;i<dataLength;++i)
406       if (data[i]!=HIT_THE_BOX && data[i]<minValue)
407           minValue = data[i];
408      if (minValue != HIT_THE_BOX) {
409       bin = minValue-offset;
410       if ((bin>=0)&&(bin<HIST_SIZE))
411           histogram[bin]++;
412      }
413     }
414    }
415
416    void Histogram(int *data,int dataLength, int offset, int *histogram)
417    {
418     int i,bin;
419
420     for (i=0;i<dataLength;++i) {
421      if (*data != HIT_THE_BOX) {
422       bin = *data-offset;
423       if ((bin>=0)&&(bin<HIST_SIZE))
424           histogram[bin]++;
425      }
426      data++;
427     }
428    }
429
430    int MaxBin(int *histogram)
431    {
432     int i;
433     int maxValue;
434     int maxIndex;
435
436     maxValue = histogram[0];
437     maxIndex = 0;
438     for (i=0;i<HIST_SIZE;++i)
439      if (histogram[i]>maxValue) {
440       maxValue = histogram[i];
441       maxIndex = i;
442      }
443     return maxIndex;
444    }
445
446    int MaxBinAbove(int *histogram,int line)
447    {
448     int i;
449     int maxValue;
450     int maxIndex;
451     int top,bottom;
452
453     for (i=0;i<HIST_SIZE;++i)
454      if (histogram[i] != 0)
455       break;
456
457     top = i;
458     bottom = (line+top)/2;
459
460     maxValue = histogram[top];
```

```
461       maxIndex = top;
462       for (i=top;i<=bottom;++i)
463        if (histogram[i]>maxValue) {
464         maxValue = histogram[i];
465         maxIndex = i;
466        }
467       return maxIndex;
468      }
469
470      void DrawTextLines(Picture thePict,Dictionary dict,int topLine,int bottomLine)
471      {
472       int maxLength;
473       int halfWidth;
474       int x,y;
475       float x2,x3,y2,y3;
476       float angle;
477
478       angle = (*(dict->rawOutlines))->box->angle;
479       maxLength = thePict->width+thePict->height;
480       halfWidth = thePict->width / 2;
481       x = topLine * -sin(angle) + halfWidth * cos(angle);
482       y = topLine * cos(angle) + halfWidth * sin(angle);
483       x2 = x+maxLength*cos(angle);
484       y2 = y+maxLength*sin(angle);
485       x3 = x-maxLength*cos(angle);
486       y3 = y-maxLength*sin(angle);
487       DrawLine(thePict,x,y,(int)x2,(int)y2,5);
488       DrawLine(thePict,x,y,(int)x3,(int)y3,5);
489
490       x = bottomLine * -sin(angle) + halfWidth * cos(angle);
491       y = bottomLine * cos(angle) + halfWidth * sin(angle);
492       x2 = x+maxLength*cos(angle);
493       y2 = y+maxLength*sin(angle);
494       x3 = x-maxLength*cos(angle);
495       y3 = y-maxLength*sin(angle);
496       DrawLine(thePict,x,y,(int)x2,(int)y2,5);
497       DrawLine(thePict,x,y,(int)x3,(int)y3,5);
498      }
499
500      void PageStatistics(Dictionary dict,char *fileName)
501      /* WARNING - this must be run before PostProcess since PostProcess changes the raw
502       * shape data. */
503      {
504       int index;
505       int temp;
506       int i,startIndex,firstY,minY,endIndex,shape;
507       int tops[HIST_SIZE];
508       int bottoms[HIST_SIZE];
509       int ascenders[HIST_SIZE];
510       int descenders[HIST_SIZE];
511       int middleLine,topLine,bottomLine,ascenderLine,descenderLine;
512       int ascenderHeight,descenderHeight,lineNumber;
513       int fontXHeight,fontXWidth,xIndex;
514       RawOutlinePair thisShape;
515       FILE *fp;
516       BOOLEAN haveFirstFontXWidth = FALSE;
517       int firstFontXWidth;
518
```

```
519    if ((fp=fopen(fileName,"w"))= =NULL)
520      DoError("PageStatistics: error opening output file %s.\n",fileName);
521
522    SortDictionary(dict);
523
524    index = 0;
525    lineNumber = 0;
526    while (index < dict->numberOfEntries) {
527     startIndex = index;
528     firstY = (*(dict->rawOutlines+index))->box->pageY;
529     minY = firstY;
530     while ( (*(dict->rawOutlines+index))->box->pageY - firstY < 20 &&
531            (*(dict->rawOutlines+index))->box->pageY - firstY > -20) {
532      if ( minY > ( (*(dict->rawOutlines+index))->box->pageY ))
533         minY = (*(dict->rawOutlines+index))->box->pageY;
534      ++index;
535      if (index = = dict->numberOfEntries)
536         break;
537     }
538     endIndex = index;
539
540
541     /* shapes from start index through endindex are all on */
542     /* the same text line */
543     /* minY has the top of the highest box on the line. */
544
545     /* Find the base and toplines by taking the mode of the heights of the
546      * valleys of the bottom contours and the peaks of the top contours */
547     for (i=0;i<HIST_SIZE;i++) {
548      bottoms[i]=0;
549     }
550
551     for (shape=startIndex;shape<endIndex; ++shape) {
552      thisShape = *(dict->rawOutlines+shape);
553      Histogram(thisShape->bottom,thisShape->numberOfLegs,minY,bottoms);
554     }
555     bottomLine = MaxBin(bottoms)+minY;
556     if (X_HEIGHT_SHAPE> =startIndex&&X_HEIGHT_SHAPE<endIndex) {
557      topLine = MinTopValue(*(dict->rawOutlines+X_HEIGHT_SHAPE));
558      fontXHeight = bottomLine - topLine;
559     }
560     if (ASC_HEIGHT_SHAPE> =startIndex&&ASC_HEIGHT_SHAPE<endIndex) {
561      ascenderLine = MinTopValue(*(dict->rawOutlines+ASC_HEIGHT_SHAPE));
562      ascenderHeight = bottomLine - ascenderLine;
563     }
564     middleLine = bottomLine-fontXHeight/2;
565     topLine = bottomLine-fontXHeight;
566
567     if (thePict)
568      DrawTextLines(thePict,dict,topLine,bottomLine);
569
570
571     fprintf(fp,"%d: %d %d %2.6f\n",lineNumber,fontXHeight,ascenderHeight,
572            (float)ascenderHeight/(float)fontXHeight);
573
574     for (shape=startIndex;shape<endIndex; ++shape)
575      StoreOutlinePair(dict,shape,middleLine,fontXHeight,ascenderHeight);
576
```

```
577         ++lineNumber;
578       } /* Do another line of text */
579       fclose(fp);
580     }
```

Aug 21 19:50 1991 baselines.c

```
1       #include <stdio.h>
2       #include <values.h>
3       #include <math.h>
4       #include "boolean.h"
5       #include "pict.h"
6       #include "types.h"
7       #include "lists.h"
8       #include "lines.h"
9       #include "baselines.h"
10
11      extern double sqrt(double);
12      extern int irint(double);
13
14      /*inline*/ int NewReadPixel(UCHAR *base,int width,float x,float y)
15      {
16        int xi;
17        int yi;
18        UCHAR mask;
19
20        xi = irint(x);
21        yi = irint(y);
22        mask = 0x80 >> (xi & 0x7);
23        return *(base+yi*width+(xi>>3)) & mask;
24      }
25
26      void NewCountLine1Bit(Picture pict,int x1,int y1,int x2,int y2,int *black,int *blackEdge)
27      {
28        float x,y;
29        float xinc,yinc;
30        float xupinc,yupinc;
31        float den;
32        int b,be;
33        int width,ucharWidth,height;
34        UCHAR *data;
35
36        width = pict->width;
37        ucharWidth = pict->uchar_width;
38        height = pict->height;
39        data = pict->data;
40
41        den = sqrt((y2-y1)*(y2-y1)+(x2-x1)*(x2-x1));
42        xinc = (x2-x1)/den;
43        yinc = (y2-y1)/den;
44        xupinc = -yinc;
45        yupinc = xinc;
46        x = x1;
47        y = y1;
48
49        b=0;
```

```
50      be=0;
51
52      while (x<width&&x>=0&&y<height&&y>=0) {
53      ++b;
54      if (NewReadPixel(data,ucharWidth,x,y)) {
55        if (!(NewReadPixel(data,ucharWidth,x+xupinc,y+yupinc) &&
56              NewReadPixel(data,ucharWidth,x-xupinc,y-yupinc)))

57          ++be;
58      }
59      x += xinc;
60      y += yinc;
61
62      }
63      *black = b;
64      *blackEdge = be;
65      }
66
67
68      #define MIN_BLACK 5
69      float NewCountLine(Picture pict,int x1,int y1,int x2,int y2)
70      {
71       int black,blackEdge;
72       black = 0;
73       blackEdge = 0;
74       NewCountLine1Bit(pict,x1,y1,x2,y2,&black,&blackEdge);
75       NewCountLine1Bit(pict,x1,y1,x1-(x2-x1),y1-(y2-y1),&black,&blackEdge);
76       if (black < MIN_BLACK)
77         return 0;
78       else
79         return (float)blackEdge/black;
80      }
81
82      static float x2offset;
83      static float y2offset;
84      static int projectIndex;
85      static float *projection;
86      static int *coordx;
87      static int *coordy;
88      BOOLEAN BaseLinePiston(Picture pict, int x, int y, BOOLEAN test, UCHAR color)
89      {
90       if (test) {
91      /*   if (!(projectIndex%10))
92           DrawLine(pict,x,y,(int)(x+x2offset),(int)(y+y2offset),0xff); */
93      /*   WritePixel(pict,x,y,0xff); */
94       projection[projectIndex] = NewCountLine(pict,x,y,(int)(x+x2offset),
95                                               (int)(y+y2offset));
96       coordx[projectIndex] = x;
97       coordy[projectIndex++] = y;
98       return test;
99       } else
100        return test;
101     }
102
103     static int lastX;
104     static int lastY;
105     BOOLEAN EndPointPiston(Picture pict, int x, int y, BOOLEAN test, UCHAR color)
106     {
```

```
107      if (test) {
108        lastX = x;
109        lastY = y;
110      }
111      return test;
112    }
113
114    void EndPoints(Picture pict,double angle,int *tx, int *ty,int *bx, int *by)
115    {
116      int xc,yc;
117      int maxLength;
118      float normal;
119      float x2,y2,x3,y3;
120
121      /* Make normal to text point in quadrants I and II */
122      /* Assume 0 <= angle < 2*M_PI */
123      normal = fmod(angle + M_PI/2,2*M_PI);
124      if (normal > M_PI)
125        normal -= M_PI;
126
127      xc = pict->width/2;
128      yc = pict->height/2;
129
130      maxLength = pict->width+pict->height;
131      x2 = xc+maxLength*cos(normal);      /* At bottom of picture */
132      y2 = yc+maxLength*sin(normal);
133      x3 = xc-maxLength*cos(normal);      /* At top of picture */
134      y3 = yc-maxLength*sin(normal);
135
136      LineEngine(pict,xc,yc,(int)x2,(int)y2,0,EndPointPiston);
137      *bx = lastX;
138      *by = lastY;
139      LineEngine(pict,xc,yc,(int)x3,(int)y3,0,EndPointPiston);
140      *tx = lastX;
141      *ty = lastY;
142    }
143
144    double distance(int x1,int y1,int x2,int y2)
145    {
146      return sqrt((double)((x1-x2)*(x1-x2)+(y1-y2)*(y1-y2)));
147    }
148
149    #define BASE_PERCENTILE 0.20
150    #define MIN_LINE_HEIGHT_FRACTION 0.50
151    List BaseLines(Picture pict,double angle,char *plotFile)
152    #ifdef foo
153    ,int *count,
154              int **returnCoordx, int **returnCoordy)
155    #endif
156    {
157      float *topProjection;
158      int *topCoordx,*topCoordy;
159      int *finalCoordx,*finalCoordy,*finalIndex;
160      int topIndex,bottomIndex;
161      int topCount,botCount,finalCount;
162      int maxLength;
163      int xc,yc;
164      float x2,y2,x3,y3;
```

```
165      float maxValue,lastValue;
166      int i,j;
167      float baseThresh;
168      int topX,topY,bottomX,bottomY;
169      BOOLEAN onTextLine;
170      List xList,yList,result;
171      double totalDistance,averageDistance;
172      FILE *outfile;
173
174      printf("angle = %3.3f\n",angle);
175
176      maxLength = pict->width+pict->height;
177
178      topProjection = (float *)calloc(maxLength,sizeof(float));
179      topCoordx = (int *)calloc(maxLength,sizeof(int));
180      topCoordy = (int *)calloc(maxLength,sizeof(int));
181      finalCoordx = (int *)calloc(maxLength,sizeof(int));
182      finalCoordy = (int *)calloc(maxLength,sizeof(int));
183      finalIndex = (int *)calloc(maxLength,sizeof(int));
184
185      if ((topProjection == NULL)||
186         (topCoordx == NULL)||
187         (topCoordy == NULL)||
188         (finalIndex == NULL) ||
189         (finalCoordx == NULL) ||
190         (finalCoordy == NULL)) {
191        printf("BaseLines: cannot allocate memory\n");
192        exit(-1);
193      }
194
195      EndPoints(pict,angle,&topX,&topY,&bottomX,&bottomY);
196
197      printf("Main Line: (%d,%d)-(%d,%d)\n",topX,topY,bottomX,bottomY);
198      /* DrawLine(pict,topX,topY,bottomX,bottomY,0xff); */
199
200      x2offset = maxLength*cos(angle);
201      y2offset = maxLength*sin(angle);
202      projectIndex = 0;
203      projection = topProjection;
204      coordx = topCoordx;
205      coordy = topCoordy;
206      LineEngine(pict,topX,topY,bottomX,bottomY,0,BaseLinePiston);
207      topCount = projectIndex;
208
209      maxValue = topProjection[0];
210      for (i=0;i<topCount;++i) {
211       if (topProjection[i]>maxValue)
212         maxValue = topProjection[i];
213      }
214
215      baseThresh = maxValue*BASE_PERCENTILE;
216      printf("baseThresh = %3.3f\n",baseThresh);
217
218      /* Plot the baseline contour if requested */
219      if (plotFile!=NULL) {
220       printf("Opening baselines plot file\n");
221       if ((outfile = fopen(plotFile,"w"))==NULL) {
222         printf("Error opening baseline plot file.\n");
```

```
223        exit(-1);
224       }
225       for (i=0;i<topCount;++i)
226        fprintf(outfile,"%d %f\n",i,topProjection[i]);
227       fprintf(outfile,"\"Projection\n\n");
228       fprintf(outfile,
229          "0 %f\n%d %f%\n\"Baseline Threshold\n",
230             baseThresh,topCount,baseThresh);
231      }
232
233      finalCount=0;
234      lastValue = topProjection[topCount-1];
235      onTextLine = FALSE;
236      for (i=1;i<topCount;++i) {
237       if (onTextLine) {
238        if (lastValue>baseThresh && topProjection[i]<=baseThresh) {
239            finalCoordx[finalCount] = topCoordx[i];
240            finalCoordy[finalCount] = topCoordy[i];
241         finalIndex[finalCount] = i;
242            finalCount++;
243            onTextLine = FALSE;
244        }
245       } else {
246        if (lastValue<=baseThresh && topProjection[i]>baseThresh) {
247            finalCoordx[finalCount] = topCoordx[i];
248            finalCoordy[finalCount] = topCoordy[i];
249         finalIndex[finalCount] = i;
250            finalCount++;
251            onTextLine = TRUE;
252        }
253       }
254
255       lastValue = topProjection[i];
256      }
257      if (finalCount&1)
258       --finalCount;          /* Only take an even number of lines */
259      for (totalDistance=0,i=0,j=0;i<finalCount;i+=2) {
260       topX = finalCoordx[i];
261       topY = finalCoordy[i];
262       bottomX = finalCoordx[i+1];
263       bottomY = finalCoordy[i+1];
264       totalDistance += distance(topX,topY,bottomX,bottomY);
265       j+=2;
266      }
267      averageDistance = totalDistance / (finalCount/2)*MIN_LINE_HEIGHT_FRACTION;
268      for (i=0,j=0;i<finalCount;i+=2) {
269       topX = finalCoordx[i];
270       topY = finalCoordy[i];
271       topIndex = finalIndex[i];
272       bottomX = finalCoordx[i+1];
273       bottomY = finalCoordy[i+1];
274       bottomIndex = finalIndex[i+1];
275       finalCoordx[j] = topX;
276       finalCoordy[j] = topY;
277       finalIndex[j] = topIndex;
278       finalCoordx[j+1] = bottomX;
279       finalCoordy[j+1] = bottomY;
```

```
280       finalIndex[j+1] = bottomIndex;
281       if (distance(topX,topY,bottomX,bottomY)>averageDistance)
282         j+=2;
283      }
284    #ifdef foo
285     *count = j;
286     *returnCoordx = finalCoordx;
287     *returnCoordy = finalCoordy;
288    #endif
289     result = nil;
290     for (i=j-1;i>=0;--i) {
291       push(MakePoint(finalCoordx[i],finalCoordy[i]),result);
292     }
293
294     if (plotFile != NULL) {
295      fprintf(outfile,"\n0 %f\n",-baseThresh);
296      for (i=0;i<j;i+=2) {
297          fprintf(outfile,"%d %f\n%d %f\n%d %f\n%d %f\n",
298                  finalIndex[i],-baseThresh,
299                  finalIndex[i],-2*baseThresh,
300                  finalIndex[i+1],-2*baseThresh,
301                  finalIndex[i+1],-baseThresh);
302      }
303      fprintf(outfile,"\"Baselines");
304      fclose(outfile);
305      printf("Done writing baseline plot file.\n");
306     }
307
308     return result;
309    }
310
311    void DrawBaseLines(Picture pict, List pointList, double angle)
312    #ifdef foo
313    int count,int *coordx,int *coordy,double angle)
314    #endif
315    {
316     int maxLength;
317     float x2,y2,x3,y3;
318     int x,y;
319     Point temp;
320     maxLength = pict->width+pict->height;
321     while (!endp(pointList)) {
322      temp = pop(pointList);
323      x = temp->x;
324      y = temp->y;
325      x2 = x+maxLength*cos(angle);
326      y2 = y+maxLength*sin(angle);
327      x3 = x-maxLength*cos(angle);
328      y3 = y-maxLength*sin(angle);
329      DrawLine(pict,x,y,(int)x2,(int)y2,0xff);
330      DrawLine(pict,x,y,(int)x3,(int)y3,0xff);
331     }
332    }
```

Jul 1 13:44 1991 blobify.c

```c
1       #include <stdio.h>
2       #include <math.h>
3       #include "boolean.h"
4       #include "pict.h"
5       #include "blobify.h"
6
7       static UCHAR bitmasks[] = {0x80,0x40,0x20,0x10,0x8,0x4,0x2,0x1};
8
9       Picture Blobify(Picture old,int half_mask_size,double threshold)
10      {
11        Picture new;
12        int x,y;
13        int tval;
14        int left,right,top,bottom;
15        int width;
16        int *counters;
17        int *countptr;
18        int mask_size;
19        UCHAR *xptr,*xyptr;
20        int *leftptr;
21        int *rightptr;
22        UCHAR *topptr;
23        UCHAR *bottomptr;
24        int uchar_width;
25      /* UCHAR bitmask;*/
26        int count;
27        int inside;
28        int thold;
29      /* Added the following for speedup hack 1/14/91 */
30        UCHAR bitMask;
31        UCHAR *newCursor;
32        UCHAR newValue;
33        UCHAR topPixels;
34        UCHAR bottomPixels;
35
36
37        mask_size = 2 * half_mask_size + 1;
38      /* uchar_width = ROUND8(old->width) >> 3; */
39        uchar_width = old->uchar_width;
40
41        left = half_mask_size;
42        right = old->width - half_mask_size - 1;
43
44        top = half_mask_size;
45        bottom = old->height - half_mask_size - 1;
46
47
48        tval = floor(4*half_mask_size*half_mask_size*threshold);
49        new = new_pict(old->width,old->height,old->depth);
50
51        counters = (int *)calloc(old->width,sizeof(int));
52
```

```
53      width = old->width;
54      countptr = counters;
55      xptr = old->data;
56      bitMask = 0x80;
57      for (x=0;x<width;++x) {
58    /*  bitmask = bitmasks[x%8]; */
59       xyptr = xptr;
60       for (count=0,y=0;y<mask_size;++y) {
61        if (*xyptr & bitMask)
62           ++count;
63        xyptr += uchar_width;
64       }
65       *(countptr++) = count;
66    /*  if (x%8 == 7)
67     *     ++xptr; */
68       if (bitMask == 0x01) {
69        bitMask = 0x80;
70        ++xptr;
71       }
72       else
73        bitMask = bitMask >> 1;
74      }
75
76      for (y=top;y<=bottom;++y) {
77       countptr = counters;
78       for (inside=0,x=0;x<mask_size;++x)
79        inside += *countptr++;
80
81       leftptr = counters;
82       rightptr = counters + mask_size;
83       newCursor = new->data+y*uchar_width+(left>>3);
84       bitMask = bitmasks[left%8];
85       newValue = 0;
86       for (x=left;x<=right;++x) {
87        if (inside>tval)
88           /* set pixel */
89           newValue |= bitMask;
90    /*      *(new->data+y*uchar_width+(x>>3)) |= bitmasks[x%8]; */
91        if (bitMask == 0x01) {
92           bitMask = 0x80;
93           *newCursor++ = newValue;
94           newValue = 0;
95        }
96        else
97           bitMask = bitMask >> 1;
98        inside += *rightptr++;
99        inside -= *leftptr++;
100      }
101      if (bitMask != 0x80) {
102       *newCursor = newValue;
103      }
104
105      topptr = old->data+(y-half_mask_size)*uchar_width;
106      bottomptr = topptr + mask_size*uchar_width;
107      countptr = counters;
```

```
108        bitMask = 0x01;
109        for (x=0;x<width; ++x) {
110    /*    bitmask = bitmasks[x%8]; */
111          if (bitMask == 0x01) {
112             topPixels = *topptr++;
113             bottomPixels = *bottomptr++;
114             bitMask = 0x80;
115          }
116          else
117             bitMask = bitMask >> 1;
118          if (topPixels & bitMask) {
119             if (!(bottomPixels & bitMask))
120               --(*countptr);
121          }
122          else if (bottomPixels & bitMask)
123             ++(*countptr);
124
125          ++countptr;
126        }
127      }
128
129      return new;
130    }
131
132    #ifdef foo
133    void main(argc,argv)
134    int argc;
135    char **argv;
136    {
137      char *infile,*outfile;
138      Picture old,new;
139      int half_mask_size;
140      float threshold;
141
142      malloc_debug(2);
143
144      if (argc != 5) {
145        printf("Usage: %s infile outfile half_mask_size threshold\n",argv[0]);
146        exit(0);
147      }
148      infile = argv[1];
149      outfile = argv[2];
150      half_mask_size = atoi(argv[3]);
151      threshold = atof(argv[4]);
152
153      printf("Loading %s...",infile);
154      old = load_pict(infile);
155      new = components(old,half_mask_size,threshold);
156      write_pict(outfile,new);
157
158    }
159    #endif
160
```

Aug 26 18:10 1991 boxes.c

```
1     #include <stdio.h>
2     #include <values.h>
```

```
3      #include <math.h>
4      #include "boolean.h"
5      #include "pict.h"
6      #include "types.h"
7      #include "lists.h"
8
9      extern int irint(double);
10
11     #define MAX_QUEUE_SIZE 10000
12     #define BLACK 1
13     #define WHITE 0
14
15     #define ABS(a) ((a)<0?-(a):(a))
16
17     typedef Point PointArray;
18
19     typedef struct {
20       PointBody ulc,lrc;
21     } MinMaxBox;
22
23     typedef struct {
24       PointBody xwitness,ywitness;
25     } WitnessBox;
26
27     typedef struct {
28       PointArray data;
29       int first,last;
30       int size;
31     } QueueBody,*Queue;
32
33     Queue MakeQueue(size)
34     int size;
35     {
36       Queue q;
37       if ((q=(Queue)calloc(1,sizeof(QueueBody)))==NULL) {
38         printf("Cannot alloc space for queue body\n");
39         exit(0);
40       }
41       if ((q->data=(PointArray)calloc(size,sizeof(PointBody)))==NULL) {
42         printf("Cannot allocate space for queue array\n");
43         exit(0);
44       }
45       q->first=q->last=0;
46       q->size=size;
47       return q;
48     }
49
50     void InsertPoint(x,y,q)
51     int x,y;
52     Queue q;
53     {
54       q->data[q->last].x=x;
55       q->data[q->last].y=y;
56       q->last=(q->last+1)%q->size;
57       if (q->last==q->first) {
58         printf("Maximum q size exceeded\n");
59         exit(0);
```

```
60      }
61    }
62
63    void GetFirst(x,y,q)
64    int *x,*y;
65    Queue q;
66    {
67      if (q->first==q->last) {
68        printf("Error: tried top pop empty queue\n");
69        exit(0);
70      }
71      *x=q->data[q->first].x;
72      *y=q->data[q->first].y;
73      q->first=(q->first+1)%q->size;
74    }
75
76    BOOLEAN Empty(q)
77    Queue q;
78    {
79      return q->first==q->last;
80    }
81
82    void InsertBlackNeighbors(Picture pict,int x,int y,Queue queue)
83    {
84      if (ReadPixel(pict,x+1,y)) {
85        WritePixel(pict,x+1,y,WHITE);
86        InsertPoint(x+1,y,queue);
87      }
88      if (ReadPixel(pict,x-1,y)) {
89        WritePixel(pict,x-1,y,WHITE);
90        InsertPoint(x-1,y,queue);
91      }
92      if (ReadPixel(pict,x,y+1)) {
93        WritePixel(pict,x,y+1,WHITE);
94        InsertPoint(x,y+1,queue);
95      }
96      if (ReadPixel(pict,x,y-1)) {
97        WritePixel(pict,x,y-1,WHITE);
98        InsertPoint(x,y-1,queue);
99      }
100   }
101
102   void PointFromTheta(theta,x,y)
103   float theta;
104   float *x,*y;
105   {
106     *x = cos(theta);
107     *y = sin(theta);
108   }
109
110   void Normal(x,y,nx,ny)
111   float x,y;
112   float *nx,*ny;
113   {
114     *nx = -y;
115     *ny = x;
116   }
117
```

```
118   int DotFl(fx,fy,ix,iy)
119   float fx,fy;
120   int ix,iy;
121   {
122     return irint(fx*ix+fy*iy);
123   }
124
125   static float pox,poy,pnx,pny;
126
127   void MinMax(boundingBox,oldFrameBox,px,py)
128   MinMaxBox *boundingBox;
129   WitnessBox *oldFrameBox;
130   int px,py;
131   {
132   /* IGNORE THETA FOR THE TIME BEING */
133     if (boundingBox->lrc.x < DotFl(pox,poy,px,py)) {
134       boundingBox->lrc.x = DotFl(pox,poy,px,py);
135     }
136     if (boundingBox->lrc.y < DotFl(pnx,pny,px,py)) {
137       boundingBox->lrc.y = DotFl(pnx,pny,px,py);
138     }
139     if (boundingBox->ulc.x > DotFl(pox,poy,px,py)) {
140       boundingBox->ulc.x = DotFl(pox,poy,px,py);
141       oldFrameBox->xwitness.x = px;
142       oldFrameBox->xwitness.y = py;
143     }
144     if (boundingBox->ulc.y > DotFl(pnx,pny,px,py)) {
145       boundingBox->ulc.y = DotFl(pnx,pny,px,py);
146       oldFrameBox->ywitness.x = px;
147       oldFrameBox->ywitness.y = py;
148     }
149   }
150
151   /* Set the pixels on the border of the image to the color WHITE so that
152    * the paint routine need never worry about going off the edge of the
153    * image. */
154   void FramePicture(pict)
155   Picture pict;
156   {
157     int i;
158     for (i=0;i<pict->height;++i) {
159       WritePixel(pict,0,i,WHITE);
160       WritePixel(pict,pict->width-1,i,WHITE);
161     }
162     for (i=0;i<pict->width;++i) {
163       WritePixel(pict,i,0,WHITE);
164       WritePixel(pict,i,pict->height-1,WHITE);
165     }
166   }
167
168   /*
169    * Given as input a thresholded image, find the borders of the connected
170    * components. Assumes image is thresholded to 0 and 1.
171    */
172   void PaintComponent(pict,x,y,queue,boundingBox,oldFrameBox)
173   Picture pict;
174   int x,y;
175   Queue queue;
```

```
176    MinMaxBox *boundingBox;
177    WitnessBox *oldFrameBox;
178    {
179      boundingBox->ulc.x = boundingBox->lrc.x = DotFl(pox,poy,x,y);
180      boundingBox->ulc.y = boundingBox->lrc.y = DotFl(pnx,pny,x,y);
181      oldFrameBox->xwitness.x = oldFrameBox->ywitness.x = x;
182      oldFrameBox->xwitness.y = oldFrameBox->ywitness.y = y;
183
184      InsertPoint(x,y,queue);
185      WritePixel(pict,x,y,WHITE);
186    /* printf("Queue status: %s\n",(Empty(queue))?"empty":"not empty"); */
187      while (!Empty(queue)) {
188       GetFirst(&x,&y,queue);
189       MinMax(boundingBox,oldFrameBox,x,y);
190       InsertBlackNeighbors(pict,x,y,queue);
191      }
192    }
193
194    int iabs(int x)
195    {
196     if (x<0)
197       return -x;
198     else
199       return x;
200    }
201
202    BOOLEAN PointInBounds(Picture pict,int x,int y)
203    {
204     return x>=0 && x<pict->width && y>=0 && y<pict->height;
205    }
206
207
208    BOOLEAN BoxInBounds(Picture pict,int x, int y, int width, int height,
209                  double angle)
210    {
211     int rightX,rightY,downX,downY;
212     rightX = width*cos(angle);
213     rightY = width*sin(angle);
214     downX = height*cos(angle+M_PI/2);
215     downY = height*sin(angle+M_PI/2);
216     return (PointInBounds(pict,x,y) &&
217             PointInBounds(pict,x+rightX,y+rightY) &&
218             PointInBounds(pict,x+rightX+downX,y+rightY+downY) &&
219             PointInBounds(pict,x+downX,y+downY));
220    }
221
222    void GetCorner(WitnessBox *box,int *ulcx,int *ulcy)
223    {
224     double c2;
225     c2 = (-pny*(box->ywitness.x-box->xwitness.x) +
226         pnx*(box->ywitness.y-box->xwitness.y) ) /
227         (pox*pny - pnx*poy);
228     *ulcx = c2*pox+box->ywitness.x;
229     *ulcy = c2*poy+box->ywitness.y;
230    }
231
232    List FindBorders(Picture pict,double theta)
233    {
```

```
234      int x,y;
235      int ulcx,ulcy;
236      Queue queue;
237      MinMaxBox boundingBox;
238      WitnessBox oldFrameBox;
239      List boxList;
240      int width,height;
241
242      queue = MakeQueue(MAX_QUEUE_SIZE);
243
244      PointFromTheta(theta,&pox,&poy);
245      Normal(pox,poy,&pnx,&pny);
246
247      printf("Framing picture\n");
248      FramePicture(pict);         /* Put a "visited" color border
249                                   * around the image */
250      boxList = nil;
251      for (y=1;y<pict->height-1;++y)
252       for (x=1;x<pict->width-1;++x)
253        if (ReadPixel(pict,x,y)) {
254  /*     printf("Found component at (%d,%d)\n",x,y); */
255        PaintComponent(pict,x,y,queue,&boundingBox,&oldFrameBox);
256  /*     printf("Making box: %d %d %d %d\n",
257             oldFrameBox.ulc.x,
258             oldFrameBox.ulc.y,
259             oldFrameBox.lrc.x,
260             oldFrameBox.lrc.y);
261  */
262       GetCorner(&oldFrameBox,&ulcx,&ulcy);
263       width = boundingBox.lrc.x-boundingBox.ulc.x;
264       height = boundingBox.lrc.y-boundingBox.ulc.y;
265  /*    if (iabs(height)>10) */
266       if (BoxInBounds(pict,ulcx,ulcy,
267                    width,height,theta))
268        push(MakeBox(ulcx,ulcy,
269                  width,height,theta),
270             boxList);
271       }
272      printf("Found %d boxes completely on the page\n",ListLength(boxList));
273      return boxList;
274     }
275
276     void DrawBox(Picture pict,Box box)
277     {
278      int rightX,rightY,downX,downY;
279      rightX = box->width*cos(box->angle);
280      rightY = box->width*sin(box->angle);
281      downX = box->height*cos(box->angle+M_PI/2);
282      downY = box->height*sin(box->angle+M_PI/2);
283  /* printf("DrawBox: %d %d %d %d\n",box->x,box->y,box->width<,box->height); */
284      DrawLine(pict,box->x,box->y,box->x+rightX,box->y+rightY,0xff);
285      DrawLine(pict,box->x+rightX,box->y+rightY,
286           box->x+rightX+downX,box->y+rightY+downY,0xff);
287      DrawLine(pict,box->x+rightX+downX,box->y+rightY+downY,
288           box->x+downX,box->y+downY,0xff);
289      DrawLine(pict,box->x+downX,box->y+downY,box->x,box->y,0xff);
290     }
291
```

```
292    void DrawColorBox(Picture pict,Box box,int color)
293    {
294      int rightX,rightY,downX,downY;
295      rightX = box->width*cos(box->angle);
296      rightY = box->width*sin(box->angle);
297      downX = box->height*cos(box->angle+M_PI/2);
298      downY = box->height*sin(box->angle+M_PI/2);
299    /* printf("DrawBox: %d %d %d %d\n",box->x,box->y,box->width<,box->height); */
300      DrawLine(pict,box->x,box->y,box->x+rightX,box->y+rightY,color);
301      DrawLine(pict,box->x+rightX,box->y+rightY,
302              box->x+rightX+downX,box->y+rightY+downY,color);
303      DrawLine(pict,box->x+rightX+downX,box->y+rightY+downY,
304              box->x+downX,box->y+downY,color);
305      DrawLine(pict,box->x+downX,box->y+downY,box->x,box->y,color);
306    }
307
308
309    void DrawBoxList(Picture pict,List boxList)
310    {
311     while (!endp(boxList)) {
312      DrawBox(pict,(Box)pop(boxList));
313     }
314    }
315
316
317    #ifdef TRYMAIN
318    /* WARNING - be sure to replace the height check in FindBorders */
319    #endif
320    void main(argc,argv)
321    int argc;
322    char **argv;
323    {
324     char *infileName,*outfileName;
325     List boxList;
326     int width,height;
327     float theta;
328     Picture pict,finalPict;
329     FILE *outfile;
330
331     if (argc != 4) {
332      printf("Usage: %s infile outfile page_orientation\n",argv[0]);
333      exit(0);
334     }
335     infileName = argv[1];
336     outfileName = argv[2];
337     theta = atof(argv[3]);
338
339     printf("Loading %s...",infileName);
340     pict = load_pict(infileName);
341
342     printf("\nFinding boxes.\n");
343
344     finalPict = new_pict(pict->width,pict->height,pict->depth);
345    /* CopyPicture(finalPict,pict); */
346     boxList = FindBorders(pict,theta);
347
348     DrawBoxList(finalPict,boxList);
349     write_pict(outfileName,finalPict);
350    }
```

Jan 16 15:52 1991 dict.c

```
1    #include <stdio.h>
2    #include "boolean.h"
3    #include "types.h"
4    #include "error.h"
5    #include "pict.h"
6    #include "dict.h"
7
8    void WriteOutlinePair(OutlinePair o, FILE *fp)
9    {
10     fwrite(o->box,sizeof(BoxBody),1,fp);
11     fwrite(&(o->blackoutHeight),sizeof(float),1,fp);
12     fwrite(&(o->numberOfLegs),sizeof(int),1,fp);
13     fwrite(&(o->offset),sizeof(int),1,fp);
14     fwrite(&(o->width),sizeof(int),1,fp);
15
16     fwrite(o->x,sizeof(float),o->numberOfLegs,fp);
17     fwrite(o->top,sizeof(float),o->numberOfLegs,fp);
18     fwrite(o->bottom,sizeof(float),o->numberOfLegs,fp);
19    }
20
21   void WriteDictionary(Dictionary dict, char *filename)
22   {
23     FILE *fp;
24     int temp;
25     int i;
26     if ((fp=fopen(filename,"w"))==NULL)
27       DoError("WriteDictionary: Error opening output file.\n",NULL);
28     temp = 1234567;
29     fwrite(&temp,sizeof(int),1,fp);
30     fwrite(&(dict->numberOfEntries),sizeof(int),1,fp);
31
32     if (dict->infoString == NULL) {
33       temp = 0;
34       fwrite(&temp,sizeof(int),1,fp);
35     }
36     else{
37       temp = strlen(dict->infoString)+1;
38       fwrite(&temp,sizeof(int),1,fp);
39       fwrite(dict->infoString,sizeof(char),temp,fp);
40     }
41
42     for (i=0;i<dict->numberOfEntries;++i)
43       WriteOutlinePair(*(dict->outlines+i),fp);
44     fclose(fp);
45    }
46
47
48   /* Reads a Box from a binary stream. the type Box is defined in box.h */
49   Box ReadBox(FILE *fp)
50   {
51     Box temp;
52     temp = (Box)calloc(1,sizeof(BoxBody));
```

```
53      if (temp==NULL)
54        DoError("ReadBox: cannot allocate space\n",NULL);
55      if (fread(temp,sizeof(BoxBody),1,fp)!=1)
56        DoError("ReadBox: error reading bounding box\n",NULL);
57      return temp;
58    }
59
60    /* Reads an OutlinePair from a binary stream. The format of an OutlinePair
61     * follows:
62     *  BoxBody - shape bounding box
63     *  float   - blackout bar height
64     *  int     - number of legs in the contour
65     *  int     - x coordinate of left edge of contour
66     *  int     - width in pixels of edge contour
67     *  float[numberOfLegs] - x coordinates of contours
68     *  float[numberOfLegs] - y coordinates of top contour
69     *  float[numberOfLegs] - y coordinates of bototm contour
70     */
71    OutlinePair ReadOutlinePair(FILE *fp)
72    {
73      OutlinePair temp;
74      temp = (OutlinePair)calloc(1,sizeof(OutlinePairBody));
75      if (temp == NULL)
76        DoError("ReadOutlinePair: cannot allocate space\n",NULL);
77      temp->box = ReadBox(fp);
78
79      if (fread(&(temp->blackoutHeight),sizeof(float),1,fp)!=1)
80        DoError("ReadOutlinePair: error reading blackoutHeight\n",NULL);
81
82      if (fread(&(temp->numberOfLegs),sizeof(int),1,fp)!=1)
83        DoError("ReadOutlinePair: error reading length\n",NULL);
84
85      if (fread(&(temp->offset),sizeof(int),1,fp)!=1)
86        DoError("ReadOutlinePair: error reading offset\n",NULL);
87      if (fread(&(temp->width),sizeof(int),1,fp)!=1)
88        DoError("ReadOutlinePair: error reading width\n",NULL);
89
90      temp->x = (float *)calloc(temp->numberOfLegs,sizeof(float));
91      if (temp->x == NULL)
92        DoError("ReadOutlinePair: cannot allocate space\n",NULL);
93      if (fread(temp->x,
94            sizeof(float),temp->numberOfLegs,fp)!=temp->numberOfLegs)
95        DoError("ReadOutlinePair: error reading x coords\n",NULL);
96
97      temp->top = (float *)calloc(temp->numberOfLegs,sizeof(float));
98      if (temp->top == NULL)
99        DoError("ReadOutlinePair: cannot allocate space\n",NULL);
100     if (fread(temp->top,sizeof(float),
101           temp->numberOfLegs,fp)!=temp->numberOfLegs)
102       DoError("ReadOutlinePair: error reading topY coords\n",NULL);
103
104     temp->bottom = (float *)calloc(temp->numberOfLegs,sizeof(float));
105     if (temp->bottom == NULL)
106       DoError("ReadOutlinePair: cannot allocate space\n",NULL);
107     if (fread(temp->bottom,
```

```
108              sizeof(float),temp->numberOfLegs,fp)!=temp->numberOfLegs)
109        DoError("ReadOutlinePair: error reading bottomY coords\n",NULL);
110
111      return temp;
112    }
113
114    /* Create a new Dictionary structure with space allocated for the
115     * entries. */
116    Dictionary NewDict(int numberOfEntries)
117    {
118      Dictionary temp;
119      temp = (Dictionary)calloc(1,sizeof(DictionaryBody));
120      if (temp == NULL)
121        DoError("NewDict: cannot allocate space\n",NULL);
122      temp->numberOfEntries = numberOfEntries;
123      temp->infoString = NULL;
124      temp->rawOutlines = (RawOutlinePair *)calloc(numberOfEntries,
125                                    sizeof(RawOutlinePair));
126      temp->outlines = (OutlinePair *)calloc(numberOfEntries,
127                                    sizeof(OutlinePair));
128      if ((temp->outlines == NULL)||(temp->rawOutlines == NULL))
129        DoError("NewDict: cannot allocate space\n",NULL);
130      return temp;
131    }
132
133    /* Read a dictionary from a binary format file. The file organization
134     * follows:
135     *   int     - number of entries in the dictionary
136     *   OutlinePair[numberOfEntries] - outlines of each shape in the dictionary
137     * When a dictionary is read in, the shapes are sorted such that they fall
138     * in the order of words on textlines. */
139    Dictionary ReadDictionary(char *filename)
140    {
141      FILE *fp;
142      Dictionary dict;
143      int i;
144      int temp;
145      int infoStringLength;
146      int numberOfEntries;
147      int magicNumber;
148
149      if ((fp=fopen(filename,"r"))==NULL)
150        DoError("Error opening input file\n",NULL);
151
152      if (fread(&magicNumber,sizeof(int),1,fp)!=1)
153        DoError("Error reading dictionary\n",NULL);
154      if (magicNumber != 1234567)
155        DoError("ReadDictionary: input file %s is not a dictionary file.\n",
156                filename);
157
158      if (fread(&numberOfEntries,sizeof(int),1,fp)!=1)
159        DoError("Error reading dictionary\n",NULL);
160      dict = NewDict(numberOfEntries);
161
162      if (fread(&infoStringLength,sizeof(int),1,fp)!=1)
163        DoError("Error reading dictionary\n",NULL);
164      if (infoStringLength) {
```

```
165      if ((dict->infoString = (char *)calloc(infoStringLength,sizeof(char))) ==
166          NULL)
167        DoError("ReadDictionary: cannot allocate space for info string.\n",NULL);
168      fread(dict->infoString,infoStringLength,sizeof(char),fp);
169      *(dict->infoString+infoStringLength-1) = '\0'; /* Set last char to 0 just in case */
170    }
171
172    for (i=0;i<numberOfEntries;++i)
173      *(dict->outlines+i) = ReadOutlinePair(fp);
174    fclose(fp);
175    return dict;
176  }
177
178  char *ArgListToString(int argc, char **argv)
179  {
180    int i;
181    int totalLength;
182    char *theString;
183    char *destCursor,*srcCursor;
184
185    for (i=0,totalLength=0;i<argc;++i)
186      totalLength += strlen(argv[i]) + 1; /* Room for each arg and one space */
187    totalLength++;                        /* Room for thee EOS character */
188
189    if ((theString = (char *)calloc(totalLength,sizeof(char)))==NULL)
190      DoError("ArgListToString: cannot allocatee space.\n",NULL);
191
192    for (i=0,destCursor=theString;i<argc;++i) {
193      srcCursor = argv[i];
194      while (*srcCursor != '\0')
195        *destCursor++ = *srcCursor++;
196      *destCursor++ = ' ';
197    }
198    *destCursor = '\0';
199
200    return theString;
201  }
```

Jan 11 17:06 1991 dmain.c

```
1    #include <stdio.h>
2    #include <math.h>
3    #include <values.h>
4    #include "boolean.h"
5    #include "types.h"
6    #include "pict.h"
7    #include "diff.h"
8
9
10   void main(int argc,char **argv)
11   {
12     Picture pict;
13     char *infile1,*infile2,*outfile;
14
15     if (argc != 4) {
16       printf("Usage:\n");
```

```
17        printf(" %s infile1 infile2 outfile\n",argv[0]);
18        exit(-1);
19      }
20
21      infile1 = argv[1];
22      infile2 = argv[2];
23      outfile = argv[3];
24      pict = CompareDictionaries(infile1,infile2);
25      WritePictureAsAscii(pict,outfile);
26    }
```

Jun 21 15:54 1991  fft.c

```
1     /* Copyright 1991 by Michael Hopcroft.
2      * Right is hearby granted to Xerox Corporation to make use of this
3      * code free of charge. */
4     #include <stdio.h>
5     #include <math.h>
6     #include "fft.h"
7
8     /* Applies bit reversal permutation matrix to array a. length must be a power
9      * of 2. */
10    void BitReverse(float *a, int n)
11    {
12      int i,j,k;
13      float temp;
14
15      j=1;
16      for (i=1;i<n;++i) {
17        if (i<j) {
18          temp = a[i-1];
19          a[i-1] = a[j-1];
20          a[j-1] = temp;
21        }
22        k=n/2;
23        while (k<j) {
24          j = j-k;
25          k = k/2;
26        }
27        j = j+k;
28      }
29    }
30
31    #define TWOPI (M_PI*2)
32
33    void fft(float *real,float *imag,int logn,int mode)
34    {
35      int n;
36      int j,top,i,id,bottom;
37      int stage,subpartLength;
38      float tempr,tempi,temp2r,temp2i,ar,ai,wr,wi,angle;
39
40      n = irint(exp2((double)logn));
41
42      for (stage=1, subpartLength = n;
43           stage<=logn;
```

```
44         ++stage, subpartLength/=2) {
45         angle = TWOPI/subpartLength;
46         ar = 1.0;
47         ai = 0.0;
48         if (mode == REVERSE) {
49          wr = cos(angle);
50          wi = sin(angle);
51         } else {
52          wr = cos(angle);
53          wi = -sin(angle);
54         }
55         for (j=0;j<subpartLength/2;++j) {     /* for each offset in a part */
56          for (top=j;top<n;top+=subpartLength) {  /* for each part */
57              bottom = top+subpartLength/2;
58              tempr = real[bottom];           /* temp = x[id] */
59              tempi = imag[bottom];
60              real[bottom] = real[top]-real[bottom]; /* x[id] = x[i] - x[id] */
61              imag[bottom] = imag[top]-imag[bottom];
62              temp2r = real[bottom]*ar-imag[bottom]*ai; /* temp2 = x[id]*a */
63              temp2i = real[bottom]*ai+imag[bottom]*ar;
64              real[bottom] = temp2r;          /* x[id] = temp2 */
65              imag[bottom] = temp2i;
66              real[top] += tempr;             /* x[i] += temp */
67              imag[top] += tempi;
68          }
69          temp2r = ar*wr-ai*wi;        /* a *= w */
70          temp2i = ai*wr+ar*wi;
71          ar = temp2r;
72          ai = temp2i;
73         }
74     }
75     BitReverse(real,n);
76     BitReverse(imag,n);
77
78     #ifdef foo
79      if (mode == MAGNITUDE)
80       for (i=0;i<n;++i)
81         real[i] = sqrt(real[i]*real[i]+imag[i]*imag[i]);
82     #endif
83
84      if (mode == MAGNITUDE)
85       for (i=0;i<n;++i)
86         real[i] = sqrt(real[i]*real[i]+imag[i]*imag[i]);
87     }
88
89     #ifdef TRYMAIN
90     void main(int argc,char **argv)
91     {
92     #define POWER 8
93     #define LENGTH 256
94      float real[LENGTH];
95      float imag[LENGTH];
96      int i;
97     #ifdef foo
98      for (i=0;i<LENGTH;++i){
99       if (i<LENGTH/2)
100        real[i] = 1.0;
```

```
101      else
102        real[i] = 0.0;
103        imag[i] = 0.0;
104      }
105    #endif
106
107    for (i=0;i<LENGTH;++i) {
108      real[i] = sin(8*TWOPI*i/(LENGTH-1));
109      imag[i] = 0.0;
110    }
111    fft(real,imag,POWER,MAGNITUDE);
112    for (i=0;i<LENGTH;++i)
113      printf("%d %f\n",i,real[i]);
114    }
115    #endif
116
```

Aug 15 21:19 1991 fontNorm.c

```
1      #include <stdio.h>
2      #include <math.h>
3      #include "boolean.h"
4      #include "types.h"
5      #include "error.h"
6      #include "pict.h"
7      #include "dict.h"
8      #include "fontNorm.h"
9
10
11     extern double ceil(double);
12     extern int irint(double);
13
14
15     #define UP 0
16     #define DOWN 1
17     typedef int Direction;
18
19     extern Picture thePict;
20
21     void StoreRawOutlinePair(Dictionary dict, int dictEntry,
22                       Box box,int *bothX,int *topY, int *baseY,
23                       int numberOfLegs)
24     {
25       RawOutlinePair temp;
26       int i;
27       int *xCursor,*topCursor,*bottomCursor;
28
29       temp = (RawOutlinePair)calloc(1,sizeof(RawOutlinePairBody));
30       if (temp == NULL)
31         DoError("StoreRawOutlinePair: cannot allocate space\n",NULL);
32
33       temp->box = box;
34       temp->numberOfLegs = numberOfLegs;
35
36       temp->x = (int *)calloc(temp->numberOfLegs,sizeof(int));
37       temp->top = (int *)calloc(temp->numberOfLegs,sizeof(int));
38       temp->bottom = (int *)calloc(temp->numberOfLegs,sizeof(int));
```

```c
39      if ((temp->x == NULL) ||
40          (temp->top == NULL) ||
41          (temp->bottom == NULL))
42        DoError("StoreRawOutlinePair: cannot allocate space\n",NULL);
43
44      xCursor = temp->x;
45      topCursor = temp->top;
46      bottomCursor = temp->bottom;
47
48      for (i=0;i<numberOfLegs;++i) {
49        *xCursor++ = *bothX++;
50        *topCursor++ = *topY++;
51        *bottomCursor++ = *baseY++;
52      }
53      *(dict->rawOutlines+dictEntry) = temp;
54    }
55
56    int RawOutlineWidth(RawOutlinePair a,int middleLine)
57    {
58      int i,numberOfLegs,right,left;
59      int *topCursor,*bottomCursor;
60      int topValue,bottomValue;
61
62      numberOfLegs = a->numberOfLegs;
63
64      topCursor = a->top;
65      bottomCursor = a->bottom;
66      for (i=0;i<numberOfLegs;++i) {
67        topValue = *topCursor++;
68        bottomValue = *bottomCursor++;
69
70        if (topValue != HIT_THE_BOX) {
71          topValue = middleLine - topValue;
72          if (topValue<0)
73              topValue = 0;
74        }
75        else
76          topValue = 0;
77
78        if (bottomValue != HIT_THE_BOX) {
79          bottomValue = bottomValue - middleLine;
80          if (bottomValue < 0)
81              bottomValue = 0;
82        }
83        else
84          bottomValue = 0;
85
86        if ((bottomValue != 0)||(topValue != 0))
87          break;
88      }
89      left = i;
90
91      topCursor = a->top+numberOfLegs-1;
92      bottomCursor = a->bottom+numberOfLegs-1;
93      for (i=numberOfLegs-1;i>=0;--i) {
94        topValue = *topCursor--;
95        bottomValue = *bottomCursor--;
96
```

```
97        if (topValue != HIT_THE_BOX) {
98         topValue = middleLine - topValue;
99         if (topValue<0)
100            topValue = 0;
101       }
102       else
103        topValue = 0;
104
105       if (bottomValue != HIT_THE_BOX) {
106        bottomValue = bottomValue - middleLine;
107        if (bottomValue < 0)
108            bottomValue = 0;
109       }
110       else bottomValue = 0;
111
112       if ((topValue != 0)||(bottomValue !=0))
113         break;
114      }
115      right = i+1;
116
117      return right-left;
118     }
119
120     void ResampleOutlinePair(OutlinePair a,float newToOldFactor)
121     /* Resample an outline pair using linear interpolation. */
122     {
123      int newWidth,oldWidth,i;
124      int oldLeft,oldRight;
125      float oldCenter;
126      float *newX,*newTop,*newBottom;
127      float *xCursor,*topCursor,*bottomCursor;
128
129      oldWidth = a->numberOfLegs;
130      newWidth = irint(newToOldFactor*oldWidth);
131
132      newX = (float *)calloc(newWidth,sizeof(float));
133      newTop = (float *)calloc(newWidth,sizeof(float));
134      newBottom = (float *)calloc(newWidth,sizeof(float));
135      if ((newX==NULL)||(newTop==NULL)||(newBottom==NULL))
136        DoError("ResampleOutlinePair: cannot allocate space.\n",NULL);
137
138      xCursor = newX;
139      topCursor = newTop;
140      bottomCursor = newBottom;
141
142      for (i=0;i<newWidth;++i) {
143       oldCenter = i/(float)newWidth*(float)oldWidth;
144       oldLeft = irint(floor(oldCenter));
145       oldRight = irint(ceil(oldCenter));
146       if (oldLeft==oldRight) {
147         *xCursor++ = *(a->x+oldLeft);
148         *topCursor++ = *(a->top+oldLeft);
149         *bottomCursor++ = *(a->bottom+oldLeft);
150       }
151       else {
152        float slope;
153        slope = *(a->x+oldRight)-*(a->x+oldLeft);
```

```
154        *xCursor++ = *(a->x+oldLeft) + (oldCenter-oldLeft)*slope;
155        slope = *(a->top+oldRight)-*(a->top+oldLeft);
156        *topCursor++ = *(a->top+oldLeft) + (oldCenter-oldLeft)*slope;
157        slope = *(a->bottom+oldRight)-*(a->bottom+oldLeft);
158        *bottomCursor++ = *(a->bottom+oldLeft) + (oldCenter-oldLeft)*slope;
159      }
160    }
161
162    free(a->x);
163    free(a->top);
164    free(a->bottom);
165
166    a->x = newX;
167    a->top = newTop;
168    a->bottom = newBottom;
169    a->numberOfLegs = newWidth;
170  }
171
172  void StoreOutlinePair(Dictionary dict, int dictEntry,
173              int middleLine,int fontXHeight,
174              int ascenderHeight,NormalizationDescriptor *nd)
175  /* This routine normalizes the raw outline pair stored in dict at dictEntry using the following
176   * operations:
177   * 1) For the top contour, shift so that the middle line is at y=0 and negate so that the
178   *    higher points are greater than 0. For the bottom, shift so that middle line is at y=0,
179   *    but don't flip. Thus, lower points have y coordinates greater than 0.
180   *    Consider points whose value is HIT_THE_BOX to be at y=0. These correspond to gaps
181   *    between the letters.
182   * 2) Compress top and bottom y coordinates by 1/fontXHeight so that the coordinates at the
183   *    distance of the fontXHeight have value 1. Note that 1 is an arbitrary number. It is
184   *    unlikely that a signal will have parts that are the x height above the center line
185   *    anyway.
186   *    FOR TOP CONTOUR,
187   *    IF HEIGHT IS GREATER THAN XHEIGHT, SCALE DIFFERENCE BY 1.5/ASCENDER_HEIGHT.
188   *    ELSE SCALE DIFFERENCE BY 1/XHEIGHT.
189   *    FOR BOTTOM CONTOUR,
190   *    SCALE BY 1.5/ASCENDER_HEIGHT.
191   * 3) Compress the x coordinates by the same factor as in step 2. Note that this does not
192   *    actually resample the contour. NOW DO THIS WITH RESAMPLE. USE SCALE FACTOR OF
193   *    20/XHEIGHT.
194   * 4) Remove left and right ends of the contour that have y values of zero. This is so the
195   *    contour starts where the word starts, rather than at the edge of its bouding box.
196   * 5) Resample the contour to stretch by firstFontXwidth/fontxWidth. KILL THIS OPERATION.
197   */
198  {
199    RawOutlinePair raw;
200    OutlinePair temp;
201    int i,numberOfLegs;
202    int y;
203    int offset;
204    int *xSCursor,*topSCursor,*bottomSCursor;
205    float *xDCursor,*topDCursor,*bottomDCursor;
206    float *xCursor,*topCursor,*bottomCursor;
207    int left,right;
208    float foffset;
209    float ascenderFactor,xHeightFactor,widthFactor;
```

```
210
211      raw = *(dict->rawOutlines+dictEntry);
212
213      temp = (OutlinePair)calloc(1,sizeof(OutlinePairBody));
214      if (temp == NULL)
215        DoError("StoreOutlinePair: cannot allocate space\n",NULL);
216
217      temp->x = (float *)calloc(raw->numberOfLegs,sizeof(float));
218      temp->top = (float *)calloc(raw->numberOfLegs,sizeof(float));
219      temp->bottom = (float *)calloc(raw->numberOfLegs,sizeof(float));
220      if ((temp->x == NULL) ||
221         (temp->top == NULL) ||
222         (temp->bottom == NULL))
223        DoError("StoreOutlinePair: cannot allocate space\n",NULL);
224
225      temp->box = raw->box;
226      temp->blackoutHeight = 0;
227      temp->numberOfLegs = raw->numberOfLegs;
228      offset = temp->offset = *(raw->x);
229      temp->width = *(raw->x+raw->numberOfLegs-1) - temp->offset;
230
231      xDCursor = temp->x;
232      topDCursor = temp->top;
233      bottomDCursor = temp->bottom;
234      xSCursor = raw->x;
235      topSCursor = raw->top;
236      bottomSCursor = raw->bottom;
237
238      ascenderFactor = 1.5/ascenderHeight;
239      xHeightFactor = 1.0/fontXHeight;
240      widthFactor = 20.0/fontXHeight;
241      if (nd->noXHeightNormalize) {
242        xHeightFactor = 1.0;
243        ascenderFactor = 1.0;
244      }
245      if (nd->noAscenderNormalize)
246        ascenderFactor = xHeightFactor;
247
248      numberOfLegs = raw->numberOfLegs;
249      for (i=0;i<numberOfLegs;++i) {
250        if (*topSCursor==HIT_THE_BOX) {
251          y = 0;
252          topSCursor++;
253        }
254        else {
255          y = middleLine - *topSCursor++;
256          if (y<0)
257            y = 0;
258        }
259        if (y>fontXHeight/2) {
260          float temp1 = (float)y * ascenderFactor;
261          float temp2 = (float)fontXHeight/2 * xHeightFactor;
262          if (temp1<temp2)
263              *topDCursor++ = temp2;
264          else
265              *topDCursor++ = temp1;
266  /*
267          *topDCursor++ = (float)y * ascenderFactor;
```

```
268        */
269          }
270        else
271          *topDCursor++ = (float)y * xHeightFactor;
272
273        if (*bottomSCursor==HIT_THE_BOX) {
274         y = 0;
275         bottomSCursor++;
276        }
277        else {
278         y = *bottomSCursor++ - middleLine;
279         if (y<0)
280            y = 0;
281        }
282        if (y<fontXHeight/2)
283          *bottomDCursor++ = (float)y * xHeightFactor;
284        else {
285         float temp1 = (float)y * ascenderFactor;
286         float temp2 = (float)fontXHeight/2 * xHeightFactor;
287         if (temp1<temp2)
288            *bottomDCursor++ = temp2;
289         else
290            *bottomDCursor++ = temp1;
291   /*    *bottomDCursor++ = (float)y * ascenderFactor; */
292        }
293       }
294
295    /* Now try to remove parts of the contour on to the left and right of the
296     * word shape that are at height 0 */
297
298    /* Find left edge */
299     topDCursor = temp->top;
300     bottomDCursor = temp->bottom;
301     for (i=0;i<numberOfLegs;++i) {
302      if ((*topDCursor++ != 0)||(*bottomDCursor++!=0))
303        break;
304     }
305     left = i;
306
307    /* Find right edge */
308     topDCursor = temp->top+numberOfLegs-1;
309     bottomDCursor = temp->bottom+numberOfLegs-1;
310     for (i=numberOfLegs-1;i>=0;--i) {
311      if ((*topDCursor-- != 0)||(*bottomDCursor-- !=0))
312        break;
313     }
314     right = i+1;
315
316    /* Clip the ends of the contour at left and right */
317     xDCursor = temp->x;
318     topDCursor = temp->top;
319     bottomDCursor = temp->bottom;
320     xCursor = temp->x+left;
321     topCursor = temp->top+left;
322     bottomCursor = temp->bottom+left;
323     foffset = *xSCursor;
324     for (i=left;i<right;++i) {
325      *xDCursor++ = *xCursor++ - foffset;
```

```
326       *topDCursor++ = *topCursor++;
327       *bottomDCursor++ = *bottomCursor++;
328     }
329     temp->numberOfLegs = right-left;
330
331     *(dict->outlines+dictEntry) = temp;
332     ResampleOutlinePair(*(dict->outlines+dictEntry),widthFactor);
333   }
334
335   static int lineSpacing;
336   int OrderOutlinePair(OutlinePair *o1,OutlinePair *o2)
337   {
338    int yDistance;
339    int xDistance;
340    yDistance = (*o1)->box->pageY - (*o2)->box->pageY;
341    if (yDistance<lineSpacing && yDistance > -lineSpacing) {
342      xDistance = (*o1)->box->pageX - (*o2)->box->pageX;
343      return xDistance;
344    }
345    return yDistance;
346   }
347
348   void SortDictionary(Dictionary dict)
349   {
350    lineSpacing = 20;
351    qsort(dict->rawOutlines,dict->numberOfEntries,sizeof(RawOutlinePair),
352         OrderOutlinePair);
353   }
354
355   #define HIST_SIZE 100
356   void HistogramMax(int *data,int dataLength,int offset,int sign,int *histogram)
357   {
358    int i,bin;
359
360    if (sign>0) {
361     int maxValue;
362
363     maxValue = *data;
364     for (i=0;i<dataLength;++i)
365      if (data[i]!=HIT_THE_BOX) {
366          maxValue = data[i];
367          break;
368      }
369     for (;i<dataLength;++i)
370      if (data[i]!=HIT_THE_BOX && data[i]>maxValue)
371          maxValue = data[i];
372     if (maxValue != HIT_THE_BOX) {
373      bin = maxValue-offset;
374      if ((bin>=0)&&(bin<HIST_SIZE))
375          histogram[bin]++;
376     }
377    }
378    else {
379     int minValue;
380     minValue = *data;
381     for (i=0;i<dataLength;++i)
382      if (data[i]!=HIT_THE_BOX) {
383          minValue = data[i];
```

```
            break;
        }
    for (;i<dataLength;++i)
        if (data[i]!=HIT_THE_BOX && data[i]<minValue)
            minValue = data[i];
    if (minValue != HIT_THE_BOX) {
        bin = minValue-offset;
        if ((bin>=0)&&(bin<HIST_SIZE))
            histogram[bin]++;
    }
    }
} void Histogram(int *data,int dataLength, int offset, int *histogram)
{
    int i,bin;

for (i=0;i<dataLength;++i) {
        if (*data != HIT_THE_BOX) {
            bin = *data-offset;
            if ((bin>=0)&&(bin<HIST_SIZE))
                histogram[bin]++;
        }
        data++;
    }
} int MaxBin(int *histogram)
{
    int i;
    int maxValue;
    int maxIndex;

maxValue = histogram[0];
    maxIndex = 0;
    for (i=0;i<HIST_SIZE;++i)
        if (histogram[i]>maxValue) {
            maxValue = histogram[i];
            maxIndex = i;
        }
    return maxIndex;
} int MaxBinAbove(int *histogram,int line)
{
    int i;
    int maxValue;
    int maxIndex;
    int top,bottom;

for (i=0;i<HIST_SIZE;++i)
        if (histogram[i] != 0)
            break;

top = i;
    bottom = (line+top)/2;
```

```
441      maxValue = histogram[top];
442      maxIndex = top;
443      for (i=top;i<=bottom;++i)
444       if (histogram[i]>maxValue) {
445         maxValue = histogram[i];
446         maxIndex = i;
447       }
448      return maxIndex;
449     }
450
451     void DrawTextLines(Picture thePict,Dictionary dict,int topLine,int bottomLine)
452     {
453      int maxLength;
454      int halfWidth;
455      int x,y;
456      float x2,x3,y2,y3;
457      float angle;
458
459      angle = (*(dict->rawOutlines))->box->angle;
460      maxLength = thePict->width+thePict->height;
461      halfWidth = thePict->width / 2;
462      x = topLine * -sin(angle) + halfWidth * cos(angle);
463      y = topLine * cos(angle) + halfWidth * sin(angle);
464      x2 = x+maxLength*cos(angle);
465      y2 = y+maxLength*sin(angle);
466      x3 = x-maxLength*cos(angle);
467      y3 = y-maxLength*sin(angle);
468      DrawLine(thePict,x,y,(int)x2,(int)y2,5);
469      DrawLine(thePict,x,y,(int)x3,(int)y3,5);
470
471      x = bottomLine * -sin(angle) + halfWidth * cos(angle);
472      y = bottomLine * cos(angle) + halfWidth * sin(angle);
473      x2 = x+maxLength*cos(angle);
474      y2 = y+maxLength*sin(angle);
475      x3 = x-maxLength*cos(angle);
476      y3 = y-maxLength*sin(angle);
477      DrawLine(thePict,x,y,(int)x2,(int)y2,5);
478      DrawLine(thePict,x,y,(int)x3,(int)y3,5);
479     }
480
481     void PageStatistics(Dictionary dict,char *fileName,NormalizationDescriptor *nd)
482     /* WARNING - this must be run before PostProcess since PostProcess changes the raw
483      * shape data. */
484     {
485      int index;
486      int temp;
487      int i,startIndex,firstY,minY,endIndex,shape;
488      int tops[HIST_SIZE];
489      int bottoms[HIST_SIZE];
490      int ascenders[HIST_SIZE];
491      int descenders[HIST_SIZE];
492      int middleLine,topLine,bottomLine,ascenderLine,descenderLine;
493      int ascenderHeight,descenderHeight,lineNumber;
494      int fontXHeight,fontXWidth,xIndex;
495      RawOutlinePair thisShape;
496      FILE *fp;
497      BOOLEAN haveFirstFontXWidth = FALSE;
```

```
498      int firstFontXWidth;
499
500      if ((fp=fopen(fileName,"w"))==NULL)
501       DoError("PageStatistics: error opening output file %s.\n",fileName);
502
503      SortDictionary(dict);
504
505      index = 0;
506    #ifdef foo
507      malloc_verify();
508    #endif
509      lineNumber = 0;
510      while (index < dict->numberOfEntries) {
511       startIndex = index;
512       firstY = (*(dict->rawOutlines+index))->box->pageY;
513       minY = firstY;
514       while ( (*(dict->rawOutlines+index))->box->pageY - firstY < 20 &&
515             (*(dict->rawOutlines+index))->box->pageY - firstY > -20) {
516        if ( minY > ( (*(dict->rawOutlines+index))->box->pageY ))
517           minY = (*(dict->rawOutlines+index))->box->pageY;
518        ++index;
519        if (index == dict->numberOfEntries)
520           break;
521       }
522       endIndex = index;
523
524    #ifdef foo
525      malloc_verify();
526    #endif
527
528      /* shapes from start index through endindex are all on */
529      /* the same text line */
530      /* minY has the top of the highest box on the line. */
531
532      /* Find the base and toplines by taking the mode of the heights of the
533       * valleys of the bottom contours and the peaks of the top contours */
534      for (i=0;i<HIST_SIZE;i++) {
535       tops[i]=0;
536       bottoms[i]=0;
537       ascenders[i]=0;
538       descenders[i]=0;
539      }
540
541      for (shape=startIndex;shape<endIndex; ++shape) {
542       thisShape = *(dict->rawOutlines+shape);
543       Histogram(thisShape->top,thisShape->numberOfLegs,minY,tops);
544       Histogram(thisShape->bottom,thisShape->numberOfLegs,minY,bottoms);
545
546       HistogramMax(thisShape->top,thisShape->numberOfLegs,minY,-1,ascenders);
547       HistogramMax(thisShape->bottom,thisShape->numberOfLegs,minY,1,descenders);
548      }
549      topLine = MaxBin(tops)+minY;
550      bottomLine = MaxBin(bottoms)+minY;
551      ascenderLine = MaxBin(ascenders)+minY;
552      descenderLine = MaxBin(descenders)+minY;
553
554      if (thePict)
555       DrawTextLines(thePict,dict,topLine,bottomLine);
```

```
556     #ifdef foo
557       malloc_verify();
558     #endif
559
560       middleLine = (bottomLine+topLine)/2;
561       fontXHeight = bottomLine-topLine;
562       ascenderHeight = bottomLine-ascenderLine;
563       if ((float)ascenderHeight/(float)fontXHeight < 1.1) {
564         fprintf(stderr,"Bad ascender height on line %d.\n",lineNumber);
565         ascenderLine = MaxBinAbove(ascenders,ascenderLine-minY)+minY;
566         ascenderHeight = bottomLine-ascenderLine;
567         fprintf(stderr,"New ascender height = %d.\nNew xheight = %d.\n",ascenderHeight,fontXHeight);
568       }
569
570       fprintf(fp,"%d: %d %d %2.6f\n",lineNumber,fontXHeight,ascenderHeight,
571             (float)ascenderHeight/(float)fontXHeight);
572
573     #ifdef foo
574       /* Assume that the first shape in the image is the letter x.
575        * Use this shape to compute the fontXWidth value. */
576       if (lineNumber==0)
577         fontXWidth = RawOutlineWidth(*(dict->rawOutlines),middleLine);
578     #endif
579
580       ++lineNumber;
581       if (fontXHeight < 0) {
582         fprintf(stderr,"PageStatistics: negative fontXHeight in line %d.\n",lineNumber);
583         fontXHeight *= -1;
584       }
585       for (shape=startIndex;shape<endIndex;++shape)
586         StoreOutlinePair(dict,shape,middleLine,fontXHeight,ascenderHeight,nd);
587     } /* Do another line of text */
588     fclose(fp);
589   }
```

Jan 12 17:35 1991 getAll.c

```
1     #include <stdio.h>
2     #include <math.h>
3     #include <values.h>
4     #include "boolean.h"
5     #include "types.h"
6     #include "pict.h"
7     #include "dict.h"
8
9     #define MAX_STRING_LEN 256
10
11    void WriteShiftedAsciiOutline(FILE *fp, OutlinePair outline, float x, float y)
12    {
13      int i;
14      for (i=0;i<outline->numberOfLegs;++i)
15        fprintf(fp,"%f %f\n",i+x,*(outline->top+i)+y);
16      fprintf(fp,"\"top\n\n");
17
18      for (i=0;i<outline->numberOfLegs;++i)
```

```
19          fprintf(fp,"%f %f\n",i+x,y-(*(outline->bottom+i)));
20          fprintf(fp,"\"bottom\n\n");
21        }
22
23        void WriteOutlines(char *filename,Dictionary dict)
24        {
25         float maxWidth,maxHeight;
26         int i,j,count;
27         int width,height;
28         float x,y;
29         OutlinePair outline;
30         FILE *fp;
31         if ((fp = fopen(filename,"w"))= =NULL) {
32          printf("Error opening %s.",filename);
33          exit(-1);
34         }
35
36         maxWidth = 0;
37         maxHeight = 0;
38         for (i=0;i<dict->numberOfEntries; + +i) {
39          outline = *(dict->outlines+i);
40          if (outline->numberOfLegs > maxWidth)
41           maxWidth = outline->numberOfLegs;
42          for (j=0;j<outline->numberOfLegs; + +j) {
43           if (*(outline->bottom+j)>maxHeight)
44              maxHeight = *(outline->bottom+j)>maxHeight;
45           if (*(outline->top+j)>maxHeight)
46              maxHeight = *(outline->bottom+j)>maxHeight;
47          }
48         };
49
50         printf("maxWidth,maxHeight = %f,%f\n",maxWidth,maxHeight);
51
52         width = irint(sqrt((double)(dict->numberOfEntries)));
53         height = irint((double)(dict->numberOfEntries) / width);
54
55         printf("n,width,height = %d,%d,%d\n",dict->numberOfEntries,width,height);
56
57         for (i=0;i<height; + +i)
58          for (j=0;j<width; + +j) {
59           count = i*width+j;
60           if ((count < 16) && (count < dict->numberOfEntries)) {
61              x = j*maxWidth*1.5;
62            y = (height-i+1)*maxHeight*3;
63            printf("(%f,%f) ",x,y);
64              WriteShiftedAsciiOutline(fp,*(dict->outlines+count),x,y);
65           }
66          }
67         fclose(fp);
68        }
69
70
71        void main(int argc,char **argv)
72        {
73         char *infile,*outfile;
74         Dictionary dict;
75
```

```
76      if (argc != 3) {
77        printf("Usage:\n");
78        printf("  %s infile outfile\n",argv[0]);
79        exit(-1);
80      }
81
82      infile = argv[1];
83      outfile = argv[2];
84      dict = ReadDictionary(infile);
85
86      WriteOutlines(outfile,dict);
87
88      printf("\n");
89    }
90
91
```

Jul 8 14:25 1991 getOutline.c

```
1     #include <stdio.h>
2     #include <math.h>
3     #include <values.h>
4     #include <strings.h>
5     #include "boolean.h"
6     #include "types.h"
7     #include "pict.h"
8     #include "dict.h"
9
10    extern char *strchr(char *s,int c);
11
12    #define MAX_STRING_LEN 256
13
14    void WriteAsciiOutline(char *filename, OutlinePair outline)
15    {
16      FILE *fp;
17      int i;
18      if ((fp = fopen(filename,"w")) == NULL) {
19        printf("Error opening %s.",filename);
20        exit(-1);
21      }
22      for (i=0;i<outline->numberOfLegs;++i)
23        fprintf(fp,"%d %f\n",i,*(outline->top+i));
24      fprintf(fp,"\"top\n\n");
25
26      for (i=0;i<outline->numberOfLegs;++i)
27        fprintf(fp,"%d %f\n",i,-(*(outline->bottom+i)));
28      fprintf(fp,"\"bottom\n\n");
29      fclose(fp);
30    }
31
32
33    void main(int argc,char **argv)
34    {
35      char *infile;
36      char s[MAX_STRING_LEN],outfile[MAX_STRING_LEN];
37      Dictionary dict;
```

```
38      int selection;
39      char *crPointer;
40      BOOLEAN done = FALSE;
41
42      if (argc != 2) {
43       printf("Usage:\n");
44       printf(" %s infile\n",argv[0]);
45       exit(-1);
46      }
47
48      infile = argv[1];
49      dict = ReadDictionary(infile);
50
51      while (!done) {
52       printf("Shape number [0..%d]: ",dict->numberOfEntries-1);
53       fgets(s,MAX_STRING_LEN,stdin);
54       if (sscanf(s,"%d",&selection) == 1) {
55        if (selection<0 || selection >= dict->numberOfEntries)
56            printf("Shape numbers must be between 0 and %d, inclusive.\n",
57              dict->numberOfEntries-1);
58        else {
59            printf("Output file: ");
60            fgets(outfile,MAX_STRING_LEN,stdin);
61            crPointer = strchr(outfile,'\n');
62            if (crPointer != NULL)
63              *crPointer = '\0';
64            printf("Writing shape %d to file %s\n",selection,outfile);
65            WriteAsciiOutline(outfile,*(dict->outlines+selection));
66        }
67       }
68       else if ((s[0] == '\0') || (s[0] == '\n'))
69         done = TRUE;
70       else {
71        printf("Enter an integer to select a shape or a blank line\n");
72        printf("to quit.\n");
73       }
74      }
75     }
76
77

Jan 11 17:06 1991 guassian.c

1       #include <stdio.h>
2       #include <math.h>
3       #include <values.h>
4
5       float square(float x)
6       {
7        return x*x;
8       }
9
10      float gaussian(a, s, x)   /* return A*GAUSS(SIGMA, X) */
11      float a, s, x;
12      {
13       return (a*exp(-square(x/s)/2.0))/(s*sqrt(2.0*M_PI));
```

```
14    }
15
16    float *MakeMask(int halfMaskSize, float a)
17    {
18     int mask_size;
19     int x;
20     float s;
21     float *mask, sum;
22
23     mask_size = 2*halfMaskSize+1;
24     s = halfMaskSize/2;
25     mask = (float *) calloc(halfMaskSize+1, sizeof(float));
26     if (mask == NULL) {
27      printf("MakeMask: cannot allocate space\n");
28      exit(-1);
29     }
30
31     for (x = 0; x <= halfMaskSize; x++) {
32      mask[x] = gaussian(a, s, (float) x);
33  /*   printf("%e\n",mask[x]); */
34     }
35
36     for (sum = fabs(mask[0]), x = 1; x <= halfMaskSize; x++)
37      sum += 2.0*fabs(mask[x]);
38
39     for (x = 0; x <= halfMaskSize; x++)
40      mask[x] /= sum;
41
42     return mask;
43    }
44
45    void Guass1DFloat(float *data, int n, int halfMaskSize)
46    {
47     float a;
48     float *mask;
49     float *newData;
50     float *leftPtr,*rightPtr;
51     float sum;
52     int i,j,left,right;
53
54     a=1;
55
56     if (n < halfMaskSize*2+1)
57      return;
58
59     newData = (float *)calloc(n,sizeof(float));
60     if (newData == NULL) {
61      printf("Guass1DFloat: cannot allocate space\n");
62      exit(-1);
63     }
64
65     mask = MakeMask(halfMaskSize,a);
66
67     for (i=halfMaskSize;i<n-halfMaskSize;++i) {
68      sum = *(data+i) * mask[0];
69      leftPtr = rightPtr = data+i;
70      for (j=1;j<halfMaskSize;++j)
```

```
71          sum += mask[j] * (*(--leftPtr) + *(++rightPtr));
72          newData[i] = sum;
73        }
74
75        for (i=0;i<halfMaskSize;++i) {
76         sum = data[i]*mask[0];
77         left = i;
78         right = i;
79         for (j=1;j<halfMaskSize;++j) {
80          if (--left < 0)
81             left += n;
82          if (++right >= n)
83             right -= n;
84          sum += mask[j] * ( data[left] + data[right] );
85         }
86         newData[i] = sum;
87        }
88
89        for (i=n-halfMaskSize;i<n;++i) {
90         sum = data[i]*mask[0];
91         left = i;
92         right = i;
93         for (j=1;j<halfMaskSize;++j) {
94          if (--left < 0)
95             left += n;
96          if (++right >= n)
97             right -= n;
98          sum += mask[j] * ( data[left] + data[right] );
99         }
100        newData[i] = sum;
101       }
102
103       leftPtr = data;
104       rightPtr = newData;
105       for (i=0;i<n;++i)
106        *leftPtr++ = *rightPtr++;
107       free(newData);
108      }
```

Aug 23 19:21 1991 lines.c

```
1      #include <stdio.h>
2      #include <values.h>
3      #include <math.h>
4      #include "boolean.h"
5      #include "pict.h"
6      #include "lines.h"
7
8      void LineEngine(Picture pict,
9                     int x1,
10                    int y1,
11                    int x2,
12                    int y2,
13                    UCHAR color,
14                    pistFunc PerPixel)
15     {
```

```
16      static int inside = 0;
17      int xinc,yinc;
18      int distance;
19      int left,right,top,bottom;
20
21      ++inside;
22      left = 0;
23      right = pict->width-1;
24      top = 0;
25      bottom = pict->height-1;
26      /* printf("Draw line: (%d,%d)-(%d,%d)\n",x1,y1,x2,y2); */
27      /* CASE VERTICAL */
28      yinc = y2 - y1;
29      xinc = x2 - x1;
30      if (xinc > 0) {
31       if (yinc > 0) {
32        /* Line goes up to the right */
33        if (yinc>xinc)
34            distance = -yinc;
35        else
36            distance = xinc;
37        while ((*PerPixel)(pict,x1,y1,
38                          ((x1 < x2) || (y1 < y2))&&(x1<=right)&&(y1<=bottom),
39                          color)) {
40          if (distance > 0) {
41           /* move right */
42           x1++;
43           distance -= yinc;
44          } else {
45           /* move up */
46           y1++;
47           distance += xinc;
48          }
49        }
50       } else {
51        if (-yinc>xinc)
52            distance = yinc;
53        else
54            distance = xinc;
55        while ((*PerPixel)(pict,x1,y1,
56                          ((x1 < x2) || (y1 > y2))&&(x1<=right)&&(y1>=top),
57                          color)) {
58          if (distance > 0) {
59           /* move right */
60           x1++;
61           distance += yinc;
62          } else {
63           /* move down */
64           y1--;
65           distance += xinc;
66          }
67        }
68       }
69      } else {
70       if (yinc > 0) {
71        /* Line goes up to the left */
72        if (yinc>-xinc)
```

```
73              distance = -yinc;
74          else
75              distance = -xinc;
76          while ((*PerPixel)(pict,x1,y1,
77                      ((x1 > x2) || (y1 < y2))&&(x1>=left)&&(y1<=bottom),
78                      color)) {
79            if (distance > 0) {
80              /* move left */
81              x1--;
82              distance -= yinc;
83            } else {
84              /* move up */
85              y1++;
86              distance -= xinc;
87            }
88          }
89        } else {
90          if (-yinc>-xinc)
91              distance = yinc;
92          else
93              distance = -xinc;
94          while ((*PerPixel)(pict,x1,y1,
95                      ((x1 > x2) || (y1 > y2))&&(x1>=left)&&(y1>=top),
96                      color)) {
97            if (distance > 0) {
98              /* move left */
99              x1--;
100             distance += yinc;
101           } else {
102             /* move down */
103             y1--;
104             distance -= xinc;
105           }
106         }
107       }
108     }
109     --inside;
110   }
111
112   BOOLEAN DrawPiston(Picture pict, int x, int y, BOOLEAN test, UCHAR color)
113   {
114     if (test)
115       WriteClippedPixel(pict,x,y,color);
116     return test;
117   }
118
119   static UCHAR bitmasks[] = { 0x80,0x40,0x20,0x10,0x8,0x4,0x2,0x1 };
120
121   void CountLine1Bit(Picture pict,
122               int x1,
123               int y1,
124               int x2,
125               int y2,
126               int *totalSet,
127               int *total)
128   {
129     static int inside = 0;
130     int xinc,yinc;
```

```
131       int distance;
132       int left,right,top,bottom;
133
134       int uchar_width;
135       UCHAR *cursor;
136       UCHAR mask;
137       int count = 0;
138       int pixels = 0;
139
140        ++inside;
141        left = 0;
142        right = pict->width-1;
143        top = 0;
144        bottom = pict->height-1;
145
146        if (pict->depth != 1)
147         DoError("CountLine1Bit: Only depth 1 is supported.\n",NULL);
148
149        uchar_width = pict->uchar_width;
150        cursor = pict->data+y1*uchar_width+(x1>>3);
151        mask = bitmasks[x1%8];
152
153        /* printf("Draw line: (%d,%d)-(%d,%d)\n",x1,y1,x2,y2); */
154        /* CASE VERTICAL */
155        yinc = y2 - y1;
156        xinc = x2 - x1;
157        if (xinc > 0) {
158         if (yinc > 0) {
159          /* Line goes up to the right */
160          if (yinc>xinc)
161              distance = -yinc;
162          else
163              distance = xinc;
164          while (((x1 < x2) || (y1 < y2))&&(x1<=right)&&(y1<=bottom)) {
165              if (*cursor & mask)
166               ++count;
167              ++pixels;
168              if (distance > 0) {
169               /* move right */
170               if (mask == 0x1) {
171                mask = 0x80;
172                ++cursor;
173               }
174               else
175                mask = mask >> 1;
176              x1++;
177              distance -= yinc;
178             } else {
179              /* move up */
180              cursor += uchar_width;
181              y1++;
182              distance += xinc;
183             }
184         }
185        } else {
186         if (-yinc>xinc)
187             distance = yinc;
```

```
188       else
189           distance = xinc;
190       while (((x1 < x2) || (y1 > y2))&&(x1<=right)&&(y1>=top)) {
191           if (*cursor & mask)
192               ++count;
193           ++pixels;
194           if (distance > 0) {
195           /* move right */
196           if (mask == 0x1) {
197               mask = 0x80;
198               ++cursor;
199           }
200           else
201               mask = mask >> 1;
202           x1++;
203           distance += yinc;
204           } else {
205           /* move down */
206         cursor -= uchar_width;
207               y1--;
208               distance += xinc;
209           }
210       }
211       }
212   } else {
213     if (yinc > 0) {
214     /* Line goes up to the left */
215     if (yinc>-xinc)
216         distance = -yinc;
217     else
218         distance = -xinc;
219     while (((x1 > x2) || (y1 < y2))&&(x1>=left)&&(y1<=bottom)) {
220         if (*cursor & mask)
221             ++count;
222         ++pixels;
223         if (distance > 0) {
224         /* move left */
225         if (mask == 0x80) {
226             mask = 0x1;
227             --cursor;
228         }
229         else
230             mask = mask << 1;
231         x1--;
232         distance -= yinc;
233         } else {
234         /* move up */
235         cursor += uchar_width;
236         y1++;
237         distance -= xinc;
238         }
239     }
240     } else {
241     if (-yinc>-xinc)
242         distance = yinc;
243     else
244         distance = -xinc;
245     while (((x1 > x2) || (y1 > y2))&&(x1>=left)&&(y1>=top)) {
```

```
246        if (*cursor & mask)
247          ++count;
248        ++pixels;
249        if (distance > 0) {
250        /* move left */
251        if (mask == 0x80) {
252          mask = 0x1;
253          --cursor;
254        }
255         else
256          mask = mask << 1;
257        x1--;
258        distance += yinc;
259        } else {
260        /* move down */
261        cursor -= uchar_width;
262        y1--;
263        distance -= xinc;
264        }
265      }
266     }
267    }
268    --inside;
269    *totalSet += count;
270    *total += pixels;
271    }
272
273    void DrawLine(Picture pict, int x1, int y1, int x2, int y2, UCHAR color)
274    {
275      LineEngine(pict,x1,y1,x2,y2,color,DrawPiston);
276    }
277
278    static int pixelCounter;
279    static int setCounter;
280    BOOLEAN CountPiston(Picture pict, int x, int y, BOOLEAN test, UCHAR color)
281    {
282     if (test) {
283       ++pixelCounter;
284       if (ReadPixel(pict,x,y))
285         ++setCounter;
286     }
287     return test;
288    }
289
290    #ifdef foo
291    float CountLine(Picture pict, int x1, int y1, int x2, int y2)
292    {
293     pixelCounter = 0;
294     setCounter = 0;
295     LineEngine(pict,x1,y1,x2,y2,0,CountPiston);
296     LineEngine(pict,x1,y1,x1-(x2-x1),y1-(y2-y1),0,CountPiston);
297     return (float)setCounter/pixelCounter;
298    }
299    #endif
300
301    float CountLine(Picture pict, int x1, int y1, int x2, int y2)
302    {
```

```
303      pixelCounter = 0;
304      setCounter = 0;
305      CountLine1Bit(pict,x1,y1,x2,y2,&setCounter,&pixelCounter);
306      CountLine1Bit(pict,x1,y1,x1-(x2-x1),y1-(y2-y1),&setCounter,&pixelCounter);
307      return (float)setCounter/pixelCounter;
308    }
309
310    static int startx;
311    static int starty;
312    static int endx;
313    static int endy;
314    BOOLEAN DistancePiston(Picture pict, int x, int y, BOOLEAN test, UCHAR color)
315    {
316      if (test) {
317       if (ReadPixel(pict,x,y)) {
318        if ((x==startx)&&(y==starty))
319           return test;
320        else {
321           endx = x;
322           endy = y;
323           return FALSE;
324        }
325       }
326       else
327        return test;
328      } else
329       return test;
330    }
331
332
333    int DistanceLine(Picture pict, int x1, int y1, int x2, int y2)
334    {
335      double dx,dy;
336      startx = x1;
337      starty = y1;
338      endx = x2;
339      endy = y2;
340      LineEngine(pict,x1,y1,x2,y2,0,DistancePiston);
341      dx = endx-x1;
342      dy = endy-y1;
343      return sqrt(dx*dx+dy*dy);
344    }
345
346
347    #ifdef TEST
348    void draw(pict)
349    Picture pict;
350    {
351     float angle;
352     float step;
353     float x1,y1,x2,y2;
354     float r1,r2;
355     int xc,yc;
356
357     xc = 320;
358     yc = 250;
359     r1 = 50;
360     r2 = 400;
```

```
361        step = M_PI*2/50;
362
363        for (angle = 0;angle < 2*M_PI; angle += step) {
364          x1 = xc + r1*cos(angle);
365          y1 = yc + r1*sin(angle);
366          x2 = xc + r2*cos(angle);
367          y2 = yc + r2*sin(angle);
368          DrawLine(pict,(int)x1,(int)y1,(int)x2,(int)y2,0xff);
369          printf("%3.2f: %d %d\n",angle,
370                 CountLine(pict,(int)x1,(int)y1,(int)x2,(int)y2),
371                 DistanceLine(pict,(int)x1,(int)y1,(int)x2,(int)y2));
372        }
373      }
374
375      void main(argc,argv)
376      int argc;
377      char **argv;
378      {
379        char *outfile;
380        Picture pict;
381
382        if (argc != 2) {
383          printf("Usage: %s outfile\n",argv[0]);
384          exit(0);
385        }
386        outfile = argv[1];
387
388        pict = new_pict(640,500,1);
389
390        draw(pict);
391
392        write_pict(outfile,pict);
393        printf("done\n");
394      }
395      #endif
```

Aug 23 16:43 1991 maxFilter.c

```
1        #include <stdio.h>
2        #include "mylib.h"
3
4        extern int irint(double);
5
6        #define MAX_SIGNAL_LENGTH (10000)
7        #define MIN_MODE (5)  /* MIN_MODE must be less than MAX_HIST_SIZE */
8        #define MAX_HIST_SIZE (500)
9        #define MAX_PEAKS (100)
10       #define BASE_PERCENTILE (0.5)
11       float data[MAX_SIGNAL_LENGTH];
12       int newSignal[MAX_SIGNAL_LENGTH];
13
14       int MaxOnInterval(int start,int end)
15       {
16         int i;
17         float maxValue = data[start];
```

```
18       int maxIndex = start;
19       for (i=start;i<end;++i)
20        if (data[i]>maxValue) {
21         maxValue = data[i];
22         maxIndex = i;
23        }
24       return maxIndex;
25      }
26
27      void main(int argc,char **argv)
28      {
29       char *infile,*outfile;
30       FILE *inFP,*outFP;
31       int signalLength;
32       float *cursor;
33       int foo;
34       int i;
35       int maskWidth = 10;
36       float maxValue;
37       int maxIndex,modeValue,modeIndex;
38       int h[MAX_HIST_SIZE];
39       int finalCount;
40       int finalIndex[MAX_PEAKS];
41       float baseThresh;
42       BOOLEAN upState;
43       float thisRatio,lastRatio;
44
45       DefArg("%s %s","infile outfile",&infile,&outfile);
46       ScanArgs(argc,argv);
47
48       if ((inFP=fopen(infile,"r"))==NULL)
49        DoError("Error opening file %s.\n",infile);
50
51       cursor = data;
52       while (fscanf(inFP,"%d %f\n",&foo,cursor++)==2)
53        if (cursor-data>MAX_SIGNAL_LENGTH)
54         DoError("Signal is too long.\n",NULL);
55       signalLength = cursor-data;
56
57       /* Compute the threhold for the black edge to black pixel ratio */
58       maxValue = data[0];
59       for (i=0;i<signalLength;++i) {
60        if (data[i]>maxValue)
61         maxValue = data[i];
62       }
63       baseThresh = maxValue*BASE_PERCENTILE;
64       printf("baseThresh = %3.3f\n",baseThresh);
65
66       /* Get the indices of the peaks taller than baseThresh */
67       finalCount = 0;
68       upState = TRUE;
69       for (i=0;i<signalLength;++i) {
70        thisRatio = data[i];
71        if (thisRatio < baseThresh)
72         thisRatio = 0;
73        if (upState) {
74         if (thisRatio < lastRatio) {
75            finalIndex[finalCount] = i;
```

```
76          finalCount++;
77          upState = FALSE;
78        }
79      }
80      else {
81        /* upState == FALSE */
82        if (thisRatio > lastRatio)
83            upState = TRUE;
84      }
85      lastRatio = thisRatio;
86      if (finalCount==MAX_PEAKS)
87        break;
88    }
89
90    /* Histogram the distances between adjacent peaks */
91    for (i=0;i<MAX_HIST_SIZE;h[i++]=0);
92    for (i=0;i<finalCount-1;++i) {
93      int d;
94      d = finalIndex[i+1]-finalIndex[i];
95      if (d<MAX_HIST_SIZE)
96        h[d]++;
97    }
98
99    /* Find the mode of the adjacent distances that is above MIN_MODE */
100   modeValue = h[MIN_MODE];
101   modeIndex = MIN_MODE;
102   for (i=MIN_MODE;i<MAX_HIST_SIZE;++i)
103     if (h[i]>modeValue) {
104       modeValue = h[i];
105       modeIndex = i;
106     }
107
108   /* Set the mask width to half of the most common spacing of largest peaks */
109   maskWidth = irint(modeIndex*0.80);
110   printf("maskWidth = %d.\n",maskWidth);
111
112   for (i=0;i<signalLength;newSignal[i++]=0);
113   for (i=0;i<signalLength-maskWidth;++i)
114     newSignal[MaxOnInterval(i,i+maskWidth)]++;
115
116   if ((outFP=fopen(outfile,"w"))==NULL)
117     DoError("Error opening file %s.\n",NULL);
118   for (i=0;i<signalLength;++i)
119     fprintf(outFP,"%d %d\n",i,newSignal[i]);
120   fclose(outFP);
121 }
122
123
124
```

Jun 19 21:22 1991 myWc.c

```
1    #include <stdio.h>
2    #include "boolean.h"
3    #include "error.h"
4
```

```
5   typedef int State;
6   #define WHITE_SPACE 0
7   #define UNKNOWN_WORD 1
8   #define ASCENDER_WORD 2
9
10
11  #define MAX_STRING_LENGTH 200
12
13  BOOLEAN isWhite(char c)
14  {
15    return (c==' '||c=='\t'||c=='\0'||c=='\n');
16  }
17
18  BOOLEAN isAscender(char c)
19  {
20    return ((c=='b')||(c=='d')||(c=='f')||(c=='h')||(c=='i')||(c=='j')||(c=='k')||(c=='l')||
21         (c=='t')||((c>='A')&&(c<='Z'))||((c>='0')&&(c<='9'))||(c=='\'')||(c=='"'));
22  }
23
24  void main(int argc,char **argv)
25  {
26    char *filename;
27    FILE *fp;
28    char s[MAX_STRING_LENGTH+1];
29    char *ptr;
30    State state;
31    int wordsWithAscenders,wordsWithoutAscenders,words;
32
33    if (argc != 2) {
34      fprintf(stderr,"Usage:\n");
35      fprintf(stderr," %s <input file>\n");
36      exit(-1);
37    }
38
39    filename = argv[1];
40    if ((fp=fopen(filename,"r"))==NULL)
41      DoError("%s: cannot open input file.\n",filename);
42
43    wordsWithAscenders = 0;
44    wordsWithoutAscenders = 0;
45    words = 0;
46    fgets(s,MAX_STRING_LENGTH,fp);
47    while (!feof(fp)) {
48     ptr = s;
49     state = WHITE_SPACE;
50     while (*ptr != '\0') {
51       switch (state) {
52         case WHITE_SPACE:
53           if (isWhite(*ptr))
54             ++ptr;
55           else
56             state = UNKNOWN_WORD;
57           break;
58         case UNKNOWN_WORD:
59           if (isWhite(*ptr)) {
60             ++wordsWithoutAscenders;
61             ++words;
```

```
62              state = WHITE_SPACE;
63            }
64            if (isAscender(*ptr)) {
65              ++wordsWithAscenders;
66              ++words;
67              ++ptr;
68              state = ASCENDER_WORD;
69            }
70            else
71              ++ptr;
72            break;
73          case ASCENDER_WORD:
74            if (isWhite(*ptr))
75              state = WHITE_SPACE;
76            ++ptr;
77            break;
78          default:
79            DoError("myWc: internal error - bad state.\n",NULL);
80        } /* switch */
81      } /* while (*ptr ... */
82      fgets(s,MAX_STRING_LENGTH,fp);
83    } /* while (!eof ... */
84    printf("words: %d\n",words);
85    printf("words with ascenders: %d\n",wordsWithAscenders);
86    printf("words without ascenders: %d\n",wordsWithoutAscenders);
87    printf("word ascender/descender ratio: %6.2f\n",
88         (float)wordsWithAscenders/(float)wordsWithoutAscenders);
89  }
```

Aug 23 18:12 1991  newBaselines.c

```
1    #include <stdio.h>
2    #include <values.h>
3    #include <math.h>
4    #include "boolean.h"
5    #include "pict.h"
6    #include "types.h"
7    #include "lists.h"
8    #include "lines.h"
9    #include "baselines.h"
10
11   extern double sqrt(double);
12   extern int irint(double);
13
14   /*inline*/ int NewReadPixel(UCHAR *base,int width,float x,float y)
15   {
16    int xi;
17    int yi;
18    UCHAR mask;
19
20    xi = irint(x);
21    yi = irint(y);
22    mask = 0x80 >> (xi & 0x7);
23    return *(base+yi*width+(xi>>3)) & mask;
24   }
25
```

```
26   void NewCountLine1Bit(Picture pict,int x1,int y1,int x2,int y2,int *black,int *blackEdge)
27   {
28    float x,y;
29    float xinc,yinc;
30    float xupinc,yupinc;
31    float den;
32    int b,be;
33    int width,ucharWidth,height;
34    UCHAR *data;
35
36    width = pict->width;
37    ucharWidth = pict->uchar_width;
38    height = pict->height;
39    data = pict->data;
40
41    den = sqrt((y2-y1)*(y2-y1)+(x2-x1)*(x2-x1));
42    xinc = (x2-x1)/den;
43    yinc = (y2-y1)/den;
44    xupinc = -yinc;
45    yupinc = xinc;
46    x = x1;
47    y = y1;
48
49    b=0;
50    be=0;
51
52    while (x<width&&x>=0&&y<height&&y>=0) {
53     ++b;
54     if (NewReadPixel(data,ucharWidth,x,y)) {
55      if (!(NewReadPixel(data,ucharWidth,x+xupinc,y+yupinc) &&
56           NewReadPixel(data,ucharWidth,x-xupinc,y-yupinc)))
57         ++be;
58     }
59     x += xinc;
60     y += yinc;
61
62    }
63    *black = b;
64    *blackEdge = be;
65   }
66
67
68   #define MIN_BLACK 5
69   void NewCountLine(Picture pict,int x1,int y1,int x2,int y2,int *black,int *blackEdge)
70   {
71    *black = 0;
72    *blackEdge = 0;
73    NewCountLine1Bit(pict,x1,y1,x2,y2,black,blackEdge);
74    NewCountLine1Bit(pict,x1,y1,x1-(x2-x1),y1-(y2-y1),black,blackEdge);
75   }
76
77   static float x2offset;
78   static float y2offset;
79   static int projectIndex;
80   static int *blackPixels;
81   static int *blackEdgePixels;
82   static int *coordx;
```

```
83    static int *coordy;
84    BOOLEAN BaseLinePiston(Picture pict, int x, int y, BOOLEAN test, UCHAR color)
85    {
86      if (test) {
87        NewCountLine(pict,x,y,(int)(x+x2offset),(int)(y+y2offset),
88                  blackPixels+projectIndex,blackEdgePixels+projectIndex);
89        coordx[projectIndex] = x;
90        coordy[projectIndex++] = y;
91        return test;
92      } else
93        return test;
94    }
95
96    static int lastX;
97    static int lastY;
98    BOOLEAN EndPointPiston(Picture pict, int x, int y, BOOLEAN test, UCHAR color)
99    {
100     if (test) {
101       lastX = x;
102       lastY = y;
103     }
104     return test;
105   }
106
107   void EndPoints(Picture pict,double angle,int *tx, int *ty,int *bx, int *by)
108   {
109     int xc,yc;
110     int maxLength;
111     float normal;
112     float x2,y2,x3,y3;
113
114     /* Make normal to text point in quadrants I and II */
115     /* Assume 0 <= angle < 2*M_PI */
116     normal = fmod(angle + M_PI/2,2*M_PI);
117     if (normal > M_PI)
118       normal -= M_PI;
119
120     xc = pict->width/2;
121     yc = pict->height/2;
122
123     maxLength = pict->width+pict->height;
124     x2 = xc+maxLength*cos(normal);      /* At bottom of picture */
125     y2 = yc+maxLength*sin(normal);
126     x3 = xc-maxLength*cos(normal);      /* At top of picture */
127     y3 = yc-maxLength*sin(normal);
128
129     LineEngine(pict,xc,yc,(int)x2,(int)y2,0,EndPointPiston);
130     *bx = lastX;
131     *by = lastY;
132     LineEngine(pict,xc,yc,(int)x3,(int)y3,0,EndPointPiston);
133     *tx = lastX;
134     *ty = lastY;
135   }
136
137   double distance(int x1,int y1,int x2,int y2)
138   {
139     return sqrt((double)((x1-x2)*(x1-x2)+(y1-y2)*(y1-y2)));
```

```
140      }
141
142      FILE *PlotBaselineContour(char *plotFile,int topCount,
143                        float *ratios,int *newSignal,
144                        float baseThresh)
145      {
146       FILE *outfile;
147       int i;
148
149       printf("Opening baselines plot file\n");
150       if ((outfile = fopen(plotFile,"w"))==NULL) {
151        printf("Error opening baseline plot file.\n");
152        exit(-1);
153       }
154       for (i=0;i<topCount;++i)
155        fprintf(outfile,"%d %f\n",i,ratios[i]/baseThresh*5);
156       fprintf(outfile,"\"Ratio\n\n");
157       for (i=0;i<topCount;++i)
158        fprintf(outfile,"%d %d\n",i,newSignal[i]);
159       fprintf(outfile,"\"Projection\n\n");
160       fprintf(outfile,
161            "0 %f\n%d %f%\n\"Baseline Threshold\n",
162            baseThresh,topCount,baseThresh);
163       return outfile;
164      }
165
166      int MaxOnInterval(float *data,int start,int end)
167      {
168       int i;
169       float maxValue = data[start];
170       int maxIndex = start;
171       for (i=start;i<end;++i)
172        if (data[i]>maxValue) {
173         maxValue = data[i];
174         maxIndex = i;
175        }
176       return maxIndex;
177      }
178
179      #define BASE_PERCENTILE 0.50
180      #define MIN_LINE_HEIGHT_FRACTION 0.50
181      #define MIN_MODE (5) /* MIN_MODE must be less than MAX_HIST_SIZE */
182      #define MAX_HIST_SIZE (500)
183      #define MAX_BASELINES (300)
184      List BaseLines(Picture pict,double angle,char *plotFile)
185      {
186       float *topProjection;
187       int *topCoordx,*topCoordy;
188       int *finalCoordx,*finalCoordy,*finalIndex;
189       int topIndex,bottomIndex;
190       int topCount,botCount,finalCount;
191       int maxLength;
192       int xc,yc;
193       float x2,y2,x3,y3;
194       float maxValue,lastValue;
195       int i,j;
196       float baseThresh;
```

```
197        int topX,topY,bottomX,bottomY;
198        BOOLEAN onTextLine;
199        List xList,yList,result;
200        double totalDistance,averageDistance;
201        FILE *outfile;
202        int inside;
203        BOOLEAN upState;
204        float ratio,lastRatio,thisRatio;
205        float *ratios;
206        int *newSignal;
207        int halfMaskWidth = 10; /* for computing ratios */
208        int maxIndex,modeValue,modeIndex;
209        int h[MAX_HIST_SIZE];
210        int maskWidth; /* for max filter */
211
212        printf("angle = %3.3f\n",angle);
213
214     /* The longest ling though the picture will be shorter than maxLength */
215        maxLength = pict->width+pict->height;
216
217     /* Allocate space for the page projection values */
218        blackPixels = (int *)calloc(maxLength,sizeof(int));
219        blackEdgePixels = (int *)calloc(maxLength,sizeof(int));
220        ratios = (float *)calloc(maxLength,sizeof(float));
221        newSignal = (int *)calloc(maxLength,sizeof(int));
222        topCoordx = (int *)calloc(maxLength,sizeof(int));
223        topCoordy = (int *)calloc(maxLength,sizeof(int));
224        finalCoordx = (int *)calloc(maxLength,sizeof(int));
225        finalCoordy = (int *)calloc(maxLength,sizeof(int));
226        finalIndex = (int *)calloc(maxLength,sizeof(int));
227
228        if ((blackPixels == NULL)||
229          (blackEdgePixels == NULL)||
230          (ratios == NULL)||
231          (newSignal==NULL)||
232          (topCoordx == NULL)||
233          (topCoordy == NULL)||
234          (finalIndex == NULL) ||
235          (finalCoordx == NULL) ||
236          (finalCoordy == NULL)) {
237        printf("BaseLines: cannot allocate memory\n");
238        exit(-1);
239        }
240
241     /* Compute the endpoints of a line through the center of the picture in the direction
242      * perpendicular to the text lines. This line will be used as the reference frame for
243      * computing projections. */
244        EndPoints(pict,angle,&topX,&topY,&bottomX,&bottomY);
245
246        printf("Main Line: (%d,%d)-(%d,%d)\n",topX,topY,bottomX,bottomY);
247     /* DrawLine(pict,topX,topY,bottomX,bottomY,0xff); */
248
249     /* Compute the projection of the image at each point along the line.
250      * topProjection will have the number of black pixels on a line and
251      * ratios will have the fraction of black pixels on a line that are
252      * the ends of vertical extents. */
253        x2offset = maxLength*cos(angle);
```

```
254    y2offset = maxLength*sin(angle);
255    projectIndex = 0;
256    coordx = topCoordx;
257    coordy = topCoordy;
258    LineEngine(pict,topX,topY,bottomX,bottomY,0,BaseLinePiston);
259    topCount = projectIndex;
260
261    /* Compute the ratios plot */
262     for (i=0;i<halfMaskWidth;++i)
263      ratios[i] = 0;
264     for (i=topCount-halfMaskWidth;i<topCount;++i)
265      ratios[i] = 0;
266     for (i=0,inside=0;i<halfMaskWidth*2+1;++i)
267      inside += blackPixels[i];
268     for (i=halfMaskWidth;i<topCount-halfMaskWidth;++i) {
269      ratios[i] = (float)blackEdgePixels[i]/inside;
270      inside -= blackPixels[i-halfMaskWidth];
271      inside += blackPixels[i+halfMaskWidth];
272     }
273
274    /* Compute the threhold for the black edge to black pixel ratio */
275     maxValue = ratios[0];
276     for (i=0;i<topCount;++i) {
277      if (ratios[i]>maxValue)
278       maxValue = ratios[i];
279     }
280
281     baseThresh = maxValue*BASE_PERCENTILE;
282     printf("baseThresh = %3.3f\n",baseThresh);
283
284    /* Get the coordinates of the baselines and toplines by finding peaks in the
285     * ratios projection. */
286     finalCount = 0;
287     upState = TRUE;
288     for (i=0;i<topCount;++i) {
289      thisRatio = ratios[i];
290      if (thisRatio < baseThresh)
291       thisRatio = 0;
292      if (upState) {
293       if (thisRatio < lastRatio) {
294          finalIndex[finalCount] = i;
295          finalCount++;
296          upState = FALSE;
297       }
298      }
299      else {
300       /* upState == FALSE */
301       if (thisRatio > lastRatio)
302          upState = TRUE;
303      }
304      lastRatio = thisRatio;
305      if (finalCount == MAX_BASELINES) {
306       fprintf(stderr,"Warning: found too many baselines.\n");
307       fprintf(stderr,"Ignoring remaining baselines.\n");
308       break;
309      }
310     }
```

```
311
312     /* Histogram the distances between adjacent peaks */
313       for (i=0;i<MAX_HIST_SIZE;h[i++]=0);
314       for (i=0;i<finalCount-1;++i) {
315         int d;
316         d = finalIndex[i+1]-finalIndex[i];
317         if (d<MAX_HIST_SIZE)
318           h[d]++;
319       }
320
321     /* Find the mode of the adjacent distances that is above MIN_MODE */
322       modeValue = h[MIN_MODE];
323       modeIndex = MIN_MODE;
324       for (i=MIN_MODE;i<MAX_HIST_SIZE;++i)
325         if (h[i]>modeValue) {
326           modeValue = h[i];
327           modeIndex = i;
328         }
329
330     /* Set the mask width to half of the most common spacing of largest peaks */
331       maskWidth = irint(modeIndex*0.80);
332       printf("maskWidth = %d.\n",maskWidth);
333
334       for (i=0;i<topCount;newSignal[i++]=0);
335       for (i=0;i<topCount-maskWidth;++i)
336         newSignal[MaxOnInterval(ratios,i,i+maskWidth)]++;
337
338     /* Plot the baseline contour if requested */
339       if (plotFile!=NULL)
340         outfile = PlotBaselineContour(plotFile,topCount,ratios,newSignal,baseThresh);
341
342     /* Pick off the new peaks */
343     /* Compute the threhold for the black edge to black pixel ratio */
344       maxValue = newSignal[0];
345       for (i=0;i<topCount;++i) {
346         if (newSignal[i]>maxValue)
347           maxValue = newSignal[i];
348       }
349
350       baseThresh = maxValue*0.80;
351       printf("baseThresh = %3.3f\n",baseThresh);
352
353     /* Get the coordinates of the baselines and toplines by finding peaks in the
354      * ratios projection. */
355       finalCount = 0;
356       upState = TRUE;
357       for (i=0;i<topCount;++i) {
358         thisRatio = newSignal[i];
359         if (thisRatio < baseThresh)
360           thisRatio = 0;
361         if (upState) {
362           if (thisRatio < lastRatio) {
363             finalCoordx[finalCount] = topCoordx[i];
364             finalCoordy[finalCount] = topCoordy[i];
365             finalIndex[finalCount] = i;
366             finalCount++;
367             upState = FALSE;
```

```
368       }
369     }
370     else {
371       /* upState == FALSE */
372       if (thisRatio > lastRatio)
373         upState = TRUE;
374     }
375     lastRatio = thisRatio;
376     if (finalCount == MAX_BASELINES) {
377       fprintf(stderr,"Warning: found too many baselines.\n");
378       fprintf(stderr,"Ignoring remaining baselines.\n");
379       break;
380     }
381   }
382
383
384   /* -------------------------------------------------------------- */
385
386   if (finalCount&1)
387     --finalCount;           /* Only take an even number of lines */
388   for (totalDistance=0,i=0,j=0;i<finalCount;i+=2) {
389     topX = finalCoordx[i];
390     topY = finalCoordy[i];
391     bottomX = finalCoordx[i+1];
392     bottomY = finalCoordy[i+1];
393     totalDistance += distance(topX,topY,bottomX,bottomY);
394     j+=2;
395   }
396   averageDistance = totalDistance / (finalCount/2)*MIN_LINE_HEIGHT_FRACTION;
397   for (i=0,j=0;i<finalCount;i+=2) {
398     topX = finalCoordx[i];
399     topY = finalCoordy[i];
400     topIndex = finalIndex[i];
401     bottomX = finalCoordx[i+1];
402     bottomY = finalCoordy[i+1];
403     bottomIndex = finalIndex[i+1];
404     finalCoordx[j] = topX;
405     finalCoordy[j] = topY;
406     finalIndex[j] = topIndex;
407     finalCoordx[j+1] = bottomX;
408     finalCoordy[j+1] = bottomY;
409     finalIndex[j+1] = bottomIndex;
410     if (distance(topX,topY,bottomX,bottomY)>averageDistance)
411       j+=2;
412   }
413 #ifdef foo
414   *count = j;
415   *returnCoordx = finalCoordx;
416   *returnCoordy = finalCoordy;
417 #endif
418   result = nil;
419   for (i=j-1;i>=0;--i) {
420     push(MakePoint(finalCoordx[i],finalCoordy[i]),result);
421   }
422
423   if (plotFile != NULL) {
424     fprintf(outfile,"\n0 %f\n",-baseThresh);
```

```
425        for (i=0;i<j;i+=2) {
426            fprintf(outfile,"%d %f\n%d %f\n%d %f\n%d %f\n",
427                finalIndex[i],-baseThresh,
428                finalIndex[i],-2*baseThresh,
429                finalIndex[i+1],-2*baseThresh,
430                finalIndex[i+1],-baseThresh);
431        }
432        fprintf(outfile,"\"Baselines");
433        fclose(outfile);
434        printf("Done writing baseline plot file.\n");
435    }
436
437    return result;
438 }
439
440 void DrawBaseLines(Picture pict, List pointList, double angle)
441 #ifdef foo
442 int count,int *coordx,int *coordy,double angle)
443 #endif
444 {
445   int maxLength;
446   float x2,y2,x3,y3;
447   int x,y;
448   Point temp;
449   maxLength = pict->width+pict->height;
450   while (!endp(pointList)) {
451    temp = pop(pointList);
452    x = temp->x;
453    y = temp->y;
454    x2 = x+maxLength*cos(angle);
455    y2 = y+maxLength*sin(angle);
456    x3 = x-maxLength*cos(angle);
457    y3 = y-maxLength*sin(angle);
458    DrawLine(pict,x,y,(int)x2,(int)y2,0xff);
459    DrawLine(pict,x,y,(int)x3,(int)y3,0xff);
460   }
461 }
```

Aug 25 19:48 1991 newBlobify.c

```
1    #include <stdio.h>
2    #include <math.h>
3    #include "mylib.h"
4    #include "blobify.h"
5
6
7    #define MAX_KERNAL_SIZE (40)
8
9    extern int irint(double);
10
11   static UCHAR bitmasks[] = {0x80,0x40,0x20,0x10,0x8,0x4,0x2,0x1};
12
13   UCHAR *address(Picture pict,float x,float y)
14   {
15    return pict->data+irint(y)*pict->uchar_width+(irint(x)>>3);
16   }
```

```
17
18    UCHAR mask(float x)
19    {
20      static masks[] = { 0x80,0x40,0x20,0x10,8,4,2,1};
21      return masks[irint(x)%8];
22    }
23
24    int X(float x)
25    {
26      return irint(x);
27    }
28
29    int Y(float y)
30    {
31      return irint(y);
32    }
33
34    Picture NewBlobify(Picture old,int halfMaskWidth,double threshold,double angle)
35    {
36      Picture new;
37
38      int index;
39      float x,y,xinc,yinc;
40      UCHAR *kernalPtr[MAX_KERNAL_SIZE],*kp[MAX_KERNAL_SIZE];
41      UCHAR kernalMask[MAX_KERNAL_SIZE],km[MAX_KERNAL_SIZE];
42      int kernalX[MAX_KERNAL_SIZE],kernalY[MAX_KERNAL_SIZE];
43      int kx[MAX_KERNAL_SIZE],ky[MAX_KERNAL_SIZE];
44      UCHAR kb[MAX_KERNAL_SIZE];
45      UCHAR *dest;
46      UCHAR dm;
47      int tval,i,j,k,inside;
48      int width,height,ucharWidth,maskWidth;
49
50      if (halfMaskWidth*2+1 > MAX_KERNAL_SIZE)
51        DoError("Blobify: mask is too large.\n",NULL);
52
53      tval = irint(threshold*(halfMaskWidth*2+1));
54
55      width = old->width;
56      height = old->height;
57      ucharWidth = old->uchar_width;
58
59      new = new_pict(width,height,1);
60
61      xinc = cos(angle);
62      yinc = sin(angle);
63      index = 0;
64      kernalPtr[index] = address(old,halfMaskWidth,halfMaskWidth);
65    /*
66      kernalX[index] = X(halfMaskWidth);
67      kernalY[index] = Y(halfMaskWidth);
68    */
69      kernalMask[index++] = mask(halfMaskWidth);
70      for (i=0,x=0,y=0;i<halfMaskWidth;++i) {
71        x+=xinc;
72        y+=yinc;
73        kernalPtr[index] = address(old,halfMaskWidth+x,halfMaskWidth+y);
74    /*
```

```
75        kernalX[index] = X(halfMaskWidth+x);
76        kernalY[index] = Y(halfMaskWidth+y);
77     */
78        kernalMask[index++] = mask(halfMaskWidth+x);
79        kernalPtr[index] = address(old,halfMaskWidth-x,halfMaskWidth-y);
80     /*
81        kernalX[index] = X(halfMaskWidth-x);
82        kernalY[index] = Y(halfMaskWidth-y);
83     */
84        kernalMask[index++] = mask(halfMaskWidth-x);
85      }
86
87      maskWidth = 2*halfMaskWidth+1;
88
89      for (j=0;j<height-maskWidth;++j) {
90       for (i=0;i<index;++i) {
91        kp[i] = kernalPtr[i]+j*ucharWidth;
92        km[i] = kernalMask[i];
93        kb[i] = *kp[i]++;
94     /*
95        kx[i] = kernalX[i];
96        ky[i] = kernalY[i]+j;
97     */
98       }
99       dest = new->data+(j+halfMaskWidth)*ucharWidth+(halfMaskWidth>>3);
100      dm = mask(halfMaskWidth);
101
102      for (k=0;k<width-maskWidth;++k) {
103       if (dm == 0) {
104          dm = 0x80;
105          dest++;
106       }
107       for (i=0,inside=0;i<index;++i) {
108          if (km[i] == 0) {
109           km[i] = 0x80;
110           kb[i] = *kp[i]++;
111          }
112     /*
113          printf("(%d,%d): %d - %x %x -> %x\n",kx[i],ky[i],kb[i]&km[i],kp[i]-1,km[i],kb[i]);
114          kx[i]++;
115     */
116          if (kb[i]&km[i])
117           ++inside;
118          km[i] >>= 1;
119       }
120     /*
121       printf("%d\n\n",inside);
122     */
123       if (inside > tval)
124          *dest |= dm;
125       dm >>= 1;
126      }
127
128     }
129
130     return new;
131
132    }
```

```
133
134     #ifdef TRYMAIN
135     void main(argc,argv)
136     int argc;
137     char **argv;
138     {
139      char *infile,*outfile;
140      Picture old,new;
141      int halfMaskSize;
142      float threshold;
143      float angle;
144
145      DefArg("%s %s %d %f %f","infile outfile halfMaskSize threshold angle",
146              &infile,&outfile,&halfMaskSize,&threshold,&angle);
147      ScanArgs(argc,argv);
148
149      printf("Loading %s...",infile);
150      old = load_pict(infile);
151      new = NewBlobify(old,halfMaskSize,threshold,angle);
152      write_pict(outfile,new);
153     }
154     #endif
```

Aug 15 06:41 1991 newContour.c

```
1       #include <stdio.h>
2       #include <values.h>
3       #include <math.h>
4       #include "boolean.h"
5       #include "types.h"
6       #include "pict.h"
7       #include "lines.h"
8       #include "lists.h"
9       #include "dict.h"
10      #include "diff.h"
11      #include "fontNorm.h"
12
13      extern Picture thePict; /* Picture used for annotated shapes */
14
15      /* The following are misc. definitionas and routines havine to do with
16       * vectors and coordinates. */
17
18      typedef struct {
19      double x;
20      double y;
21      } DPointBody,*DPoint;
22
23
24      static double Dot(DPoint a,DPoint b)
25      {
26      /* printf("Dot: (%lf,%lf)*(%lf,%lf) = %lf\n",a->x,a->y,b->x,b->y,a->x*b->x + a->y*b->y); */
27       return a->x*b->x + a->y*b->y;
28      }
29
30      static DPoint PolarToCartesian(double angle,double radius)
```

```
31    {
32      DPoint result = (DPoint)calloc(1,sizeof(DPointBody));
33      if (result = = NULL)
34       DoError("Dot: cannot allocate space\n");
35      result->x = cos(angle);
36      result->y = sin(angle);
37      return result;
38    }
39
40    static DPoint Normal(DPoint a)
41    {
42      DPoint result = (DPoint)calloc(1,sizeof(DPointBody));
43      if (result = = NULL)
44       DoError("Dot: cannot allocate space\n");
45      result->x = -a->y;
46      result->y = a->x;
47      return result;
48    }
49
50
51
52    /* This piston scans pict up and down from the top and bottom of the
53     * bounding box, looking for the highest and lowest pixels in the
54     * word. If thePict is not NULL, these pixels will be colored as 4
55     * in thePict. */
56    static int startX;
57    static int startY;
58    static double stopDistance;
59    static int lastY;
60    static BOOLEAN valid;
61    BOOLEAN TracePiston(Picture pict, int x, int y, BOOLEAN test, UCHAR color)
62    {
63      double distance;
64      if (test) {
65       distance = sqrt((double)(startX-x)*(startX-x)+(startY-y)*(startY-y));
66       if (distance<stopDistance) {
67    /*    lastY = stopDistance - distance; */
68        lastY = distance;
69
70        if (ReadPixel(pict,x,y)) {
71
72           if (thePict)
73            WritePixel(thePict,x,y,4);
74
75           valid = TRUE;
76           return FALSE;
77       } else {
78           valid = FALSE;
79           return test;
80       }
81      }
82      else {
83       if (thePict)
84          WritePixel(thePict,x,y,4);
85    #ifdef foo
86       lastY = distance; /**** Used to be 0 ****/
87    #endif
```

```
88        lastY = HIT_THE_BOX;
89        valid = FALSE;
90        return FALSE;
91       }
92      }
93      return test;
94    }
95
96
97    /* This piston moves from left to right across a bounding box, calling
98     * trace piston and saving its output in topY, baseY, and bothX. */
99    #define MAX_SHELL_LENGTH 400
100   static int numberOfLegs;
101   static int topY[MAX_SHELL_LENGTH];
102   static int baseY[MAX_SHELL_LENGTH];
103   static int bothX[MAX_SHELL_LENGTH];
104
105   static double leftDistance;
106   static DPoint lineVector;
107   static int downX;
108   static int downY;
109   static double boxTopDistance;
110   static double boxBaseDistance;
111   BOOLEAN ShellPiston(Picture pict, int x, int y, BOOLEAN test, UCHAR color)
112   {
113    int xDistance;
114    DPointBody thisPoint;
115    if (test) {
116     if (numberOfLegs >= MAX_SHELL_LENGTH)
117      return FALSE;
118     thisPoint.x = x;
119     thisPoint.y = y;
120     xDistance = Dot(&thisPoint,lineVector) - leftDistance;
121     stopDistance = boxTopDistance;
122     startX = x;
123     startY = y;
124     LineEngine(pict,x,y,x+downX,y+downY,0,TracePiston);
125     bothX[numberOfLegs] = xDistance;
126     if (valid)
127      topY[numberOfLegs] = lastY;
128     else
129      topY[numberOfLegs] = HIT_THE_BOX;
130
131     stopDistance = boxBaseDistance;
132     startX = x+downX;
133     startY = y+downY;
134     LineEngine(pict,x+downX,y+downY,x,y,0,TracePiston);
135     if (valid)
136      baseY[numberOfLegs] = lastY;
137     else
138      baseY[numberOfLegs] = HIT_THE_BOX;
139     numberOfLegs++;
140
141    }
142    return test;
143   }
144
```

```
145    /* This function, finds the upper and lower contours corresponding
146     * to a word within a bounding box. */
147    void MakeShell(Picture pict,Box box,
148                Dictionary dict, int dictEntry)
149    {
150     DPoint normalVector;
151     DPointBody temp;
152     double boxTop,boxBase;
153     int rightX,rightY;
154
155     lineVector = PolarToCartesian(box->angle,1);
156     normalVector = Normal(lineVector);
157     temp.x = box->x;
158     temp.y = box->y;
159     boxTop = Dot(&temp,normalVector);
160     box->pageY = irint(boxTop);
161     boxBase = boxTop + box->height;
162
163
164    /* CHANGE CHANGE CHANGE CHANGE CHANGE CHANGE CHANGE CHANGE CHANGE */
165     boxTopDistance = boxBase - boxTop;
166     boxBaseDistance = boxBase - boxTop;
167    /* CHANGE CHANGE CHANGE CHANGE CHANGE CHANGE CHANGE CHANGE CHANGE */
168
169     downX = box->height*cos(box->angle+M_PI/2);
170     downY = box->height*sin(box->angle+M_PI/2);
171
172     rightX = box->width*cos(box->angle);
173     rightY = box->width*sin(box->angle);
174
175     numberOfLegs = 0;
176     leftDistance = Dot(&temp,lineVector);
177     box->pageX = irint(leftDistance);
178    #ifdef foo
179     malloc_verify();
180    #endif
181     LineEngine(pict,box->x,box->y,
182             box->x+rightX,box->y+rightY,0,
183             ShellPiston);
184
185    /* CHANGE CHANGE CHANGE CHANGE CHANGE CHANGE CHANGE CHANGE CHANGE */
186     {
187      int i;
188      for (i=0;i<numberOfLegs;++i) {
189       if (*(topY+i)!=HIT_THE_BOX)
190          *(topY+i) += boxTop;
191       if (*(baseY+i)!=HIT_THE_BOX)
192          *(baseY+i) = boxBase - *(baseY+i);
193      }
194     }
195    /* CHANGE CHANGE CHANGE CHANGE CHANGE CHANGE CHANGE CHANGE CHANGE */
196
197    #ifdef foo
198     malloc_verify();
199    #endif
200     StoreRawOutlinePair(dict,dictEntry,box,bothX,topY,
201                baseY,numberOfLegs);
```

```
202    }
203
204    BOOLEAN OnABaseLine(Box box,List baseLinePoints)
205    {
206     DPoint lineVector,normalVector;
207     DPointBody temp;
208     double boxTop,boxBase,top,base;
209     Point topPoint, basePoint;
210
211     lineVector = PolarToCartesian(box->angle,1);
212     normalVector = Normal(lineVector);
213     temp.x = box->x;
214     temp.y = box->y;
215     boxTop = Dot(normalVector,&temp);
216     boxBase = boxTop+box->height;
217
218     while (!endp(baseLinePoints)) {
219      topPoint = pop(baseLinePoints);
220      basePoint = pop(baseLinePoints);
221      temp.x = topPoint->x;
222      temp.y = topPoint->y;
223      top = Dot(normalVector,&temp);
224      temp.x = basePoint->x;
225      temp.y = basePoint->y;
226      base = Dot(normalVector,&temp);
227
228      if ((boxTop>=top && boxTop <= base) ||  /* box top is between */
229          (boxBase>=top && boxBase <= base) || /* box bottom is between */
230          (top >= boxTop && top <= boxBase))   /* both lines inside box */
231        return TRUE;
232     }
233     return FALSE;
234    }
235
236    BOOLEAN BoxToShell(Picture pict,Box box,List baseLinePoints,
237                  Dictionary dict,int dictEntry)
238    {
239     Point topPoint,bottomPoint;
240
241     if (OnABaseLine(box,baseLinePoints)) {
242      MakeShell(pict,box,dict,dictEntry);
243      return TRUE;
244     }
245     else
246      return FALSE;
247    }
248
249    #define MAX_SHAPES 1000
250    void BarBoxList(Picture pict,List boxList,List baseLinePoints,
251                char *filename,char *infoString, NormalizationDescriptor *nd)
252    {
253     Dictionary dict;
254     int count = 0;
255     long int location;
256
257     dict = NewDict(MAX_SHAPES);
258     dict->infoString = infoString;
```

```
259
260      while (!endp(boxList)) {
261      #ifdef foo
262        if (BoxToShell(pict,
263                    (Box)pop(boxList),
264                    baseLinePoints,
265                    dict,
266                    count))
267          ++count;
268      #endif
269      /* Change 8/8/91
270       * All boxes are stored in the dictionary.
271       * The post processing stage in newFontNorm.c will weed out boxes */
272        MakeShell(pict,(Box)pop(boxList),dict,count);
273        ++count;
274      /* End of change 8/8/91 */
275        if (count> =MAX_SHAPES) {
276          printf("Maximum dictionary size exceeded.\n");
277          printf("Ignoring rest of shapes.\n");
278          break;
279        }
280      }
281      dict->numberOfEntries = count;
282      PageStatistics(dict,"statistics",nd);
283      /* PostProcess(dict); */
284      WriteDictionary(dict,filename);
285    }
286
```

Jan 11 17:07 1991 newDiff2.c

```
1      #include <stdio.h>
2      #include "boolean.h"
3      #include "types.h"
4      #include "error.h"
5      #include "pict.h"
6      #include "dict.h"
7      #include "diff.h"
8
9      /* Given the names of two dictionary files, compute the squared difference
10      * between every pair of shapes in the cross product of the dictionaries.
11      * The result is a matrix printed to stdout. The width and height are
12      * followed by the matrix entries in row major order. The output is in
13      * ascii to facilitate reading by a Symbolics. */
14     Picture CompareDictionaries(char *file1,char *file2)
15     {
16       Dictionary dict1,dict2;
17       Picture pict;
18       int x,y;
19       dict1 = ReadDictionary(file1); /* height */
20       dict2 = ReadDictionary(file2); /* width */
21       pict = new_pict(dict2->numberOfEntries,
22                      dict1->numberOfEntries,
23                      32);
24       for (y=0;y<pict->height; ++y)
25         for (x=0;x<pict->width; ++x) {
```

```
26          printf("(%d,%d) ",y,x);
27          *((float *)(pict->data)+pict->width*y+x) =
28              DiffPair(*(dict1->outlines+y),
29                      *(dict2->outlines+x));
30      }
31   return pict;
32  }
33
34  void WritePictureAsAscii(Picture pict,char *filename)
35  {
36   FILE *fp;
37   int x,y;
38   int count=1;
39   if ((fp = fopen(filename,"w"))==NULL)
40     DoError("WritePictureAsAscii: error opening output file\n",NULL);
41   fprintf(fp,"%d\n%d\n",pict->width,pict->height);
42   for (y=0;y<pict->height;++y)
43    for (x=0;x<pict->width;++x) {
44     fprintf(fp,"%f ",*(((float *)pict->data)++));
45     if (!((count++)%5))
46         fprintf(fp,"\n");
47    }
48   fprintf(fp,"\n");
49   fclose(fp);
50  }
```

Aug 26 17:20 1991 newMain.c

```
1       #include <stdio.h>
2       #include <values.h>
3       #include <math.h>
4       #include "misc.h"
5       #include "boolean.h"
6       #include "error.h"
7       #include "types.h"
8       #include "pict.h"
9       #include "lists.h"
10      #include "lines.h"
11      #include "orient.h"
12      #include "baselines.h"
13      #include "blobify.h"
14      #include "boxes.h"
15      #include "dict.h"
16      #include "diff.h"
17      #include "newContour.h"
18      #include "numbers.h"
19
20      #define TRY
21      #ifdef TRY
22      Picture thePict;
23      #endif
24
25      void DrawMiddleLines(Picture pict,List pointList, double angle)
26      {
27       int maxLength;
28       int xc,yc,xBot,xTop,yBot,yTop;
```

```
29      Point temp;
30      float x2,y2,x3,y3;
31      int i,len;
32      maxLength = pict->width+pict->height;
33      len = ListLength(pointList);
34      pop(pointList);
35      for (i=1;i<len-1;i+=2) {
36       temp = pop(pointList);
37       xTop = temp->x;
38       yTop = temp->y;
39       temp = pop(pointList);
40       xBot = temp->x;
41       yBot = temp->y;
42       xc = (xBot+xTop)/2;
43       yc = (yBot+yTop)/2;
44       x2 = xc+maxLength*cos(angle);
45       y2 = yc+maxLength*sin(angle);
46       x3 = xc-maxLength*cos(angle);
47       y3 = yc-maxLength*sin(angle);
48       DrawLine(pict,xc,yc,(int)x2,(int)y2,0);
49       DrawLine(pict,xc,yc,(int)x3,(int)y3,0);
50      }
51     }
52
53     void DrawBoxList(Picture pict,List boxList)
54     {
55      while (!endp(boxList)) {
56       DrawBox(pict,(Box)pop(boxList));
57      }
58     }
59
60     void LabelShapes(Picture pict,Dictionary dict)
61     {
62      int i;
63      Box box;
64
65      for (i=0;i<dict->numberOfEntries;++i) {
66       box = (*(dict->outlines+i))->box;
67       DrawColorBox(pict,box,3);
68       DrawNumber(pict,box->x,box->y,2,(float)box->height/2,i);
69      }
70     }
71
72     double FixAngle(double angle)
73     {
74      if (angle > M_PI/2 && angle < 1.5*M_PI)
75       return angle-M_PI;
76      else
77       return angle;
78     }
79
80     int ScanIntArg(int argc,char **argv,int index)
81     {
82      if (index<argc)
83       return atoi(argv[index]);
84      else
85       DoError("Expected an integer argument\n",NULL);
86     }
```

```
87
88      float ScanFloatArg(int argc,char **argv,int index)
89      {
90       if (index<argc)
91        return atof(argv[index]);
92       else
93        DoError("Expected a floating point argument\n",NULL);
94      }
95
96      char *ScanStringArg(int argc,char **argv,int index)
97      {
98       if (index<argc)
99        return argv[index];
100      else
101       DoError("Expected a string argument\n",NULL);
102     }
103
104     void main(argc,argv)
105     int argc;
106     char **argv;
107     {
108      char *infile;
109      int coarseDirections,coarseSamples,fineDirections,fineSamples;
110      Picture pict,newPict,finalPict;
111      float coarseAngle,mediumAngle,fineAngle;
112      float coarseError,mediumError,fineError;
113      List baselines,boxList;
114      int maskWidth;
115      float blobThreshold;
116      int i;
117      char *shapesFile, *drawBaselinesFile;
118      char *drawBoxesFile,*plotFile,*plotOrientFile;
119      char *drawColorBoxesFile,*drawBlobsFile;
120      char *flag;
121      BOOLEAN doOrientation,doBaselines,doBoxes,doShapes,drawBaselines,drawBoxes;
122      BOOLEAN plotBaselines,plotOrientation,drawColorBoxes,drawBlobs;
123      BOOLEAN
        noXHeightNorm,noAscenderNorm,dontOrientation,doBlobThreshold,doMaskWidth;
124      NormalizationDescriptor nd;
125
126      DefArg("%s","infile",&infile);
127      DefOption("-orientation %f","-orientation (page orientation in radians)",
128              &dontOrientation,&fineAngle);
129      DefOption("-findOrientation","-findOrientation",&doOrientation);
130      DefOption("-plotOrientation %s","-plotOrientation (file top plot xgraph format image
         to)",
131              &plotOrientation,&plotOrientFile);
132      DefOption("-maskWidth %d","-maskWidth (integer half mask width)",
133              &doMaskWidth,&maskWidth);
134      DefOption("-blobThreshold %f","-blobThreshold (float on/off threshold)",
135              &doBlobThreshold,&blobThreshold);
136      DefOption("-drawBlobs %s","-drawBlobs (file to output image
         to)",&drawBlobs,&drawBlobsFile);
137      DefOption("-drawBaselines %s","-drawBaselines (file to output image
         to)",&drawBaselines,
138              &drawBaselinesFile);
139      DefOption("-plotBaselines %s","-plotBaselines (file to plot xgrapgh format baselines to)",
140              &plotBaselines,&plotFile);
```

```
141    DefOption("-drawBoxes %s","-drawBoxes (file to output image
           to)",&drawBoxes,&drawBoxesFile);
142    DefOption("-shapeFunctions %s","-shapeFunctions (file to output shape functions to)",
143            &doShapes,&shapesFile);
144    DefOption("-annotatedShapes %s","-annotatedShapes (file to output image to)",
145            &drawColorBoxes,&drawColorBoxesFile);
146    DefOption("-noAscenderNorm","-noAscenderNorm",&noAscenderNorm);
147    DefOption("-noXHeightNorm","-noXHeightNorm",&noXHeightNorm);
148
149    i = 2;
150    coarseDirections = 72;
151    coarseSamples = 400;
152    fineDirections = 40;
153    fineSamples = 10;
154    maskWidth = 3;
155    blobThreshold = 0.01;
156
157    ScanArgs(argc,argv);
158    if (dontOrientation)
159      doOrientation = FALSE;
160
161    nd.noXHeightNormalize = noXHeightNorm;
162    nd.noAscenderNormalize = noAscenderNorm;
163
164    printf("Loading %s...\n",infile);
165    pict = load_pict(infile);
166    if (pict->depth != 1)
167      DoError("error: only depth 1 is supported\n",NULL);
168
169    if (drawBaselines || drawBoxes)
170      finalPict = new_pict(pict->width,pict->height,pict->depth);
171
172    if (doOrientation) {
173   #define NUMBER_OF_ANGLES 180
174   #define SAMPLES_PER_ANGLE 10
175   #define BIN_ERROR 4
176      printf("Finding coarse orientation.\n");
177      coarseAngle = NewFine(pict,SAMPLES_PER_ANGLE,NUMBER_OF_ANGLES,
178                   0,M_PI,NULL);
179      coarseError = (M_PI-0)/NUMBER_OF_ANGLES;
180      printf("Coarse angle: %f(%f)\n",coarseAngle,coarseAngle/M_PI*180);
181      printf("Coarse error: %f(%f)\n",coarseError,coarseError/M_PI*180);
182
183      mediumAngle = NewFine(pict,SAMPLES_PER_ANGLE,NUMBER_OF_ANGLES,
184                    coarseAngle-BIN_ERROR*coarseError,
185                    coarseAngle+BIN_ERROR*coarseError,
186                    NULL);
187      mediumError = 2*BIN_ERROR*coarseError/NUMBER_OF_ANGLES;
188      printf("Medium angle: %f(%f)\n",mediumAngle,mediumAngle/M_PI*180);
189      printf("Medium error: %f(%f)\n",mediumError,mediumError/M_PI*180);
190
191
192      fineAngle = NewFine(pict,SAMPLES_PER_ANGLE,NUMBER_OF_ANGLES,
193                  mediumAngle-15*mediumError,mediumAngle+15*mediumError,
194                  plotOrientFile);
195      fineError = 30*mediumError/NUMBER_OF_ANGLES;
196      fineAngle = FixAngle(fineAngle);
```

```
197      printf("Fine angle: %f(%f)\n",fineAngle,fineAngle/M_PI*180);
198      printf("Fine error: %f(%f)\n",fineError,fineError/M_PI*180);
199    }
200
201    printf("Adjusted angle: %lf\n",fineAngle);
202
203  #ifdef foo
204    printf("Finding baselines\n");
205    baselines = BaseLines(pict,fineAngle,plotBaselines?plotFile:NULL);
206
207    if (drawBaselines) {
208      CopyPicture(finalPict,pict);
209      DrawBaseLines(finalPict,baselines,fineAngle);
210      write_pict(drawBaselinesFile,finalPict);
211    }
212
213    printf("Blobifying\n");
214    newPict = Blobify(pict,maskWidth,blobThreshold);
215  #endif
216    printf("NewBlobify\n");
217    /* newPict = NewBlobify(pict,maskWidth,blobThreshold,fineAngle); */
218    newPict = Blobify(pict,maskWidth,blobThreshold);
219    printf("Finding baselines\n");
220    baselines = BaseLines(newPict,fineAngle,plotBaselines?plotFile:NULL);
221    if (drawBaselines) {
222      CopyPicture(finalPict,pict);
223      DrawBaseLines(finalPict,baselines,fineAngle);
224      write_pict(drawBaselinesFile,finalPict);
225    }
226
227
228    DrawMiddleLines(newPict,baselines,fineAngle);
229    if (drawBlobs)
230      write_pict(drawBlobsFile,newPict);
231    printf("Finding boxes\n");
232    boxList = FindBorders(newPict,fineAngle);
233
234    if (drawBoxes) {
235      CopyPicture(finalPict,pict);
236      DrawBoxList(finalPict,boxList);
237      write_pict(drawBoxesFile,finalPict);
238    }
239
240    if (doShapes) {
241     ColorMap cmap;
242     int x,y;
243
244     if (drawColorBoxes) {
245       thePict = new_pict(pict->width,pict->height,8);
246       cmap = NewColorMap(6); /* black, white, and 16 colors */
247       WriteColorValue(cmap,0,0,128,0);    /* Olive */
248       WriteColorValue(cmap,1,0,0,0);      /* Black */
249       WriteColorValue(cmap,2,255,255,255); /* White */
250       WriteColorValue(cmap,3,0,0,255);    /* Blue */
251       WriteColorValue(cmap,4,255,255,80); /* Yellow */
252       WriteColorValue(cmap,5,128,0,0);    /* Blood */
253       thePict->cmap = cmap;
```

```
254         for (y=0;y<pict->height;++y)
255           for (x=0;x<pict->width;++x)
256             WritePixel(thePict,x,y,ReadPixel(pict,x,y)?0:1);
257       }
258       else
259         thePict = NULL; /* Important */
260
261       printf("Tracing outlines\n");
262       BarBoxList(pict,boxList,baselines,shapesFile,ArgListToString(argc,argv),&nd);
263
264       if (drawColorBoxes) {
265         Dictionary dict;
266
267         dict = ReadDictionary(shapesFile);
268         LabelShapes(thePict,dict);
269         write_pict(drawColorBoxesFile,thePict);
270       }
271     }
272   }
```

Jan 11 17:07 1991 numbers.c

```
1       #include "stdio.h"
2       #include "boolean.h"
3       #include "pict.h"
4       #include "lines.h"
5
6       static float localScale;
7       static int localColor;
8       static int localX;
9       static int localY;
10      static Picture localPict;
11
12      void DrawSegment(float y1,float x1,float y2,float x2)
13      {
14        DrawLine(localPict,irint(localX+x1*localScale),
15               irint(localY+y1*localScale),
16               irint(localX+x2*localScale),
17               irint(localY+y2*localScale),localColor);
18      }
19
20      void Draw0(Picture pict, int x, int y, int color,float scale)
21      {
22        localPict = pict;
23        localScale = scale;
24        localColor = color;
25        localX = x;
26        localY = y;
27        DrawSegment(0,0,0,1);
28        DrawSegment(1,0,1,1);
29        DrawSegment(0,0,1,0);
30        DrawSegment(0,1,1,1);
31      }
32
33      void Draw1(Picture pict, int x, int y, int color,float scale)
34      {
```

```
35      localPict = pict;
36      localScale = scale;
37      localColor = color;
38      localX = x;
39      localY = y;
40      DrawSegment(0,0.5,1,.5);
41     }
42
43     void Draw2(Picture pict, int x, int y, int color, float scale)
44     {
45      localPict = pict;
46      localScale = scale;
47      localColor = color;
48      localX = x;
49      localY = y;
50      DrawSegment(0,0,0,1);
51      DrawSegment(0,1,.5,1);
52      DrawSegment(.5,1,.5,0);
53      DrawSegment(.5,0,1,0);
54      DrawSegment(1,0,1,1);
55     }
56
57     void Draw3(Picture pict, int x, int y, int color, float scale)
58     {
59      localPict = pict;
60      localScale = scale;
61      localColor = color;
62      localX = x;
63      localY = y;
64      DrawSegment(0,0,0,1);
65      DrawSegment(0,1,1,1);
66      DrawSegment(1,0,1,1);
67      DrawSegment(.5,0,.5,1);
68     }
69
70     void Draw4(Picture pict, int x, int y, int color, float scale)
71     {
72      localPict = pict;
73      localScale = scale;
74      localColor = color;
75      localX = x;
76      localY = y;
77      DrawSegment(0,0,.5,0);
78      DrawSegment(0,1,1,1);
79      DrawSegment(.5,0,.5,1);
80     }
81
82     void Draw5(Picture pict, int x, int y, int color, float scale)
83     {
84      localPict = pict;
85      localScale = scale;
86      localColor = color;
87      localX = x;
88      localY = y;
89      DrawSegment(0,0,0,1);
90      DrawSegment(0,0,.5,0);
91      DrawSegment(.5,1,.5,0);
```

```
92      DrawSegment(.5,1,1,1);
93      DrawSegment(1,0,1,1);
94    }
95
96    void Draw6(Picture pict, int x, int y, int color,float scale)
97    {
98     localPict = pict;
99     localScale = scale;
100    localColor = color;
101    localX = x;
102    localY = y;
103    DrawSegment(0,0,0,1);
104    DrawSegment(0,0,1,0);
105    DrawSegment(.5,1,.5,0);
106    DrawSegment(.5,1,1,1);
107    DrawSegment(1,0,1,1);
108   }
109
110   void Draw7(Picture pict, int x, int y, int color,float scale)
111   {
112    localPict = pict;
113    localScale = scale;
114    localColor = color;
115    localX = x;
116    localY = y;
117    DrawSegment(0,0,0,1);
118    DrawSegment(0,1,1,1);
119   }
120
121   void Draw8(Picture pict, int x, int y, int color,float scale)
122   {
123    localPict = pict;
124    localScale = scale;
125    localColor = color;
126    localX = x;
127    localY = y;
128    DrawSegment(0,0,0,1);
129    DrawSegment(0,0,1,0);
130    DrawSegment(1,0,1,1);
131    DrawSegment(.5,1,.5,0);
132    DrawSegment(0,1,1,1);
133   }
134
135   void Draw9(Picture pict, int x, int y, int color,float scale)
136   {
137    localPict = pict;
138    localScale = scale;
139    localColor = color;
140    localX = x;
141    localY = y;
142    DrawSegment(0,0,0,1);
143    DrawSegment(.5,0,.5,1);
144    DrawSegment(0,0,.5,0);
145    DrawSegment(0,1,1,1);
146   }
147
148   typedef void DrFct(Picture pict, int x, int y, int color, float scale);
```

```
150      DrFct *DrawFunctions[] = {Draw0,Draw1,Draw2,Draw3,Draw4,Draw5,Draw6,
151                      Draw7,Draw8,Draw9};
152
153      void DrawNumeral(Picture pict, int x, int y, int color, float scale, int n)
154      {
155        (*DrawFunctions[n])(pict,x,y,color,scale);
156      }
157
158      void DrawNumber(Picture pict, int x, int y, int color, float scale, int n)
159      {
160        char s[100];
161        char *ptr;
162
163        sprintf(s,"%d",n);
164        ptr = s;
165        while (*ptr != '\0') {
166         DrawNumeral(pict,x,y,color,scale,*ptr-'0');
167         x += irint(scale*1.5);
168         ptr++;
169        }
170      }
171
172      #ifdef TRYMAIN
173      main()
174      {
175        Picture pict;
176        pict = new_pict(400,200,1);
177        DrawNumber(pict,50,50,1,20,12345);
178        DrawNumber(pict,50,100,1,10,67890);
179        write_pict("junkfile.image",pict);
180      }
181      #endif
```

Jul 2 18:48 1991 orient.c

```
1        #include <stdio.h>
2        #include <values.h>
3        #include <math.h>
4        #include "misc.h"
5        #include "boolean.h"
6        #include "pict.h"
7        #include "orient.h"
8        #include "lines.h"
9
10
11       #define ABS(x) (((x)<0)?-(x):(x))
12
13       extern long random();
14
15       int RandomCoordinate(int maxValue)
16       {
17        return (float)(random()&0xffff)*maxValue/0xffff;
18       }
19
20       void RandomEdgePixel(Picture pict,int *x, int *y)
```

```
21      {
22        while (TRUE) {
23          *x = RandomCoordinate(pict->width);
24          *y = RandomCoordinate(pict->height);
25          if (ReadPixel(pict,*x,*y))
26            if (!(ReadPixel(pict,*x+1,*y) &&
27                  ReadPixel(pict,*x-1,*y) &&
28                  ReadPixel(pict,*x,*y+1) &&
29                  ReadPixel(pict,*x,*y-1) &&
30                  ReadPixel(pict,*x+1,*y+1) &&
31                  ReadPixel(pict,*x-1,*y-1) &&
32                  ReadPixel(pict,*x+1,*y-1) &&
33                  ReadPixel(pict,*x-1,*y+1)))
34              return;
35        }
36
37      }
38
39      /* #define SYMTHRESH 4 */
40      #define SYMTHRESH 0.17453278
41      BOOLEAN FindBestMin(float *distances, int coarseDirections, float step,
42                          float *orientation)
43      {
44        int i,j,minIndex,min2Index;
45        int orientationError;
46        float minValue,min2Value;
47        int maxBinError = irint(SYMTHRESH / step);
48
49        minIndex = 0;
50        minValue = distances[0];
51        for (i=0;i<coarseDirections;++i)
52          if (distances[i]<minValue) {
53            minValue = distances[i];
54            minIndex = i;
55          }
56      /* Now verify that there is another minima M_PI away */
57
58        min2Index = (minIndex+coarseDirections/4)%coarseDirections;
59        min2Value = distances[min2Index];
60        for (i=0,j=min2Index;i<coarseDirections/2;++i,j = (j+1)%coarseDirections)
61          if (distances[j]<min2Value) {
62            min2Value = distances[j];
63            min2Index = j;
64          }
65        orientationError = ABS((min2Index-minIndex)%coarseDirections) -
66          coarseDirections/2;
67        orientationError = ABS(orientationError);
68        if (orientationError<maxBinError) {
69          *orientation = minIndex*step;
70          return TRUE;
71        } else {
72          printf("Orientation error: %d %3.3f\n",orientationError,
73              orientationError*step/M_PI/2*360);
74          printf("%3.3f:%3.3f %3.3f:%3.3f\n",minIndex*step,minValue,
75              min2Index*step,min2Value);
76          return FALSE;
77        }
```

```
 78      }
 79
 80      float Fine(Picture pict,int fineSamples, int fineDirections,
 81              int coarseDirections, float coarseAngle, char *plotFile)
 82      {
 83        float coarseError;
 84        int x,y;
 85        float x2,y2;
 86        int i,j;
 87        float *counters;
 88        float step,angle;
 89        float maxAngle;
 90        float maxValue;
 91        float maxLength;
 92        FILE *outfile;
 93
 94        counters = (float *)calloc(fineDirections,sizeof(float));
 95        if (counters = = NULL) {
 96          printf("Fine: cannot allocate memory\n");
 97          exit(-1);
 98        }
 99      /* coarseError = 2*(SYMTHRESH+1)*2*M_PI/coarseDirections; */
100        coarseError = 2*SYMTHRESH;
101        step = coarseError/fineDirections;
102        printf("fine: +/- %3.3f\n",fineDirections/2*step);
103
104        maxLength = sqrt((double)(pict->width*pict->width+
105                         pict->height*pict->height));
106        for (i=0;i<fineSamples;++i) {
107         RandomEdgePixel(pict,&x,&y);
108         angle = -fineDirections/2*step+coarseAngle;
109         for (j=0;j<fineDirections;++j,angle+=step) {
110          x2 = x + maxLength*cos(angle);
111          y2 = y + maxLength*sin(angle);
112          counters[j] += CountLine(pict,x,y,(int)x2,(int)y2);
113         }
114        }
115
116        angle = -fineDirections/2*step+coarseAngle;
117        maxAngle = angle;
118        maxValue = counters[0];
119        for (i=0;i<fineDirections;++i,angle += step) {
120      /*  printf("%3.3f: %3.3f\n",angle,counters[i]); */
121         if (counters[i]>maxValue) {
122          maxAngle = angle;
123          maxValue = counters[i];
124         }
125        }
126
127      /* Plot the orientation graph if requested */
128        angle = -fineDirections/2*step+coarseAngle;
129        if (angle < 0)
130         angle += 2*M_PI;
131        if (plotFile!=NULL) {
132         printf("Opening fine orientation plot file\n");
133         if ((outfile = fopen(plotFile,"a"))= =NULL) {
134          printf("Error opening fine orientation plot file.\n");
135          exit(-1);
```

```
136       }
137       for (i=0;i<fineDirections;++i, angle +announced step)
138         fprintf(outfile,"%f %f\n",fmod(angle,2*M_PI),counters[i]);
139       fprintf(outfile,"\"Fine Distances\n\n");
140       fclose(outfile);
141       printf("Done writing fine orientation plot file.\n");
142     }
143
144
145     return maxAngle;
146   }
147
148   float NewFine(Picture pict,int fineSamples, int fineDirections,
149                 float angleStart,float angleEnd, char *plotFile)
150   {
151     int x,y;
152     float x2,y2;
153     int i,j;
154     float *counters;
155     float step,angle;
156     float maxAngle;
157     float maxValue;
158     float maxLength;
159     FILE *outfile;
160
161     counters = (float *)calloc(fineDirections,sizeof(float));
162     if (counters == NULL) {
163       printf("Fine: cannot allocate memory\n");
164       exit(-1);
165     }
166
167     step = ABS(angleEnd - angleStart)/fineDirections;
168
169     maxLength = sqrt((double)(pict->width*pict->width+
170                               pict->height*pict->height));
171     for (i=0;i<fineSamples;++i) {
172       RandomEdgePixel(pict,&x,&y);
173       angle = angleStart;
174       for (j=0;j<fineDirections;++j) {
175         angle = fmod(angle,2*M_PI);
176         x2 = x + maxLength*cos(angle);
177         y2 = y + maxLength*sin(angle);
178         counters[j] += CountLine(pict,x,y,(int)x2,(int)y2);
179         angle += step;
180       }
181     }
182
183     angle = angleStart;
184     maxAngle = angle;
185     maxValue = counters[0];
186     for (i=0;i<fineDirections;++i) {
187       angle = fmod(angle,2*M_PI);
188       if (counters[i]>maxValue) {
189         maxAngle = angle;
190         maxValue = counters[i];
191       }
192       angle += step;
193     }
```

```
194        printf("Orientation is at %f(%f)\n",maxAngle,maxAngle/2/M_PI*360);
195
196        /* Plot the orientation graph if requested */
197        if (plotFile) {
198         printf("Opening fine orientation plot file\n");
199         if ((outfile = fopen(plotFile,"w"))==NULL) {
200          printf("Error opening fine orientation plot file.\n");
201          exit(-1);
202         }
203         angle = angleStart;
204         for (i=0;i<fineDirections;++i) {
205          angle = fmod(angle,2*M_PI);
206          fprintf(outfile,"%f %f\n",angle,counters[i]);
207          angle += step;
208         }
209         fprintf(outfile,"\"Fine Distances\n\n");
210         fclose(outfile);
211         printf("Done writing fine orientation plot file.\n");
212        }
213        return maxAngle;
214       }
215
```

Jan 15 15:22 1991 overlay.c

```
1      #include <stdio.h>
2      #include <math.h>
3      #include "boolean.h"
4      #include "pict.h"
5
6      main(argc, argv)
7      int argc;
8      char *argv[];
9      {
10      char *inFile1,*inFile2,*outFile;
11      Picture pict1,pict2,finalPict;
12      ColorMap cmap;
13      int x,y;
14
15      if (argc != 4 )
16      {
17       printf("\nUsage: %s infile1 infile2 outfile\n\n",
18              argv[0]);
19       exit(0);
20      }
21
22      inFile1 = argv[1];    /* get args */
23      inFile2 = argv[2];
24      outFile = argv[3];
25
26      pict1 = load_pict(inFile1);
27      pict2 = load_pict(inFile2);
28      if ((pict1->depth != 1) || (pict2->depth != 1))
29        DoError("overlay: only depth 1 supported.\n",NULL);
30      if ((pict1->width != pict2->width)||(pict1->height != pict2->height))
31        DoError("overlay: images must be the same size\n",NULL);
```

```
32
33      finalPict = new_pict(pict1->width,pict1->height,8);
34      cmap = NewColorMap(3);
35      WriteColorValue(cmap,0,0,0,0);    /* Black */
36      WriteColorValue(cmap,1,0,128,0);  /* Olive */
37      WriteColorValue(cmap,2,0,255,0);  /* Green */
38      finalPict->cmap = cmap;
39
40      for (y=0;y<pict1->height;++y)
41       for (x=0;x<pict1->width;++x)
42        if (ReadPixel(pict1,x,y))
43            WritePixel(finalPict,x,y,2);
44        else if (ReadPixel(pict2,x,y))
45            WritePixel(finalPict,x,y,1);
46
47      write_pict(outFile,finalPict);
48      }
```

Jul 1 13:45 1991 pagestats.c

```
1       #include <stdio.h>
2       #include <math.h>
3       #include "boolean.h"
4       #include "types.h"
5       #include "error.h"
6       #include "pict.h"
7       #include "dict.h"
8
9       #define UP 0
10      #define DOWN 1
11      typedef int Direction;
12
13      extern Picture thePict;
14
15      void StoreRawOutlinePair(Dictionary dict, int dictEntry,
16                      Box box,int *bothX,int *topY, int *baseY,
17                      int numberOfLegs)
18      {
19       RawOutlinePair temp;
20       int i;
21       int *xCursor,*topCursor,*bottomCursor;
22
23       temp = (RawOutlinePair)calloc(1,sizeof(RawOutlinePairBody));
24       if (temp == NULL)
25        DoError("StoreRawOutlinePair: cannot allocate space\n",NULL);
26
27       temp->box = box;
28       temp->numberOfLegs = numberOfLegs;
29
30       temp->x = (int *)calloc(temp->numberOfLegs,sizeof(int));
31       temp->top = (int *)calloc(temp->numberOfLegs,sizeof(int));
32       temp->bottom = (int *)calloc(temp->numberOfLegs,sizeof(int));
33       if ((temp->x == NULL) ||
34         (temp->top == NULL) ||
35         (temp->bottom == NULL))
36        DoError("StoreRawOutlinePair: cannot allocate space\n",NULL);
```

```
38      xCursor = temp->x;
39      topCursor = temp->top;
40      bottomCursor = temp->bottom;
41
42      for (i=0;i<numberOfLegs;++i) {
43       *xCursor++ = *bothX++;
44       *topCursor++ = *topY++;
45       *bottomCursor++ = *baseY++;
46      }
47      *(dict->rawOutlines+dictEntry) = temp;
48     }
49
50     void StoreOutlinePair(Dictionary dict, int dictEntry,
51                     int middleLine,int fontXHeight)
52     {
53      RawOutlinePair raw;
54      OutlinePair temp;
55      int i,numberOfLegs;
56      int y;
57      int offset;
58      int *xSCursor,*topSCursor,*bottomSCursor;
59      float *xDCursor,*topDCursor,*bottomDCursor;
60      float *xCursor,*topCursor,*bottomCursor;
61      int left,right;
62      float foffset;
63
64      raw = *(dict->rawOutlines+dictEntry);
65
66      temp = (OutlinePair)calloc(1,sizeof(OutlinePairBody));
67      if (temp == NULL)
68       DoError("StoreOutlinePair: cannot allocate space\n",NULL);
69
70      temp->x = (float *)calloc(raw->numberOfLegs,sizeof(float));
71      temp->top = (float *)calloc(raw->numberOfLegs,sizeof(float));
72      temp->bottom = (float *)calloc(raw->numberOfLegs,sizeof(float));
73      if ((temp->x == NULL) ||
74         (temp->top == NULL) ||
75         (temp->bottom == NULL))
76       DoError("StoreOutlinePair: cannot allocate space\n",NULL);
77
78      temp->box = raw->box;
79      temp->blackoutHeight = 0;
80      temp->numberOfLegs = raw->numberOfLegs;
81      offset = temp->offset = *(raw->x);
82      temp->width = *(raw->x+raw->numberOfLegs-1) - temp->offset;
83
84      xDCursor = temp->x;
85      topDCursor = temp->top;
86      bottomDCursor = temp->bottom;
87      xSCursor = raw->x;
88      topSCursor = raw->top;
89      bottomSCursor = raw->bottom;
90
91      numberOfLegs = raw->numberOfLegs;
92      for (i=0;i<numberOfLegs;++i) {
93       *xDCursor++ = (float)(*xSCursor++ - offset)/fontXHeight;
```

```
94       y = middleLine - *topSCursor++;
95       if (y<0)
96         y = 0;
97       *topDCursor++ = (float)y / fontXHeight;
98       y = *bottomSCursor++ - middleLine;
99       if (y<0)
100        y = 0;
101      *bottomDCursor++ = (float)y / fontXHeight;
102    }
103
104    /* Now try to remove parts of the contour on to the left and right of the
105     * word shape that are at height 0 */
106
107    topDCursor = temp->top;
108    bottomDCursor = temp->bottom;
109    for (i=0;i<numberOfLegs;++i) {
110      if ((*topDCursor++ != 0)||(*bottomDCursor++!=0))
111        break;
112    }
113    left = i;
114
115    topDCursor = temp->top+numberOfLegs-1;
116    bottomDCursor = temp->bottom+numberOfLegs-1;
117    for (i=numberOfLegs-1;i>=0;--i) {
118      if ((*topDCursor-- != 0)||(*bottomDCursor-- !=0))
119        break;
120    }
121    right = i+1;
122
123    xDCursor = temp->x;
124    topDCursor = temp->top;
125    bottomDCursor = temp->bottom;
126    xCursor = temp->x+left;
127    topCursor = temp->top+left;
128    bottomCursor = temp->bottom+left;
129    foffset = *xSCursor;
130    for (i=left;i<right;++i){
131      *xDCursor++ = *xCursor++ - foffset;
132      *topDCursor++ = *topCursor++;
133      *bottomDCursor++ = *bottomCursor++;
134    }
135    temp->numberOfLegs = right-left;
136
137    *(dict->outlines+dictEntry) = temp;
138  }
139
140  static int lineSpacing;
141  int OrderOutlinePair(OutlinePair *o1,OutlinePair *o2)
142  {
143    int yDistance;
144    int xDistance;
145    yDistance = (*o1)->box->pageY - (*o2)->box->pageY;
146    if (yDistance<lineSpacing && yDistance > -lineSpacing) {
147      xDistance = (*o1)->box->pageX - (*o2)->box->pageX;
148      return xDistance;
149    }
150    return yDistance;
```

```
151    }
152
153    void SortDictionary(Dictionary dict)
154    {
155      lineSpacing = 20;
156      qsort(dict->rawOutlines,dict->numberOfEntries,sizeof(RawOutlinePair),
157          OrderOutlinePair);
158    }
159
160    #define HIST_SIZE 100
161    void Histogram(int *data,int dataLength, int offset, int *histogram)
162    {
163      int i,bin;
164      for (i=0;i<dataLength;++i) {
165        bin = *data-offset;
166        if ((bin>=0)&&(bin<HIST_SIZE))
167          histogram[bin]++;
168        data++;
169      }
170    }
171
172    void HistogramPeaks(int *data,int dataLength, int offset, int *histogram)
173    {
174      int i,bin;
175      Direction direction;
176
177      if (*(data+1) < *data)
178        direction = UP;
179      else {
180        bin = *data-offset;
181        if ((bin>=0)&&(bin<HIST_SIZE))
182          histogram[bin]++;
183        direction = DOWN;
184      }
185      ++data;
186
187      for (i=1;i<dataLength-1;++i) {
188        if ((direction == UP) &&
189            (*data < *(data+1))) {
190        /* *data is a peak */
191        bin = *data-offset;
192        if ((bin>=0)&&(bin<HIST_SIZE))
193            histogram[bin]++;
194        direction = DOWN;
195        }
196        else if ((direction == DOWN) &&
197            (*data > *(data+1))) {
198        /* *data is a valley */
199        direction = UP;
200        }
201        ++data;
202      } /* for i */
203    }
204
205    void HistogramValleys(int *data,int dataLength, int offset, int *histogram)
206    {
207      int i,bin;
```

```
208      Direction direction;
209
210      if (*(data+1) > *data)
211        direction = UP;
212      else {
213        bin = *data-offset;
214        if ((bin>=0)&&(bin<HIST_SIZE))
215          histogram[bin]++;
216        direction = DOWN;
217      }
218      ++data;
219
220      for (i=1;i<dataLength-1;++i) {
221        if ((direction == UP) &&
222            (*data > *(data+1))) {
223          /* *data is a peak */
224          bin = *data-offset;
225          if ((bin>=0)&&(bin<HIST_SIZE))
226            histogram[bin]++;
227          direction = DOWN;
228        }
229        else if ((direction == DOWN) &&
230            (*data < *(data+1))) {
231          /* *data is a valley */
232          direction = UP;
233        }
234        ++data;
235      } /* for i */
236    }
237
238    int MaxBin(int *histogram)
239    {
240      int i;
241      int maxValue;
242      int maxIndex;
243
244      maxValue = histogram[0];
245      maxIndex = 0;
246      for (i=0;i<HIST_SIZE;++i)
247        if (histogram[i]>maxValue) {
248          maxValue = histogram[i];
249          maxIndex = i;
250        }
251      return maxIndex;
252    }
253
254    void PostProcess(Dictionary dict)
255    {
256      int index;
257      int temp;
258      int i,startIndex,firstY,minY,endIndex,shape;
259      int tops[HIST_SIZE];
260      int bottoms[HIST_SIZE];
261      int middleLine,topLine,bottomLine;
262      int fontXHeight;
263      RawOutlinePair thisShape;
264
```

```
265    SortDictionary(dict);
266
267    index = 0;
268    #ifdef foo
269    malloc_verify();
270    #endif
271    while (index < dict->numberOfEntries) {
272      startIndex = index;
273      firstY = (*(dict->rawOutlines+index))->box->pageY;
274      minY = firstY;
275      while ( (*(dict->rawOutlines+index))->box->pageY - firstY < 20 &&
276             (*(dict->rawOutlines+index))->box->pageY - firstY > -20) {
277        if ( minY > ( (*(dict->rawOutlines+index))->box->pageY ))
278          minY = (*(dict->rawOutlines+index))->box->pageY;
279        ++index;
280        if (index == dict->numberOfEntries)
281          break;
282      }
283      endIndex = index;
284
285    #ifdef foo
286      malloc_verify();
287    #endif
288
289      /* shapes from start index through endindex are all on */
290      /* the same text line */
291      /* minY has the top of the highest box on the line. */
292
293      /* Find the base and toplines by taking the mode of the heights of the
294       * valleys of the bottom contours and the peaks of the top contours */
295      for (i=0;i<HIST_SIZE;i++) {
296        tops[i]=0;
297        bottoms[i]=0;
298      }
299      for (shape=startIndex;shape<endIndex; ++shape) {
300        thisShape = *(dict->rawOutlines+shape);
301        Histogram(thisShape->top,thisShape->numberOfLegs,minY,tops);
302        Histogram(thisShape->bottom,thisShape->numberOfLegs,minY,bottoms);
303
304    #ifdef foo
305        HistogramPeaks(thisShape->top,thisShape->numberOfLegs,minY,tops);
306        HistogramValleys(thisShape->bottom,thisShape->numberOfLegs,minY,bottoms);
307    #endif
308      }
309      topLine = MaxBin(tops)+minY;
310      bottomLine = MaxBin(bottoms)+minY;
311
312      if (thePict) {
313        int maxLength;
314        int halfWidth;
315        int x,y;
316        float x2,x3,y2,y3;
317        float angle;
318
319        angle = (*(dict->rawOutlines))->box->angle;
320        maxLength = thePict->width+thePict->height;
321        halfWidth = thePict->width / 2;
```

```
322        x = topLine * -sin(angle) + halfWidth * cos(angle);
323        y = topLine * cos(angle) + halfWidth * sin(angle);
324        x2 = x+maxLength*cos(angle);
325        y2 = y+maxLength*sin(angle);
326        x3 = x-maxLength*cos(angle);
327        y3 = y-maxLength*sin(angle);
328        DrawLine(thePict,x,y,(int)x2,(int)y2,5);
329        DrawLine(thePict,x,y,(int)x3,(int)y3,5);
330
331        x = bottomLine * -sin(angle) + halfWidth * cos(angle);
332        y = bottomLine * cos(angle) + halfWidth * sin(angle);
333        x2 = x+maxLength*cos(angle);
334        y2 = y+maxLength*sin(angle);
335        x3 = x-maxLength*cos(angle);
336        y3 = y-maxLength*sin(angle);
337        DrawLine(thePict,x,y,(int)x2,(int)y2,5);
338        DrawLine(thePict,x,y,(int)x3,(int)y3,5);
339
340      }
341
342   #ifdef foo
343     malloc_verify();
344   #endif
345
346     middleLine = (bottomLine+topLine)/2;
347     fontXHeight = bottomLine-topLine;
348     /* Clip and normalize the contours */
349     for (shape=startIndex;shape<endIndex; + +shape)
350       StoreOutlinePair(dict,shape,middleLine,fontXHeight);
351    }/* Do another line of text */
352    }

Jul 1 13:46 1991 postproc.c

1     #include <stdio.h>
2     #include <math.h>
3     #include "boolean.h"
4     #include "types.h"
5     #include "error.h"
6     #include "pict.h"
7     #include "dict.h"
8
9     #define UP 0
10    #define DOWN 1
11    typedef int Direction;
12
13    extern Picture thePict;
14
15    void StoreRawOutlinePair(Dictionary dict, int dictEntry,
16                    Box box,int *bothX,int *topY, int *baseY,
17                    int numberOfLegs)
18    {
19      RawOutlinePair temp;
20      int i;
21      int *xCursor,*topCursor,*bottomCursor;
22
```

```
23      temp = (RawOutlinePair)calloc(1,sizeof(RawOutlinePairBody));
24      if (temp == NULL)
25        DoError("StoreRawOutlinePair: cannot allocate space\n",NULL);
26
27      temp->box = box;
28      temp->numberOfLegs = numberOfLegs;
29
30      temp->x = (int *)calloc(temp->numberOfLegs,sizeof(int));
31      temp->top = (int *)calloc(temp->numberOfLegs,sizeof(int));
32      temp->bottom = (int *)calloc(temp->numberOfLegs,sizeof(int));
33      if ((temp->x == NULL) ||
34         (temp->top == NULL) ||
35         (temp->bottom == NULL))
36        DoError("StoreRawOutlinePair: cannot allocate space\n",NULL);
37
38      xCursor = temp->x;
39      topCursor = temp->top;
40      bottomCursor = temp->bottom;
41
42      for (i=0;i<numberOfLegs;++i) {
43        *xCursor++ = *bothX++;
44        *topCursor++ = *topY++;
45        *bottomCursor++ = *baseY++;
46      }
47      *(dict->rawOutlines+dictEntry) = temp;
48    }
49
50    void StoreOutlinePair(Dictionary dict, int dictEntry,
51                  int middleLine,int fontXHeight)
52    {
53      RawOutlinePair raw;
54      OutlinePair temp;
55      int i,numberOfLegs;
56      int y;
57      int offset;
58      int *xSCursor,*topSCursor,*bottomSCursor;
59      float *xDCursor,*topDCursor,*bottomDCursor;
60      float *xCursor,*topCursor,*bottomCursor;
61      int left,right;
62      float foffset;
63
64      raw = *(dict->rawOutlines+dictEntry);
65
66      temp = (OutlinePair)calloc(1,sizeof(OutlinePairBody));
67      if (temp == NULL)
68        DoError("StoreOutlinePair: cannot allocate space\n",NULL);
69
70      temp->x = (float *)calloc(raw->numberOfLegs,sizeof(float));
71      temp->top = (float *)calloc(raw->numberOfLegs,sizeof(float));
72      temp->bottom = (float *)calloc(raw->numberOfLegs,sizeof(float));
73      if ((temp->x == NULL) ||
74         (temp->top == NULL) ||
75         (temp->bottom == NULL))
76        DoError("StoreOutlinePair: cannot allocate space\n",NULL);
77
78      temp->box = raw->box;
79      temp->blackoutHeight = 0;
```

```
80      temp->numberOfLegs = raw->numberOfLegs;
81      offset = temp->offset = *(raw->x);
82      temp->width = *(raw->x+raw->numberOfLegs-1) - temp->offset;
83
84      xDCursor = temp->x;
85      topDCursor = temp->top;
86      bottomDCursor = temp->bottom;
87      xSCursor = raw->x;
88      topSCursor = raw->top;
89      bottomSCursor = raw->bottom;
90
91      numberOfLegs = raw->numberOfLegs;
92      for (i=0;i<numberOfLegs;++i) {
93       *xDCursor++ = (float)(*xSCursor++ - offset)/fontXHeight;
94       y = middleLine - *topSCursor++;
95       if (y<0)
96         y = 0;
97       *topDCursor++ = (float)y / fontXHeight;
98       y = *bottomSCursor++ - middleLine;
99       if (y<0)
100        y = 0;
101       *bottomDCursor++ = (float)y / fontXHeight;
102     }
103
104     /* Now try to remove parts of the contour on to the left and right of the
105      * word shape that are at height 0 */
106
107     topDCursor = temp->top;
108     bottomDCursor = temp->bottom;
109     for (i=0;i<numberOfLegs;++i) {
110      if ((*topDCursor++ != 0)||(*bottomDCursor++ !=0))
111        break;
112     }
113     left = i;
114
115     topDCursor = temp->top+numberOfLegs-1;
116     bottomDCursor = temp->bottom+numberOfLegs-1;
117     for (i=numberOfLegs-1;i>=0;--i) {
118      if ((*topDCursor-- != 0)||(*bottomDCursor-- !=0))
119        break;
120     }
121     right = i+1;
122
123     xDCursor = temp->x;
124     topDCursor = temp->top;
125     bottomDCursor = temp->bottom;
126     xCursor = temp->x+left;
127     topCursor = temp->top+left;
128     bottomCursor = temp->bottom+left;
129     foffset = *xSCursor;
130     for (i=left;i<right;++i) {
131      *xDCursor++ = *xCursor++ - foffset;
132      *topDCursor++ = *topCursor++;
133      *bottomDCursor++ = *bottomCursor++;
134     }
135     temp->numberOfLegs = right-left;
136
137     *(dict->outlines+dictEntry) = temp;
```

```
138     }
139
140     static int lineSpacing;
141     int OrderOutlinePair(OutlinePair *o1,OutlinePair *o2)
142     {
143      int yDistance;
144      int xDistance;
145      yDistance = (*o1)->box->pageY - (*o2)->box->pageY;
146      if (yDistance<lineSpacing && yDistance > -lineSpacing) {
147       xDistance = (*o1)->box->pageX - (*o2)->box->pageX;
148       return xDistance;
149      }
150      return yDistance;
151     }
152
153     void SortDictionary(Dictionary dict)
154     {
155      lineSpacing = 20;
156      qsort(dict->rawOutlines,dict->numberOfEntries,sizeof(RawOutlinePair),
157           OrderOutlinePair);
158     }
159
160     #define HIST_SIZE 100
161     void HistogramMax(int *data,int dataLength,int offset,int sign,int *histogram)
162     {
163      int i,bin;
164
165      if (sign>0) {
166       int maxValue;
167       maxValue = *data;
168       for (i=0;i<dataLength;++i)
169        if (data[i]>maxValue)
170           maxValue = data[i];
171       bin = maxValue-offset;
172       if ((bin>=0)&&(bin<HIST_SIZE))
173        histogram[bin]++;
174      }
175      else {
176       int minValue;
177       minValue = *data;
178       for (i=0;i<dataLength;++i)
179        if (data[i]<minValue)
180           minValue = data[i];
181       bin = minValue-offset;
182       if ((bin>=0)&&(bin<HIST_SIZE))
183        histogram[bin]++;
184      }
185     }
186
187     void Histogram(int *data,int dataLength, int offset, int *histogram)
188     {
189      int i,bin;
190
191      for (i=0;i<dataLength;++i) {
192       bin = *data-offset;
193       if ((bin>=0)&&(bin<HIST_SIZE))
194        histogram[bin]++;
195       data++;
```

```
196        }
197      }
198
199      void HistogramPeaks(int *data,int dataLength, int offset, int *histogram)
200      {
201        int i,bin;
202        Direction direction;
203
204        if (*(data+1) < *data)
205         direction = UP;
206        else {
207         bin = *data-offset;
208         if ((bin>=0)&&(bin<HIST_SIZE))
209           histogram[bin]++;
210         direction = DOWN;
211        }
212        ++data;
213
214        for (i=1;i<dataLength-1;++i) {
215         if ((direction == UP) &&
216             (*data < *(data+1))) {
217          /* *data is a peak */
218          bin = *data-offset;
219          if ((bin>=0)&&(bin<HIST_SIZE))
220             histogram[bin]++;
221          direction = DOWN;
222         }
223         else if ((direction == DOWN) &&
224              (*data > *(data+1))) {
225          /* *data is a valley */
226          direction = UP;
227         }
228         ++data;
229        } /* for i */
230      }
231
232      void HistogramValleys(int *data,int dataLength, int offset, int *histogram)
233      {
234        int i,bin;
235        Direction direction;
236
237        if (*(data+1) > *data)
238         direction = UP;
239        else {
240         bin = *data-offset;
241         if ((bin>=0)&&(bin<HIST_SIZE))
242           histogram[bin]++;
243         direction = DOWN;
244        }
245        ++data;
246
247        for (i=1;i<dataLength-1;++i) {
248         if ((direction == UP) &&
249             (*data > *(data+1))) {
250          /* *data is a peak */
251          bin = *data-offset;
252          if ((bin>=0)&&(bin<HIST_SIZE))
```

```
253         histogram[bin]++;
254       direction = DOWN;
255     }
256     else if ((direction == DOWN) &&
257            (*data < *(data+1))) {
258       /* *data is a valley */
259       direction = UP;
260     }
261     ++data;
262   } /* for i */
263 }
264
265 int MaxBin(int *histogram)
266 {
267   int i;
268   int maxValue;
269   int maxIndex;
270
271   maxValue = histogram[0];
272   maxIndex = 0;
273   for (i=0;i<HIST_SIZE;++i)
274     if (histogram[i]>maxValue) {
275       maxValue = histogram[i];
276       maxIndex = i;
277     }
278   return maxIndex;
279 }
280
281 void PostProcess(Dictionary dict)
282 {
283   int index;
284   int temp;
285   int i,startIndex,firstY,minY,endIndex,shape;
286   int tops[HIST_SIZE];
287   int bottoms[HIST_SIZE];
288   int middleLine,topLine,bottomLine;
289   int fontXHeight;
290   RawOutlinePair thisShape;
291
292   SortDictionary(dict);
293
294   index = 0;
295 #ifdef foo
296   malloc_verify();
297 #endif
298   while (index < dict->numberOfEntries) {
299     startIndex = index;
300     firstY = (*(dict->rawOutlines+index))->box->pageY;
301     minY = firstY;
302     while ( (*(dict->rawOutlines+index))->box->pageY - firstY < 20 &&
303            (*(dict->rawOutlines+index))->box->pageY - firstY > -20) {
304       if ( minY > ( (*(dict->rawOutlines+index))->box->pageY ))
305         minY = (*(dict->rawOutlines+index))->box->pageY;
306       ++index;
307       if (index == dict->numberOfEntries)
308         break;
309     }
```

```
310      endIndex = index;
311
312    #ifdef foo
313      malloc_verify();
314    #endif
315
316      /* shapes from start index through endindex are all on */
317      /* the same text line */
318      /* minY has the top of the highest box on the line. */
319
320      /* Find the base and toplines by taking the mode of the heights of the
321       * valleys of the bottom contours and the peaks of the top contours */
322      for (i=0;i<HIST_SIZE;i++){
323        tops[i]=0;
324        bottoms[i]=0;
325      }
326      for (shape=startIndex;shape<endIndex;++shape) {
327        thisShape = *(dict->rawOutlines+shape);
328        Histogram(thisShape->top,thisShape->numberOfLegs,minY,tops);
329        Histogram(thisShape->bottom,thisShape->numberOfLegs,minY,bottoms);
330
331    #ifdef foo
332        HistogramPeaks(thisShape->top,thisShape->numberOfLegs,minY,tops);
333        HistogramValleys(thisShape->bottom,thisShape->numberOfLegs,minY,bottoms);
334    #endif
335      }
336      topLine = MaxBin(tops)+minY;
337      bottomLine = MaxBin(bottoms)+minY;
338
339     if (thePict) {
340       int maxLength;
341       int halfWidth;
342       int x,y;
343       float x2,x3,y2,y3;
344       float angle;
345
346       angle = (*(dict->rawOutlines))->box->angle;
347       maxLength = thePict->width+thePict->height;
348       halfWidth = thePict->width / 2;
349       x = topLine * -sin(angle) + halfWidth * cos(angle);
350       y = topLine * cos(angle) + halfWidth * sin(angle);
351       x2 = x+maxLength*cos(angle);
352       y2 = y+maxLength*sin(angle);
353       x3 = x-maxLength*cos(angle);
354       y3 = y-maxLength*sin(angle);
355       DrawLine(thePict,x,y,(int)x2,(int)y2,5);
356       DrawLine(thePict,x,y,(int)x3,(int)y3,5);
357
358       x = bottomLine * -sin(angle) + halfWidth * cos(angle);
359       y = bottomLine * cos(angle) + halfWidth * sin(angle);
360       x2 = x+maxLength*cos(angle);
361       y2 = y+maxLength*sin(angle);
362       x3 = x-maxLength*cos(angle);
363       y3 = y-maxLength*sin(angle);
364       DrawLine(thePict,x,y,(int)x2,(int)y2,5);
365       DrawLine(thePict,x,y,(int)x3,(int)y3,5);
366
```

```
367       }
368
369   #ifdef foo
370       malloc_verify();
371   #endif
372
373       middleLine = (bottomLine+topLine)/2;
374       fontXHeight = bottomLine-topLine;
375       /* Clip and normalize the contours */
376       for (shape=startIndex;shape<endIndex;++shape)
377         StoreOutlinePair(dict,shape,middleLine,fontXHeight);
378       } /* Do another line of text */
379   }
380
381   void PageStatistics(Dictionary dict,char *fileName)
382   /* WARNING - this must be run before PostProcess since PostProcess changes the raw
383    * shape data. */
384   {
385     int index;
386     int temp;
387     int i,startIndex,firstY,minY,endIndex,shape;
388     int tops[HIST_SIZE];
389     int bottoms[HIST_SIZE];
390     int ascenders[HIST_SIZE];
391     int descenders[HIST_SIZE];
392     int middleLine,topLine,bottomLine,ascenderLine,descenderLine;
393     int ascenderHeight,descenderHeight,lineNumber;
394     int fontXHeight;
395     RawOutlinePair thisShape;
396     FILE *fp;
397
398     if ((fp=fopen(fileName,"w"))==NULL)
399       DoError("PageStatistics: error opening output file %s.\n",fileName);
400
401     SortDictionary(dict);
402
403     index = 0;
404   #ifdef foo
405     malloc_verify();
406   #endif
407     lineNumber = 0;
408     while (index < dict->numberOfEntries) {
409       startIndex = index;
410       firstY = (*(dict->rawOutlines+index))->box->pageY;
411       minY = firstY;
412       while ( (*(dict->rawOutlines+index))->box->pageY - firstY < 20 &&
413              (*(dict->rawOutlines+index))->box->pageY - firstY > -20) {
414         if ( minY > ( (*(dict->rawOutlines+index))->box->pageY ))
415           minY = (*(dict->rawOutlines+index))->box->pageY;
416         ++index;
417         if (index == dict->numberOfEntries)
418           break;
419       }
420       endIndex = index;
421
422   #ifdef foo
423       malloc_verify();
```

```
424    #endif
425
426        /* shapes from start index through endindex are all on */
427        /* the same text line */
428        /* minY has the top of the highest box on the line. */
429
430        /* Find the base and toplines by taking the mode of the heights of the
431         * valleys of the bottom contours and the peaks of the top contours */
432        for (i=0;i<HIST_SIZE;i++) {
433          tops[i]=0;
434          bottoms[i]=0;
435          ascenders[i]=0;
436          descenders[i]=0;
437        }
438        for (shape=startIndex;shape<endIndex; ++shape) {
439          thisShape = *(dict->rawOutlines+shape);
440          Histogram(thisShape->top,thisShape->numberOfLegs,minY,tops);
441          Histogram(thisShape->bottom,thisShape->numberOfLegs,minY,bottoms);
442
443          HistogramMax(thisShape->top,thisShape->numberOfLegs,minY,-1,ascenders);
444          HistogramMax(thisShape->bottom,thisShape->numberOfLegs,minY,1,descenders);
445        }
446        topLine = MaxBin(tops)+minY;
447        bottomLine = MaxBin(bottoms)+minY;
448        ascenderLine = MaxBin(ascenders)+minY;
449        descenderLine = MaxBin(descenders)+minY;
450
451    #ifdef foo
452        malloc_verify();
453    #endif
454
455        middleLine = (bottomLine+topLine)/2;
456        fontXHeight = bottomLine-topLine;
457
458        ascenderHeight = bottomLine-ascenderLine;
459        descenderHeight = descenderLine-bottomLine;
460        fprintf(fp,"%d: %d %d %d %2.6f\n",lineNumber,fontXHeight,ascenderHeight,descenderHeight,
461              (float)ascenderHeight/(float)fontXHeight);
462        ++lineNumber;
463      } /* Do another line of text */
464      fclose(fp);
465    }

Jul 10 13:17 1991 testFine.c

1      #include <stdio.h>
2      #include <math.h>
3      #include "boolean.h"
4      #include "pict.h"
5      #include "lines.h"
6
7      #define ABS(x) (((x)<0)?(-(x)):(x))
8
9      extern long random();
10
```

```
11    int RandomCoordinate(int maxValue)
12    {
13      return (float)(random()&0xffff)*maxValue/0xffff;
14    }
15
16    void RandomEdgePixel(Picture pict,int *x, int *y)
17    {
18     while (TRUE) {
19       *x = RandomCoordinate(pict->width);
20       *y = RandomCoordinate(pict->height);
21       if (ReadPixel(pict,*x,*y))
22        if (!(ReadPixel(pict,*x+1,*y) &&
23              ReadPixel(pict,*x-1,*y) &&
24              ReadPixel(pict,*x,*y+1) &&
25              ReadPixel(pict,*x,*y-1) &&
26              ReadPixel(pict,*x+1,*y+1) &&
27              ReadPixel(pict,*x-1,*y-1) &&
28              ReadPixel(pict,*x+1,*y-1) &&
29              ReadPixel(pict,*x-1,*y+1)))
30          return;
31      }
32
33    }
34
35    float Fine(Picture pict,int fineSamples, int fineDirections,
36               float angleStart,float angleEnd, char *plotFile)
37    {
38      int x,y;
39      float x2,y2;
40      int i,j;
41      float *counters;
42      float step,angle;
43      float maxAngle;
44      float maxValue;
45      float maxLength;
46      FILE *outfile;
47
48      counters = (float *)calloc(fineDirections,sizeof(float));
49      if (counters == NULL) {
50       printf("Fine: cannot allocate memory\n");
51       exit(-1);
52      }
53
54      step = ABS(angleEnd - angleStart)/fineDirections;
55
56      maxLength = sqrt((double)(pict->width*pict->width+
57                       pict->height*pict->height));
58      for (i=0;i<fineSamples;++i) {
59       RandomEdgePixel(pict,&x,&y);
60       angle = angleStart;
61       for (j=0;j<fineDirections;++j) {
62         angle = fmod(angle,2*M_PI);
63         x2 = x + maxLength*cos(angle);
64         y2 = y + maxLength*sin(angle);
65         counters[j] += CountLine(pict,x,y,(int)x2,(int)y2);
66         angle += step;
67       }
```

```
68      }
69
70      angle = angleStart;
71      maxAngle = angle;
72      maxValue = counters[0];
73      for (i=0;i<fineDirections;++i) {
74       angle = fmod(angle,2*M_PI);
75       if (counters[i]>maxValue) {
76        maxAngle = angle;
77        maxValue = counters[i];
78       }
79       angle += step;
80      }
81      printf("Orientation is at %f(%f)\n",maxAngle,maxAngle/2/M_PI*360);
82
83      /* Plot the orientation graph if requested */
84       printf("Opening fine orientation plot file\n");
85       if ((outfile = fopen(plotFile,"w"))==NULL) {
86        printf("Error opening fine orientation plot file.\n");
87        exit(-1);
88       }
89       angle = angleStart;
90       for (i=0;i<fineDirections;++i) {
91        angle = fmod(angle,2*M_PI);
92        fprintf(outfile,"%f %f\n",angle,counters[i]);
93        angle += step;
94       }
95       fprintf(outfile,"\"Fine Distances\n\n");
96       fclose(outfile);
97        printf("Done writing fine orientation plot file.\n");
98        return maxAngle;
99      }
100
101     main(argc, argv)
102     int argc;
103     char *argv[];
104     {
105      char *inFileName,*coarseOutFileName,*fineOutFileName,*fine2OutFileName;
106      int fineDirections,fineSamples;
107      float coarseAngle,fineAngle,fineAngle2;
108      float firstSpacing,secondSpacing,thirdSpacing;
109      Picture pict;
110
111      if (argc != 7 )
112      {
113       printf("\nUsage: %s infile coarsePlotFile finePlotFile\n",argv[0]);
114       printf("     finerPlotFile #directions #samples\n\n");
115
116       exit(0);
117      }
118
119      inFileName = argv[1];    /* get args */
120      coarseOutFileName = argv[2];
121      fineOutFileName = argv[3];
122      fine2OutFileName = argv[4];
123      fineDirections = atoi(argv[5]);
124      fineSamples = atoi(argv[6]);
125
```

```
126      pict = load_pict(inFileName);
127      coarseAngle = Fine(pict,fineSamples,fineDirections,
128                    0,M_PI,coarseOutFileName);
129      firstSpacing = (M_PI-0)/fineDirections;
130      printf("Coarse angle: %f(%f)\n",coarseAngle,coarseAngle/M_PI*180);
131      printf("Coarse spacing: %f(%f)\n",firstSpacing,firstSpacing/M_PI*180);
132
133      fineAngle = Fine(pict,fineSamples,fineDirections,
134                    coarseAngle-4*firstSpacing,coarseAngle+4*firstSpacing,
135                    fineOutFileName);
136      secondSpacing = 8*firstSpacing/fineDirections;
137      printf("Fine angle: %f(%f)\n",fineAngle,fineAngle/M_PI*180);
138      printf("Fine spacing: %f(%f)\n",secondSpacing,secondSpacing/M_PI*180);
139
140      fineAngle2 = Fine(pict,fineSamples,fineDirections,
141                    fineAngle-15*secondSpacing,fineAngle+15*secondSpacing,
142                    fine2OutFileName);
143      thirdSpacing = 30*secondSpacing/fineDirections;
144      printf("Finer angle: %f(%f)\n",fineAngle2,fineAngle2/M_PI*180);
145      printf("Finer spacing: %f(%f)\n",thirdSpacing,thirdSpacing/M_PI*180);
146    }
147
```

Aug 15 06:32 1991  types.c

```
1      #include "stdio.h"
2      #include "mylib.h"
3      #include "types.h"
4      #include "error.h"
5
6      Box MakeBox(int x,int y,int width,int height,double angle)
7      {
8       Box temp;
9       temp = (Box)calloc(1,sizeof(BoxBody));
10      if (temp==NULL)
11       DoError("MakeBox: out of memory\n",NULL);
12      temp->x = x;
13      temp->y = y;
14      temp->width = width;
15      temp->height = height;
16      temp->angle = angle;
17      return temp;
18     }
19
20     Point MakePoint(int x,int y)
21     {
22      Point temp;
23      temp = (Point)calloc(1,sizeof(PointBody));
24      if (temp==NULL)
25       DoError("MakePoint: out of memory\n",NULL);
26      temp->x = x;
27      temp->y = y;
28      return temp;
29     }
30
31
32
```

What is claimed is:

1. A method for electronically processing at least one document stored as an electronic document image containing undecoded text to identify a selected portion thereof, said method comprising the steps or:
   segmenting said at least one document image into words, each word having an undecoded textual content;
   classifying the textual content of at least some of said words relative to other said words, without decoding the words, based on an evaluation of predetermined morphological characteristics of said words; and
   selecting words for further processing according to the classification of said words obtained in said classifying step.

2. The method of claim 1 wherein said evaluation of predetermined morphological characteristics includes a determination of whether said words being classified are located within selected regions within the document image.

3. The method of claim 1 wherein said classifying step is also based on a determination of the relative frequencies with which words having similar predetermined morphological characteristics are present among the words being classified.

4. The method of claim 1 wherein said predetermined morphological characteristics include at least one of a dimension, font, typeface, number of ascender elements, number of descender elements, pixel density, pixel cross-sectional characteristics, the location of words with respect to neighboring words, vertical position, horizontal inter-word spacing, and contour characteristic of said words.

5. The method of claim 1 wherein:
   prior to performing said classifying step, said words are processed for discriminating which of said words do not contain sufficient textual content for useful evaluation of the subject matter of the text contained in said document image;
   said classifying step is performed only with the words not discriminated by said process for discriminating; and said process for discriminating is performed based on an evaluation of the predetermined morphological characteristics of said words, without decoding the words or referring to decoded word image data.

6. The method of claim 1 wherein a document corpus containing a plurality of documents is processed, and said segmenting, classifying and selecting steps are performed with respect to the document image for each document in the document corpus.

7. The method of claim 6 further comprising the step of classifying the documents in the document corpus according to the classification of the words obtained in said classifying step.

8. A method for electronically processing at least one document stored as an electronic document image containing undecoded information to identify a selected portion thereof, said method comprising the steps of:
   segmenting said at least one document image into image units;
   classifying the image units relative to other said image units, without decoding the image units being classified or referring to decoded image data, based on an evaluation of predetermined morphological image characteristics of said image units being classified;
   selecting image units for further processing according to the classification of said image units obtained in said classifying step, wherein:
   prior to performing said classifying step, said image units are processed for discriminating which of said image units are useful for evaluation of the subject matter contained in said document image; and
   said classifying step is performed only with the image units not discriminated by said process for discriminating; and said process for discriminating is performed based on an evaluation of predetermined image characteristics of said image units, without decoding the image units or referring to decoded image data.

9. The method of claim 1, wherein said words comprise at least one of numbers, alphanumerical sequences, symbols and graphic representations.

* * * * *